United States Patent [19]
Farrell et al.

[11] Patent Number: 5,206,933
[45] Date of Patent: Apr. 27, 1993

[54] DATA LINK CONTROLLER WITH CHANNELS SELECTIVELY ALLOCATABLE TO HYPER CHANNELS AND HYPER CHANNEL DATA FUNNELED THROUGH REFERENCE LOGICAL CHANNELS

[75] Inventors: Joseph K. Farrell, Boca Raton, Fla.; Jeffrey S. Gordon, Centreville, Va.; Daniel C. Kuhl, Delray Beach, Fla.; Timothy V. Lee; Tony E. Parker, both of Boca Raton, Fla.

[73] Assignee: International Business Machines Corporation, Armonk, N.Y.

[21] Appl. No.: 495,821

[22] Filed: Mar. 15, 1990

[51] Int. Cl.[5] .............................. G06F 7/00
[52] U.S. Cl. ................... 395/200; 370/95.1; 395/325; 395/500; 364/DIG. 2; 364/940; 364/942
[58] Field of Search ............. 395/325, 200, 275, 700, 395/500; 370/84, 95.1

[56] References Cited
U.S. PATENT DOCUMENTS

| | | |
|---|---|---|
| H586 | 2/1989 | Kun. |
| 4,156,796 | 5/1979 | O'Neal et al. ............ 178/3 |
| 4,188,665 | 2/1980 | Nagel et al. ............ 364/200 |
| 4,985,887 | 1/1991 | Mizuhara et al. ......... 370/58.2 |
| 4,985,891 | 1/1991 | Fujiwara et al. ......... 370/110.1 |
| 5,012,489 | 4/1991 | Burton et al. ............ 375/8 |
| 5,051,982 | 9/1991 | Brown et al. ............ 370/58.2 |

OTHER PUBLICATIONS

User Manual T115 Synchronous Protocol Data Formatter (SPYDER-T), Copyright Mar., 1989 AT&T.
Rockwell Fact Sheet (80 pages), ISDN/DMI Link Layer Controller VLSI Device, dated Jul. 23, 1986.
Rockwell Fact Sheet R8071 ISDN/DMI Link Controller, Document No. 29300N15, Nov. 1985.

Primary Examiner—Thomas C. Lee
Assistant Examiner—Mehmet Geckil
Attorney, Agent, or Firm—Winfield J. Brown, Jr.; Robert Lieber

[57] ABSTRACT

An integrated data link control device (IDLC) interfaces between a host computer system and external channels in a communication network. The device contains multiple internal channels allocatable individually to interface to the external channels, each internal channel having internal buffer memory reserved to it for storing data signals handled by it. The device also includes facilities for selectively configuring groups of its internal channels into "extended channels", some of which are termed Hyper Channels. Channels in each extended channel group interface collectively and in time coordination to one external channel, presenting an effective bandwidth to the external channel which is greater than the bandwidth of any single internal channel. One channel in each group is designated as a reference channel for the group, and all data signals transferred between the group and the assigned external channel are funneled through only the buffer memory assigned to the respective reference channel; in order to ensure that such signals are transferred between the external channel and the host system in their correct "message" sequence.

14 Claims, 23 Drawing Sheets

Hyperchl Formulation/Usage (HYPERCHANNEL FORMATION/USAGE)

N — PROCESSING FOR SLOT N
P — PREFETCHING PART OF CCR ("CHL TYPE")
S — SWAPPING STATES
H — HALT ELEMENTS FOR GLOBAL SWAP
R — READ FULL CCR/HPCR
BOS — BEGINNING OF SLOT INDICATION
xxxx — BTDM DATA TRANSFER PHASE
GLOBAL — VARIABLES COMMON TO XMIT & RCV Time Swap Ram (TSR)

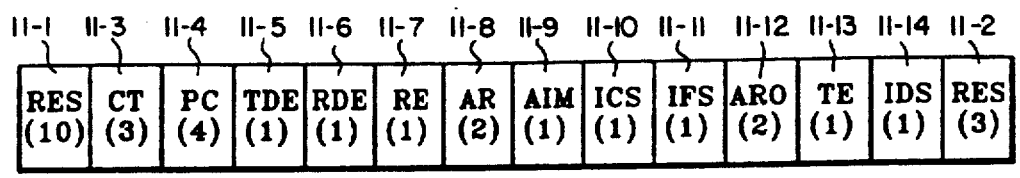
Channel Configuration Register (CCR)   FIG. 11
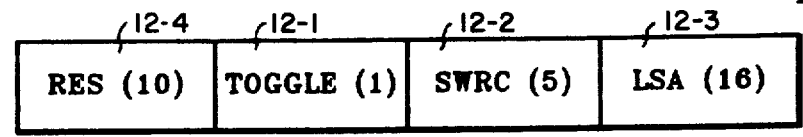
HDLC Protocol Configuration Register (HPCR)   FIG. 12
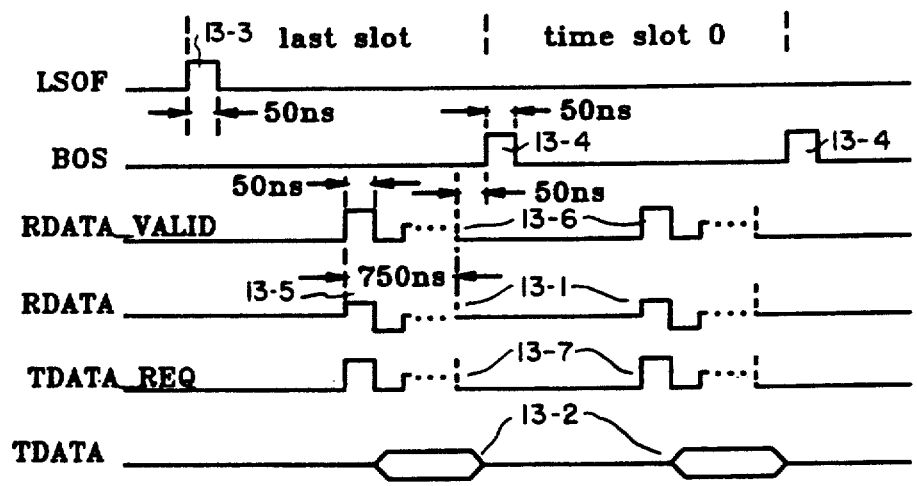
BTDM Interface Signal and Data Timing   FIG. 13
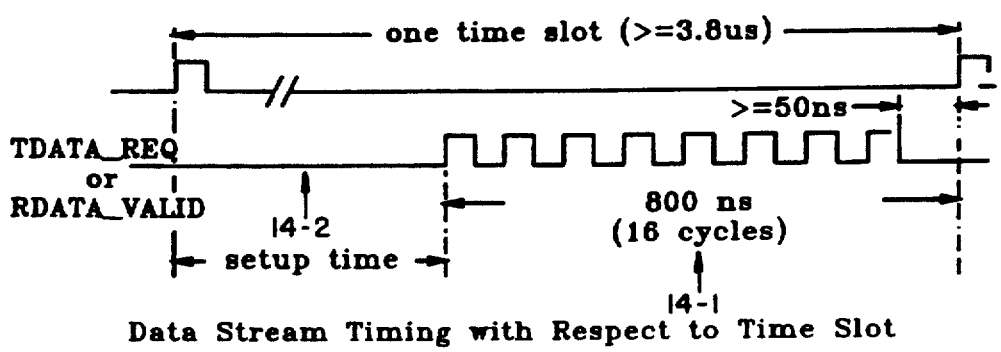
Data Stream Timing with Respect to Time Slot
FIG. 14

Data Bit Timing with Respect to Clocks

RFM (Receive FIFO Manager) partition

Receive FIFO Manager Time Swapped Word 1 (RFM_TS01)

Receive FIFO Manager Time Swapped Word 2 (RFM_TS02)

Transmit FIFO Manager partition (TFM)

Transmit FIFO Manager Time Swapped Word 1 (TFM_TS01)

Receive DMA Configuration Register 1 (RDCR1)

Receive DMA Configuration Register 2 (RDCR2)

Transmit DMA Configuration Register 1 (TDCR1)

Transmit DMA Configuration Register 2 (TDCR2)

FIG. 26  INTERRUPT PARTITION (INT)

| RES (16) | WPE (1) | APE (1) | LID (1) | PWE (1) | PIA (1) | DPE (1) | NDS (1) | WSE (1) | PPE (1) | DBE (1) | RES (1) | ITE (1) | LTO (1) | RES (1) | ESD (1) | DTO (1) |
|---|---|---|---|---|---|---|---|---|---|---|---|---|---|---|---|---|
| | 27-4 | 27-5 | 27-6 | 27-7 | 27-8 | 27-9 | 27-10 | 27-11 | 27-12 | 27-13 | 27-2 | 27-14 | 27-15 | 27-3 | 27-16 | 27-17 |
| 27-1 | STATUS | | | | | | | | | | SOURCE | | | | | |

IHEISR Format

FIG. 27

| RES (15) | WVA (1) | NOV (5) | PTV (1) | IQO (1) | PE (2) | IM (2) | SWA (1) | NSL (4) |
|---|---|---|---|---|---|---|---|---|
| 28-1 | 28-2 | 28-9 | 28-3 | 28-4 | 28-6 | 28-7 | 28-5 | 28-8 |

CEISR Format

FIG. 28

| IQO (1) | XMIT EOC (1) | XMIT ABT/IDL (1) | XMIT UNDR (1) | SRC EOF (1) | SRC ABC (1) | SRC ABT (1) | SRC IDL (1) | RDD (1) | TX CNT (4) | RCV OAS (1) | RCV CRC (1) | RCV OVF (1) | RCV DBC (16) |
|---|---|---|---|---|---|---|---|---|---|---|---|---|---|
| 29-1 | 29-2 | 29-3 | 29-4 | 29-5 | 29-6 | 29-7 | 29-8 | 29-9 | 29-10 | 29-11 | 29-12 | 29-13 | 29-14 |
| A | T | | | SOURCE | | | | R | | STATUS | | | |

EOPISR Format

FIG. 29

| | TOTAL | SCAN ALGORITHM |
|---|---|---|
| CHANNEL INTERRUPTS | | |
| IDLC End of Process Channel Interrupt | 32 | 5 |
| IDLC Channelized Error Interrupt | 32 | 4 |
| CHIP INTERRUPTS | | |
| Layer One Channel Interrupt | 1 | 3 |
| Layer One Common Chip Interrupt | 1 | 2 |
| IDLC Chip Hardware Error Interrupt | 1 | 1 |

IDLC Interrupt Vector Level and Priority

SIO PARTITION

IDLC Configuration Register (ICR)

Hyper-Channel configuration Register (HCR)

Vector Holding Register (VHR)

DMAC_A State Machine

Receive DMA Configuration Register 3 (RDCR3)

Receive DMA Configuration Register 4 (RDCR4)

Transmit DMA Configuration Register 3 (TDCR3)

Transmit DMA Configuration Register 4 (TDCR4)

Hyperchl Formulation/Usage

DATA LINK CONTROLLER WITH CHANNELS SELECTIVELY ALLOCATABLE TO HYPER CHANNELS AND HYPER CHANNEL DATA FUNNELED THROUGH REFERENCE LOGICAL CHANNELS

CONTENTS

ABSTRACT OF THE DISCLOSURE
CROSS-REFERENCES TO RELATED PATENT APPLICATIONS
BACKGROUND OF THE INVENTION
PRIOR ART
SUMMARY OF THE INVENTION
OBJECTS OF THE INVENTION
DESCRIPTION OF DRAWINGS
DETAILED DESCRIPTION
 1. TERMS, DEFINITIONS AND CONCEPTS
 2. SYSTEM OVERVIEW
 3. ARCHITECTURE OF IDLC DEVICE
 4. OPERATIONS—GENERAL
 5. IDLC ORGANIZATION—INTERMEDIATE 5.1 ABBREVIATIONS (32); 5.2 TRANSMIT/RECEIVE DATA PATHS (35); 5.3 INTERRUPT PATHS (42); 5.4 STATUS SWAP PATHS (44); 5.5 HOST PROGRAM CONTROL INTERFACE (49); 5.6 OPERATIONS—INTERMEDIATE (50); 5.7 FORMATION AND USAGE OF HYPERCHANNELS/EXTENDED CHANNELS (56)
 6. TIME-SWAP RAM (TSR)
 7. RSM
 8. BTDM INTERFACE
 9. RECEIVE ELEMENTS RL1, RV
 10. TRANSMIT PROCESSING ELEMENTS TL1 and TV
 11. FIFO RAM (FIFOR) AND FIFO MANAGER PARTITIONS
 12. INTERRUPT HANDLING ELEMENTS - INT, SIO
 13. DMARQ, DMA RAM AND DMAC ELEMENT
 14. MIO
 15. HYPERCHANNELS
CLAIMS

CROSS-REFERENCES TO RELATED PATENT APPLICATIONS

1. Application Ser. No. 07/495,232, filed Mar. 15, 1990, by J. Farrell et al, entitled "Integrated Data Link Controller With Autonomous Logical Elements", concerns organization of a subject data link control device into multiple autonomous elements providing pipelining effects for more efficient operation.

2. Application Ser. No. 07/495,810, filed Mar. 15, 1990, now issued U.S. Pat. No. 5,121,390 by J. Farrell et al, entitled "Integrated Data Link Controller Controller With Synchronous Link Interface And Asynchronous Host Processor Interface" concerns the partitioning of the subject device into synchronous and asynchronous sections for achieving busing efficiencies and other benefits.

3. Application Ser. No. 07/495,012, filed Mar. 15, 1990, by J. Farrell et al, entitled "Burst Time Division Multiplex Interface For Integrated Data Link Controller" concerns a connection interface between a subject device and line control circuits (also called "Level 1 or L1 circuits"), allowing the device to operate efficiently relative to diverse line speeds, protocols, modem characteristics, etc.

BACKGROUND OF THE INVENTION

HyperChannels, also known as H-Channels and referred to elsewhere herein as "extended channels", are channels formed by combining smaller channels to obtain increased bandwidths [refer to: CCITT Red Book, Vol. III, Fascicle III.5, "Integrated Services Digital Network (ISDN), Recommendations of the Series I, Geneva 1985]. CCITT recommendations for HyperChannels in ISDN environments contemplate three types of HyperChannels, each having fixed bandwidth associated with national high speed communication links. The three types are; H0 type HyperChannels running at 384 Kbps, H11 HyperChannels running at 1.536 Mbps (or 4 times H0 speed), and H12 HyperChannels running at 1.920 Mbps (or 5 times H0 speed).

Above-mentioned CCITT recommendations define an environment for integral support of digitized voice and data communications, towards which national and supra-national telecommunication carrier systems appear to be evolving presently both in the United States and elsewhere. A basic simplex voice channel operates at 64 Kbps, and a full duplex voice channel operates at 128 Kbps (for sustaining voice communication at a quality level considered commercially acceptable). It is apparent that the operating speeds selected for Hyper-Channels as defined are predetermined multiples of the basic rates needed for single voice channels, either simplex or full duplex.

The present invention relates to a data link control device supporting dynamic formation and dissolution of HyperChannels, and having flexibility characteristics transcending limits imposed by the CCITT recommendations.

PRIOR ART

As noted above, the basic rate for sustaining commercially acceptable voice communication (one-way) is 32 Kbps. A data link control device suitable for operation in the ISDN environment would be expected therefore to sustain at least several channels of voice and data communication simultaneously, and therefore should have an operating rate which is a multiple of the basic voice rate.

As noted further above, HyperChannels as defined in CCITT recommendations have operating rates which are predetermined multiples of the basic rate needed for a simplex voice link.

The present invention seeks to provide a data link control device supporting basic voice and data channels and HyperChannels with a degree of flexibility in allocation of capacity not previously contemplated.

SUMMARY OF THE INVENTION

The present invention seeks to provide a data link control device suited for operation in the ISDN environment. That device has a time division multiplex data communication interface in which basic time slots recur cyclically in frames containing n slots. These basic slots are allocatable dynamically to n "basic" communication channels supporting n separate communication processes having various forms and protocols (n=32 in the described embodiment). A basic channel in the presently disclosed environment contains sufficient bandwidth to sustain a full duplex voice conversation (64

Kbps) or any other data communication operation which can operate within that bandwidth.

A feature of this device presently of interest is that it contains logic permitting groups of time slots at the interface to be allocated to "extended channels" or "HyperChannels". In such allocation, a group of m slots within the slot recurrence frame is associated with one channel entity, the latter presently termed either extended channel or HyperChannel. This allows the respective channel entity to operate effectively at m times the maximum bit transfer rate of a basic channel.

Another feature of the present device is that the grouping of allocated slots is variable to allow formation of groups of many different sizes (different numbers of slots) and also to allow for selecting slots which are not contiguously positioned within the basic frame.

Thus, the invention contemplates a device having a degree of flexibility in respect to HyperChannel formation which transcends limits apparently contemplated by the CCITT recommendations (e.g. to provide extended channels having bandwidths effective bandwidths intermediate those afforded by basic channels, H0 HyperChannels, and H1 HyperChannels as defined by the CCITT.

Another feature is that the grouped allocation of slot capacity may be made at a level transparent to circuitry which performs OSI layer 1 functions between the subject device and communication media. Another feature is that such allocation may be provided by grouping non-contiguous time slots within a basic slot repetition frame, whereby, for instance, H0 or H1 HyperChannels may be configured even though the number of available contiguous time slots is insufficient for such.

The device comprises logic circuitry and a number of locally accessible RAM (random access memory) storage arrays. The logic circuitry is organized into synchronous and asynchronous sections, which respectively link to a multi-channel communication network and a higher level processing system (e.g. a host processing system). Data received in active network channels is processed within the synchronous section, stored in one of the local RAM's and transferred from that RAM through the asynchronous section to 15 an external memory associated with the higher level system. In the opposite direction, relative to active network channels, data is fetched from the external memory through the asynchronous section to the local RAM, then processed in the synchronous section, and ultimately transferred across the network interface.

At the network interface, data is transferred during basic time division time slots allocated to internal channels and/or HyperChannels in the device. The basic slots recur cyclically in frames of n slots (n=32 presently). During a slot allocated to an active channel, data is transferred bit-serially to and/or from an internal channel (or HyperChannel) in the device. Each such transfer comprises a burst of from 0 to m bits (m=8 presently) compressed into a fraction of the respective slot interval.

At the processing system interface, data is transferred in bit-parallel sets (presently in groups of up to 4 bytes) between internal device channels or HyperChannels and pre-assigned channel or HyperChannel storage spaces in an external memory associated with the external processing system.

Within each section data is handled through several logical partitions. The partitions in the synchronous section form discrete multitasking stages in receive and transmit processing pipelines which respectively process data received from and transmitted to the network interface. The partitions operate in synchronism with time slots at the network interface to process data relative to channels or HyperChannels to which such slots are assigned. Within each pipeline stage, data in any channel is handled in bit-parallel byte units.

A stage closest to the network interface in the receive pipeline deserializes received data relative to each channel (assembles them into bytes) and performs several protocol-specific functions relative to data received in a specific protocol form; e.g. HDLC. From that stage data is passed to the next receive pipeline stage in bit-parallel byte units for further processing. The next stage performs validation processing on data received in protocol channels (e.g. CRC checking) and passes the data to a respective channel queue storage space in the above-mentioned local RAM (each such queue presently holds up to 4 bytes of data relative to each channel and/or HyperChannel).

In the transmit pipeline a stage furthest from the network interface performs validation processing relative to protocol formatted channels and passes bytes relative to each active channel to a next stage closest to the network interface. The latter stage performs certain protocol-specific tasks selectively relative to bytes received from protocol formatted channels, and transfers data bit-serially to the network interface in response to request pulses presented at the interface. In each stage, processing relative to each channel or HyperChannel is performed in synchronism with the occurrences of time slots assigned to the respective channel or HyperChannel at the interface.

In accordance with the present invention, a HyperChannel or extended channel is a channel entity formed by allocating to that entity a group of m (m greater than 1) selected slots within the basic frame of interface time slot recurrence, so that said entity can operate to transfer data at a rate of m times the basic rate allowable for a single slot. Furthermore, in such allocation presently, a many to one association is established between the allocated group of slots and a "reference" slot in the group (presently, the slot which appears earliest in each slot frame).

A feature of this association is that with a minor exception all control, configuration and process state parameters relative to that entity, as well as all in-transit data of that entity, need then be stored only in spaces associated with the reference slot. Thus, the time needed to program the device relative to such entity is reduced (simplifying the programmed operation of the higher level processing system in that respect and also reducing the use of bandwidth at the device/processing system interface for that function). The above-mentioned minor exception is that storage spaces associated with non-reference slots of a HyperChannel group contain configuration information for indicating the HyperChannel type as one of a plurality of types (H1, H01, H02, H03, H04, H05), and this information is needed for determining the respective reference slot association.

In the arrangement presently disclosed, HyperChannels or extended channels are formed and activated through programmed action of external processing systems. Such systems have access to the above-mentioned local RAM arrays and to certain common configuration defining registers in the device partitions for establishing initial parameters required for such formation and activation. A feature presently is that one of the registers, termed the HCR (HyperChannel Configuration Register), is externally settable to define the reference slot association of each configured group and the active or inactive status of the respective HyperChannel.

The device contains a resource manager logical partition (RSM) which operates in synchronism with network slots, and generates a numerical time slot indications ($RSM_{13}$ TSI) which normally represents the time position of the respective slot within the basic frame of slots. These indications are used to derive addresses relative to one of the local arrays and to control certain request queueing operations discussed below. A feature of the invention presently is that when a slot associated with a HyperChannel group appears at the network interface, the RSM uses information in HCR to translate its time slot indication into a value which represents the time position of the reference slot of that group. Another feature is that when a slot in an associated group appears, the RSM produces a further indication relative to the group which is useful with respect to request queueing as discussed later.

Regarding the request queueing function mentioned earlier, the device is organized into synchronous and asynchronous sections, and data is transferred between these sections via data queues in one of the local RAM's. The data queue storage spaces include a transmit data queue space and a receive data queue space relative to each interface time slot. A DMA (direct memory access) control partition (DMAC) in the asynchronous section transfers data between these data queues and external memory via an external bus associated with an external higher level data processing system. A DMA Request Queue (DMARQ) forms the controlling linkage for data handling between the synchronous and asynchronous sections. Logic in the synchronous section monitors the status of each active data queue, and as action is required posts a request to DMARQ which is steered to an associated bit register in DMARQ. DMARQ contains 2 bit registers for each allocatable basic slot, one for requests associated with a respective transmit data queue and the other for requests associated with a respective receive data queue. Thus, requests associated with receive and transmit data queues are steered to separate associated bit registers in DMARQ. Requests in these bit registers are presented on an asynchronous basis to DMAC for handling in a predetermined priority sequence. When DMAC selects a request to be serviced it performs an operation via the external bus to transfer data between the respective data queue and external memory. At the same time, DMAC presents a resetting input signal to DMARQ which is steered to the bit register holding the selected request so as to cause the resetting of that bit.

A feature of the invention is that DMARQ contains separate bit registers for requests associated with HyperChannel data queues, and such requests are steered to their respective bit registers when a HyperChannel data queue requires service. Such requests are posted during any time slot assigned to the respective HyperChannel slot group. Accordingly, the respective priority given and action taken by DMAC relative to HyperChannel requests is different from those given and taken relative to basic channel requests (as needed to meet the higher speed requirements of HyperChannels). The steering of HyperChannel requests to appropriate bit registers in DMARQ is determined by several control indications provided to DMARQ from RSM. These include the time slot indication mentioned earlier (which is translated by RSM on the basis of the information in HCR to point to the reference slot of the HyperChannel slot group), and a further indication from RSM defining the HyperChannel type. In a described embodiment contemplating support of basic channels and H0, H11 and H12 HyperChannels, the DMARQ provides three separate sets of bit registers; one set each for basic channels, H0 HyperChannels and H1 HyperChannels. Within each set there are two bit registers for each channel or HyperChannel which can be formed in the device; one for transmit data queue service and the other for receive data queue service. Thus, in this embodiment, there are 64 bit registers for basic channels, 10 for H0 HyperChannels, and 2 for H1 HyperChannels. A related feature of the invention is that DMAC servicing of requests set into these bit registers is conducted on a prioritized basis such that H1 HyperChannels receive highest priority attention, H0 HyperChannels receive next highest priority attention and base channels receive lowest priority attention; whereby the combinational channel entities are serviced at a rate commensurate with their average rate of bit transfer.

As the DMAC services each request it presents signals to DMARQ which are steered to and effectuate resetting of respective bit registers. Indications of set and reset states of DMARQ registers are presented to the synchronous section in time division synchronism with basic time slot recurrences at the network interface of the device, enabling the synchronous section to determine when requests which it has posted relative to basic channel slots and slots assigned to HyperChannels have been acted upon.

A feature of the present invention is that the configuration and activation of extended channels or HyperChannels is so accomplished via HCR that all slots in the associated group are rendered active at the same instant of time. Were the slots of a group to be activated at separate instants of time, it would be possible to have data in transit through an inactive slot of the group mishandled. The present arrangement prevents this.

The device includes an interrupt management partition (INT), which straddles the synchronous and asynchronous sections like DMARQ. INT monitors conditions throughout the device and relative to each communication channel, and in response to certain indications furnishes request signals and associated single byte vectors which are relayed to the external bus interface for monitoring by external systems. Relative to interrupt requests associated with communication channel events (e.g. end of HDLC received frame), other partitions in the synchronous section store associated status information in respective channel queues within one of the local RAM arrays; each queue capable of storing information relative to plural events in the respective channel.

The external system acts through internal device paths separate from INT to retrieve status information from the respective queues, and INT manages the updating of control parameters associated with the filling and emptying of these queues. Thus, operations of these queues serve to ease the time constraints on the external system in respect to recovery of channel event status, and operations of INT serve to offload from the external system responsibilities for queue management which otherwise would be placed on that system.

When status information is stored in these queues the address is determined in part by the time slot indication provided by RSM. A feature of the invention presently is that when a channel event or condition occurs during any slot of a HyperChannel or extended channel group, the translated time slot indication is used to effectuate storage of the respective status information in the queue assigned to the respective reference slot of the group.

OBJECTS OF THE INVENTION

An object of this invention is to provide a data link control device having basic time division channels recurring cyclically in frames, and including facilities for variably combining basic channels to form extended channels having greater bandwidth than the basic channels.

Another object is to provide a data link control device having basic time division channels recurring cyclically in frames, and including facilities for variably combining basic channels to form HyperChannels of extended bandwidth.

Another object is to provide a data link control device having basic time division channels recurring cyclically in ordered frames, and which is adaptable to allow for selectively combining plural basic channels, appearing at arbitrary time positions in said frame, into a single extended channel operable at a multiple of the maximum data throughput rate of a basic channel.

Another object is to provide a device as just characterized, which is further adaptable to form a plural-to-one association between the basic channels combined to form a said extended channel and a reference one of said combined basic channels, whereby control parameters for operation of said extended channel may be efficiently stored relative only to said reference channel.

Another object is to provide a device as just characterized wherein said reference channel is chosen as the one of said combined channels which appears earliest in said frame.

Another object is to provide a device as just characterized having a configuration register indicating said plural-to-one association.

Another object is to provide a device as just characterized including counting means cycled in correspondence with said basic channels, and further including means coupled to said counting means for providing time slot indications associated with said basic channels, and further including means coupled to said counting means, said configuration register and said indicating means for translating counts associated with said combined channels into time slot indications associated with the reference one of said basic channels.

Another object is to provide a device as just characterized including RAM storage arrays partitioned to store information relative to said basic channels, and further including means coupled to said time slot indicating means for supplying partial addresses to said storage arrays, whereby portions of said arrays dedicated to individual basic channels are addressed during appearances of said individual channels in said frame, and whereby portions of said arrays dedicated to said reference one of said combined basic channels are addressed during appearances of any of said combined channels in said frame.

A further object is to provide a device as just characterized including means for generating requests to transfer data relative to said basic channels, means for distinguishing between requests from any of said combined basic channels and any of said basic channels which are uncombined, and means coupled to said time slot indicating means and said distinguishing means for associating requests relative to any of said combined channels with the associated one of said reference channels, whereby actions taken to transfer data relative to said any combined channels are referred to the associated reference channel.

These and other objects, features, advantages and benefits of the invention will be more fully understood and appreciated by considering the following detailed description and claims.

DESCRIPTION OF DRAWINGS

FIG. 11 illustrates bit assignments in a channel configuration register (CCR) parameter. Each channel has a dedicated space in TS RAM for holding a respective CCR parameter, and RSM contains a "CCR" register for holding the CCR parameter of a channel currently being served.

FIG. 12 illustrates bit assignments in a "High Level Data Link (HDLC) protocol configuration register" parameter HPCR. Each channel has a dedicated space in TS RAM for holding a respective HPCR function, and RSM contains a dedicated register for holding the HPCR of a channel currently being served.

FIGS. 13-15 illustrate signal timings at the Burst Time Division Mode (BTDM) interface between the subject device and level 1 (L1) logic circuits that convey signals between that interface and external communication channels. FIG. 13 shows the relative timing of data and control signals at this interface. FIG. 14 shows details of data signal timing within a time slot shown in more general context in FIG. 13. FIG. 15 shows the time relation between individual data signals transferred at the interface and internal clock functions of the L1 circuits.

FIG. 18 illustrates a first such word, designated RFM_TS01, and FIG. 19 illustrates a second such word, designated RFM$_{13}$ TS02.

FIG. 22 shows a first such channel space, designated "receive data configuration register 1 (RDCR1); and FIG. 23 shows a second such channel space designated "receive data configuration register 2" (RDCR2).

FIG. 24 shows a first such channel space, designated "transmit data configuration register 1 (TDCR1); and FIG. 25 shows a second such channel space called "transmit data configuration register 2" (TDCR2).

FIG. 27 illustrates the form of the status function IHEISR (IDLC Hardware Error Interrupt Status Register) generated in INT.

FIGS. 28 and 29 respectively illustrate forms of status words CEISR (Channelized Error Interrupt Status Register) and EOPISR (End Of Process Interrupt Status Register) generated in INT and stored relative to each communication channel in TS RAM.

DETAILED DESCRIPTION

1. Terms, Definitions and Concepts

Figure 1:
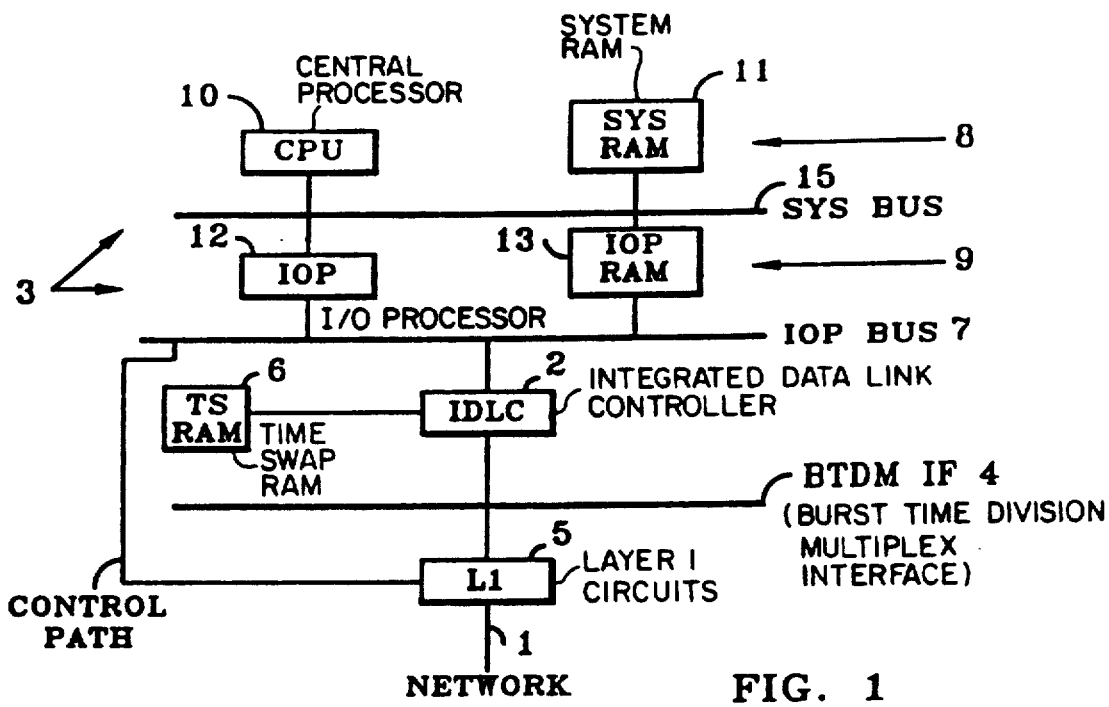
FIG. 1 is a block diagram of a data processing system containing an integrated data link control device (IDLC) including an embodiment of the subject invention, at a node in a typical communication network, illustrating the configuration of the device relative to other processing elements in the node.

Terms used herein have the following intended meanings.

Autonomous Logical Element

As used presently, means a special purpose logical circuit arrangement having data inputs and outputs and a finite repertoire of logical states, typically a set of logic circuits containing one or more logical state machine circuits, and which upon being set to one of its states sequences to other states as a function of external conditions or events, and while so sequencing performs logical functions relative to said data inputs and outputs in a manner such that its operations relative to other elements to which it connects either for exchanging data or receiving external state control are performable in parallel and simultaneous with operations of such other elements.

CCITT

The International Telegraph and Telephone Consultative Committee; an organization formed originally under the International Telecommunications Union (ITU) treaty of 1865, and now a specialized agency of the United Nations. The organization generates publications referred to elsewhere herein defining international standards for telecommunication protocols. Participants include telecommunications carriers such as AT&T and GTE Telenet.

CMOS

Complementary Metallic Oxide Silicon as used in contemporary integrated semiconductor devices.

CMOS 2

A particular form of CMOS technology accommodating line spacings of 1 micron and providing circuit switching speeds of 1 ns for a 2 input AND gate [refer to: (1) IEEE J. Solid State Circuits, V. 23, N. 5 Oct. 1988, Pp. 1095-11, Wong, D. T. et al, "11-ns 8K×18 CMOS Static RAM With 0.5-mu m Devices"; (2) Proc. Of The Custom Integrated Circuits Conf. 1987, by IEEE, Pp. 248-252, Aldridge, A. W. et al, "40K Equivalent Gate CMOS Standard Cell Chip"; (3) Proc. Of The Custom Integrated Circuits Conf. 1987, by IEEE, Pp. 245-247, Hornung, F et al, "A Versatile VLSI Design System For Combining Gate Array And Standard Cell Circuits On The Same Chip"]

Extended Channel

A term used presently as generic to HyperChannels and other combinations of channels providing multiples of a predetermined basic channel bandwidth Host System A main data processing unit or system in a data processing network.

H-channel (Hereafter termed HyperChannel) A form of high speed time division channel defined by the CCITT in its I.412 definitions [refer to: CCITT Red Book, Vol. III, Fascicle III.5, "Integrated Services Digital Network (ISDN), Recommendations of the Series I, Geneva 1985].

HDLC (High Level Data Link Control)

Generic term encompassing LapB, LapD and SDLC protocols defined herein.

HyperChannel

See H-channel above.

IOP System

An input-output processor operating under control of a main (or host) processor.

ISDN

Integrated Services Digital Network, as defined by CCITT [Refer to: CCITT Red Book, VIII, Fascicle III.5 above].

ISDN Layers 1 and 2 (L1, L2)

Respectively, the physical and data link control layers of logical signal handling in ISDN networks; the physical layer attending to transmission and reception of signals on network lines and activation and deactivation of network connections on such lines; the link control layer concerned with error checking and other higher level functions relative to the physical layer [refer to: CCITT Red Book, VIII, Fascicle III.5 above, Part IV, Sections 3 and 4].

LAPB

A particular data link protocol for X.25 networks, defined by CCITT X.25 Recommendation [refer to: CCITT Fascicle VIII.3—Recommendation X.25, "Interface Between Data Terminal Equipment (DTE) And Data Circuit-Terminating Equipment (DCE) For Terminals Operating In The Packet Mode And Connected To Public Data Networks By Dedicated Circuit, Geneva 1976, Amended 1980 and 1984].

LAPD

A particular link access protocol for D channels as defined by CCITT Recommendation Q.920 [Refer to: CCITT Fascicle III.5 above, Part IV, Section 4.]

Motorola 68000 bus

Bus used by Motorola 68000 microprocessors to attach to memory and other peripherals [refer to: M68000 8-/16-/32 Bit Microprocessors User's Manual, sixth ed., Prentice Hall, 1989, Section 5 (Signal And Bus Operation Description)].

Network Nodes

Points at which terminal equipments attach to a network.

Physical Interface

Layer 1 interface [see ISDN Layers 1 and 2 above].

RAM

Random Access Memory

SDLC

Synchronous Data Link Control; the link control protocol used in SNA [refer to: IBM Publications GA27-3093-3, "Synchronous Data Link Control—Concepts", 1979, 1986]

SNA

Systems Network Architecture [refer to: IBM Publication GC30-3072-3, "Systems Network Architecture—Concepts And Products",1981, 1986]

Finite State Machine

A logical circuit having a finite repertoire of possible stable operating positions or stages, each position or stage yielding a characteristic action or output, and undergoing transitions between such positions or stages as a function of external stimuli.

2. System Overview

FIG. 1 illustrates a data exchange node 1 of a time division multiplex data communication network, and a data handling system, the latter containing an integrated data link control device 2 (IDLC) in which the present invention is advantageously used. The device 2, which is described in detail in the above cross-referenced copending applications referring to "Autonomous Elements" and "Synchronous Link Interface" in their titles, performs certain OSI Layer 2 processes relative to data in transit between the network node and a host processing system 3.

Such data is passed between device 2 and time division channels at network node 1, via a special "Burst Time Division Multiplex" (BTDM) interface 4 (described in the copending application referring to same in its title) and circuits 5. Circuits 5, termed Layer 1 (or L1) circuits, perform a number of OSI Layer 1 functions relative to data in active channels, and interface 4 isolates device 2 from some of the time dependencies imposed at node 1 due to relative drift between local and remote clocks.

Device 2 contains or is locally coupled to a time swap RAM 6 (TS RAM) which contains spaces dedicated to individual time division channels. When a channel is active its associated space in RAM 6 contains configuration control, process state and event status information relative to that channel.

The configuration control information defines the channel configuration (communication protocol, etc.). The process state information is stored relative to a number of logical partitions in the device which are cyclically conditioned to process data relative to variously configured channels assigned to specific BTDM time slots. Thus, in appearances of any channel time slot during successive time division frames, each partition resumes logical processing relative to the respective channel in precisely the state it last held relative to the same channel in the previous frame. The event status information is part of the information furnished to the host system 3 via interruption actions described later.

Device 2 couples to host system 3 and to external memory associated with that system via "IOP" bus 7. Bus 7 potentially accommodates connections of other control devices to host system 3. In the indicated environment, system 3 comprises a host processing system 8 and an input/output processing subsystem 9. In this arrangement, system 8 comprises a CPU 10 and associated system RAM memory 11, and IOP subsystem 9 comprises an I/O processor 12 and associated RAM memory 13. Subsystem 9 connects to device 2 via bus 7 and to system 8 via bus 15, the latter allowing for connection of other I/O subsystems to the same system.

In the system formed by circuits 5, device 2 and system 3, data in multiple time division channels is carried between system 3 and remote terminals via device 2, circuits 5 and the network extending from node 1. As noted previously such data may be carried over the network in various formats and in accordance with various communication protocols (e.g. encoded voice, HDLC data, bisynch data, etc.).

Data processing services provided at node 1 may include so-called "voice-mail" services (centralized storage and forwarding of voice messages for telephone users) and access to public or private databases (law libraries, patent libraries, etc.). In the presently contemplated environment, the network link at node 1 would be a high speed T1 or T3 common carrier leased line sustaining multiple time division channels. Although not required for effective use of data link control devices such as 2, the network may be structured in conformance with ISDN requirements, and any time channel of the network linked to node may be allocated dynamically to digitized voice and data signal traffic.

Of interest presently, is the operation of subject device to variably allocate groups of time channels to "extended channels" or HyperChannels, and specifics of the means and methodology employed therefor.

In such networks, signalling speeds could reach rates of 4.096 Mbits (megabits) per second full duplex on T-1 lines, and considerably higher rates on T-3 lines. Accordingly, a data link control device suitable for serving such lines should be able to operate at speeds in excess of 5 Mbits per second full duplex. The present IDLC device architecture, as implemented in state of the art 1 Micron CMOS technology, is capable of supporting highest full duplex rates presently contemplated for any fully occupied T-1 or T-3 line within a single LSI chip structure.

A comparable prior art device—refer to column 6 in U.S. Pat. No. 4,493,051 cited above—has a maximum signal rate of 350,000 received or transmitted bits per second (suggesting half duplex) and could not as disclosed service a full T-1 line or accommodate mixed voice and data channels. Thus, such devices would not be suited for ISDN applications in particular, or even higher speed data only applications, and hence the need for devices of the present form.

3. Architecture of IDLC Device

Figure 2:
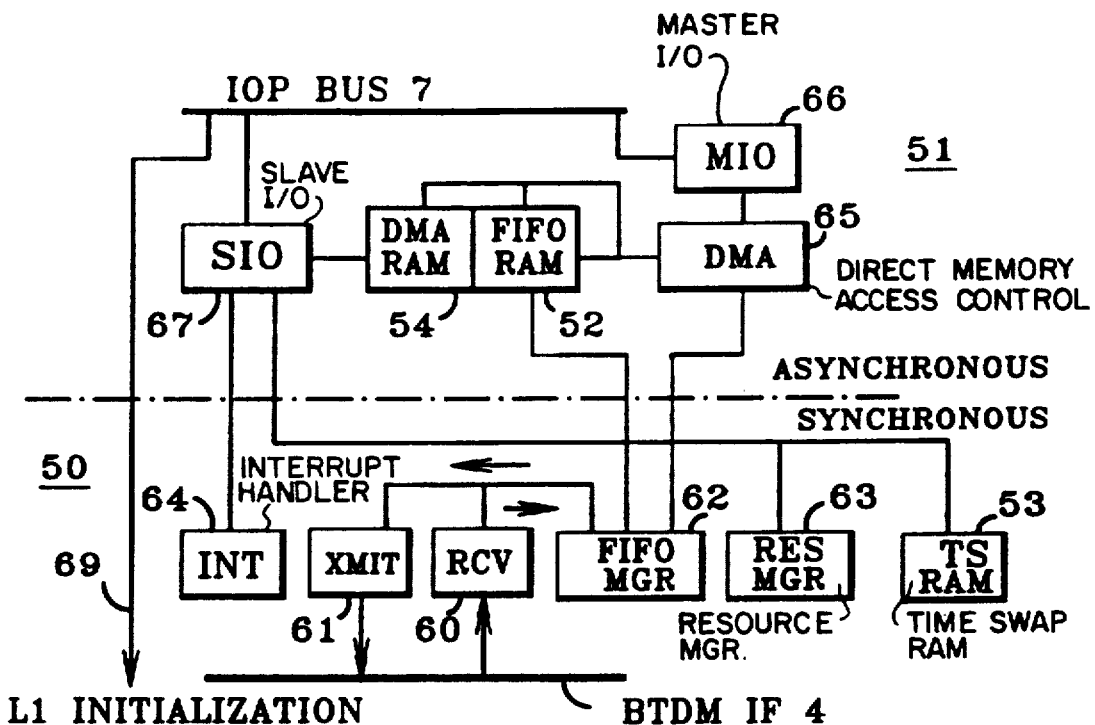
FIG. 2 is a high level block diagram of the internal logical organization of the subject link control device illustrating its major logical partitions and associated RAM memory units including TS RAM.

FIG. 2, a block diagram of the logical organization of subject IDLC device, illustrates positioning of the device between IOP bus 7 and the BTDM interface 4 previously discussed, and division of the device circuitry into synchronous and asynchronous sections, 50 and 51 respectively. Also shown are principal logical partitions in each section, each partition understood to contain one or more autonomous elements to be shown and described later.

Section 50 operates in synchronism with appearances of channel times slots at interface (IF) 4 to perform operations relative to respective communication channels Operations in section 51 relative to any channel are performed in asynchronous relation to respective time slot appearances at IF 4. RAM (random access memory) units 52 and 53 are accessible to partitions in both sections, whereas RAM unit 54 is accessible only to partitions in the asynchronous section The synchronous section contains logical partitions 60-64, and the asynchronous section contains partitions 65-67.

All of the partitions and RAM units may be contained within a single LSI chip, but for certain applications discussed later it may be desired to provide TS RAM unit 53 in a separate module located close to the IDLC chip on a common card or board. The RAM units have predetermined access characteristics, capacities, address allocations and functional usages described later.

Partitions 60 and 62, and RAM 52, form a plural-stage "receive pipeline" relative to communication data received from IF 4 ("receive data"). Partitions 61 and 62, and RAM 52 similarly form a transmit pipeline relative to data being transmitted to IF 4 ("transmit data"). Data entering the receive pipeline at IF 4 is selectively modified in transit through partition 60, and written into RAM 52 by partition 62. Data is fetched to the transmit pipeline from RAM 52, by partition 62, handed over to partition 61, selectively modified by the latter and transferred to IF 4. Operations of these partitions and the respective pipelines relative to any channel at IF 4 are conducted in synchronism with appearances of respective time division slots at IF 4, under direction of resource manager element 63 (RSM).

RSM operates in response to signals received from the L1 direct state swapping operations between TSR 53 and other partitions 60-62 and 64 whereby operations of the latter relative to individual channels are properly programmed and coordinated. These state swapping transfers are bidirected, so that processing states of the partitions are saved relative to an active channel whose slot is just ending and processing states of the same partitions are restored relative to any active channel whose slot is just beginning. Accordingly, the processing activities in these partitions relative to consecutive recurrences of a slot assigned to an active channel slot are continuous relative to that channel.

INT is responsible for monitoring conditions and channel events in the IDLC and L1 circuitry and for generating interruption indications and associated vector pointers relative to such conditions and events. INT also oversees the collection of status information relative to such conditions and events and storage thereof in RAM 53 and various device registers. INT cooperates with slave I/O partition 67 (SIO) to present interruption requests and associated interrupt vectors to the host-/IOP complex.

SIO provides a unique access path from the host/IOP complex to the RAM's and registers in the IDLC partitions such that status stored therein relative to associated interrupt requests may be retrieved by the host-/IOP complex in asynchronous relation to its handling of the associated requests. The same path is used in the reverse direction by the host/IOP complex for writing information into the IDLC RAM's and registers; e.g. for dynamically activating and configuring channels and HyperChannels, and for programming operations of the IDLC partitions relative thereto.

The path between processing elements in the host-/IOP complex (10, 12 FIG. 1) and internal elements of the IDLC, through SIO, is maximally separate from the communication data transfer path between host/IOP memory (13, FIG. 1) and the IDLC via partitions 65, 66; thereby minimizing interference between operations conducted over these paths.

Autonomous elements in each IDLC partition, which are fully described in the copending application referring to "Autonomous Elements" in its title, comprise registers and special purpose discrete logic circuits (as distinct from Program Logic Arrays, microprocessors, etc.), the latter implemented presently as finite state machines. The term "autonomous" as used here is intended to denote a degree of functional autonomy between elements, particularly the partitions in the receive and transmit pipelines mentioned above, such that performance of a function by any element relative to other elements to which it connects is less critically time dependent on actions of such other elements than it would otherwise be without such autonomy.

Receive partition 60 is responsible for reception of data (and/or voice) signals from IF 4 in whatever protocol is currently active on each network data channel (SDLC, HDLC, LAP-B, LAP-D, etc.). Voice channels are "clear" (no protocol specific delimiters, etc.). Relative to each data channel, partition 60 is responsible for stripping protocol-specific information (e.g. destuffing HDLC stuffed bits), recognizing addresses, detecting protocol-specific control functions (e.g. abort/idle indications in HDLC, frame boundary indications, etc.), and forming interrupt status indications for receive events (e.g. CRC error, FIFO buffer and IOP buffer overflow conditions, frame endings, etc.).

Transmit partition 61 handles bit serial transfer of data and control bits to IF 4, in whatever protocol is currently active on each channel (SDLC, LAP-B, LAP-D, etc.; voice is sent in the clear). It also generates protocol-specific information to be sent with the data (e.g. HDLC stuffing bits, abort/idle indications in HDLC, frame delimiters, etc.), and forms interrupt status indications for transmit events (e.g. FIFO buffer underruns, end of control block chain for transmission, etc.).

FIFO management partition 62 interfaces between FIFO RAM 52 (later abbreviated as FIFOR) and the receive and transmit partitions to transfer receive and transmit data between per channel queues in the RAM and these partitions on a FIFO (first in first out) basis, and to manage the utilization of such queues. Partition 62 monitors the state of occupancy of each channel queue in RAM 52, and supplies requests to DMA (Direct Memory Access) partition 65 in the asynchronous section which evoke actions through master I/O (MIO) partition 66 causing data to be transferred between respective queues and host system memories via bus 35. The requests from partition 62 to partition 65 are actually latched by a separate DMA Request Queue (DMARQ) partition not shown in FIG. 2, and handled by the latter on an asynchronous basis.

Thus, receive data queues are emptied on a FIFO basis before they overflow as a result of activity at IF 4, and transmit data queues are replenished with new data before they underflow relative to IF 4.

Interrupt (INT) partition 64, having circuit portions operating in both synchronous section 50 and asynchronous section 51, operates to: receives signals indicating reportable hardware and channel process events and conditions from all other IDLC elements and the L1 circuits; pass associated flagging requests to slave I/O (SIO) partition 67; and collect status information relative to such events and conditions for asynchronous retrieval by the IOP/Host system. Such events and conditions include hardware errors, channel errors, channel processing events (frame boundary transitions, end of transmission, etc.). Relative to such requests, partition 67 engages in interrupt communication with the host system via bus 35 for transferring the related status information.

As previously indicated, each autonomous element (and/or sub-element) in each partition includes logic which is generally implemented as one or more "finite state machines". These sequence through successions of states for performing respectively assigned functions relative to each active network channel. As any channel on the network link is configured for operation under a selected voice or data communication protocol, a set of state variable parameters is inserted into TSR 53 from host interface 35 (via SIO partition 67) to set up initial states for the autonomous elements in partitions 60-64 relative to that configuration.

During subsequent appearances in each frame at interface 4 of a time slot assigned to a particular channel, RSM 63 directs state swaps between RAM 53 and autonomous elements in partitions 60-62, and between RAM 53 and a synchronous portion of partition 64, which cause said partitions to operate intermittently to perform assigned logical processing tasks relative to the respective channel.

4. OPERATIONS—GENERAL

Figure 3:
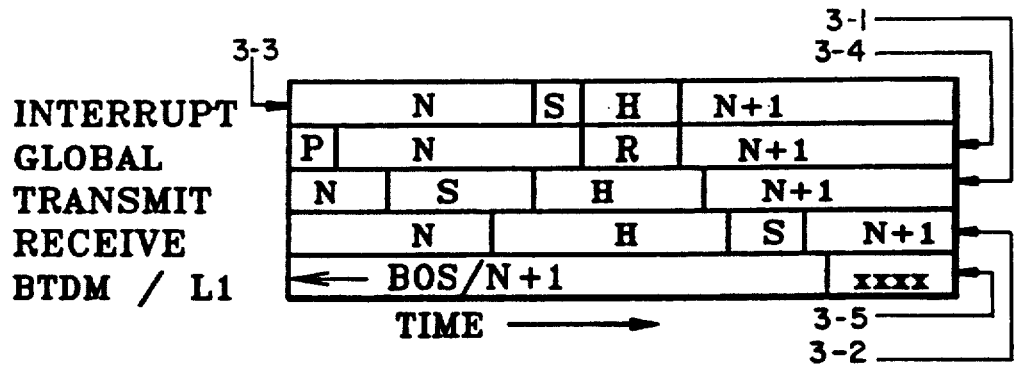
FIG. 3 is a time chart of functions performed within the synchronous section of the subject device, under direction of a resource manager logic element within the device, for dynamically configuring states of other autonomous logic elements in that section in synchronism with level 1 signalling processes external to the device.

Referring to FIGS. 1-3, at power-up signals presented at host interface 7 (by host processing elements 10, 12) force the IDLC and L1 circuits to reset modes. In this mode, logical elements in all IDLC partitions are cleared of non-relevant status and set to idle states. Then L1 and IDLC circuits are initialized, again by host signals presented via IF 4. Included in such signals is information defining critical initial parameters for channel activation and IDLC and L1 operation. The initializing information for the L1 circuits is transferred via line 69 to not-shown registers in the L1 section. Initializing information for asynchronous section 51 of the IDLC is passed via bus 35, MIO 66 and DMA partition 65 to RAM's 52 and 54. Initializing information for synchronous section 50 is passed to RAM 53 via bus 35 and SIO 67.

After initialization, the IDLC is set to an active mode, and processing begins for activating network channel functions. Channels are activated individually. In addition to loading of initial critical parameters for each channel during IDLC initialization, before a channel can be activated control parameters must be entered into RAM's 52-54 and certain registers discussed later for conditioning all processing partitions to perform functions required for the respective channel types. Upon activation, signals indicating appearances of the respective channel time slot are sent to the IDLC from L1 via BTDM IF 4, and processing relative to the channel begins. During such processing full duplex links are established via network signalling channels, between the local node and remote nodes. Information is transferred over such links, and status information relative to such channels is collected in RAM 53 and made available to the host system via SIO 67.

Referring to FIG. 3, state swapping processes conducted by RSM, relative to communication channels associated with time slots at the BTDM interface (in this figure, consecutive slots N and N+1), involve transfers of four types of variables; transmit-specific, receive-specific, interrupt-specific and global; with relative timing characterized respectively in rows marked 3-1 to 3-4 (FIG. 3). A fifth row in FIG. 3, shown at 3-5, indicates the relative timing of a signal BOS (discussed below) which serves as a basic timing reference for the time slots. State swaps (saving of element processing states relative to a channel associated with a time slot now ending, and reloading of previously saved states relative to a channel whose time slot is now beginning) are conducted only relative to active channels. Global variables are common to transmit, receive and interrupt processing. A small portion of one global variable, indicating the channel type, is prefetched relative to both active and inactive channels in order to distinguish such.

Transmit-specific variables are transferred relative to elements in transmit pipeline partitions 61 and 62. Receive-specific variables are transferred relative to elements in receive pipeline partitions 60 and 62. As shown later, each partition 60, 61 and 62 comprises autonomous sub-partitions for performing different processing functions on data in transit from and to the network.

Interrupt-specific variables are transferred relative to INT partition 64.

Figure 4:
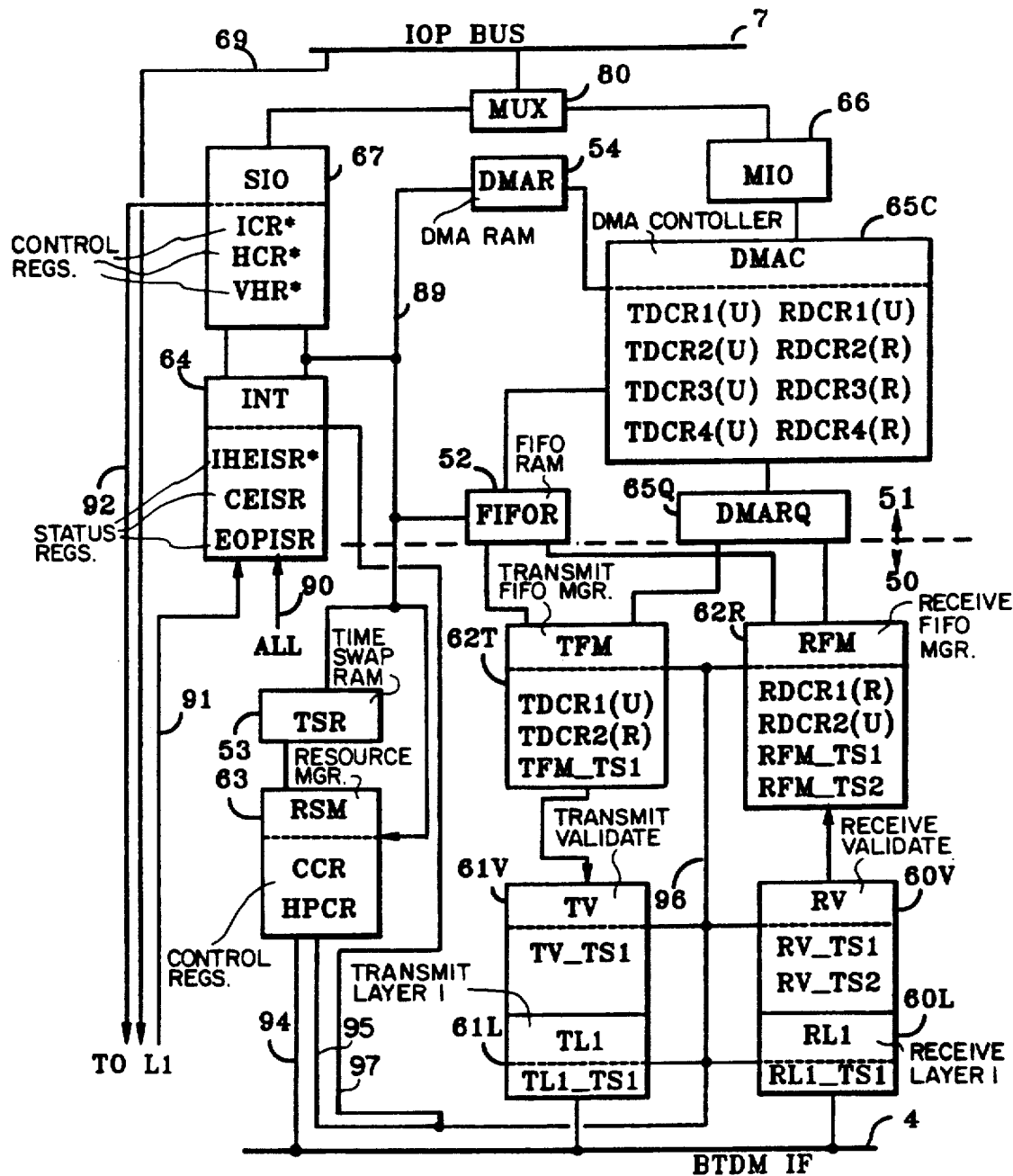
FIG. 4 is an intermediate level block diagram of the IDLC, illustrating its synchronous and asynchronous sections, local RAM memory arrays, logical partitions and principal registers in those partitions.

Referring to FIGS. 3 and 4, channel-specific global variables, which define configuration and protocol associations of individual channels, are transferred relative to configuration registers CCR (Configuration Control Register) and HPCR (HDLC Protocol Configuration Register) in RSM 63 in synchronism with channel processing (see further descriptions of RSM which follow). While registered in RSM, these variables are effectively shared by all partitions.

Referring to FIGS. 3 and 4, other transient variables relating to handling of interruption event status are held in registers CEISR (Channel Events Interrupt Status Register) in INT, EOPISR (End Of Process Interrupt Status Register) in INT, IHEISR (IDLC Hardware Error Interrupt Event Status Register) in INT, and VHR (Vector Holding Register) in SIO. Contents of CEISR and EOPISR are swapped relative to TSR in synchronism with channel time slot appearances. Contents of IHEISR and VHR are held static until retrieved by the IOP.

Another global variable defining HyperChannel associations is held in register HCR (HyperChannel Configuration Register) in SIO. Since this variable does not change with channel time slot occurrences at the BTDM interface, it is held static in HCR (not synchronously saved and reloaded; see later description of HyperChannels). Other global variables defining device configuration parameters not specific to any channel are held static in register ICR (IDLC Configuration Register) in SIO.

Transfers of receive, transmit and interrupt variables are true saving and reloading "swaps", but transfers of channel-specific global variables relative to registers CCR and HPCR in RSM 63 are one way only (although these variables may differ from channel to channel, they do not change as a function of IDLC processing relative to any channel and therefore need not be saved as channel slots conclude).

The state swap actions (S) are staggered in phase within each time slot period; global and interrupt first, transmit-specific next and receive-specific last. While the global variables are loading, the partitions in both pipelines are halted (H). It is understood of course that these actions are omitted during time slots associated with inactive channels.

The slots at IF 4 recur cyclically in frames. Beginnings of individual slots and frames are indicated by control pulse signals provided by special timing circuits in L1 circuits 5. These timing circuits provide beginning of slot pulses BOS, (see row 3-5, FIG. 3) at beginnings of slots other than the last slot of each frame, and last slot of frame pulses LSOF (not shown in FIG. 3, but shown and explained below in reference to FIG. 12), at the beginning of the last slot of each frame. These signals are used by RSM to order its operations relative to IDLC channels assigned to slots at specifically numbered frame positions, and also form a basis for permitting the L1 circuits to be adapted to vary frame durations and/or slot durations and/or numbers of slots in any frame.

In response to each BOS and LSOF signal following a slot assigned to an active channel (BOS/N+1 in FIG. 3, indicating beginning of slot number N+1 following slot N), RSM signals the synchronous partitions in the transmit pipeline to prepare for transmit-specific swapping. If channels N and N+1 are both active, elements in the transmit pipeline whose state machines are in stable states from which they can resume on the next appearance of channel N time slot immediately signal "DONE" conditions to RSM and have their transmit process states swapped relative to respective state storage areas in TS RAM (if N is inactive no state information will be transferred to TS RAM, and if N+1 is inactive no state information will be loaded from TS RAM). The state information saved relative to channel N (assuming it is active) is sufficient to enable respective elements to resume transmit processing relative to that channel in the next slot frame without loss of continuity. Similar actions occur at the phase of receive-specific swapping.

Elements not in stable states, when processing relative to an active channel N, and signalled by RSM to prepare for state swapping, sequence to their next stable states before asserting DONE status and undergoing state swaps. As will be shown later, the staggering of the swapping actions relative to transmit and receive processes, and the subdivision of same into directional specific and global stages, coordinated with specific present phasing of signal transfers to and from IF 4, provide highly efficient usage of RAM 53 and the transmit and receive partitions (without which larger RAM and more circuitry in the pipeline partitions would be needed).

Relative to the present invention of HyperChannel formation and usage, an interesting aspect of the foregoing state swapping process is that each HyperChannel is assigned to a group of plural slots at IF 4 (not necessarily in contiguous positions in the slot frame) and that all state swapping processes are conducted relative to a space in TSR assigned to the slot in the group which appears earliest in each frame; the latter designated as a reference slot.

For its role in state swapping and other operations, RSM develops a time slot indication (RSM_TSI) which ordinarily is based upon the value of an internal slot count that is reset at the beginning of each frame and incremented as BOS (beginning of slot) pulses are received. As will be shown more completely hereafter, these TSI indications are used as address offsets during time swapping and as time position references for relating channel requests in DMARQ to respective time slot positions. However, TSI indications for time slots associated with a HyperChannel are developed differently.

In general, each HyperChannel will have a group of plural time slots in each slot frame assigned to it. Presently, all slots in such a group have a many-to-one association to a reference slot which is the earliest appearing slot in the respective group. When any time slot in a HyperChannel group appears, its association is recognized by RSM, through decoding of channel configuration information (CCR) fetched to RSM from TSR. At such times, RSM uses information in HyperChannel configuration register HCR (in SIO; see FIG. 4), to develop a TSI indication which is the time position of the associated reference slot.

Thus, all slot-dependent channel addressing functions relative to the slots in a HyperChannel group are referred to addresses (in TSR, FIFOR, DMAR and DMARQ) associated with the respective slot. This simplifies the programming of the IDLC device relative to HyperChannels (since then only process state and channel state parameters associated with the reference slot need be written by the host system into the local RAM's 52-54). As will be seen later it also simplifies the logical structure of DMARQ.

5. IDLC Organization—Intermediate

This section and following subsections provide intermediate level descriptions of the IDLC logical organization and operations, with particular reference to FIG. 4.

5.1 Abbreviations

This section provides an alphabetically ordered listing of abbreviations (Abbr.) of element and register names used in FIG. 4, with explanations of functions performed by each named item. Items marked with asterisk (*) are common to all channels.

Figure 5:
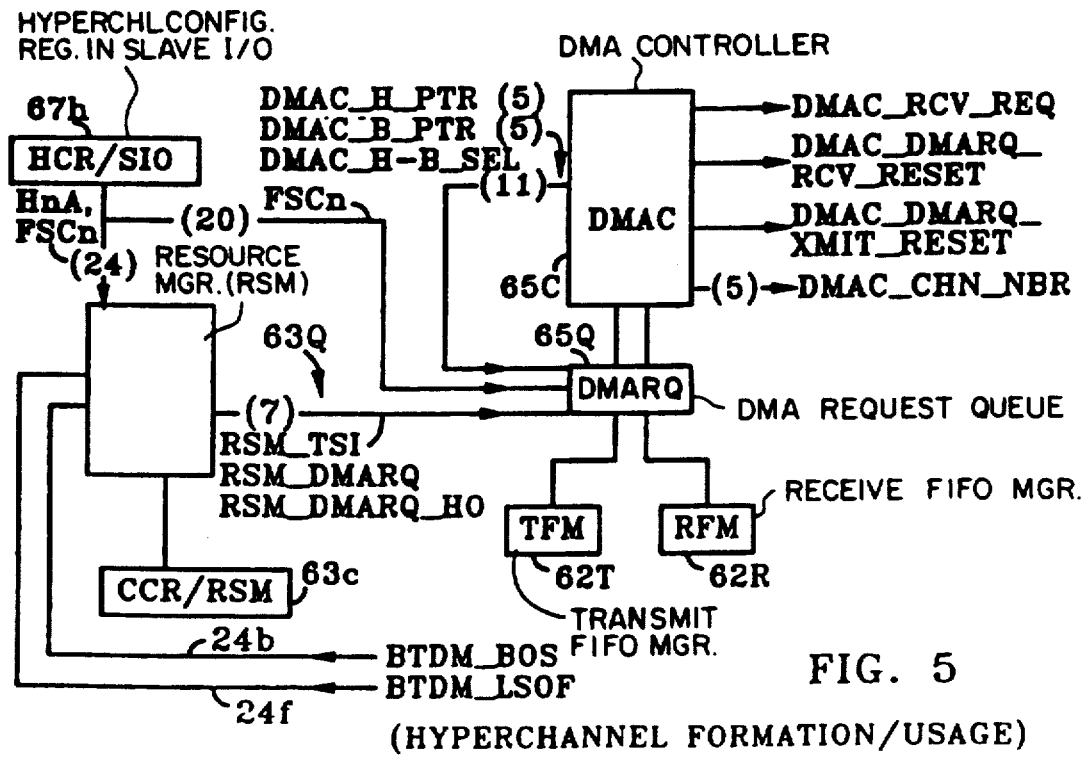
FIG. 5 is a block diagram of distributed circuit means within the device for configuring and utilizing Hyper-Channels or extended channels as presently contemplated.

| Abbr. | Full Name/Function |
|---|---|
| CCR | CHANNEL CONFIGURATION REGISTER/ channelized (replicated for each channel), this is used to select the channel protocol (SDLC, LapB, LapD, clear/voice, other) and indicate the channel type (inactive, B/D, H0 number 1-5, H1, H11, H12, etc.) |
| CEISR | Channelized Error Interrupt Status Register/stores channel error status information for transfer to host |
| DMAC | DMA control element/cooperates with MIO to transfer data between FIFOR and host bus 35; includes registers for storing data in transit between MIO and FIFOR |
| DMAR | DMA RAM/stores per-channel control information for DMAC |
| DMARQ | DMA Request Queue/receives and queues requests for per channel data tranfer action from RFM and TFM |
| EOPISR | End Of Process Interrupt Status Register/buffers end of process status information for transfer to SIO |
| FIFOR | FIFO RAM/stores per-channel data in transit between FIFO managers (transmit and receive) and DMAC |
| HCR* | Hyperchannel Configuration Register/defines hyperchannel configurations |
| HPCR | Protocol Configuration Register/together with part of CCR customizes channels for HDLC type protocols |
| I_RQ | Interrupt Request/path for L1 interrupt requests |
| ICR* | Idle Configuration Register/common register for placing chip elements in reset and idle states |
| IHEISR* | IDLC Hardware Error Interrupt Register/ buffers error status relative to IDLC hardware error conditions affecting all channels |
| L1 | Level 1/refers to level 1 circuits 22 (see FIG. 2) |
| MIO | Master I-O/IDLC element interfacing between host IOP bus and IDLC DMAC element |
| MUX | Multiplexor/circuits linking IOP bus to MIO and SIO |
| RDCR1-4 | Receive DMA Configuration Registers (four in DMAC and two in RFM, with per channel backups in FIFOR and DMAR) define channel configuration setups of DMAC and RFM for DMA transfers of received data; parenthetic indications "(R)" and "(U)" in FIG. 5 respectively characterize registers used in read only and read/write (updatable) modes |
| RFM | Receive FIFO Manager/IDLC element for managing transfers of receive data between RV1 and FIFO RAM, and initiating action by DMAC, relative to data stored in FIFO RAM, via requests placed in DMARQ |
| RFM_TS1,2 | Receive FIFO Manager Time Swap Words/ registers holding RFM state information which must be saved on time swap |
| RL1 | Receive Layer 1/IDLC element for transferring receive data between BTDM interface 27 (see FIG. 2) and RV |
| RL1_TS1,2 | Receive Layer 1 Time Swap Words/registers in RL1 holding state information which must be saved on time swap |
| RSM | Resource Manager/IDLC partition controlling |

-continued

| Abbr. | Full Name/Function |
|---|---|
|  | time swapping between TSR and receive, transmit and interrupt partitions |
| RV | Receive Validation/IDLC element performing layer 2 processing of receive data including stripping of protocol specific information, address examination, error checking, etc. |
| RV_TS1 | Receive Validation Time Swap Word/RV state information to save on time swap |
| TDCR | Transmit DMA Configuration Register/four registers per channel in DMAC and two per channel in TFM which define configuration setup of DMAC and TFM relative to DMA fetching of transmit data in respective channels; parenthetic indications "(R)" and "(U)" in FIG. 5 respectively characterize registers used in read only and read/write (updatable) modes |
| TFM | Transmit FIFO Manager/IDLC element for managing transfers of transmit data between FIFOR and TV1, and initiating DMAC action to replenish transmit queue in FIFOR, via requests placed in DMARQ |
| TFM_TS1,2 | Transmit FIFO Manager Time Swap Words 1 and 2/TFM state information which must be saved on time swap |
| TL1 | Transmit Layer 1/IDLC element for transferring transmit data between TV and BTDM interface 27 |
| TL1_TS1,2 | Transmit Layer 1 Time Swap Words/TL1 state information which must be saved on time swap |
| TSR | Time Swap RAM/RAM external but locally accessible to the IDLC (see RAM 53, FIG. 3) |
| TV | Transmit Validation/IDLC element performing layer 2 logical processing of transmit data, including insertion of protocol specific information, error check references, etc. in data channels |
| TV_TS1 | Transmit Validation Time Swap Word/TV state information to save on time swap |
| VHR* | Vector Holding Register/common register for chip and channel interrupt status vectors |

5.2 Transmit/Receive Data Paths

Wherever possible in FIG. 4, numbers of partitions shown previously in FIG. 2 are retained, and elements in those partitions are identified by like numbers with one or more letters (e.g. 61L).

FIG. 4 illustrates major information processing paths in and through the IDLC. These consist of paths for handling transmit data (data received from the host via bus 7 and transmitted in channel time slots at IF 4 after intermediate processing in IDLC partitions), paths for handling receive data (data received at IF 4 and processed within the IDLC for transfer to host interface 7), paths for transferring initializing and control information from the host system to the IDLC RAM's, paths for collection of information reportable to the host via interruption (data indicating events and conditions and status data specific to same), paths for conducting state swaps (between IDLC elements and TSR 53), and host access paths to IDLC RAM's (enabling the host system to dynamically program operations of the IDLC relative to individual BTDM slots, and to retrieve IDLC and IDLC channel state information). This section discusses the transmit and receive data paths.

5.2.1 Transmit Path

Data to be transmitted in channel time slots at IF 4 ("transmit data") enters the IDLC via bus 7, MUX circuits 80, and MIO partition 66. MUX 80 serves as a switch for routing communication data and other information signals between external host system memory (13, FIG. 2) and MIO 66, and between host system processing entities (10, 12, FIG. 2) and SIO 67. Transmit data is retrieved in bit-parallel word sets from host memory by a DMA (direct memory access) process controlled by DMA control element 65C (DMAC) in response to DCB (Data Control Block) command vectors prepared in DMAR 54 by the host system.

DMAC is adaptable to respond to chaining indications in such DCB's for initiating retrieval of additional DCB's from IOP/host memory; thereby reducing IOP/host processing activities in respect to such additional DCB's. This type of action also enables the IDLC device to retrieve both additional DCB's and transmit data associated with those DCB's from scattered areas in IOP/host memory.

After passing through MIO and DMAC, transmit data is deposited in per channel queue spaces in FIFOR 52. Relative to individual channels, the IDLC process for fetching such data from host memory is invoked in response to requests transferred from Transmit FIFO Manager (TFM) element 62T to DMA Request Queue (DMARQ) element 65Q as TFM acts to empty respective channel queues in FIFOR.

TFM removes transmit data one byte at a time, from the per channel queue spaces in FIFOR, and passes each byte to Transmit Validation (TV) element 61T. The data in each queue space is fetched in FIFO (first in first out) sequence. TV performs certain validation level processes on the data, and passes resulting bytes to Transmit Layer 1 element 61L (TL1). TL1 performs other level 2 processing and transfers resulting data bit serially to IF 4. Each bit transfer at IF 4 is made in response to a specific transmit data bit request pulse presented to TL1 by L1 circuits (5, FIG. 1) which control IF 4. Each bit transfer is synchronous (must occur within 50 nanoseconds of the respective request pulse.

The processing in TV (61V) relative to individual data channels includes selective insertion of protocol-specific framing characters/flags (in channels operating under protocols using such symbols). This, together with the above-mentioned DCB chaining feature in DMAC, permits the IDLC to transfer large blocks of data from scattered spaces in host memory, and introduce diversely formed and spaced protocol framing information into such data in accordance with individual channel configurations. As a result, extensive processing responsibility is offloaded from the IOP and host systems.

Note in reference to above-mentioned elements 61V, 61L, 62T, 65C and 65Q, that partitions shown in single blocks at 61, 62 and 65 in FIG. 2 actually consist of plural elements and/or sub-partitions. Transmit partition 61 contains elements 61T and 61L performing different processing functions on transmit data. FIFO partition 62 is actually sub-partitioned into transmit FIFO and receive FIFO partitions, 62T (TFM) and 62R (RFM) respectively, for separately managing FIFO queuing of transmit data and receive data. DMA partition 65 contains functionally autonomous elements 65C (DMAC), for overall DMA control, and 65Q (DMARQ) for receiving per channel requests from partitions 62T and 62R and queuing such requests relative to DMAC.

In respect to transmit data, requests transferred by TFM to 65Q, and presented by the latter to 65C, indicate depletion of respective channel data queues. In response to such requests, and asynchronous to appearances of respective channel time slots at IF 27, elements 65C and MIO operate to gain access to IOP memory via bus 35 (or host system memory depending on what is connected to bus 35) and retrieve therefrom transmit data which is transferred to respective channel queues in FIFOR.

The above operations of DMAC and TFM are controlled via registers TDCR (Transmit Data Configuration Registers) 1-4 in DMAC, and associated registers TDCR 1-2 in TFM. These registers buffer information fetched from spaces dedicated to individual channels in DMAR and FIFOR.

While fetching transmit data relative to any channel, TFM determines (from the associated TDCR1 information) if the respective queue space in FIFOR (associated TDCR2 space in FIFOR) is empty. If it is, TFM posts a request to DMARQ which the latter asynchronously presents to DMAC. Later, DMAC cooperates with MIO to access external host system memory and fetch more transmit data from there to FIFOR/TDCR2. DMAC's operations relative to external memory are determined from information stored in TDCR 3-4 spaces reserved for the respective channel in DMAR 54. During DMAC action relative to any channel, registers TDCR3 and TDCR4 in DMAC are loaded with channel control information needed to access external memory (that control information fetched from associated TDCR 3, 4 spaces in DMAR). That control information is used to define the location of transmit data to be retrieved (in parallel sets of up to 4 bytes) and transferred to FIFOR/TDCR2. Channel spaces TDCR2 in FIFOR are 4 byte buffers in which transmit data is held for TFM. Registers TDCR1, TDCR3 and TDCR4 in DMAC are loaded from DMAR when a not-shown "transmit DMA state machine" in DMAC (to be shown and described later) is initialized relative to any channel queue requiring service.

The processes for transferring transmit data, from IOP/host memory to FIFOR, are carried out in asynchronous relation to appearances in time of respective channel time slots at (BTDM) interface (IF) 4. However, the handling of transmit data by elements 62T, 61V and 61L is carried out synchronous with said slot appearances, and states of those elements relative to transmit processes in active channels are cyclically swapped in synchronism with respective slot appearances. As noted previously, the state swaps are between those elements and TSR 53 under direction of RSM 63.

Transmit validation element 61V (TV) processes transmit data in accordance with channel requirements and passes it to transmit layer 1 element 61L (TL1) to be serialized and transferred to interface 4. Although transfers of transmit data at this interface are bit serial, a variable number of from 0 to 8 bits is transferrable during one slot. Each bit is transferred in synchronism to (within 50 ns of) a respective bit request pulse received from L1 circuits which control the BTDM interface.

All data bit transfers within a slot are carried out during a small window of time in the slot, for purposes explained later. During that window, in the time slot of any active channel, the L1 circuits present a variable number of bit request pulses, from 0 to 8, and TL1 responds to each pulse by presenting a transmit data bit.

Relative to active data channels, second layer (validation level) processing by TV includes insertion of protocol specific framing information, and insertion of address and check reference information (e.g. CRC check bits). As noted previously, digitized voice signals are transferred in the clear; not requiring explicit destination addresses inasmuch as their destinations are fixed when respective channel links are established).

Relative to active data channels, processing in TL1 comprises parallel to serial conversion (TL1 receives data from TV in bit-parallel bytes and sends data at IF 4 bit-serially) and selective insertion of protocol-specific bits (e.g. HDLC transparency bits which are inserted to prevent message data from being erroneously detected as control flags).

Data bytes passing through TV and TL1 relative to any channel are handled in parallel and simultaneously, in a pipelined manner and in synchronism with appearances of respective channel time slots at BTDM interface 4. Note, in regard to such pipelining, that states of TV and TL1 relative to individual channels are swapped in synchronism with transitions of respective channel time slots at IF 4, and during the slot associated with an active channel TV and TL1 may be simultaneously processing separate bytes relative to the same channel in parallel. However, at IF 4, each byte is passed from TL1 to IF 4 bit serially and only in response to per bit requests presented to TL1 from the interface. Thus, it will be understood that the processing required in these elements to transfer a byte or other unit of data to IF 4 may span one or frames of recurrences of respective channel time slots at IF 4; but due in part to the pipelining just mentioned (and in part to the queued handling in asynchronous section 51) such data is made available at IF 4, in "assembly line" fashion, at a rate ordinarily commensurate with the rated signal speed in the channel.

In IDLC section 50, states of elements 61L, 61V and 62T are "swapped" relative to network channels in synchronism with appearances of respective channel time slots at IF 4, and processing of receive data relative to any channel is conducted in synchronism with appearances of respective time slots. These state swapping processes are conducted between respective elements and spaces in time swap RAM 53 (TSR) allocated to each basic channel time slot. Portions of each channel space are separately reserved for each of the elements. The transfers of state information between the elements and TSR are directed by resource managing element (RSM) 63. In IDLC section 51 all operations relative to transmit data are conducted in asynchronous relation to appearances of respective channel time slots.

5.2.2 Receive Path

Receive data is received bit serially from IF 4 by element 60L (RL1), deserialized into bytes with some additional processing relative to data in protocol formatted channels, bytes are handed over to validation level element 60V (RV) for "second level" selective processing, resulting bytes are transferred from RV to receive FIFO manager element 62R RFM, and transferred by RFM into receive buffer queues (one per channel) in FIFO RAM 52 (FIFOR).

Reception at IF 4 during any channel slot is carried out bit-serially and only during a short duration fraction of the full slot time. During that fraction of time, a variable number of from 0 to m bits is receivable (m=8 presently).

The selective processing tasks performed in RL1 includes stripping protocol-specific information from the received data (e.g. transparency bits and framing flags in HDLC formatted data). The processing in RV includes validation checking of the data in protocol-formatted channels (e.g. CRC checking of HDLC data) and checking of destination addresses in certain data channels (for discarding data not directed to the local node). Data bytes processed by RV and not discarded are transferred to RFM (Receive FIFO Management) element 62R for loading into receive data queue spaces in FIFO RAM 52 (FIFOR) allocated to respective channels. States of fullness of receive data queues in RAM 52 are monitored by element 62R, and when action is needed requests are presented to DMARQ 65Q causing DMAC 65C to operate to forward queued received data from FIFOR to per channel "circular buffers" in host IOP memory on a first in first out basis.

In IDLC section 50, states of elements 60L, 60V and 62R are "swapped" relative to network channels in synchronism with appearances of respective channel time slots at IF 4, and processing of receive data relative to any channel is conducted in synchronism with appearances of respective time slots. These state swapping processes are conducted between respective elements and spaces in time swap RAM 53 (TSR) allocated to each basic channel time slot. Portions of each channel space are separately reserved for each of the elements. The transfers of state information between the elements 60L, 60V, 62R and TSR are directed by resource managing element (RSM) 63. In IDLC section 51 all operations relative to receive data are conducted in asynchronous relation to appearances of respective channel time slots.

As in the transmit path, the receive element shown at 60 in FIG. 2 actually comprises autonomous sub-elements 60L (RL1) and 60V (RV) which respectively provide first and second layer handling of data received at IF 4. As in transmission, states of these elements are swapped in synchronism with appearances of channel time slots at IF 4. Therefore processing of data in these elements relative to any channel or HyperChannel invariably occurs in synchronism with appearances of respective time slots. Although processing required for transferral of a byte of receive data through RL1, RV and RFM will in general span at least three frames of time slot repetition, the per-channel buffering allotted to each element, in TSR 53, and the buffer queue capacity per channel in FIFOR (4 bytes presently) permits pipelined processing of such data to be conducted in a manner such that a channel operating at maximum rate will not overflow in the device.

A feature of the interface 4 (see cross-referenced application with "Burst Time Division" in its title) is its operation in a "positive slip" mode whereby the number of bits received at RL1 during a single time slot is invariably greater than or equal to the number of bits received by the L1 circuits (5, FIG. 1) since the last prior recurrence of the same slot. this ensures that the data received in any channel or HyperChannel will never overflow the L1 circuits in transit to the subject device, regardless of the rate of drift between the receiving clocks of the L1 circuits and the remote sources of such data in the network.

RL1 conducts first layer processing operations on receive data (deserialization, removal of HDLC opening and closing flags, etc.), and RV conducts second layer (validation) processing on data forwarded to it from RL1 (address recognition, stripping of protocol specific information, CRC checking, etc.). As data becomes available for forwarding from RV, requests presented by that element cause RFM 62R to transfer such data to respective channel queues in FIFOR 52. As any channel queue reaches a predetermined state of fullness (which is well before it can overflow), RFM requests action by DMAC 65C, via DMARQ 65Q, which results eventually in (asynchronous) action taken by DMAC to empty the respective queue (in first in first out order).

5.3 Interrupt Paths

Interrupt managing element (INT) 64 is responsible for collection and localized storage of status information (hardware status in IDLC and L1 circuits, and channel process status) required to be reported to the host system. Slave I/O (SIO) element 67 interfaces to the host system via bus 7, for providing interrupt request indications to the host when status information is available locally, and also for providing direct access paths 89 from the host system to RAM's 52-54, and registers in both INT and SIO, by means of which the host can directly access locally stored status information.

Paths 89 are bidirected so that the host system can also directly program operations of the IDLC, by setting initial element state and control information into RAM's 52-54, (see discussion of paths 89 under Host Control Paths below). INT 64 has connections to all other IDLC elements, for receiving event flagging signals and associated event status information through path 90 marked "all", and similar paths 91 to the L1 circuits. Path 90 is bidirectional so that signals can be distributed over that path to logic circuits in the other IDLC partitions. Chip select line 92, extending from SIO 67 to the L1 circuits, prepares the L1 circuits for transfer of their status information. Line 69 previously discussed is used to pass initializing information directly from host interface 7 to the L1 circuits.

Registers ICR, HCR and VHR in SIO 67, and register IHEISR in INT 64 (see definitions above), are common to the entire IDLC chip/device. Outputs of ICR and HCR can be broadcast throughout the IDLC logic, via element 64 and path 90, to establish operating conditions in the IDLC at the hardware level; ICR to establish idle operating mode throughout the chip, and HCR for establishing hyperchannel operating configurations (see cross-referenced co-pending application pertaining to Hyperchannels). VHR holds status vector information, associated with reportage of chip and channel status, collected throughout IDLC via path 64, 90. Register IHEISR in INT 64 serves as a focal point for collection of hardware error information; throughout the IDLC via path 90 and from L1 circuits via path 91.

The other two registers in INT 64, CEISR and EOPISR, are used as common to all channels but are essentially "channelized" (replicated for each channel on the network). Within the space allotted to each channel in TSR 53 there are "images" of these registers. During the time slot synchronous state swapping process previously discussed, RSM 63 loads register CEISR in INT (with CEISR image information fetched from TSR) so that its contents correspond synchronously with those of the channel whose time slot is currently appearing at IF 4. Register EOPISR in INT is a focal point for collection of end of process channel status information and if its contents are altered during a time slot period the information is transferred by RSM into one of 16 EOPISR buffers in the TSR space allotted to the respective channel. The buffer selected is one designated by pointer information in register CEISR during the time slot. See also discussions of Time Swap Paths and TSR below. The contents of the 16 EOPISR buffers associated with any channel form a 16 deep status queue relative to the respective channel.

Register CEISR provides a focal point for transfer of per channel error interrupt status information to the host, and register EOPISR forms a focal point for presentation of end of process status information per channel to the host. Such status information is distinct from and is needed to supplement the more general information passed through VHR. End of process status information per channel includes end of frame status information per channel which may recur at the rate of time slot frames (hence the need for a 16 deep queue for this type of information).

The logical configuration of INT 64 permits it to determine relative time urgency of pending interrupt conditions/events and to order presentation of associated interrupt requests and status information in accordance with such determination, so that bus 7 and the host system are not pre-emptively used for unimportant event communications.

5.4 Status Swap Paths

RSM 63 directs time slot synchronous state swapping activities (see phases "S" on lines 3-1 thru 3-3, FIG. 3) between TSR 53 and the elements which process transmit and receive data, as well as between TSR 53 and status registers in both RSM and INT. Transfers between certain of these status registers and TSR are unidirectional relative to TSR (read-only or write only) as follows.

Registers CCR and HPCR in RSM receive read-only transfers from TSR. These registers hold information which does not change during processing relative to individual channels (backing information in TSR is loaded from the IOP/host system when the channels are configured and does not change thereafter until the channel is reconfigured); hence, data transferred to these registers need not be returned to TSR.

Register EOPISR in INT is used as a source of status information in write-only transfers to TSR. This register holds status information representing events occurring during channel processing, and its contents are placed into one of 16 backing buffer locations in TSR allotted to the respective channel in accordance with pointer information in register CEISR. The handling of the pointers and the status information in the backing locations, and the nature of the information fields stored in EOPISR, are such that loading of that register from TSR is never required.

Other state swapping activities between TSR and processing elements of the IDLC may be bidirectional. It should be understood that relative to processing elements of the IDLC state saving actions to TSR are carried out only if the slot which is ending is one assigned to an active channel or HyperChannel, and state reloading actions from TSR to these elements are carried out only if the next slot is assigned to an active channel or HyperChannel. Accordingly, in the following discussion referred to FIG. 3, describing state swapping activities relative to consecutive time slots N and N+1, it will be understood that status is saved relative to slot N only if that slot is assigned to an active channel or HyperChannel, and status is reloaded relative to slot N+1 only if that slot is assigned to an active channel or HyperChannel.

State swapping transfer activities are time-staggered by RSM relative to transmit processing, receive processing, synchronous aspects of interruption processing, and the loading of global configuration control variables (see phases S on lines 3-1 thru 3-3, FIG. 3). RSM allows for different periods of time for these functions to conclude before initiating associated activities relative to TSR and the affected elements.

As mentioned earlier, RSM receives beginning of slot (BOS) and last slot of frame (LSOF) pulses from IF 4 via lines 94 which enable RSM to prepare itself and other IDLC elements for state swapping action. The preparation timing tolerance allows for elements whose states are to be saved to sequence to stable states assuring unambiguous continuity of processing in the next appearance of the currently ending time slot.

Referring to FIG. 3, as a part of such preparation, RSM prefetches a "channel type" portion of the global variable CCR (configuration control register) from TSR (during phase P on the line 3-4 labelled "global" in FIG. 3). This portion defines the channel or Hyper-Channel type associated with the time slot just beginning (slot N+1 in FIG. 3), and in respect to Hyper-Channels allows RSM to prepare for translation of a time slot indicating function RSM_TSI (discussed later) which is the basis for associating HyperChannel slots to a reference slot as described later.

Relative to consecutive slots N and N+1, RSM allows for staggered periods of time for elements involved in transmit, receive and interrupt processing to complete their operations relative to slot N before initiating respective state swapping activities (see portions "N" of lines 3-1 thru 3-3, respectively labelled "transmit", "receive" and "interrupt" in FIG. 3). As a transitional indication, RSM presents staggered end of slot (EOS) pulses to the elements responsible for synchronous aspects of transmit, receive and interrupt processing as described next.

The first processing function to conclude relative to slot N is transmit processing (compare end of phase "N" on line 3-1 "transmit" in FIG. 3 with ends of phase "N" on other lines). Accordingly, RSM presents the first EOS pulses to the transmit processing elements TL1, TV and TFM. Upon receiving the EOS signal these elements sequence to a stable operating state relative to the channel associated with slot N and assert "DONE" indications to RSM (any element instantly in a stable operating state when EOS is received, immediately asserts its DONE indication).

As each DONE indication is received, RSM operates TSR to write respective element processing state information into a space in TSR associated with slot N (a space whose address is related directly to the time position of slot N in the slot frame if N is assigned as the reference slot of a HyperChannel or if N is assigned to a basic channel, and whose address is otherwise related to the position of the associated reference slot if N is assigned to a non-reference slot of a HyperChannel).

Thereafter the transmit process elements (TL1, TV and TFM) are set to states associated with channel N+1, if next slot N+1 is assigned to an active channel or HyperChannel, and then condition themselves to halted states (phase "H" line 3-1 "transmit" in FIG. 3). The information to set transmit process states relative to slot N+1 is fetched by RSM from a location in TSR associated either directly with that slot (if the slot is assigned as a reference channel of a HyperChannel or to a basic channel), or directly with an associated reference slot (if slot N+1 is a non-reference slot of a HyperChannel). After a brief period in the halted condition, the transmit processing elements are given a start pulse signal by RSM and they begin processing relative to slot N+1 (phase "N+1" on line 3-1 "transmit").

The next function to conclude processing relative to slot N is the receive process conducted in RL1, RV and RFM. These elements are given EOS indications near the end of their "N" processing phase and are allowed a brief period of time to cycle to stable processing states, and present respective DONE indications to RSM (or to present DONE immediately if instantly stable when EOS appears). However, for this function, the elements condition themselves to halted conditions before their states are swapped (leaving RSM additional time to direct state swapping relative to interrupt processes and loading of global variables for slot N+1 as described below).

After their halted phase, the states of the receive processing elements relative to slots N and N+1 are swapped (phase "S" line 3-2 "receive" in FIG. 3). Then those elements are given start signals by RSM and begin processing relative to slot N+1. As with transmit state swapping, states of the receive elements relative to slot N (slot N+1) are stored in (fetched from) a TSR space associated either directly with the time position of the respective slot, if that slot is assigned to a basic channel or as a reference slot of a HyperChannel, or with the time position of a reference slot if the respective slot is assigned as a non-reference slot of a HyperChannel.

The next function to conclude relative to slot N is that performed by interrupt partition 64 (INT); see line 3-3 "interrupt" in FIG. 3. Notably, logical parts of INT operate in synchronous and asynchronous modes; and this discussion of slot related activities is directed only to the part which operates synchronously. At an appropriate time relative to the synchronous interrupt process relative to slot N, RSM presents EOS indication to INT causing the latter to sequence to a stable state and present DONE indication (or to immediately present DONE indication if immediately in a stable operating state). At this point, state of INT (synchronous part) is saved relative to slot N and last state of INT (synchronous part) relative to slot N+1 is loaded. As with transmit and receive elements, the saved state relative to slot N (loaded state relative to slot N+1) is written to (fetched from) a location in TSR associated either with slot N (N+1) or with a reference slot if slot N (N+1) is assigned to a non-reference slot of a HyperChannel. Then synchronous part of INT phases through a halt condition, receives a start indication from RSM and starts processing relative to slot N+1.

The state handling activity which concludes last relative to slot N is the fetching (read-only) of the global configuration control variables by RSM to its CCR and HPCR registers (phase "R" on 3-4 labelled "global"). Note that shortly after this action concludes, the state swapping transfers relative to the receive processing elements are started.

5.5 Host Program Control Interface

Paths 89 from SIO to INT and RAM's 52-54 are bidirectional. In the direction towards SIO (and via the latter to bus 7), these paths allow the IOP/host system to collect status information from TSR and registers in SIO and INT (specifically, register VHR in SIO and register IHEISR in INT). In the opposite direction (called the host control interface), these paths allow the IOP/host system to set initial state and control information into RAM's 52-54 and into registers within the IDLC logical elements.

Thus, for instance, the host/IOP complex can insert state information into TSR for establishing initial operating states in elements within the synchronous part of the IDLC relative to selected channels. Advantage of having this separate path is that it does not interfere with the normal communication paths at the MIO interface, and it allows for each channel to be activated and deactivated independently of all other channels. Processing logic in the host/IOP complex can act through this path to set individual element registers and storage array functions (for configuring and/or controlling IDLC operations) while data communication between DMAC and host/IOP memory is concurrently proceeding. Thus, for instance, the host/IOP processors can modify registers ICR and HCR in SIO for configuring IDLC to certain operating modes (e.g. reset), and it can modify registers such as HPCR in RSM for dynamically informing elements such as INT of actions taken relative to certain interrupt status queues in TSR (see description of interrupt handling operations in section 5.6 below and in detailed descriptions of INT and RSM partitions which follow).

Figure 6:
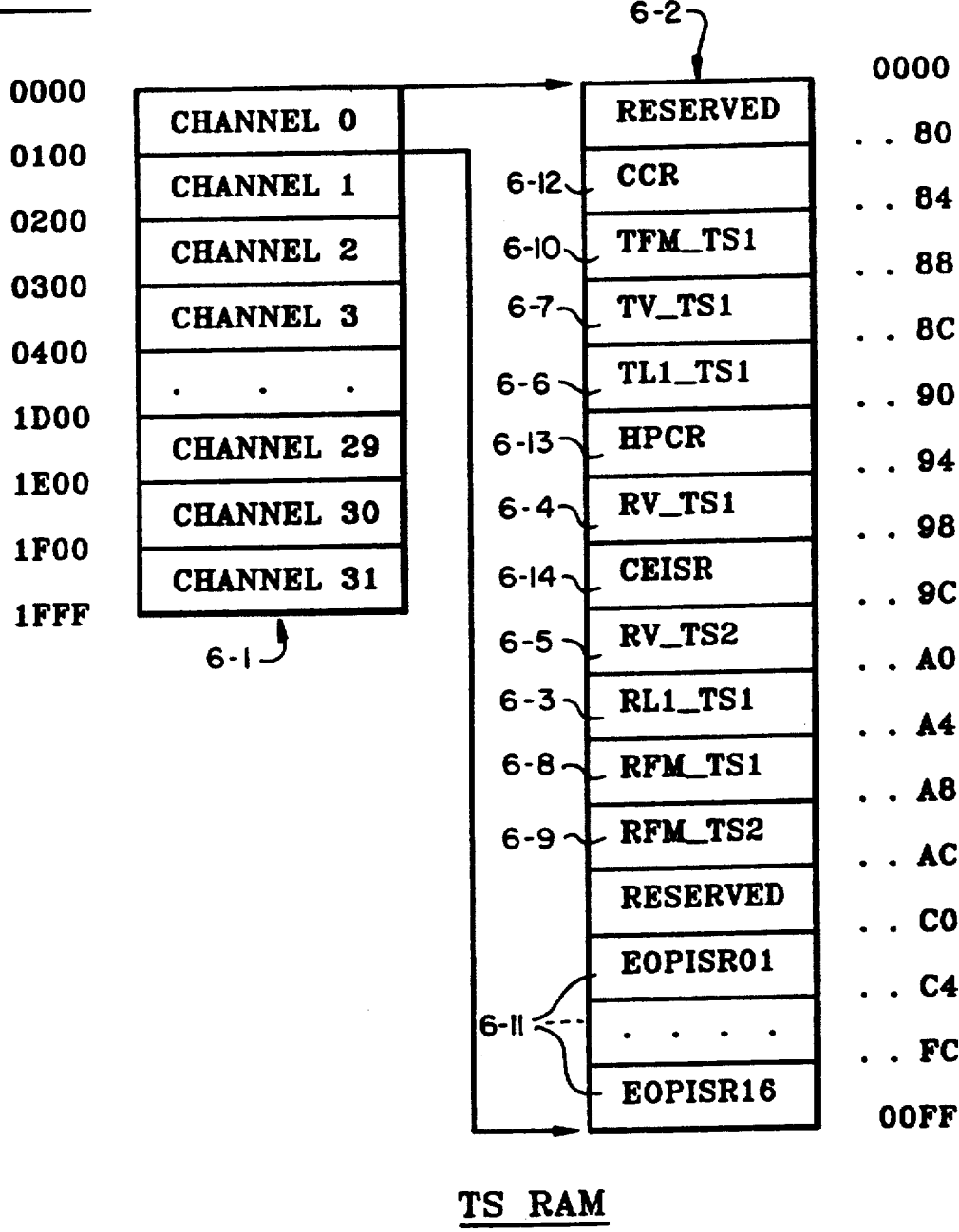
FIG. 6 is a block diagram of the time swap store (TS RAM), one of the local RAM arrays in the device, indicating its size and per channel space allotments.

In respect to the above-mentioned use of the path 89 for loading element state information into TSR, relative to selected channels, refer to FIG. 6. As indicated at 6-1, each of the 32 channels is assigned a respective block of storage space in TSR 53, of spaces and, within each respective block, there are multiple word spaces reserved for storage of respective channel information; including respective configuration control information, respective interrupt event information, and respective "time swap" words, the latter words having the form "ABC—_TSON"; where ABC represents synchronous processing elements (e.g. RV, TV, etc.), TS represents "time swap word" and N is 0 or 1. Note further that in each channel's block the spaces reserved for configuration control information are used to store Channel Configuration Register information (CCR) and HDLC Protocol Configuration Register information (HPCR) for customizing the configuration and communication protocol in the respective channel, and the spaces reserved for interrupt status information include a space for storing Channel Error Interrupt Status Register information (CEISR), and up to 16 words of End of Process Interrupt Status Register information (EOPISRn, n=1 ... 16) for indicating events reportable to the host/IOP system through interrupts.

Figure 7:
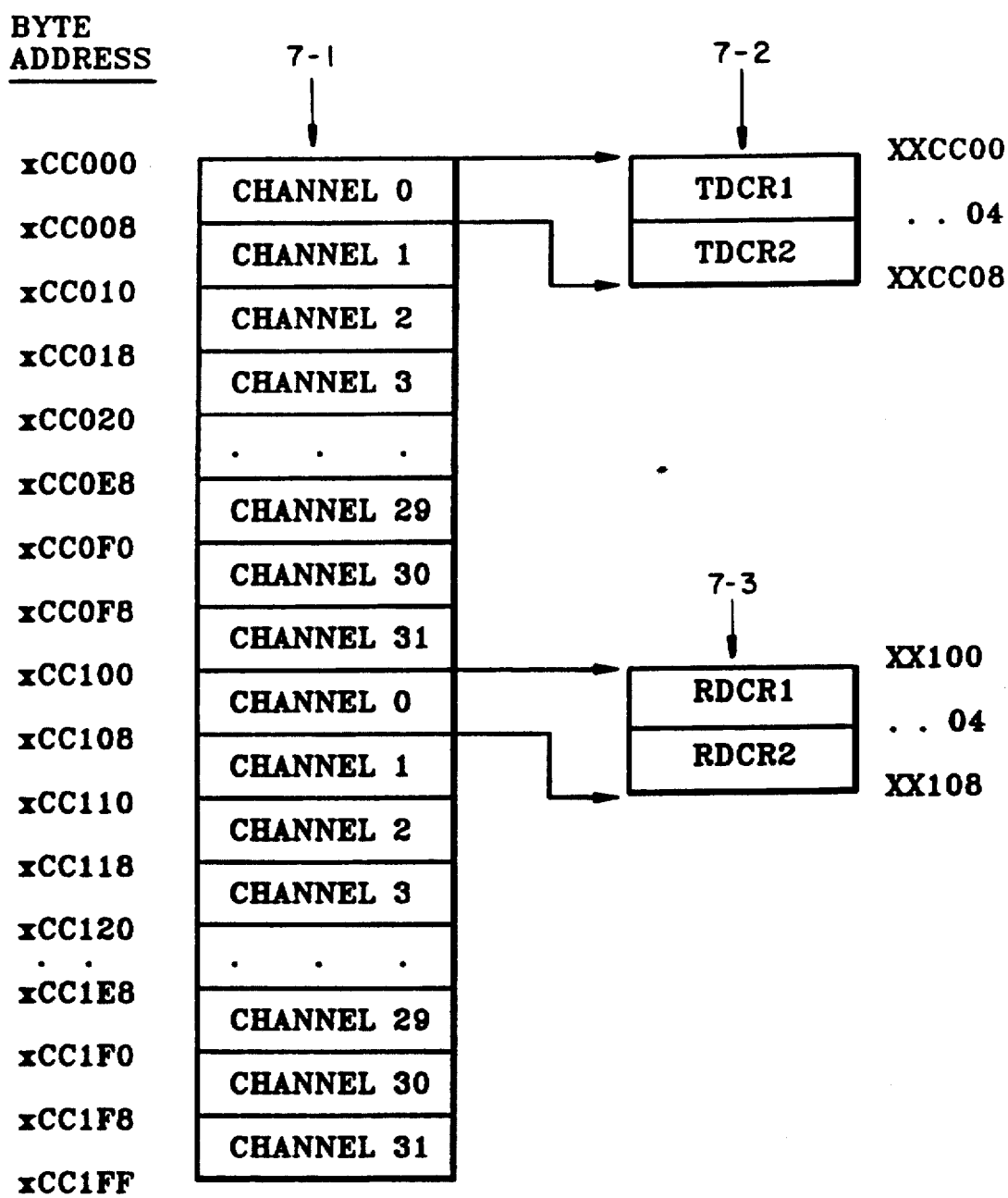
FIG. 7 is a block diagram of the first in first out buffer store (FIFO RAM), another of the local RAM arrays, indicating its size and per channel space allotments.
Figure 8:
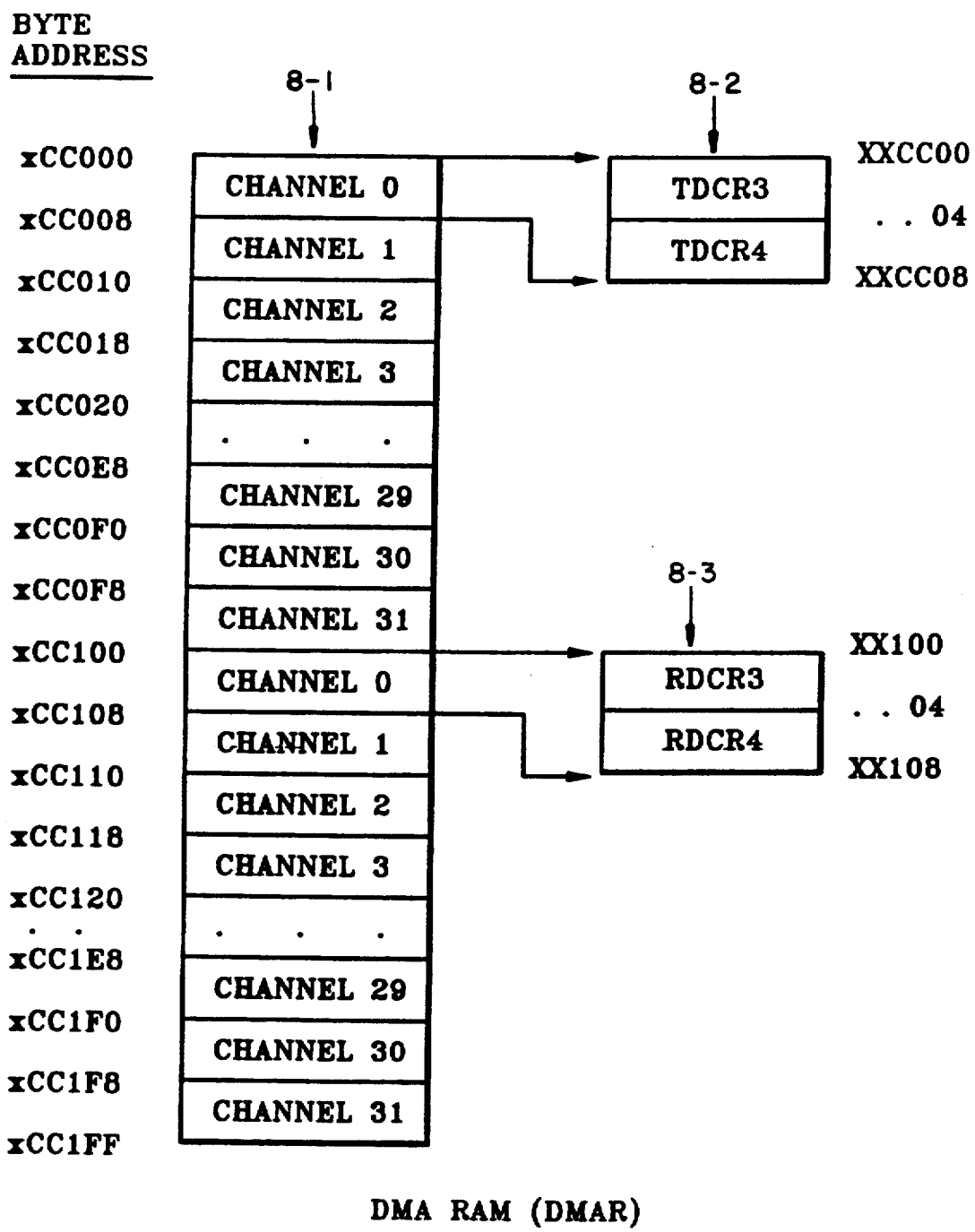
FIG. 8 is a block diagram of DMA RAM, another of the local RAM arrays, indicating its size and per channel space allotments.

FIGS. 7 and 8 respectively illustrate the allocation of blocks of storage space per channel in FIFOR (FIFO RAM), at 7-1, and DMAR (DMA Control RAM), at 8-1. In each channel's block, as exemplified for channel 0 at 7-2 and 8-2, four Transmit Data Control Register word spaces TDCR1-TDCR4 are used for transmission of data, and in the same block, as exemplified for channel 0 at 7-3 and 8-3, and four Receive Data Control Register word spaces RDCR1-RDCR4 handle received data. Considering these spaces relative to FIG. 4, path 89 can be used by the Host/IOP complex to transfer control information to the individual channel spaces in FIFOR 52 and DMAR 54, for initializing DMA control parameters, TDCR and RDCR, to effectively prepare DMAC 65C for directing block transfers of transmit data and receive data, relative to respective channels, between FIFOR and IOP RAM 13 (FIG. 1) across bus interface 7. Included in these parameters are control words which can be used to define data block lengths and byte sequencing (TDCR1 and RDCR1), and control words (TDCR3 and TDCR4, RDCR3 and RDCR4) which can be used to define operations of the DMAC partition relative to individual channels.

TDCR3 holds address information defining the space in IOP/host memory from and to which transmit data is to be transferred. TDCR4 holds a DCB command array defining the transmit operation (with potential via chaining indicators to extend operations to additional DCB's accessible via IDLC DMAC action). RDCR3 and RDCR4 hold address parameters defining boundaries of a circular buffer space in IOP/host memory to which received data is to be transferred.

5.6 Operations—Intermediate

The following is an intermediate level description of operations of the IDLC other than those involved in forming and using HyperChannels or extended channels. An intermediate level description of the formation and usage of HyperChannels and extended channels is provided in section 5.7 below.

In an ISDN Primary Rate environment, the IDLC supports 32 channels with a maximum data rate in each channel of 64,000 bits per second (64 kbps) full duplex, or an aggregate rate in each of 128 kbps. This rate is sufficient to accommodate full duplex transmission of either data or digitized voice in any channel, and for higher data rates channels may be variably grouped into hyperchannels.

At power-on reset, the IOP/host system sets all registers in the IDLC and L1 circuits, and all locations in RAM's 52-54 to initial values, and then enables the IDLC by writing to the ICR (IDLC Configuration Register) register in SIO (see discussion of that register in the detailed description of SIO to follow). All of these actions are taken across bus 7, and through SIO. The registers in each of the IDLC logical partitions are accessible through not-shown extensions of paths 89. SIO decodes addresses of individual RAM units and partition registers and passes suitable request signals to the units and partitions. The partitions and RAM units arbitrate these requests along with requests from other partitions, and when ready assert acknowledgement to SIO whereupon the relevant information transfers (from IOP to RAM unit address locations or individual partition registers) are completed.

Then the IOP initializes the L1 logic via path 69 and performs operations through that path to verify that the L1 circuits can successfully transfer data across the network.

At this point, RSM is receiving signals indicating channel time slot transitions from L1 circuits (signals BOS and LSOF mentioned earlier), via BTDM IF 4 and connection 94, and directing state swapping transfers between the other elements in the IDLC synchronous section and TSR. Also, the other elements have been activated and are ready to process data. Thereafter, individual channels in the IDLC can be activated by writing appropriate values to associated registers (from IOP via SIO). After activation of any channel the IOP enables data transfer in the L1 circuits, causing those circuits to request transmission of data to the channel from the IDLC and forward received data to the IDLC. All data transfers at BTDM IF 4 are in varied length bit-serial bursts (as explained earlier) in the respective channel's time slot, and all processing of received and transmitted data in the IDLC synchronous section is conducted only during the respective time slot.

Data transmission is accomplished by retrieval of data from IOP memory, via DMAC operations defined by DCB's stored in the associated channel space in DMAR, transfer of such data to respective channel spaces in FIFOR, further transfer of the data by TFM to TV, and processing of the data in TV and TLI to produce required formats. The data is handled in byte units by TFM, TV and TLI and passed bit serially across IF 4 in response to individual bit transfer requests posted by L1 circuits. Up to a byte (8 bits) of data may be transferred during one channel time slot. At the IOP bus interface 7, transmit data is transferred in 4-byte units, and in FIFOR each channel has a buffer storage space for holding 4 bytes.

Data reception is accomplished by reverse processing of data in RL1 and RV, transfer of resulting data to RFM and via the latter to respective channel receive spaces in FIFOR, and forwarding of the data from FIFOR to circular buffer spaces in IOP memory through operation of DMAC in response to control information preset into DMAR. At IF 4 the data is received bit serially, in response to individual requests presented by L1 circuits during the channel time slot. Up to a byte of data may be transferred during a time slot. In RL1, RV and RFM, the data is handled in byte units. FIFOR holds up to 4 bytes of receive data per channel. At IOP bus interface 7, receive data is transferred in 4-byte units.

Relative to transmit data in e.g. HDLC format, TV generates CRC's for outgoing frames and passes the data to TL1. TL1 generates opening and closing flags for each frame, inserts stuffing bits in data as required to sustain transparency (of data in relation to control characters) and passes the data with CRC and flags to IF 4 bit serially. Relative to receive data in e.g. HDLC format, RL1 searches for opening and closing frame flags and discards them, detects stuffed bits in data and discards same, performs octet alignment checking on remaining data, and forwards same to RV. RV performs address recognition and CRC checking functions before forwarding the data to TFM.

All transfers between DMAC and bus 7 are through MIO. MIO services transfer requests from DMAC by arbitrating for the bus and sequencing bus control, address and data signals to perform the transfer.

Interrupt requests relative to critical channel process conditions are presented to INT from RSM, RFM, TFM and TL1. RSM reports TS RAM parity errors to INT. RFM and TFM are focal points for reporting channelized hardware errors (bus errors, FIFO parity errors, etc.) to INT relative to events in respective partitions and in the DMAC partition. RFM also acts as a focal point for interrupt requesting relative to RL1 and RV, and TFM acts similarly relative to TV. Thus, requests from RFM cover all "reportable" channel process conditions encountered within the receive pipeline (DMAC, RFM, RV, RL1), and requests from TFM and TLI cover all such conditions encountered in the transmit pipeline (DMAC, TFM, TV, TL1).

In response to such requests, INT acts during one or more time slots of the respective channel to assemble CEIS (Channelized Error Interrupt Status) and EOPIS (End Of Process interrupt status) words. The CEIS words describe channel error conditions, while the EOPIS words describe channel communication frame transition events. The CEIS words also contain addressing information for locating EOPIS words.

These words are written from INT to TSR by operation of the state swapping mechanism in RSM. In TSR, these status words are saved in spaces dedicated to respective channels; each EOPIS word being saved in 1 of 16 spaces allotted as a queue to EOPIS parameters. The particular space in the EOPIS queue to be written at each access is defined by pointer information furnished to RSM by INT. The queue is used in a "circular" manner; the pointer advancing in unit increments to a last space and from that space "wrapping around" to a first space. The pointer information is also stored by INT in the CEIS status word which is written via RSM to TSR, and is thereby available to the IOP for monitoring. The CEIS word also contains information defining the number of outstanding words in the queue, which is updated by INT as new entries are written to the queue.

Relative to each such status word written to TSR, INT assembles a vector identifying the associated channel, and sends it along with a request to SIO. SIO stores the vector in register VHR, activates an interrupt signal on bus 7 and, when IOP acknowledges, places the vector on the bus.

Later, IOP decodes the vector, determines which channel is involved, and acts through SIO to retrieve the associated CEIS word. Examining this word, IOP determines if there are outstanding entries in the EOPIS queue. If there are, when IOP is ready to deal with those parameters, it acts through SIO to retrieve one or more of the queue entries; providing address information to SIO derived from the pointer information in the previously retrieved CEIS and modifying the CEIS information in TSR to reflect the number of entries remaining outstanding in the respective EOPIS queue.

At such times, the IOP acts further through SIO and program control path 89 to access the HPCR register in RSM and alter information in the latter to indicate that contents of the associated channel's EOPIS queue have changed, and to indicate further the number of outstanding queue entries removed. INT uses this HPCR information to determine if the queue is not empty; i.e. if it needs to generate another interrupt relative to the queue.

As INT writes EOPIS words into each channel queue, and updates the associated CEIS word to indicate the number of entries currently outstanding, if the number reaches 16 INT sets a bit in the 16th entry to indicate a full queue condition. When IOP retrieves that entry it notes the toggled full bit as an indication that some subsequent entries may have been written over; i.e. as an indication that its information relative to communication framing events in the respective channel may be incomplete.

The IOP can disable a channel by first halting data transfer on that channel in the L1 logic, and then disabling the channel in the IDLC by setting channel type bits in the respective channel control register (CCR) to a value indicating an inactive channel. The IOP can disable the IDLC entirely by setting a mode field in the ICR register to a predetermined value (for further information refer to the detailed description of the SIO element hereafter).

With certain exceptions noted here, information transfers between the IDLC and its external interfaces, and between elements within the IDLC, are conducted by exchanges of request and acknowledgement signals. Exceptions with respect to data transmission and reception are at the BTDM interface and at the interface between RL1 and RV.

At the BTDM interface TLI must present a bit of transmit data within a predetermined time after appearance of a request from L1 circuits for bit transfer, and RL1 must accept a receive bit within a predetermined time after L1 indicates that it is sending same. If data byte buffers in TL1 (there are 2) are both empty when a request for bit transfer appears at IF 4, an underrun indication is given to TV which then presents an interrupt indication to INT. Similarly, if the (single) data byte buffer in RL1 is full when transfer of a receive bit is indicated at IF 4, RL1 asserts an overrun indication which is passed to INT via RV and RFM. INT then collects and stores the related status information and generates a related interrupt request to IOP via SIO.

At the interface between RL1 and RV similar synchronous transfer restrictions apply; namely, that RV must accept a byte of receive data presented by RL1 within a predetermined time after RL1 indicates that it is presenting that byte. The time can vary depending upon the current slot phase at the BTDM interface. In general, the time is the lesser of the earliest time at which another bit could be received at the BTDM interface or the time at which RV status would be saved (see discussion of "DONE" indications in description of RSM hereafter).

All other IDLC transfers are full handshake request-acknowledge. TFM moves transmit channel data from a respective 4-byte buffer in FIFOR to TV one byte at a time. Each transfer is initiated by a request from TV and completed with an acknowledgement from TFM. As soon as the last of 4 bytes is transferred from the FIFOR buffer, in an operation which is not concluded by that transfer, TFM posts a request for additional data to DMARQ. On an asynchronous basis, requests in DMARQ are serviced by DMAC which interacts with MIO to arbitrate for bus 7, directly access IOP memory and transfer 4 bytes of additional transmit source data to FIFOR. Depending on the size of bus 7, the 4 byte transfer may be accomplished in one or more stages, but to DMAC the transfer appears as a single operation. As it completes its processing of each transmit data byte, TV asserts a transfer request to TLI and the latter when ready accepts the byte and asserts an acknowledgement.

Similarly, in receive data handling, RV requests transfer action from RFM as it completes processing of a received byte, and RFM when ready accepts the byte and asserts acknowledgement. The byte is stored in FIFOR within a 4-byte receive data storage space allotted to the respective channel, and when that space fills with the last of 4 bytes RFM posts a request to DMARQ. Asynchronously, DMAC services that request and moves 4 byte from FIFOR to a directly accessed designated circular buffer space in IOP, after intermediate arbitration for bus 7 by MIO.

Note that the IDLC design can be varied to accommodate a variety of different bus 7 interfaces merely by changing designs of MIO and SIO, and without changing any of the other partitions or significantly altering the aggregate circuit count of the device.

5.7 Formation and Usage of Hyperchannels/Extended Channels

An intermediate level description of the means employed in the IDLC to support formation and usage of HyperChannels and extended channels is provided next with reference to FIG. 5. Additional details will be provided later in detailed descriptions of individual IDLC partitions involved in such formation and usage, and in a later section describing HyperChannel formation and usage in greater detail.

In order to understand HyperChannel formation and usage in the IDLC it is useful to understand how space in RAM's 52-54 (FIG. 4) is utilized. This is shown generally in FIGS. 6-8. Space dedication per "channel" is shown in FIG. 6 for TSR 53, in FIG. 7 for FIFOR 52, and in FIG. 8 for DMAR 54. As indicated in these figures, the addressable space in each RAM array is divided into 32 blocks of space associated with 32 "basic time division channels" (channels 0 through 31). These correspond in numerical order to the 32 basic time slots which recur in time sequence during each time division frame at BTDM IF 4. This allocation is fixed regardless of activity status in the respective slots, so long as the slots are not assigned to HyperChannels.

Within the block of space reserved to each basic channel, TSR has dedicated sub-spaces, reading from top to bottom in FIG. 6, as follows (the dedication within the channel 0 space shown as exemplary): a sub-space for storage of a configuration control register parameter CCR for the respective channel; sub-spaces dedicated for storage of time swap status word functions relative to synchronous pipeline partitions TFM, TV, TL1, RV, RL1 and RFM (e.g. status word TFM_TS1 relative to partition TFM); a sub-space for storage of a respective channel event interrupt status register term CEISR; and 16 sub-spaces forming a storage queue for channel end of process interrupt status terms (EOPISR01 through EOPISR16). Details of these sub-spaces and their usage are given later in detailed descriptions of the IDLC logical partitions. Of interest presently, the CCR sub-space has a field CT defining the respective channel type which will be discussed below in describing HyperChannel usage.

Within the (4-word) block of space dedicated to each basic channel/slot, FIFOR has sub-spaces dedicated as follows (the dedication for channel/slot 0 shown in FIG. 7 as exemplary): 2 word spaces reserved for storage of transmit data control register terms TDCR1 and TDCR2, and 2 word spaces reserved for receive data control register terms RDCR1 and RDCR2. The TDCR2 and RDCR2 spaces are respectively reserved as data queues for handling communication data in transit relative to IDLC partitions TFM and RFM; TDCR2 storing up to 4 bytes of transmit data en route from external IOP memory (via DMAC) to TFM, and RDCR2 storing up to 4 bytes of receive data en route from RFM to external IOP memory (via DMAC). The TDCR1 and RDCR1 word spaces are dedicated for storing information used by respective storage manager partitions TFM and RFM to control their access to respective data queue spaces (TDCR2 and RDCR2).

Within the space reserved for each basic channel/slot, DMAR 54 (FIG. 8) contains (4 word) sub-spaces as follows (the sub-space dedication for channel 0 exemplified): 2 word spaces for transmit data control register terms (TDCR3, TDCR4) and 2 word spaces for receive data control register terms (RDCR3, RDCR4). The TDCR spaces are reserved for information controlling operations of DMAC for retrieving transmit data from IOP/external relative to the respective channel, and the RDCR spaces are reserved for holding information to control operations of DMAC for writing receive data to IOP/external memory relative to the respective channel.

Considering the above, it should be appreciated that when a basic channel is active and not part of a Hyper-Channel or extended channel (hereafter, these terms will be used interchangeably so that mention of one should be taken as embracing the other), the sub-spaces in RAM's 52-54 dedicated to the respective channel are addressable in association with the time positions of respective BTDM slots. In other words, a factor in the location of each space in this circumstance is the time position of the respective BTDM slot; and as noted earlier this time position is manifested by a time slot indication synchronously generated by RSM (RSM₁₃ TSI).

In accordance with the present invention, a HyperChannel is formed by combining plural basic channels/slots and establishing a plural-to-one association between a reference (earliest appearing) one of the combined slots and the other combined slots. When this occurs, it is necessary to translate all memory accesses (both those relative to internal RAM's 53–54 and those directed by DMAC relative to IOP memory) relative to the combined basic channels/slots into accesses to the spaces reserved for the reference channel/slot.

FIG. 5 illustrates generally the IDLC elements involved in formation and usage of the foregoing plural-to-one HyperChannel associations. Register HCR in SIO, shown at 67h, contains spaces assignable to up to 5 numerically ordered HyperChannels (these will be more fully discussed in the detailed description later of HyperChannel formation and usage). Each space includes a 1-bit field for indicating if the respective HyperChannel is active or inactive and a 5-bit field for designating the time position of a respective reference slot associated with the HyperChannel.

When a HyperChannel is formed and activated, information is written into one of the HCR spaces (from Host/IOP complex) to define the numerical order and reference channel/slot of the respective HyperChannel. This information is instantly available to other partitions including RSM and DMAC.

When a HyperChannel is formed and activated, information is also written into the CCR type fields associated with the constituent slots (a term hereafter used to refer to the basic slots which are combined to form the HyperChannel) to indicate their association with an active HyperChannel and designating the numerical order of the HyperChannel. This information is written from the Host/IOP processing complex into the TSR spaces of the constituent slots via SIO.

At the beginning of each BTDM time slot (indicated by BOS and LSOF pulses on lines 4b and 4f in FIG. 5), RSM 63 examines the CCR type field in the corresponding TSR space to determine if the slot is a constituent slot of an active HyperChannel. If it is, RSM uses the information in HCR 67h to translate its internal slot count into an externally manifested time slot indication (RSM_TSI) which corresponds to the time position of the associated reference slot. Since the RSM time slot indication is used as a base offset in addressing RAM's 52 and 53 during operations of the IDLC synchronous section 50 (FIG. 4), it will be appreciated that when constituent slots of a HyperChannel are being served such addressing will be referred to the space assigned to the associated reference slot.

Operations of DMAC 65C, for transferring information between IOP/external memory and RAM 52 (also RAM 53 in certain chaining operations discussed later), are invoked by requests presented statically to DMAC by DMARQ 65Q. These requests correspond to requests presented by RFM 62R and TFM 62T to DMARQ during synchronous processing. DMARQ contains discretely separate sets of positionally ordered registers dedicated to HyperChannels and basic channels, and requests presented by RFM and TFM are steered to and staticized in these registers by logical elements of DMARQ.

During synchronous processing relative to any basic time slot, RSM presents DMARQ with its time slot indication (RSM_TSI). Relative to constituent slots of a HyperChannel, RSM also generates an indication of the respective HyperChannel order number which is presented to DMARQ. When a request is presented by TFM and/or RFM to DMARQ, the time slot and HyperChannel order number indications from RSM, which are presented to DMARQ via lines indicated generally at 63Q (FIG. 5), enable DMARQ logic to steer the request(s) to corresponding register positions for presentation to DMAC. In other words, requests associated with constituent slots of a HyperChannel are steered to request registration positions associated with the respective HyperChannel and other requests are steered to request registration positions associated with basic channels.

DMAC selects and services the staticized DMARQ requests one at a time, in a predetermined priority order, giving preference to HyperChannel requests over other requests. In doing so, DMAC develops logical pointer functions which distinguish the channel or HyperChannel association of the request currently being serviced.

One of these functions, DMAC_H-B_SEL, indicates if the current request is associated with a HyperChannel (H) or basic channel (B). For requests associated with B channels, a corresponding 5-bit B pointer is generated (DMAC_B_PTR) defining the numerical position of that channel (which corresponds to the time position of its associated BTDM slot). For requests associated with H channels (HyperChannels), DMAC generates a corresponding 5-bit H pointer (DMAC_H_PTR) defining the numerical orders of those channels.

In performing its transfer operations, DMAC accesses RAM's DMAR and FIFOR (FIFOR to read or write communication data, and DMAR for control information to use in accessing IOP/external memory). In performing these accesses, DMAC uses the above pointers and the information in HCR to determine which spaces to address. Accordingly, when operating relative to a B channel request, DMAC will use the corresponding B pointer to access the spaces in FIFOR and DMAR associated with the respective basic channel/slot, and when operating relative to a HyperChannel, DMAC will use the respective H pointer to access the spaces in FIFOR and DMAR dedicated to the respective reference slot.

The requests associated with RFM and TFM are separately staticized in DMARQ and handled separately by DMAC. An indication distinguishing between respective receive and transmit related requests is provided by DMAC at DMAC_RCV_REQ (high for receive requests and low for transmit requests), and used relative to DMAR as an additional addressing factor.

As it completes servicing of any request, DMAC presents a 0 reset indication to DMARQ (DMAC_DMARQ_RCV_RESET or DMAC_DMARQ_XMIT_RESET), which the latter must steer to the respective staticizing register position containing the corresponding request indication on which DMAC is operating. For this purpose, DMAC also supplies DMARQ with the corresponding H-B pointer selection and H or B pointer indicating functions, these together with the reset indication effectively pointing to the appropriate registration position.

As a final note, when DMAC is servicing a B channel request, it generates an addressing output DMAC_CH_N_NBR designating the respective channel number for use as an address factor relative to FIFOR and DMAR. Other operations performed by DMAC and DMARQ will be indicated in the later detailed description of HyperChannel formation and usage.

6. Time-Swap RAM (TSR)

As noted earlier, time-swap RAM TSR (FIG. 6) contains blocks of spaces allocated to basic channels corresponding to the time division slots recurring in BTDM frames. In the present embodiment, there are 32 such channels/slots (channels 0 through 31 and 32 corresponding space allocations/dedications in TSR.

Within each dedicated channel space there are subspaces dedicated for storage of process state words relative to the partitions in the previously discussed (transmit and receive) processing pipelines in the IDLC synchronous section 50 (FIG. 4); i.e. relative to RL1, RV, RFM, TFM, TV, TL1. These state words are denoted by e.g. TFM_TS1 (TFM denoting the partition and TS1 denoting a time swap status word). RV and RFM have 2 such time swap status word sub-spaces in each TSR channel space, and the others have one word sub-space each.

Relative to active channels, these state words define the processing states of respective partitions at the end of the last recurrence of the assigned BTDM time slot. Through actions described later state information is transferred between the state word spaces and respective partitions to provide continuity of processing relative to each active channel (see description of RSM partition below).

Each basic channel space also contains word subspaces for parameters CCR (configuration control register) and HPCR (HDLC protocol configuration register) which define the operating configuration, activity status and communication protocol of the respective channel.

Finally, each basic channel space contains 17 word spaces for storing interrupt status indications relative to communication events occurring in respective channels. Through actions described later, such indications are retrievable by the IOP/Host complex in association with interrupt requests presented by the IDLC (see detailed descriptions of INT and SIO below). One such space is reserved for an error status word function CEISR (channelized error interrupt status register), usually associated with detection of a parity error in transfer of information between either TSR or FIFOR and the synchronous processing partitions, and the other 16 spaces are reserved as a circular buffer queue for event status word indications EOPISR (end of process interrupt status register).

Channel event and error status information is gathered and stored under the direction of interrupt partition INT. The TSR space allotted for the event status information is sufficient to permit queueing up of status relative to up to 16 separately occurring events in the respective channel, thereby reducing time constraints on the IOP/host complex relative to retrieval of such information. INT is responsible for managing these status queues.

Processing channels which are active and currently enabled for communication are serviced by the IDLC processing elements in synchronism with appearances of respective time slots at the BTDM interface. At the end of each slot associated with an active channel, the respective processing elements cooperate with Resource Manager RSM to save their latest processing status in the TSR space associated with that channel and the respective element, and at the beginning of a time slot associated with the next active channel the elements cooperate with RSM to reload status saved relative to that next channel during its last service/slot appearance.

During each BTDM slot assigned to an active channel, and on signal from RSM, the IDLC processing elements cooperatively perform processing and buffering operations relative to data being received and transmitted through the elements in the associated channel. The data is handled bit serially at the BTDM interface (plural bits may be transferred during any slot), and in bit parallel, byte serial form between synchronous processing elements.

The elements directly interfacing to the BTDM (TL1, RL1) perform serializing and deserializing functions on the data transferred to and from the interface. In addition, the first and second stage synchronous processing elements connecting to the BTDM (TV, TL1 in the transmit direction; RL1, RV in the receive direction) operate as a multitasking unit to perform various processing functions relative to data carried in framed formats (e.g. relative to channels configured for HDLC protocol communications). These functions presently include insertion and deletion of delimiting flags and fill patterns relative to formatted channels, insertion and deletion of stuffing bits into data in protocol channels (for sustaining transparency relative to control characters), address recognition in reception for selectively restricting processing to data appropriately addressed relative to the local node of the IDLC/IOP, insertion and checking of CRC (cyclic redundancy check) information, etc.

TSR is also accessible to the IOP, via slave I/O partition SIO, for enabling the IOP to enter programmable initializing configuration and process state information relative to the basic channels and retrieve interrupt status information relative to the channels.

6.1 TSR Organization

Figure 9:
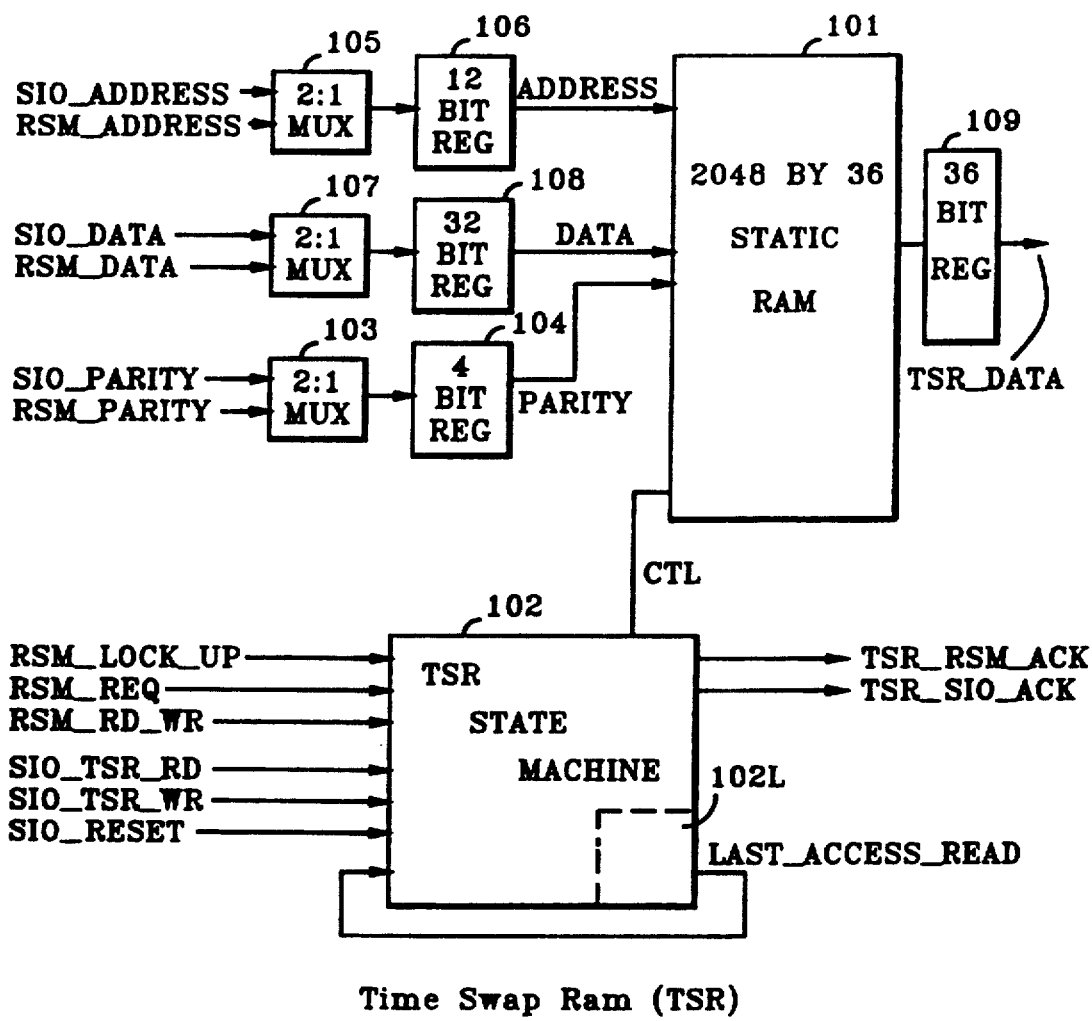
FIG. 9 is a block diagram illustrating the logical and physical organization of TS RAM.

FIG. 9 illustrates the physical and logical organization of TSR. TSR comprises a 2048×36 static RAM 101 (see discussions of FIG. 6 above and below regarding space allotted to individual channel parameters and unused/reserved spaces). If tolerance of RAM faults is significant, two 2048×36 RAM's should be provided and one or the other used depending upon which is totally free of error. Minimally, TSR requires 1024×36 capacity if reserve space is not required.

The access controls include logic 102, multiplexor circuit 103 and register 104. Addressing of storage spaces within the RAM is controlled by address multiplexor circuit 105 and address register 106. Data is input to TSR through data multiplexor circuit 107 and buffer register 108, and output from TSR through buffer register 109. Outputs of register 109 are applied to inputs of RSM and SIO along with acknowledging signals (TSR_RSM_ACK or TSR_SIO_ACK) designating one of the partitions as selected.

It will be noted that inputs to circuits 102, 103, 105 and 107, as well as outputs from circuit 102, appear in a notation "A_B_C"; where A and B are abbreviated partition names and C denotes a function. In this notation, which will be used extensively throughout following descriptions of all partitions, the partition designated first represents the source of a respective signal and the partition designated second represents the destination of that signal within the illustrated circuitry. In some instances the destination partition is omitted but understood to be at least that of the illustrated partition.

Thus, in FIG. 9, "RSM_ADDRESS" is understood as representing "RSM_TSR_ADDRESS", and as denoting a set of address signals from RSM transferrable via multiplexor 105 to register 106. Similarly, all inputs in FIG. 9 having RSM as indicated source are understood as directed exclusively to TSR. TSR inputs from SIO are an exception to the above rule, since SIO has access to all of the RAM partitions TSR, FIFOR and DMAR. In respect to SIO inputs in this figure, destinations of all address, data and parity functions are all RAM partitions in the IDLC. The function selecting TSR as exclusive destination is the active one of "SIO_TSR_RD" or "SIO_TSR_WR" (the only signals from SIO shown with explicit destination).

Multiplexor circuits 103, 105 and 107 select between respective inputs presented by RSM and SIO. Multiplexor 105 selects between address inputs presented by these partitions, multiplexor 107 selects between data inputs presented by these partitions, and multiplexor 103 selects between parity inputs presented by these partitions. Selected input data is written along with corresponding input parity into the address position of TSR designated by the corresponding address input. Input data is presented in 32 bit parallel sets of "actual data" accompanied by 4 bit parallel sets of input parity associated with individual 8 bit byte subsets of the actual data. It follows that outputs to buffer 109 consist of output data bytes with respective 4 parity bits.

Control logic 102 is a finite state machine circuit having control inputs as shown, acknowledging outputs to RSM and SIO as shown, and RAM controlling output 102A for controlling enablement of access to the RAM and the direction of access (read or write). Read and write accesses are also referred to below as fetch and store operations respectively. The state machine circuits have the following possible states and operate according to the following state sequencing rules.

1. Reset state—assumed only when "SIO_RESET" is active; next state (when "SIO_RESET" goes inactive) is state 0.

2. State 0 (RSM Ownership State)—provides the following actions. If "RSM_LOCK_UP" is active, "TSR_RSM_ACK" is asserted to preemptively select RSM inputs over SIO inputs. The latter function is understood as requiring enablement of RSM input selection at multiplexors 103, 105, 107 and at not-shown selector circuits within logic 102 for "RSM_RD_WR" and RSM_REQ (the former being in one state or another depending on whether the operation is a read or a write, and the latter being asserted for either a read or a write). If the last access was a read and RSM is requesting a write then a chip select function in controls 102A, relative to RAM 101 is held off (see state 3 explanation below). This extra cycle is needed to allow adequate time for turn around of off-chip drivers. If the current access is a read, set internal LAST_ACCESS_READ latch 102L; otherwise reset it. This last action is needed to keep track of the type of access previously performed (see discussion of state 3 below). If RSM_LOCK_UP is inactive, examine the SIO request. If SIO_TSR_WR is active, transfer the SIO data and parity to RAM 101 (at the address designated by SIO_ADDRESS), and reset latch 102L. If SIO_TSR_RD is active assert all control signals but hold off accessing RAM 101 (see explanation of state 1 below).

Advance to state 0, 1 or 3 according to the following. Next state is state 0 if RSM_LOCK_UP is active and other conditions for advancing to state 3 are absent, or if no requests are pending. Next state is 1 if the only request pending is an SIO read (SIO_TSR_RD active and RSM_LOCK_UP is inactive). Next state is 3 if RSM_LOCK_UP and LAST_ACCESS_READ are active, and RSM_RD_WR is indicating a write request.

3. State 1 (SIO Read Ownership)—If SIO_TSR_RD is active, enable read access to location designated by SIO_ADDRESS. Next state unconditionally is state 2.

State 2 (SIO Acknowledgement)—Assert TSR_SIO_ACK, relative to SIO request. TSR_DATA is valid if and only if SIO_TSR_RD was active. Next state is unconditionally state 0.

5. State 3 (RSM Police State)—this state guards against back-to-back read and write accesses by RSM with insufficient intervening time to permit RAM inputs and outputs to stabilize. This state is entered when RSM attempts a write access while LAST_ACCESS_READ is active (see state 0 above). If the second requested operation is a write, it may be performed without delay in this state. Next state is 0. Output of RAM 101 on read accesses, TSR_DATA, is presented to RSM and SIO along with an acknowledgement selecting one of the partitions. When RSM accesses TSR it asserts RSM_LOCK_UP, preemptively blocking SIO access. If RSM is attempting a read access, it automatically enables reception of TSR_DATA at the corresponding RSM input, and otherwise ignores that input. If SIO and RSM are simultaneously attempting read access, SIO will ignore its TSR data input because TSR_SIO_ACK will be inactive. Next state is state 0.

6.2 TSR Space Allotments

Referring to FIG. 6, in the primary rate ISDN environment, the 2048 36-bit wide "word" spaces in TSR (recall previous discussion of preferred TSR size as 2048×36) are apportioned equally to 32 channels, so that each channel is allotted 64 word spaces. Each such space is usable for storing four 8-bit data bytes together with four related parity bits. The specific word space allocations for channel 0 are illustrated as representative of those for all channels. Address boundaries are illustrated in hexadecimal notation; those for channel spaces appearing at the left, and those for word spaces within representative channel 0 appearing at the right.

Each channel space includes 27 word spaces for specific word parameters and 37 reserved spaces (available for expansion and applicational variations). The specific word parameters for each channel include: 2 words defining general channel configurations and specific HDLC protocol configurations (CCR, HPCR), 3 words for saving transmit element states on time-swaps (TX_TS1), 5 words for saving receive element states on time-swaps (3 RX_TS1, 2 RX_TS2), and 17 channel status words (CEISR and EOPISR01-EOPISR16). Specific bits and functions of each of these words will be discussed later (configuration words CCR and HPCR in the description of the RSM element, time swap words in the descriptions of individual transmit and receive elements, and status words in descriptions of INT and SIO elements.

7. RSM

Resource Manager partition RSM manages time swap status exchanges and certain other functions described below. The time swap status exchanges are conducted between TSR and the pipelined synchronous processing elements (RL1, RV, RFM, TFM, TV, TL1). RSM also manages the channel event status queues (EOPISR) in TSR, and certain control information exchanges with INT for enabling the latter to perform synchronous processing aspects of its function. RSM also serves as a logical focal point for detecting and logging hardware errors conditions relative to all parts of the IDLC chip and the L1 circuits.

RSM is also a key element in the distributed control of HyperChannel usage which is presently of interest, and in that regard RSM (using the information in the HCR register in SIO) provides time slot and other indications previously mentioned which effectively define the plural-to-one association between constituent and reference slots assigned to each HyperChannel. RSM monitors the BTDM interface for BOS ("beginning of slot") and LSOF ("last slot of frame") pulses indicating reference instants relative to each BTDM time slot for conduct of IDLC synchronous processing operations (LSOF pulses indicate beginnings of last slots relative to slot recurrence frames at the BTDM, and BOS pulses indicate beginnings of other slots). In response to each pulse, RSM prepares for its role in concluding operations relative to the slot that is ending and initiating operations relative to the slot that is beginning. These operations are selectively performed only relative to active channels.

At the beginning of each slot, RSM performs a preCCR examination operation relative to a portion of the CCR word space assigned to the slot (FIG. 6). This enables RSM to distinguish between active and inactive channels, and relative to active channels to distinguish between constituent slots of HyperChannels and slots individually assigned to basic channels.

A reason for not performing TSR exchange operations relative to inactive channels (ignoring the useless aspect of such actions) is that since Host/IOP/SIO have independent write access to respective channel state storage areas in TSR, elimination of RSM activities relative to TSR effectively increases the time of availability of TSR for Host/IOP usage, and elimination of such activities relative to inactive channels reduces possibilities of having actions by RSM overwrite newly entered valid information in TSR with invalid state functions. Another reason for not allowing information so written is parity checked in RSM; thus, allowing RSM to write state information relative to inactive channels, which would be information of indefinite form, could give rise to unnecessary parity error events and unnecessary interruption actions relative to such.

As part of its preparation for state saving, while processing is concluding relative to an active channel, RSM verifies that processing relative to that channel in each synchronous processing element has reached a stable concluding state suitable for saving. This is done by sending EOS (end of slot) pulses to the synchronous processing elements and verifying that "DONE" indications have returned from each element within a predetermined time of the respective EOS pulse, such indications denoting that respective elements have reached stable operating states within said predetermined time.

Synchronous processing elements subject to state swapping (RL1, RV, RFM, TL1, TV, TFM, and INT) continuously present state signals to RSM while processing relative to any active channel. After sending EOS to any element, RSM delays the state saving transfer relative to that element for the above-mentioned predetermined time. Of course, EOS is not sent if the slot which is ending is not assigned to an active channel or HyperChannel (so that only valid stable state information is handled for saving relative to TSR). At the end of the predetermined time just mentioned, RSM writes (saves) respective element state to TSR, but also checks for respective DONE indication. If any DONE indication has not returned when due, RSM generates a logic timeout indication internally, which is detected by INT as a hardware error condition requiring associated status recording and interrupt action relative to SIO/IOP.

RSM also monitors signal transfer activity on the BTDM interface to ensure that it is properly phased relative to state swap activities in IDLC. If RSM detects transfer action while status is being loaded or saved, it generates a timing error indication, RSM_L1-L2_ERROR, to INT and continues processing. The possibility of data corruption denoted by this indication is eventually reported to the IOP/Host, and action if required is taken by the latter system to adjust L1 circuit operations to maintain a more suitable level of synchronism (see discussion of BTDM Interface hereafter, and note therein the definition of the time window during which "burst" data transfers between L1 and IDLC are permitted).

In respect to loading of synchronous element states from TSR, for preparing these elements for processing relative to an appearing or reappearing active channel slot, RSM synchronizes the start of processing relative to that channel by presenting "START" signals to the elements at appropriate instants of time after EOS. These start signals are not presented until elements which exchange data have all been loaded with status.

In the exemplary primary rate ISDN environment, slot times have minimum durations of 3.8 microseconds and the IDLC runs on a 20 MHz clock relative to which the minimum slot time is measured by 76 clock cycles. In RSM, assignment of times to its various functions is determined by subtracting overhead time (time needed for all TSR stores and fetches) from minimum slot time, and distributing the remaining clock cycles evenly among all other time swapped functions. Since overhead time is affected by TSR availability, SIO/host accesses to TSR (for interrupt status retrieval and/or channel state initialization) may reduce the time allowed for other functions during any time slot. The tracking of overhead time is accomplished using cycle counter 121 as described below.

7.1 RSM Organization

Figure 10:
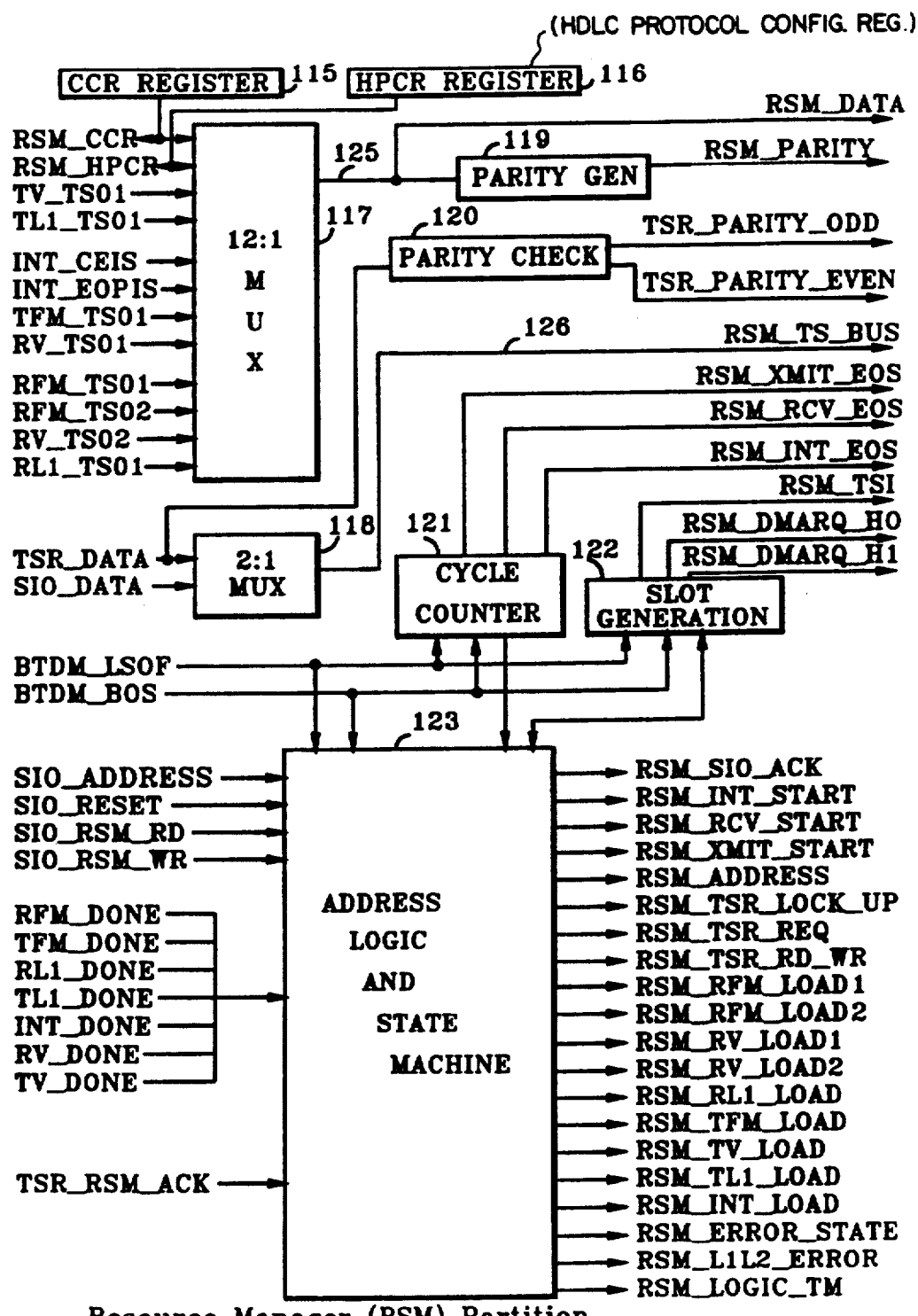
FIG. 10 is a block diagram of the RSM (resource manager) partition.

Referring to FIG. 10, RSM comprises: configuration registers 115 and 116, multiplexor circuits 117 and 118, parity generation circuit 119, parity check circuit 120, cycle counter 121, slot generation circuitry 122 and state machine 123. State machine 123, described below, contains address generation logic for determining addressing of TSR channel spaces and for supporting addressing of such relative to dynamically varied hyperchannel mappings.

Registers 115 and 116 are 32 bit wide registers serving as buffers for configuration defining words. Register 115, the configuration control register (CCR), receives configuration control words defining individual channel configurations during processing time slots assigned on a time division basis to respective channels. Register 116, the HDLC protocol configuration register (HPCR), receives control words defining protocol configurations during process time slots assigned to channels in which protocol formatted communications are being conducted.

Configuration words transferrable to these registers are stored or storable in TSR (see FIG. 6), in spaces allocated to individual channels, and specific bit field allocations within each word are illustrated in FIGS. 11 (for CCR) and 12 (for HPCR). Outputs of registers 115 and 116 extend in 32 bit parallel cable banks (shown as single lines) to associated inputs of multiplexor 117 and all other autonomous elements in the IDLC synchronous section. Referring to FIGS. 11 and 12, bit fields within these registers have the following definitions and usages.

CCR: (FIG. 11)

RES—13 unused/reserved bits (10 at the left, at 11-1, and 3 at the right, at 11-2)—reserved for expansion or future applications.

Channel Type (CT)—3 bits, at 11-3—distinguish channel type as one of: B/D (up to 64 kbps, Layer 1 dependent), HO number 1, 2, 3, 4 or 5, H11, or H12.

Protocol Code (PC)—4 bits, at 11-4—having 16 definable values of which 12 are reserved and 4 designate individual ones of the following protocols: SDLC, LapB, LapD, Clear (no protocol; e.g. for Voice channels).

Transmit DMA Enable (TDE)—1 bit, at 11-5—enables or disables transmit DMA control operations by DMAC. Bit should be set to enabling state only after TDCR1-TDCR4 have been properly initialized (see description of DMAC partition below).

Receive DMA Enable (RDE)—1 bit, at 11-6—enables or disables receive DMA operations (transfer of receive data from FIFOR to IOP/Host memory). Should be set to enabling condition only after RDCR1-RDCR4 have been properly initialized (see description of DMAC below).

Receiver Enable (RE)—1 bit, at 11-7—enables or disables processing of received data according to designated protocol. Relative to data channels (e.g. SDLC/LapB/LapD), detection of flags, aborts, idles, bit de-stuffing, bit to byte assembly, byte queueing in FIFOR, destination address recognition, CRC checking, and word (4 byte) at a time transfer to IOP storage. Relative to clear channels, bit serial to byte assembly, byte storage in FIFOR, and transfer to IOP memory a word (4 bytes) at a time. Processing of data is under assumption that most significant bit arrives first.

Abort Request (AR)—2 bits evoking one of following actions: abort only on (receive) data overrun condition, send abort data pattern (seven 1's followed by predetermined pattern), send idle pattern (15 consecutive 1's), send inverted idle pattern (15 consecutive 0's). Field valid only when Protocol code is that for SDLC, LapB or LapD. When AR designates any of the last 3 actions, TDE bit must be set to 0 (disabled) and TE bit, at 11-9 must be set to 1 (enabled).

Abort Interrupt Mask (AIM)—1 bit—relative to aborts occurring between frames, either causes interrupt to be generated or no action, depending on bit value.

Inter-Chain Fill Select (ICS)—1 bit, at 11-10—affects DMAC operations during transmit DCB chaining. Depending on bit value, causes DMAC to insert either a series of 'fill' flags ('01111110') between chained data or an 'idle pattern' ('111 . . . 111'; at least 15 1's) between closing flags and the beginning of the new chained data. Bit function valid only when PC set to value for SDLC, LapB or LapD.

Inter-Frame Fill Select (IFS)—1 bit, at 11-11—selects fill pattern to be inserted between data protocol frames as either fill flags or idle pattern following closing flags (see ICS definition).

Address Recognition Option (ARO)—2 bits, at 11-12—causes selective forwarding of received data frames depending on option field value. Options include: disabled (all frames forwarded), forward 1 (forward only broadcast frames and frames having single byte destination address), forward 2 (forward only broadcast frames and frames having 2 byte specific destination address), forward 3 (forward only frames having broadcast addresses for SDLC and LapD (since no broadcast address exists for LapB and clear channels, all frames in such channels are forwarded)). Option values are valid only when PC value is that for SDLC, LapB or LapD. Recognized broadcast addresses are: first byte after opening flag is 'FF' Hex (for SDLC), second byte after opening flag is 'FF' Hex (for LapD), none (for LapB)

Transmit Enable (TE)—1 bit, at 11-13—enables or disables transmit data transfer out of FIFOR. When disabled, no flags, aborts, idles or CRC check symbols are transmitted at BTDM IF. When enabled, data and framing symbols are transmitted at BTDM IF upon request from layer 1 hardware.

Invert Data Stream (IDS)—1 bit, at 11-14—when this bit is active, data is sent and received at BTDM interface in inverted form (otherwise in true form). Enabled state of this bit intended to support 64 kbps restricted operation. Both ICS and IFS should be in disabled conditions when this bit is enabled to avoid transmission of more than 7 consecutive 0's on link.

HPCR (FIG. 12, 1 per channel):

Toggle—1 bit, at 12-1—used to indicate that SWRC value is valid. IOP toggles the value of this bit each time it updates the SWRC field in association with retrieval of interrupt status from TSR. Bit is valid only when QM bit in ICR (see description of SIO below) is enabling.

Status Words Read Count (SWRC)—5 bits, bits at 12-2—used by IOP to indicate to INT partition the number of status words read from the associated channel's 16 word EOPISR queue in TSR after an interrupt. INT uses this count to determine if it needs to generate another interrupt relative to the current contents of the queue. Field valid only when QM bit in ICR is enabling.

Link Station Address (LSA)—16 bits, at 12-3—used to program the specific address to be recognized when ARO field in CCR has a value calling for 1 or 2 byte address recognition. For 1 byte recognition, upper 8 bits in this field should be set to the station address value and lower 8 bits to 0. For 2 byte recognition, entire field is programmed to station address value. Field valid only when PC parameter in CCR is designating SDLC, LapB or LapD protocol. When receiving LapD, command/response bit (next to least significant bit in first byte of frame) is masked automatically by receive partition elements, and frame is forwarded only if remaining seven bits in same byte (in 1 byte recognition mode) or those bits plus bits in next byte (for 2 byte recognition mode) match the LSA value, or if a broadcast pattern is detected.

Reserved (RES)—10 bits at 12-4

In addition to its inputs from registers 115 and 116, multiplexor 117 has ten other banks of 32-bit wide parallel inputs, or a total of 12 input banks. Multiplexor 117 is operated by state logic 123 to selectively connect one input bank at a time to its output 125, in accordance with not-shown selection control inputs from logic 123. The other 10 input banks serve to transfer time swap words to be saved (written to TSR); 3 from transmit processing elements (TL1, TV, TFM), 5 from receive elements (1 from RL1, and 2 each from RV and RFM), and 2 from INT (CEISR and INT_EOP).

Multiplexor output 125 connects to RSM_DATA input of TSR, parity generator 119 and SIO. Output of parity generator 119 connects to RSM_PARITY inputs of TSR and SIO. If RSM has asserted write selection inputs to TSR (RSM_TSR_RD_WR and RSM_LOCK_UP active while RSM_TSR_REQ is inactive), the aggregate 36-bit wide expression formed by RSM_DATA and RSM_PARITY is written into a TSR location designated by an associated RSM_ADDRESS output of a logic 123. Thus, during any time slot, logic 123 can repeatedly operate multiplexor 117 and access controls of TSR to sequentially store some or all of the parameters which can be input to the multiplexor, and thereby perform the various status saving operations associated with element state swapping.

It should be noted that RSM itself does not undergo state swapping relative to TSR but only fetches CCR and HPCR in a read-only context as it prepares for successive channel slots. Values stored in the associated registers are not rewritten to TSR since they do not change over the course of any time slot. However, such values are at certain times of interest to the IOP/Host complex and are therefore made accessible to SIO via multiplexor 117 and bus 125.

Multiplexor 118 receives TSR_DATA outputs, resulting from RSM read accesses to TSR, and selectively connects them to its time swap state loading bus (RSM_TS_BUS) 126 which connects to inputs of all time swapped elements. Specific elements to receive individual outputs are designated by RSM_XXX_LOAD outputs of logic 123 (where XXX represents the destination element abbreviations). Thus, state words read out of TSR can be distributed to respective elements.

Inputs from TSR to multiplexor 118 are also applied to parity check circuits 120 to be checked by the latter. If parity error is detected, circuits 120 activate one of two error indicating outputs (TSR_PARITY_ODD or TSR_PARITY_EVEN) as a function of the odd-/even value of the number assigned to the channel relative to which the error has been detected; that value being derived via circuits 122 and 123. These parity error indications are sent to the INT partition for invoking error interrupt action, and since activities of INT span consecutive slots in relation to activities of the receive and transmit elements, the odd/even distinction allowed by the two outputs is needed to enable INT to associate the error with the correct channel.

Multiplexor 118 also receives inputs from SIO_DATA output of SIO for distributing those outputs to the time swapped elements. This function is provided only for diagnostic usage since the normal source for state loading is TSR. In association with activation of SIO_DATA, SIO provides state controlling inputs SIO_RESET to logic 123 for conditioning RSM to appropriate initial states, and inputs SIO_RSM_RD, SIO_ADDRESS and SIO_RSM_WR, for directing distribution of SIO_DATA to time swapped elements via RSM multiplexor 118. In response to the latter RD and WR inputs, RSM decodes the address and asserts the appropriate control inputs to multiplexor 117 and the destination element (RSM_XXX_LOAD to the latter). This is only permitted when RSM is not performing real time channel status swapping between TSR and the elements.

Cycle counter 121 is used to determine the current state in each slot. It divides the available slot time (minimum 3.8 microseconds) into intervals of post processing for previous slot, variable TSR access times, preprocessing for next slot and data transfer times. A policing mechanism in the state machine portion of logic 123 ensures that data transfers occur only when respective partitions are prepared. Counter 121 is reset upon reception of an L1_LSOF (last slot of frame) or L1_BOS (beginning of slot) indication from the BTDM interface; the latter indicating the approaching end of the current slot and the beginning of the next one. To allow for accommodating a range of different time slot durations (in other application environments of the IDLC), counter 121 is prevented from overflowing within that range.

Slot generation logic 122, comprising 2 registers and a six bit counter, determines associations between time slots appearing at the BTDM interface and IDLC processing channels. Due to variable hyperchannel mapping in the IDLC, individual time slots at the BTDM interface may not map identically to individual channels (i.e. for some channels the slot mapping may be many-to-one). Logic 122 receives the L1_LSOF and L1_BOS indications from the BTDM interface along with mapping control inputs from state logic 123 and provides outputs to logic 123 indicating the current channel/slot associations. Incrementing of the counter in logic 122 and associated hyperchannel mappings are determined by address generation functions within logic 123 conditioned at least in part on the CT (channel type) field in CCR 115.

Slot generator 122 also presents 3 indications to the DMARQ partition; including a 5-bit time slot indicator, RSM_TSI, a 5-bit H0 indication, RSM_DMARQ_H0, and a 1-bit H1 indication, RSM_DMARQ_H1. The TSI indication identifies the BTDM time slot associated with the channel currently being processed in the synchronous section. The H0 and H1 indications, derived from logic 123 via connections of the latter to the output of the channel type field CT in CCR 115 (FIG. 11), are used to identify H0 type and H1 type HyperChannel associations of current slots (refer to CCR field descriptions above and to descriptions of DMARQ and HyperChannel which follow).

7.2 RSM Address Logic and State Machine

State machine logic 123 sequences through the following states with associated output effects as described. Relative to TSR fetch operations, it should be noted that fetched data is accessible 2 state cycles after the state initiating the respective fetch.

State 30 (Initial State):

Wait for slot transition indication from BTDM IF (L1_BOS or L1_LSOF), and determine if internal mode value (value defining the current operating mode of RSM) should be updated. Mode value is only sampled and updated when next slot count is zero, so that RSM does not sequence out of reset mode (set by SIO/Host) in the middle of an ISDN frame. In this state cycle counter 121 is reset and SIO access to RSM registers and TSR is allowed. After L1 indication, the next state transition is a function of the current mode. If in "reset" mode, no transition is made. If in "diagnostic"

mode, next state is state 2. If in "normal" mode (neither reset nor diagnostic mode), next state is state 0.

State 0 (Read CCR):

Access controls to TSR are activated to fetch the CCR for the channel associated with the next time slot. This is actually a pre-fetch in which only a small part of the CCR is actually latched and used by RSM; specifically, the 3 bit channel type field CT. This information is used only for enabling the logic to determine if the next channel is active. As noted earlier, in this and other fetch operations the fetched information is not available at RSM until 2 state or internal clock cycles after the fetch is initiated. In this and other RSM accesses to TSR, RSM_LOCK_UP is asserted to pre-empt access to TSR. RSM effectively has total control of its interface to TSR once TSR_ACK is returned, and RSM can perform any requisite access operations without SIO interference. In this and other fetch accesses to TSR, RSM_TSR_RD_WR and RSM_REQ are asserted, the latter distinguishing the operation as a fetch/read. This state is held until TSR_ACK is active, and at that time the next state, state 23, is entered.

State 23 (Read CCR Wait State):

This is a wait state for a single read of TSR, during which the CCR for the next channel to be served is read from TSR to the TSR_DATA bus (note again the presently allowed delay of 2 state cycles from fetch start to availability of fetched data). Next state is state 31.

State 31 (Load Pre-CCR Register)

The CT field of the CCR word appearing at TSR_DATA is latched into an internal "Pre-CCR" register in the state machine logic. As with all data fetches from TSR, parity is checked by parity check circuits 120. Parity error outputs of the latter are input to INT partition, and distinguished as having occurred during either an odd or even numbered slot time (TSR_PARITY_ERROR_ODD or TSR_PARITY_ERROR_EVENT). Since activities of INT span portions of consecutive slots relative to associated activities of other partitions, this distinction is needed to enable INT to associate the error with the correct channel/slot. Next state is state 25.

State 25 (HyperChannel Mapping State): The pre-CCR latches are examined, and RSM conditions itself for addressing TSR in accordance with the channel type (CT) bits in pre-CCR. For instance, some channels are processed in single BTDM time slots (ordinary B and D type channels and voice channels) while others (HyperChannels) span plural time slots. Thus, the pre-CCR examination permits RSM to determine which channel address block in TSR it currently must access. This will be understood further from the discussion of the HCR register in the description of SIO below. Furthermore, the enabling bits in pre-CCR distinguish channels as either active or inactive, and relative to inactive channels operations for saving and loading state parameters are suppressed, thereby allowing for TSR to be accessed for other purposes (e.g. for SIO data transfers to or from IOP/Host complex). In this state, the logic waits for 29 internal clock cycles to have elapsed since reception of L1_BOS or L1_LSOF, based on information furnished by cycle counter 121, and then enters next state, state 2.

State 2 (Store TFM TS01 State):

If the previous channel (the channel associated with the slot effective prior to BTDM indication) is active, controls for write access to TSR are activated (RSM_LOCK_UP and RSM_TSR_RD_WR) and first state word of TFM is presented for saving relative to the channel address space in TSR associated with the previous channel. In respect to this and other "time swapped" element state words, reference should be made to descriptions below of respective elements for details of fields within each word and usages of each relative to respective elements and INT. The state logic waits for appearance of acknowledgement from TSR (TSR_RSM_ACK), and checks that DONE signals from TFM, TV and TL1 have all been asserted by that time. If they have not, error indicator RSM_LOGIC_TM is asserted relative to INT. The storing of element state words is accomplished dynamically at different phases of the current BTDM IF slot, provided that slot is associated with an active channel, and the respective TDE bit in the associated CCR is enabling. With respect to saving of the TFM state word additional conditions are that no end of DCB chain condition or FIFO parity error in TFM has been encountered. Next state is state 4.

State 4 (Store TV_TS01 State):

In this and following states calling for write access to TSR RSM_LOCK_UP is held asserted, fully pre-empting TSR (for RSM, to the exclusion of SIO). If the previous channel is active, and associated CCR bit TE is enabling, the first state variable of transmit element TV is saved. The CCR bits TE and TDE are provided specifically for allowing SIO, acting under IOP direction, to be able to update values in respective TSR locations without exposure to having RSM overwrite the updated values with out of date state information from the transmit and receive elements. Next state is state 6.

State 6 (Store TL1_TS01):

The third transmit variable, TL1_TS01, is stored provided TE bit in associated CCR is enabling. Next state is state 7.

State 7 (Fetch TSR_TL1_TS01):

If the next channel is active, RSM_LOCK_UP and RSM_REQ are asserted, with appropriate addressing of TSR, and the process for fetching the first state variable for TLI relative to that channel (TL1_TS01) is initiated relative to TSR. Due to the presently allowed 2 cycle latency in TSR reads, the fetching process is initiated in this state, but the respective data will not be valid on TSR_DATA bus until two states after this state. Next state is state 5.

State 5 (Fetch TSR_TV_TS01)

This starts the fetching process relative to TSR for the state variable of TV associated with the next channel, provided the next channel is active. Next state is state 3.

State 3 (Fetch TFM_TS01/Load TSR_TL1_TS01):

If next channel is active, this starts fetching of the first state variable for TFM relative to that channel, while asserting the load signals relative to TL1 for loading the state variable fetched 2 state cycles earlier. The data being loaded appears on bus 126, and parity checking of that data is performed by RSM logic 120. On parity error, appropriate indication is presented to INT as previously explained. Next state is state 9.

State 9 (Fetch HPCR, Load TV)

Fetch HDLC protocol configuration term for next channnel to HPCR register, and load TV with state variable fetched in state 5 (assert RSM_TV_LOAD). Parity of TV_TS01 is checked and receive side DONE signals (RFM, RV, RL1) are verified. Note that INT is started earlier and allowed to run longer than transmit or receive elements in each slot, in order to ensure that all exception conditions generated are synchronously logged by INT. Next state is state 1.

State 1 (Fetch CCR, Load TFM)

CCR is re-read (see state 0), for two reasons. First, to handle any required HyperChannel remapping, and second to fetch the bits not available in the pre-CCR register (as noted above, earlier pre-CCR fetching involves retrieval and use of only the channel type field, so for efficiency the internal latching facilities constituting the pre-CCR register is tailored to the type field and not the full CCR expression). In respect to HyperChannel remapping, HyperChannels span plural BTDM time slots, and the CCRs associated with such channels may not be the ones prefetched at the time of the first slot. If the previous channel is active, signal RSM_TFM_LOAD for loading TFM (with previously accessed TFM_TS01) is asserted and parity of the variable being loaded is checked. Next state is state 28.

State 28 (Wait State/Load HPCR)

This is a wait state to allow for any off-chip drivers to be turned around. Signal for loading general variable HPCR into RSM register 116 is asserted, and parity of that parameter is checked. Next state is state 22.

State 22 (Store EOPISR/Load CCR)

By this state, INT should have asserted its DONE signal (INT_DONE) and should be presenting new EOPIS status (End Of Process Interrupt Status), if it has such, for storage in the associated channel's 16 deep queue (see FIG. 6), where it becomes available for IOP access via SIO. If DONE has not been asserted, then a logic time out error is posted and processing continues. EOPIS is posted if the previous channel (the channel now concluding) was active, and the associated EOP valid bit has been set (see description of INT below). Note that in any of the previous states where parity is checked, occurrence of parity error is signalled to INT when the error is detected; a time which may either precede or coincide with the processing interval for the associated channel in the respective destination element, and this time relationship is indicated to INT by assertion of a respective PARITY_ERROR_ODD or PARITY_ERROR_EVEN indication. Posting of EOPISR in this manner is needed to ensure that any interrupt status vector CEISR (channelized error interrupt status vector) associated with hardware error is posted once and only once relative to any channel (to avoid redundant error reportage to the host system). Signal for loading CCR to register 115 in RSM is asserted and parity of the CCR variable is checked. Next state is state 12.

State 12 (Store INT_TS01)

The state variable for INT is stored if the previous (concluding) channel was active or if a parity error has been generated relative to that channel. This is needed to ensure that interrupts associated with hardware failures within an element, but indicated repeatedly by parity errors, will be generated once and only once relative to the host system (see state 22). Next state is state 13.

State 13 (Fetch TSR_INT_TS01)

The associated state variable for INT is fetched if the new channel is active or if a parity error occurred earlier in the pre-CCR fetching sequence for that channel. Again, this ensures that INT will register only a single interrupt for errors which might repeat during the slot sequence. Next state is state 29.

State 29 (Wait State)

A wait state to turn off-chip drivers around. Next state is state 14.

State 14 (Store RV_TS01/Load TSR_INT_TS01)

This is the first state for saving receive element status relative to the previous channel. If that channel was active and reception was enabled in its CCR (RE bit ON), respective status of RV is sent to TSR with appropriate address and selection functions. That status (see description of RV below) includes bits indicating states of CCR bits RE and RDE saved by RV relative to the previous channel (needed because CCR of next channel has been loaded). Load signal for INT status word is asserted and parity of that word is checked. Next state is state 16.

State 16 (Store RL1_TS01)

In this state, the START pulse for the INT partition is asserted if the next channel is active or parity error has occurred in any previous state of the present state sequence. The status word for RL1 relative to the last channel is stored in TSR if the channel was active and had an enabling reception bit RE in its CCW. Next state is state 18.

State 18 (Store RFM_TS01)

Store RFM status relative to the previous channel if that channel was active and had its CCR RDE bit enabling. Next state is state 20.

State 20 (Store RFM_TS02)

Store second status word for RFM if previous channel active and RDE enabling. Next state is state 10.

State 10 (Store RV_TS02)

Store second status word for RV if previous channel active and RE bit enabling. START pulse to transmit elements (RSM_XMIT_START) is asserted if next channel is active and no parity errors have occurred. Next state is state 11.

State 11 (Fetch TSR_RV_TS02)

Next state for RV is fetched if next channel is active. Next state is state 21.

State 21 (Fetch TSR_RFM_TS01)

Fetch first state word for RFM if next channel active. Next state is state 19.

State 19 (Fetch TSR_RFM_TS02/Load TS01 in RV)

Second state word fetched for RFM if next channel active, and second state word loaded to RV and parity checked if channel active. Next state is state 17.

State 17 (Fetch RL1 state/Load RFM)

If next channel active, state word for RL1 is fetched and first state word for RFM is loaded to RSM and parity checked. Next state is state 15.

State 15 (Fetch 1st RV state/Load 2nd RFM state)

If next channel active, fetch first state word for RV (TSR_RV_TS01), load second state word to RFM and check its parity. Next state is state 26.

State 26 (Load RL1)

If next channel active, first state word for RL1 is loaded and parity checked. Next state is state 27.

State 27 (Load RV1)

If channel active, load first state word (TSR_RV_TS01) to RV and check parity of that word. Next state is state 24.

State 24 (Start Receive)

This is the last state of the sequence. Since next slot becomes previous slot upon reception of L1_LSOF or L1_BOS, slot generation logic is conditioned to update its registers when one of these appears. Receive start (RSM_RCV_START) is asserted if current channel is active and no parity errors have occurred on fetches. Next state is initial state 30.

State ELSE (Error State)

This is a forbidden state which can only be entered through occurrence of hardware error in the state logic. If this state is reached, hardware error indication RSM_ERROR_STATE is asserted relative to INT and an attempt at recovery is made by sequencing next to state 30.

8. BTDM Interface

Lines, signal exchanges, and methodology of operation at the Burst Time Division Multiplex (BTDM) Interface (IF) are described next with respect to timing diagrams in FIGS. 13-15. Details of specific L1 circuits which may be relevant to this interface, but are not considered relevant to presently claimed subject matter, are contained in the previously cited co-pending cross-referenced application entitled "Burst Time Division Multiplex Interface For Integrated Data Link Controller". Said application and its relevant disclosure details are incorporated herein by the present reference thereto. Hereafter, for simplicity, the BTDM interface will be referred to simply as the "BTDM" or "interface".

The BTDM provides an exact functional and logical break between Layer 1 and Layer 2 processes as defined by Open Systems Interconnect (OSI) specifications of the International Standards Organization (ISO). The layer 2 processes are performable in whole or part within the present IDLC device (in the presently described embodiment for the ISDN primary rate environment many but not all layer 2 functions are performed in the IDLC, but other layer 2 functional responsibilities must be assumed in the IOP and/or host systems).

The BTDM itself is neither defined nor contemplated by OSI. Rather, it represents what is considered presently to constitute a unique approach to organizing the timing of transfer functions between Layer 1 and Layer 2 hardware such that the presently desired throughput of the IDLC is attainable in and beyond the representative primary rate ISDN environment.

The BTDM uses a rather small number of lines (6) to transfer data at high speeds (up to 2.048 Megabits per second full duplex) between the IDLC and L1 circuits. It provides the flexibility needed for sustaining such transfers in the exemplary ISDN primary rate environment; e.g. for 32 full duplex B type channels, with data transfer rates in each channel of up to 64 kbps in each direction. One understands, of course, that depending upon specific networks and media to which the L1 circuits couple such circuits may assume a variety of forms. Of relevance presently is the general composition of those circuits as needed to sustain the specific signals, signal timings, and signal phasing characteristic of the BTDM. That general composition is fully described in the above-mentioned co-pending patent application, and is not relevant to any presently claimed matter. Hence, only the associated circuit functions will be discussed herein.

The interface allows the L1 hardware to control the data rate in any slot from 0 to 64 kbps per channel full duplex, and thereby to support voice/clear channels, B type channels, and lower speed D type channels (16 kbps per channel full duplex), M type channels and S type channels; as well as HyperChannels formed by aggregating time slot capacities of plural B type channels (see later description of HyperChannels). Furthermore, the transfer timing flexibility of the interface allows for varying slot and frame durations on a dynamic basis to support varying communication traffic needs.

Although implemented to be suitable for supporting both ISDN primary rate and ISDN basic rate as L1 protocols, and HDLC as principal L2 protocol, the BTDM is not restricted to these protocols. It can be used therefore to support any other L1, L2 protocols defined by OSI or IBM (e.g. Async or Bisync), and has the speed and characteristics suitable for accommodating transfer of encoded voice in any channel.

Interface data transfer signalling is performed in sharply time-compressed bursts occupying a short duration window of time within each channel time slot. Transmit and receive transfers are conducted simultaneously. The "dead time" between bursts, also called setup time, is designed to optimize the efficiency of channel processing and state swapping functions performed in the IDLC, and is believed to inherently minimize the LSI circuit cell count required for multi-channel communication service, as well as to minimize the buffer storage capacity needed per channel in the IDLC.

The interface supports a high degree of flexibility in the methods which can be employed to transfer data, under layered protocols (OSI, SNA), between local and remote chip modules, and facilitates transfer of time division multiplexed (TDM) channelized data in HDLC format between Layer 2 devices such as the IDLC and a variety of L1 circuits.

The interface supports 'X' TDM data channels, each capable of transferring 'Y' bits of full duplex data in per channel TDM time slots of duration 'Z', where: 'X' can range from 1 to 32, 'Y' can range from 0 to 8, and 'Z' is a minimum of 3.8 microseconds, and 'X' times 'Z' is less than or equal to 125 microseconds. Note that foregoing figures are tailored to ISDN European requirements, and in implementations tailored specifically to ISDN North American requirements 'X' should range from 1 to 25, 'Y' should range from 0 to 8 for B and D type channels, and 'Z' should be the same minimum of 3.8 microseconds.

In respect to the above parameters, note that they are tailored to the presently contemplated ISDN environments. In other environments, it is believed that the range of Y (bits transferrable per slot window) for the indicated limits of X and Z could be increased to 16 without difficulty. It also should be noted that although the present BTDM implementation is designed specifically for coupling a single L1 circuit unit with a single IDLC type device it is contemplated that a similar interface design could be used to couple plural L1 circuit modules with a single IDLC device or even plural IDLC devices.

A feature of the interface, described in more detail in the related patent application, is what is termed "positive slip" operation in all channels. Interface timing presently is paced by specific elements in the L1 circuits in such fashion that under normal operating conditions possibilities of overrun and underrun (overrun in reference to transfers of receive data from L1 to IDLC and underrun in reference to transfer of transmit data from IDLC to L1), due to clock drift between internal L1 clocking and clocks at remote network nodes, are effectively eliminated or at least minimized. In other time-dependent interfaces, it is considered normal for clock drift to cause intermittent slipping effects such that occasional overrun and underrun are expected and dealt with by posted error indications and host-initiated frame retransmissions. Such error posting and retransmissions, which obviously are wasteful of host system processing time and also tend to consume or restrict interface bandwidth usage, are effectively eliminated or minimized by positive slip operation.

The BTDM contains data and control lines having relative signal timings illustrated in FIGS. 13 and 14. Single lines, RDATA and TDATA, respectively carry received and transmitted data (received data from L1 to IDLC, transmitted data from IDLC to L1) with signal timings respectively indicated at 13-1 and 13-2. Control lines LSOF and BOS transfer reference timing pulses indicated respectively at 13-3 and 1304, from L1 to IDLC, respectively indicating "last slot of frame" and "beginning of slot" points of time relative to TDM time frames and time slots. LSOF is both the beginning of slot indication for the last frame slot and an advanced end of frame indication. Durations of pulses on LSOF and BOS are 50 nanoseconds or one (IDLC, L1) machine clock cycle. Each frame slot is allocatable to a communication channel, and each communication channel may be dynamically allocated one or more slots per frame. Active B, D, and clear/voice channels, are each allotted one slot per frame, and several slots (not necessarily contiguous in time) may be allotted collectively to a single HyperChannel (see description below of HyperChannels).

During each slot (see also FIG. 14, detailing the timing of activity within signle slot), transfers of receive and transmit data occur bit serially within an 800 nanosecond "window" 13-5/14-1. The window for receive data starts 800 nanoseconds before the BOS pulse indicating the beginning of the next slot, and ends 50 nanoseconds before that pulse. The window for transmit data starts at the same time as the receive window but, due to the phasing of transmit requests and corresponding transmit bit transfers, ends almost coincident with the next BOS indication.

Each bit is transferred in a 100 nanosecond interval defined by a respective pulse from the L1 side (RDATA_VALID pulse 13-6 accompanying each receive bit sent by L1, and TDATA_REQ pulse 13-7 asserted for each transmit bit to be sent by IDLC element TL1). During any slot, the number of bits transferred in each direction (i.e. the number of 'RDATA_VALID' and TDATA_REQ pulses presented by L1 circuits) is variable (from 0 to 8 in present ISDN environments), and this variability allows L1 to regulate the fullness of its transmit and receive buffers so as to achieve the above-mentioned positive slip action.

The rest of the slot interval, 14-2, at least 2.95 microseconds in duration, is "setup time", allowing the IDLC to complete all minimally required handling of data received in the previous slot (the slot prior to BOS pulse following receive transfer), perform channel state swapping relative to the next slot (the one started with the next BOS after transfer window) and complete all minimally required handling of transmit data relative to the channel and transfer window associated with the next slot.

The theoretical (nominal) slot duration for the European ISDN rate (2.048 megabits per sec.) is 3.91 microseconds, but the duration at the present interface is held to a slightly shorter duration (minimally 3.8 microsec.); i.e. the slot rate at the BTDM is slightly higher than the nominal slot rate expected at the network interface taking into account "worst case drift" between local L1 clocks and remote clocks. Maintenance of this "advanced slot rate", and regulation at L1 level of the number of bits transferred per slot, effectuates positive slip action; i.e. ensures that receive and transmit buffers on the L1 side (with minimal capacity in each of 2 bytes per channel) can not respectively overflow and underflow due to clock drift between internal L1 and network side clocks. On the IDLC side, the rate of processing within the transmit and receive pipelines, and anticipated worst case rate of DMAC access to IOP memory, are designed to ensure more than adequate ability to meet any pace set by L1 for positive slip control.

Figure 15:
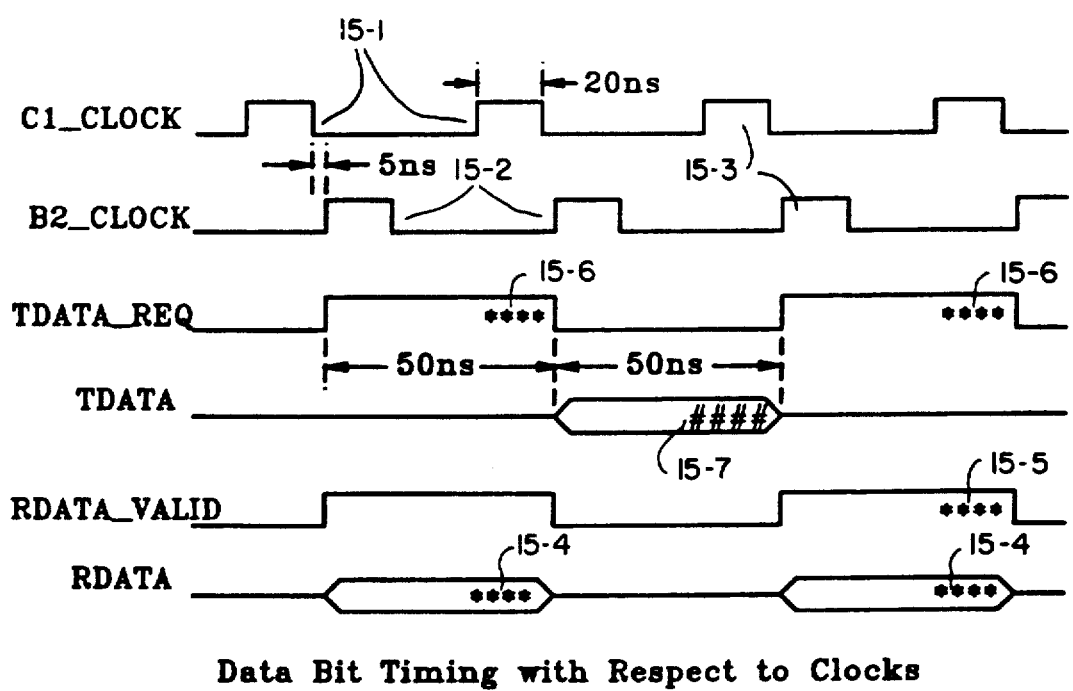

FIG. 15 illustrates timing of internal L1 clocks, CL_CLOCK and B2_CLOCK, associated with generation of BTDM data bit clocking functions TDATA_REQ and RDATA_VALID. C1 (shown at 15-1) is a master clock and B2 (shown at 15-2) is a slave clock (derived from C1). Each internal clock pulse 15-3 has 20 nanosecond (ns) duration. Consecutive C1 and B2 pulses are nonoverlapping, and the start of B2 follows the end of the immediately preceding C1 by a 'guard' space of about 5 ns. Each machine cycle in L1 (50 ns) starts with the rise of a B2 pulse, and consists of 4 clock phases; one associated with the duration of the B2 pulse, another with the interval from the end of that B2 to the rise of the following C1, a third associated with the duration of that C1 pulse, and a fourth associated with the guard space from the end of that C1 to the rise of the next B2.

Transfers of receive and transmit bits are unacknowledged. IDLC is required to latch receive data bits 15-4 at predetermined phase 15-5 of RDATA_VALID indicated by '**', and to latch L1 requests for bit transfer at predetermined phase 15-6 of TDATA_REQ indicated by '**'. L1 must latch transmit data bits presented by IDLC at predetermined phase 15-7 of TDATA indicated by '####'.

In addition to the above data and control lines, a number of lines are shown as associated with the BTDM, but are actually lines coupling the L1 circuits to the IOP/host system, some connecting directly to the IOP bus and others coupling thereto indirectly through the SIO element of IDLC. These lines allow the IOP to directly control initiation of the L1 circuits and retrieve interrupt status information directly from those circuits. Names and functions of these lines are indicated below.

| Name | Function |
|---|---|
| CHIP_SELECT | Input to L1 from SIO, indicating detection of a valid IOP originated address (and IOP originated data, if the operation required by the IOP is a write) which is in the L1 address space. This signal is also an indication that valid conditions pertain to lines: READ/WRITE, ADDRESS, ADDRESS_PARITY, and for write operations: DATA and DATA_PARITY. This line remains active until the address is removed. |
| READ/WRITE | Input to L1 from SIO designating data transfer operation to be performed relative to the |

| Name | Function |
|---|---|
| | designated address. Binary 1 and 0 levels on this line respectively designate Read and Write functions. The line signal state is valid when CHIP_SELECT is active. |
| ADDRESS | A 12 bit input to L1 from SIO designating address (A12-A0; A12 most significant bit) within L1 to or from which data is to be transferred when CHIP_SELECT is active. ADDRESS is valid whenever CHIP_SELECT is active. SIO actually receives a 24 bit address from IOP (A23-A0), and decodes the high order bits (A23 to A12) to generate CHIP_SELECT and transfer the low order bits to L1 (for further decoding by latter as needed). |
| DATA | A TTL Tristate bidirectional 16-bit (2 byte) bus between IOP bus and L1. During read operations, L1 side is required to disable its data drivers within 20 nanoseconds after deassertion of CHIP_SELECT. |
| DATA_PARITY | L1 parity input from IOP during write operations, consisting of high (H) and low (L) parity bits associated respectively with high and low bytes on DATA. If L1 detects parity error it does not assert -DTACK, and sets a status bit associating the error with data. That bit can be read by IOP/SIO to determine the cause of the associated DTACK timeout. |
| ADDRESS_PARITY | L1 input from SIO (2 bits) indicating parity of associated (full and half) bytes on ADDRESS. If L1 detects address parity error it inhibits assertion of -DTACK as for data parity error and sets status bit associating error with address. IOP/SIO can read that bit to determine cause of associated DTACK timeout. |
| -DTACK | Tristate output from L1 used to acknowledge data transfer. Asserted only after valid data has settled on DATA during read operation, or after data has been latched on a write operation, and only if associated data and address parity are correct. Signal should be removed no later than 20 ns after deassertion of CHIP_SELECT. |
| -CHIP_INTERRUPT | L1 output to INT element of IDLC, used to request generation by latter of L1 hardware fault manual interrupt vector. INT/SIO will generate associated interrupt at the IOP bus interface at level prespecified by IOP. This line should be held active by L1 until IOP responds to the IDLC interrupt request by requesting a status read operation from an internal status register in L1. The line should thereafter be held deactivated for at least 100 ns to complete the sequence. Since INT does not queue up L1 manual interrupt requests, the L1 circuits are responsible for collection of status relative to plural L1 events in local status registers of those circuits. Furthermore, since manual vector generation by INT may be delayed relative to other interrupt status exchange activities, allowance for such delay must be made in the L1 process. |
| -CHANNEL_INTERRUPT | L1 output used to request generation by INT of L1 Channel Interrupt Manual Vector. This interrupt is treated the same as the chip interrupt above. The only difference is at the IDLC where it is given a lower priority than the chip interrupt. Also, it causes a unique vector to be generated which is different from the chip interrupt vector. |
| -RESET | Input to L1 from SIO causing a master reset of all L1 circuits to a reset state. It can be activated at any time and is not gated by CHIP_SELECT. It remains active for a minimum of 100 milliseconds. |

9. Receive Elements RL1, RV

The receive elements are RL1, RV, and RFM. This section describes organizations and logic of RL1 and RV on a functional level. Operations of these elements relative to constituent slots of HyperChannels are identical to respective operations relative to slots assigned individually to channels.

9.1 RL1 Functions

RL1 interfaces between the BTDM interface and RV for receiving data signals from the BTDM, partially processing such signals and passing resulting signals to RV.

RL1 functions are:

1) Receive data deserialization. Data in active channels is received bit- serially, at the BTDM, in bursts of 0 to 8 bits per channel time slot. The data is deserialized into 8 bit bytes, partially processed in RL1 and passed to RV for further processing.

2) Detection and deletion of protocol specific control characters and signal patterns. In channels carrying protocol oriented data (e.g. HDLC), frame flags, and idle and abort signal patterns are detected and removed (not passed to RV). A received byte count maintained by RL1 is adjusted to account for such removal.

3) Detection and removal of transparency bits. Bits remotely inserted (stuffed) into the data, to prevent misinterpretation of certain data bytes as control characters or inter-message patterns, are detected and removed/destuffed (not passed to RV). Received bit count maintained by RL1 is adjusted to account for such removal.

4) Setting of indicators for alerting INT element to frame reception status, and to reception of protocol specific control functions such as HDLC frame flags and abort and idle patterns.

5) Abort masking. RL1 can be dynamically conditioned (by Host/IOP via SIO, RSM and TSR) to selectively mask out detection of abort patterns outside of a frame, thereby providing host programs with flexibility to eliminate undesired interrupts related to such detection.

6) Octet alignment checking. Upon detecting a frame closing flag, RL1 checks for octet alignment; i.e. that its final count of bits received, adjusted for the number removed (destuffed), is a multiple of 8.

7) Detection/deletion of shared symbols in protocol specific patterns. Relative to HDLC sources which use a shared 0 between consecutive flags (0111111101111110), to reduce the overall number of bits transmitted, RL1 is responsible for detecting and deleting such flags, and setting appropriate indications of frame status. Relative to HDLC sources which use a single shared flag between frames, to represent the end of one frame and the beginning of another, RL1 is also responsible for distinguishing such flags and setting appropriate indications of frame status.

8) Data inversion. RL1 supports reception of inverted data protocols (e.g. inverted HDLC) and is responsible for detection, deletion and indication of flag characters, idle patterns and abort patterns received in inverted form.

9.2 RL1 Logic

Details of this element's logic and specific states thereof are provided in the cross-referenced co-pending patent application relating to "Autonomous Logic Elements". Such details are omitted from this description as not relevant to presently claimed subject matter. To the extent that such details might have ancillary relevance, the corresponding section of the co-pending application is incorporated herein by this reference.

The time swap status word of this element, RL1_TS01 6-3 FIG. 6), comprises: two 8-bit fields termed RLCR and RLDR, a 4-bit field named RLTC, a 3-bit field named RLDC, a 2-bit field named RLFS, and a 7-bit field named RLSTAT. These fields have the following functional usage and significance.

RLCR—Represents the RL1 Check Register state; the state of register 152.

RLDR—Represents the RL1 Data Register state; the instantaneous content of data register 153.

RLTC—Represents the RL1 Transparency Count state; the value of the transparency count (count of consecutively received 1 bits) which is used for detection of stuffed 0 bits in protocol formatted data, as well as detection of flag character and control signal patterns in such data.

RLDC—Represents the RL1 Data Count; a count of the number of valid data bits received (modulo 8). It is used after detection of a valid frame closing flag for determining octet alignment. This count is reduced by 1 when a stuffed bit is removed, and it is reset when a flag or control sequence is removed.

RLFS—Represents a Frame State count indicative of phases of HDLC protocol frame reception. It is used for determining when received signals represent message data to be passed to RV.

Figure 17:
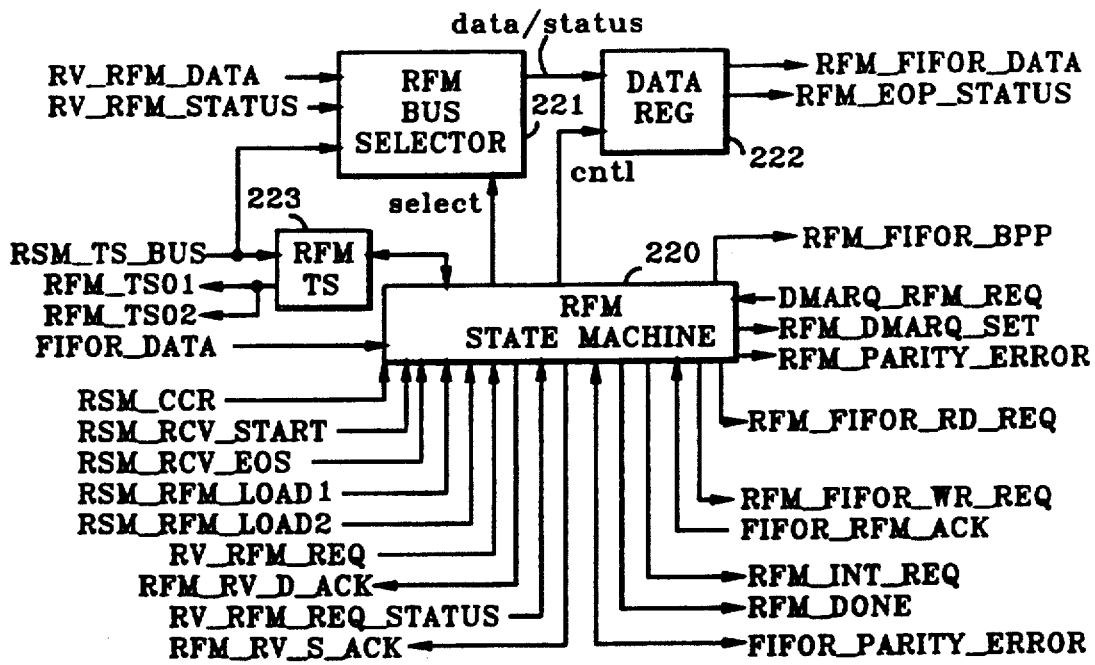
FIG. 17 is a block diagram of the receive FIFO manager (RFM) element in the IDLC.

RLSTAT—Represents the state of the RL1 status register 154 as shown in FIG. 17. Its bits, designated bits 0–6, indicate the most recent status of reception in the respective channel as follows.
Bit 0—idle pattern received
Bit 1—end of frame pattern received
Bit 2—abort pattern detected
Bit 3—reserved
Bit 4—octet alignment error detected
Bit 5—reserved
Bit 6—reserved Data bits presented by BTDM_(BTDM_DATA with BTDM_DATA_VALID) are latched by RL1 within a clock cycle (50 ns) of their presentation. Depending upon the channel protocol, such data is selectively shifted into an internal data register of RL1 and different actions follow.

Relative to clear channels, bits are shifted in without specific pattern checks, and as the 8th bit of a sequence is received, the resulting byte is transferred in parallel to RV. Such transfers of accumulated data bytes are synchronous without acknowledgement. Each byte is presented with a ready indication, requiring RV to latch the data byte within a clock cycle (50 ns).

Relative to data channels configured for HDLC, or other specially framed transmission protocols requiring selective detection of predetermined bit patterns, selective deletion of such patterns, and transfer of indications associated with detection of such patterns, RL1 performs the following operations.

As bits are serially accumulated, RL1 determines if any 8 consecutively received bits represent a control flag character (01111110). If the bits represent a flag, they are discarded (not transferred to RV), after further determination is made of the flag significance (frame start, frame end, etc.) and a corresponding indication of that is given to RV if appropriate.

As each bit is received, RL1 also acts to determine if that bit and its 6 predecessors form part of an idle or abort pattern (a pattern containing more than six consecutive 1's). If this is detected, the data register is cleared without transfer to RV, and an indication of idle or abort status is set relative to RV. After detecting an abort or idle pattern (which in effect invalidates any subsequent data until a new opening flag arrives), RL1 continues to examine arriving bits looking for a frame opening flag, and continues to discard received groups of 8 bits, by clearing the data register without transfer to RV, until a flag is detected.

After detecting an opening flag, RL1 continues to check for flags, idle and abort patterns as above, but also checks each received bit along with its predecessors to determine if that bit is a "stuffed" bit (a 0 bit following 5 consecutive 1's preceded by a 0). Each stuffed bit is discarded, and each group of 8 bits remaining after such discarding is transferred to RV in a synchronous transfer (see discussion of clear data above).

As it detects opening and closing flags, idle patterns and abort patterns, RL1 presents associated event indications to RV. RL1 is also adaptable to operate relative to HDLC transmitted in inverted form, and relative thereto to invert all received bits.

9.3 RV Functions

RV receives data and status indications from RL1, performs CRC (Cyclic Redundancy Check) calculations, checks for overflow condition, and passes the data with additional status indications to RFM. When end of frame indication is received from RL1 (relative to data received in a framed message protocol such as HDLC), RV passes the CRC check result to RFM along with status of both RL1 and RV relative to the respective channel. RV also performs address recognition on received data frames, based on the address recognition option bits ARO in the CCR (refer to RSM description above), and may selectively discard frames based on such recognition. Options allowable are: receive all frames, recognize/transfer only frames with a predetermined destination address byte or predetermined broadcast address, recognize only frames with a predetermined 2-byte destination address or broadcast address, and recognize only frames with a broadcast address.

9.4 RV Logic

Details of the RV logical organization and specific states of its state machine logic are provided in the cross-referenced co-pending patent application relating to "Autonomous Logic Elements". Such details are omitted from this description as not relevant to presently claimed subject matter. To the extent that such details might have ancillary relevance, the corresponding section of the co-pending application is incorporated herein by this reference.

RV has 2 internal registers for alternately receiving data bytes from RL1, so during any active BTDM time slot RV may be handling as many as 2 bytes of received data relative to the respective channel (or HyperChannel). RV also has 2 internal registers for holding frame status indications received from RL1.

This additional register capacity enables RV and RFM to support the maximum burst speed sustainable at the BTDM relative to any channel slot or constituent HyperChannel slot. Since RL1 can receive up to a byte of data in one channel time slot, it is possible for RL1 to receive 2 bytes of data relative to that slot before transferring the data to RFM.

As noted earlier, RV performs CRC checks relative to data requiring such. Check results are passed to RFM when RV receives valid end of frame flag indication from RL1.

RV operates on a synchronous time multiplexed basis; its status relative to each active channel being saved to TSR via RSM as the respective channel slot concludes, and reloaded via RSM when that slot reappears. Processing relative to each channel begins when a start indication, RSM_RCV_START is received from RSM (see description of RSM earlier), and ends when an end of slot indication, RSM_RCV—EOS is received from RSM. While its status is being saved relative to one active channel and reloaded relative to another active channel, RV is placed in a halted state.

Upon receiving the start indication, RV processing resumes at the state held when processing relative to the same channel slot last concluded. Upon receiving the end of slot indication from RSM, RV sequences to a stable concluding state within a predetermined time if not immediately in that state (e.g. if in a state where data must be received from RL1, the data will be latched in register 170 before the halt state is assumed). Upon reaching such state, RV asserts a done indication, RV_DONE, to RSM.

Because of its internal register capacity for 2 bytes of data and 2 bytes of RL1 status indications, the time-swap status information for RV consists of two time swap status words, RV_TS01 (6-4, FIG. 6) and RV_TS02 (6-5 FIG. 6) RV_TS01 contains the following fields.

RVD0,1—RV data registers 0 and 1 (each -8 bits). Correspond to contents of the two internal data registers in RV.

RVD0P,1P—RV Data 0 Parity and Data 1 Parity (1-bit each). Odd parity for data RVD0,1.

RVARS—RV address recognition state (2 bits); applicable to data frames subject to address recognition option for indicating states: 1. waiting for data on which to perform address recognition; 2. address has been recognized or recognition is disabled (all data in frame will be forwarded to RFM and an interrupt will be generated upon receipt of an end of frame indication); 3 or 4. no address recognized, this frame will be ignored.

RVDF—RV data registers full (2 bits). Indicator of states: 1. RVD0 and RVD1 both empty; 2. only RVD1 contains valid data; 3. only RVD0 contains valid data; 4. both RVD0 and RVD1 contain valid data.

RVLBF—Last byte of frame indication (2 bits). Indicate one of: 1. Neither RVD0 nor RVD1 contains the last byte of current frame; 2. RVD1 contains the last byte of current frame; 3. RVD0 contains the last byte of current frame; 4. Both RVD0 and RVD1 contain the last byte of current frame (i.e. registers 170 and 171 both contain end of frame indications).

RVI—RV Initialized indication (1 bit). Set by IOP/SIO to indicate initialization of state swap variables for RV relative to current channel slot, and reset by RV to acknowledge that it has sensed this and moved to a normal processing state relative to the channel.

RVLAR—RV Last Address Recognition Option (2 bits). Last value in the ARO filed of the CCR associated with this channel. In each associated process slot, RV compares this field to current ARO to determine if ARO value has been changed (by IOP/SIO). If change is detected, new value of ARO is moved into this field. Upon detecting a next start of frame RV will begin address recognition processing according to new ARO value in this field.

RV_TS02 contains the following fields.

RVCRC—RV CRC remainder (16 bits). When end of frame indication is received from RL1, relative to protocol configured channel, this field is checked to verify correct reception of the frame, and then reset to all 1's.

RVS0,1—RV Status Registers 0 and 1 (8 bits each). RVS0 contains status received from RL1, and RVS1 contains status shifted to it from RVS0. These include indications of RL1 frame processing state relative to HDLC channels (EOF, idle detected, abort detected, octet alignment status, etc.).

RVIO—RV Internal Overflow indication (1 bit). Indicates internal overflow condition of registers within RV. When this bit is set no data is forwarded to RFM.

RV logical control is effected by 2 state machines, named MOVE and PROCESS. MOVE controls internal transfers of data and status between registers in RV, and PROCESS controls processing of the data (CRC checking, address recognition, etc.) and interfacing to RFM. Specific states of these state machines are described in a corresponding section of the cross-referenced co-pending patent application for "Autonomous Elements". They are deemed not relevant to any presently claimed subject matter. To the extent, if at all, that such details may have ancillary relevance presently, the corresponding section of the cross-referenced application disclosure is incorporated herein by this reference.

10. Transmit Processing Elements TL1 and TV

The synchronous processing elements for transmit data (data en route from FIFOR to the BTDM) are TFM, TV and TL1. This section describes TL1 and TV. These elements operate identically relative to constituent slots of HyperChannels and slots assigned to individual channels.

10.1 Transmit Layer 1 (TL1) Functions

TL1 interfaces between Transmit Validate element TV and the BTDM for transferring transmit data to the network. TV receives transmit data from TFM (transmit FIFO manager), which fetches the data one byte at a time from FIFOR. Such data is loaded into FIFOR from IOP external memory via asynchronous action of DMAC in response to requests asserted by TFM to DMARQ (DMA Request Queueing Element).

TL1 performs functions which are the reverse of those performed in RL1, including:

Data byte serialization
Flag, abort and idle generation
Transparency - zero bit stuffing
Underrun detection
Flag sharing
Data inversion
Alternate register usage for output data TL1 receives data one byte at a time from TV, and transfers 25 data bit serially to the BTDM in response to bit requests TDATA_REQ presented at BTDM by the L1 circuits. In TL1, data is funneled through a pair of byte registers, so that during any slot time TL1 may be storing up to 2 bytes of data relative to the channel then being served. TL1 is thereby prepared to deal with any rate of L1 requests, within rate limits of the BTDM which allow for up to 8 requests to be burst within a slot (so that during any slot bits of 2 consecutive bytes may be in transit across the interface, since transmission generally will not be octet aligned).

If underrun occurs in spite of this, TL1 will generate an appropriate underrun indication for interrupt processing, then (in protocol oriented channels) transmit an abort pattern followed by an idle/fill pattern. After the abort pattern has been sent TL1 will generate appropriate indication of that event. In addition, TL1 is adapted to react quickly to any change made in the abort control bits (AR and AIM) in the CCR, and begin transmitting an abort pattern. Thus, TL1 can be effectively controlled at any time, by the IOP/Host acting through SIO and TSR, to abort a transmission currently in process, and thereby for instance reduce unnecessary use of network channels for continuing transmissions known to be in error.

Relative to channels communicating in HDLC protocols, TL1 will be detecting transmissions of 5 consecutive 1's, representing nondelimiting data (not flag, not idle and not abort), and insert (stuff) a 0 bit to prevent receipt of such data as delimiting. Furthermore, TL1 will distinguish start and end of protocol message frames and insert opening and closing flags at respective phases of transmission. If the protocol requires bit inversion, TL1 will take care of that.

Figure 23:
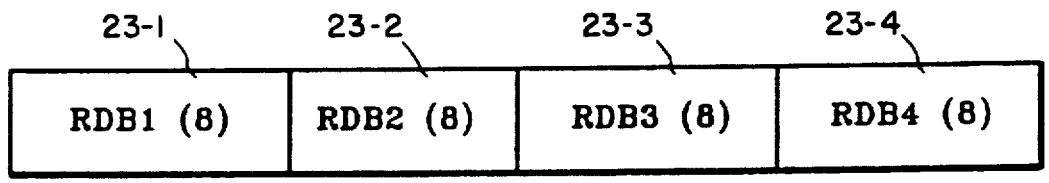

TL1 operates in a time division multiplex synchronous manner, whereby its state relative to any active channel is loaded (from TSR via RSM) during the associated BTDM time slot appearance and saved (to TSR via RSM) as the slot ends. Its time swap state consists of a single word, TL1_TS01 (6-6, FIG. 6) described below with reference to FIG. 24. TL1 contains a 9-bit status indication register discussed below with reference to FIG. 23, whose contents are saved in time swapping as part of $TL1\_TS01$.

10.2 TL1 Status Indications

TL1 maintains a number of status indications, some of which are used to alert the interrupt partition INT to error and event conditions requiring IOP interruption, and others are used to control continuation of processing in TL1 across BTDM slot frames. Some of these are discussed briefly below.

A "servicing abort" bit indicates an abort pattern is being transmitted (or an inverted abort pattern if inverted HDLC is in effect). This bit is saved during status swapping to provide a mechanism whereby an abort pattern being transmitted can be remembered across BTDM frames.

An end of frame bit is set when a byte requested from TV is indicated by the latter to be the last data byte of a protocol frame. When this bit is on, TL1 will automatically send a closing flag after the last data byte, followed by a fill pattern as and when needed. The end of frame bit is reset after the closing flag is sent. A fill pattern is needed when TV asserts either TV_ENDFRAME or TV_ENDCHAIN. The form of the pattern is determined by a bit in the CCR; the IFS (interframe fill select) bit if ENDFRAME is indicated or the ICS (interchain fill select) bit if ENDCHAIN is indicated.

A data reg order bit, in conjunction with 2 bits indicating empty status of respective TL1 data buffer registers, determines the order of data transfer relative to the data buffer registers. Data fetching action relative to TV is evoked when either empty indicating bit. If both empty bits are off (both data buffers full), data is taken out of the registers for transfer to BTDM in the order indicated by the order bit. If both empty bits are on, the order bit determines the sequence of data loading into the registers.

An underrun indicator bit is used to remember that a data underrun has occurred. When this condition occurs, the abort servicing bit is set. When TV has no new frame data to send after the last byte of a protocol message frame, and the closing flag has been sent, the underrun indicator is set requiring TL1 to generate a Fill pattern. The on/off state of the inter-frame fill select bit (IFS in RSM_CCR) determines the form of the pattern; idles if on, flags if off.

An abort raised bit is used to indicate to INT that an abort request has been asserted to INT by TFM. This indication, which is passed to TL from TFM via TV, is reset when the associated request in TFM has been acted upon and reset by INT.

A TFM reset bit is used to indicate that TFM has been reset (deactivated, reinitialized and reactivated). This bit is used to reset the abort condition.

10.3 TL1 -Logic

Details of TL1's logical organization and specific states of its state machine logic are provided in the cross-referenced co-pending patent application relating to "Autonomous Logic Elements". Such details are omitted from this description as not relevant to presently claimed subject matter. To the extent that such details might have ancillary relevance, the corresponding section of the co-pending application is incorporated herein by this reference.

10.4 TL1 Time-Swapped Word TL1 TS01

The TL1 time swapped word TL1 TS01, comprises two 8-bit fields TLD1 and TLD2, a 4-bit field TLDBP, a 3-bit section TLTC, and a 9-bit field TLSI. These fields have the following usage.

TLD1 and TLD2 (TL1 Data Register 1 and TL1 Data Register 2)

These reflect the contents of TL1's two data buffer registers which receive data from TV in alternating ("ping-pong") fashion.

TLDBP (TL1 Data Bit Pointer)

Points to the next bit to be sent from the current data buffer register source to the BTDM. The current source is indicated by TLDSS, and can be data register 1, data register 2, or an internal generator of abort/idle/flag characters.

TLTC (TL1 TRANSPARENCY COUNT)

a running count of consecutive 1 data bits sent out in slots assigned to protocol channels. A stuff bit is inserted when count value becomes 5. Count value is incremented as each 1 data bit is sent and reset when either a stuff bit or 0 data bit is sent.

TLSI (TL1 STATUS INDICATORS)

reflects the latest state of TL1's status indicators.

10.5 Transmit Validate (TV) Functions

The transmit validate element (TV) interfaces between the transmit FIFO manager (TFM) and TL1 for transferring transmit data. TV operates in time division multiplex, in synchronism with BTDM time slots defined by RSM, and undergoes state swapping via RSM and TSI relative to active channel slots. Major functions of TV are:

DATA TRANSFER

Transmit data bytes are fetched from TFM to an internal data register, one at a time, processed as described below, and transferred to TL1. Fetch requests are issued to TFM when the internal register is empty.

CRC GENERATION

In protocol oriented channels, each fetched byte of transmit data is applied bit-serially to calculation logic which performs both CRC remainder calculation and parity checking. After the last data byte of a protocol frame has been passed to TL1, the 2-byte CRC remainder is inverted and transferred to TL1, high order byte first.

CRC BYPASS

Relative to data in clear channels (e.g. digitized voice), CRC generation and parity checking are bypassed; i.e. the application of these functions is selected as a function of the channel type field CT in the CCR.

10.6 TV Logic

Details of TV's logical organization and specific states of its state machine logic are provided in the cross-referenced co-pending patent application relating to "Autonomous Logic Elements". Such details are omitted from this description as not relevant to presently claimed subject matter. To the extent that such details might have ancillary relevance, the corresponding section of the co-pending application is incorporated herein by this reference.

At end of slot indication from RSM, RSM_XMIT_EOS, TV prepares for having its time swap state saved. This status is continually presented to RSM and is saved within a predetermined time of the end of slot indication. However, if TV has not presented its done indication to RSM, TV_DONE (indicating stable end status) by that time, a timeout error and associated interrupt will be generated by RSM.

10.7 TV State Swap Word TV_TS_01

TV's state swap word TV_TS01 (6-7, FIG. 6) comprises: an 8-bit field TVDR, a 16-bit field TVCR, a 1 bit field TVDV, a 2 bit field TVDS, a 1 bit field TVOE, a 1 bit field TVEC, a 1 bit field TVDP and a 2 bit field TLDSS. Use and significance of each of these is discussed below.

TVDR (Transmit Validation Data Register)
Content of TV data buffer register
TVCR (Transmit Validation CRC Register)
State of the cumulative CRC remainder calculation for the current frame. When end of frame is encountered this field is appended to the outgoing data passing to TL1.
TVDV (Transmit Validation Data Valid)
State of this bit indicates if data register has valid data (on indicates valid data to be forwarded, off indicates data register is empty)
TVDS (Transmit Validation Data Select)
Pointer to source of next byte to be sent to TL1 (source is one of: TV data register, TV CRC register upper 8 bits or TV CRC register lower 8 bits)
TVOE (Transmit Validation Operational Error)
When active this bit indicates that an operational error has been detected (e.g. invalid state), and causes all TV processing operations to be halted.
TVEC (Transmit Validation End Of Chain)
An end of chain indication received from TFM. Requires the last byte of CRC transfer to TL1 to be accompanied by an end of chain indication preparing the latter for fill pattern transmittal.
TVDP (Transmit Validation Data Parity)
Odd parity for contents of TVDR
TLDSS (Transmit Layer 1 Source Select)

Actually associated with TL1 by TL1 at start of channel processing; but in order to minimize the number of time swapped words required relative to TSI, these 2 bits are saved through TV. These bits act as a pointer to one of four sources of next data byte to send out in TL1: data registers 1 and 2 in TL1, source of flag signal in TL1 or source of idle/abort pattern in TL1.

11 FIFO RAM (FIFOR) and FIFO Manager Partitions

FIFO RAM (FIFOR) and the FIFO managers (RFM and TFM) cooperate to queue communication data in transit through the asynchronous section 51 (FIG. 4) of the subject IDLC device. In that section, the data is handled by the DMA control (DMAC) and MIO partitions, and passed by those partitions between external IOP memory and FIFOR. Like time swap RAM (TSR), FIFOR includes logic for directing its data flow relative to other partitions.

11.1 FIFOR Structure

Figure 16:
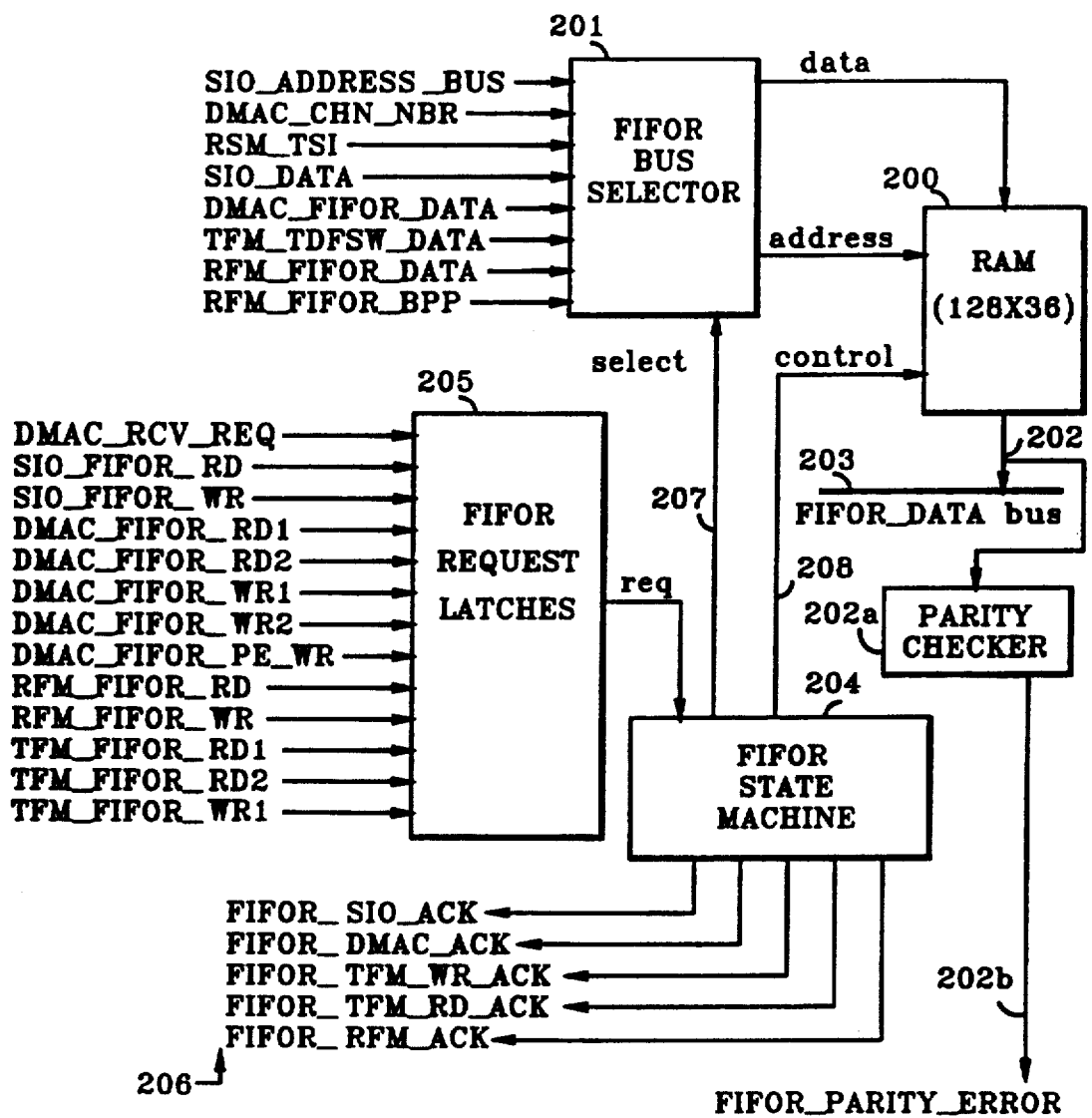
FIG. 16 is a block diagram of the FIFO RAM section of the IDLC.

Referring to FIG. 16, FIFOR comprises a 128×36 static RAM array 200 receiving inputs through bus selector circuits 201 (from SIO, RSM, RFM, TFM, and DMAC) and providing outputs at 202 to a data bus (FIFOR_DATA) indicated at 203. Bus 203 extends to SIO, RFM, TFM and DMAC. State machine logic 204 operating in association with request latches 205 controls the operations of selector 201 and array 200.

Array 200 contains 128 data word storage spaces, each word space consisting of 36 bit storage spaces (32 data bit spaces and 4 parity bit spaces in each word space). Referring to FIG. 7, in the exemplary primary rate ISDN application half of the space allotted to each channel is reserved for transmit DMA configuration register words TDCR1, TDCR2 and the other half is reserved for receive DMA configuration register words RDCR1, RDCR2. The RDCR1,2 and TDCR1,2 spaces of each active channel store status and communication data information relative to respective channels. Bit usage in each word space is discussed below in reference to FIGS. 33-36.

Data inputs to array 200 from SIO, RFM, TFM and DMA control (DMAC) partitions are provided through selector circuits 201. Data outputs are directed to those partitions via bus 203, with specific destinations designated by acknowledge outputs from state logic 204 at 206. Addressing of the array is direct in certain instances and indirect in others. In each instance, the accessing partition provides an indication to request latches 205 of the read or write direction of the desired access (e.g. SIO_FIFOR_RD or SIO_FIFOR_WR). In respect to such read/write requests, TFM and DMAC have separate inputs for requesting reading or writing of either 1 word or 2 consecutive words (RFM and SIO always issue 1 word read/write requests).

When SIO is accessing the array, it provides an explicit address input, via SIO_ADDRESS_BUS, which selector 201 transfers to address input of array 200. If data is being written, a data word supplied at SIO_DATA is transferred by selector 201 to the data input of the array. Data being fetched to SIO (or the other partitions) appears at bus 203. FIFOR_SIO_ACK at 206 designates SIO as destination.

When data is being written to the array from TFM or RFM, or fetched from the array to those partitions, address input to selector 201 is provided indirectly as a combination of the time slot indication from RSM, RSM_TSI, and select functions appearing at output 207 of state logic 204. RSM_TSI effectively addresses the block of (4 word) positions assigned to the respective channel, and select functions at 207 provide addressing offset to a particular word location in the block. In respect to receive data transfers from RFM, which are one byte at a time, RFM provides additional address input RFM_FIFOR_BPP (BPP represents "byte position pointer") resolving the address selection to a byte position within a selected word space.

When RFM is writing to the array, it presents a byte of receive data at RFM_FIFOR_DATA along with byte position pointer RFM_FIFOR_BPP; the latter designating a specific byte location within the block addressed by RSM_TSI and word selected at 207. When TFM is writing to the array, it writes only status word information, presenting the latter at TFM TDFSW DATA. When data is being fetched to either RFM or TFM, a full word is output at bus 203 along with an associated acknowledge at 206, FIFOR_RFM_ACK or FIFOR_TFM_ACK serving to designate the destination partition.

When DMAC is accessing the array, addressing inputs are developed as combinations of channel number inputs from DMAC, DMAC_CHN_NBR, and select outputs at 207. Data is presented for writing at DMAC_FIFOR_DATA, and fetched data is transferred to DMAC via bus 203 along with FIFOR_DMAC_ACK at 206.

Outputs from array 200 to bus 203 are passed in parallel to parity check circuit 202a which performs a parity check operation on the data. If parity error is detected, that circuit furnishes an error indication, FIFOR_PARITY_ERROR, at 202b. Such error indication is presented to the requesting partition, and used by the latter to provide error interrupt indication to INT partition (for logging of related status in CEISR/TSR, and reportage to IOP as a channelized error condition; see later description of INT).

Read/write and clocking functions of the array are controlled via outputs of logic 204 at 208 (derived from inputs to request latches 205). Single read or write requests take 3 machine clock/state cycles (3×50 ns) to complete. One cycle sets up the request selection functions, and activates the read/write and not-shown clock enabling inputs of the array. A next cycle latches the clock enablement and selection functions to provide glitch free clocking to the array. A next third cycle activates the acknowledge outputs and deactivates clocking and selection signals. Successive (double word) accesses are completed in 5 cycles, by overlapping the first cycle of the second access with the last cycle of the first access.

11.2 FIFO RAM Status and Data

In FIFOR, the basic channels associated with the slots of a basic BTDM slot repetition frame are each allotted 4 word spaces (FIG. 7). Two of these spaces (RDCR1, TDCR1) hold DMA control information relative to the respective channel, and the other two (RDCR2, TDCR2) serve as buffers in which data being received and transmitted is queued.

Details of bit usage in the DMA configuration register word spaces RDCR1,2 and TDCR1,2 of array 200 are indicated in FIGS. 22-25. RDCR1 and TDCR1 are used to hold certain status and control parameters relative to respective (active) channels, and RDCR2 and TDCR2 spaces, 23-1 thru 23-4 (FIG. 23) and 25-1 thru 25-4 (FIG. 4) respectively, used as 4-byte queues relative to receive and transmit communication data passing through respective (active) channels.

In each active channel having a receive path, receive data is transferred one byte at a time from RV via RFM into (specifically addressed) byte positions in the respective RDCR2 space in array 200. Relative to each actively transmitting channel, transmit data is transferred one byte at a time from TDCR2/FIFOR to TFM, and from the latter to TV. In the transfer to TFM, the full word TDCR2 is fetched, and byte selection is performed by TFM. Transfers from RFM to array 200 and from the array to TFM are conducted during respective synchronous (time-swapped) operations of RFM and TFM described below.

When an RDCR2 space becomes filled with 4 bytes, RFM posts a request to the DMARQ (DMA Request Queue) which causes the DMAC partition operating (asynchronously) in association with MIO partition to transfer the 4 bytes to a space in external (IOP/host) memory designated by address information in the respective RDCR1 field 22-1 (FIG. 22) named RDCA (Receive DMA Current Address; 22 bits). The external memory is addressed as a circular buffer (refer to DMAC detailed description which follows). The remaining 10 bit spaces in RDCR1 consist of 8 reserved bit spaces 22-2 (RES), a 1-bit space 22-3 RPE (Receive Parity Error) for indicating parity error detected at the FIFOR output to DMAC, and a 1-bit space 22-4 RBC (Receive Boundary Check) for indicating boundary check conditions encountered during the transfer (refer to DMAC description).

Similarly, when a TDCR2 active channel word space in FIFOR becomes empty, TFM posts a request to DMARQ causing DMAC (asynchronously) to fetch data from external (IOP/host) memory using control information provided in part in the associated TDCR1 space (refer to DMAC description below for full discussion of the TDCR1 fields). Briefly, the fields in each TDCR1 word (FIG. 24) consist of: 7 reserved bits 24-1 (RES), a 16-bit TDBC (Transmit DMA Byte Count) field 24-2 defining the byte length of the current external data buffer space, three 2-bit fields and three 1-bit fields. The 2-bit fields are: TBC (Transmit Buffer Count) at 24-3, pointing to the next byte in TDCR2 to be transferred to TV, TOPQ (Top of Queue) at 24-4, pointing to the first valid byte location in TCR2 (and is particularly needed when less than 4 bytes have been loaded into TCR2), and PE (Transmit DMA Parity Error) at 24-5, indicating if parity error occurred in the DMAC transfer relative to either or both external memory and FIFOR. The 1-bit fields, which represent external access condition indications settable by DMAC (refer to DMAC description for specifics), are: ECD (End of Chain Detected), at 24-6, EFD (End Of Frame Detected), at 24-7, and NDI (No Data Indicator) at 24-8.

11.3 FIFO RAM State Machine States

To simplify the following description, the 1-bit and 2-bit status functions of TDCR1 relevant to FIFOR are referred to collectively as the transmit DMA FIFO status word (TDFSW), the DMAC channel number addressing input to FIFOR is termed the DMAC address, and the time slot addressing indication from RSM to FIFOR is called the RFM address or TFM address according to which partition is actually accessing FIFOR.

STATE 0 (ARBITRATION STATE):

All requests for accessing FIFOR are constantly latched (at request latches 205). This state prioritizes the requests in accordance with predetermined arbitration rules and loads data associated with the prevailing request into FBS (FIFOR Bus Selector) 201.

Priorities in descending order are: TDFSW updates from TFM, DMAC 2-word read requests, DMAC one-word write requests, DMAC one-word read request, DMAC 2-word write request, DMAC write parity error, RFM read request, RFM write request, TFM one-word read request, TFM 2-word read request, SIO read request, and SIO write request.

When the selected request is for writing a TDFSW update for TFM (TFM_FIFOR_WR1), the address and the updated TDFSW date (TFM_TDF-SW_DATA) are selected by FBS (FIFO Bus Selector) 201. The first byte select, write and clock enable control inputs are activated. In this circumstance the next state is state 11.

When the request is for reading two words from FIFOR to DMAC (DMAC_FIFOR_RD2), DMAC is assumed to be requesting both the current external address, stored in the RDCA field of the RDCR1 word space addressed by the DMAC address, and the receive data stored in the associated RDCR2 space (both spaces designated in part by DMAC_CH_NBR). The associated word spaces are sequentially addressed, and the read controls are activated. Next state is state 1.

When the request is for writing one word to FIFOR from DMAC (DMAC_FIFOR_WR1), it is assumed DMAC is updating the word containing the associated channel's RDCA, and the associated FIFOR address is selected by FBS. The array control signals are activated for write. Next state is state 18.

When the request is reading one word to DMAC (DMAC_FIFOR_RD1), DMAC is assumed to be requesting the TDBC in the associated channel's TDCR1 space. The respective address is selected by FBS, and the array signals are activated for write. Next state is state 2.

When the request is for a 2-word write from DMAC (DMAC_FIFOR_WR2), DMAC is storing both the TDBC and transmit data. FBS selects the appropriate word addresses sequentially, the array controls are activated for successive writes, and next state is state 12. a parity error has been detected by the DMAC as the results of either DMAC requests one or two-word reads from FIFOR. The respective TDCR1 or RDCR1 is selected through the combination of DMAC_CHN_NBR, DMAC_RCV_REQ, and FBS selects. Next state is state 14.

When the request is an RFM read (RFM_FIFOR_RD active), RFM is requesting status information from the associated RDCR1. Address selection is made accordingly (as a function of RSM_TSI and word position selection outputs from the state machine), and controls are activated for a read. Next state is state 4.

When the request is a one byte write from RFM (RFM_FIFOR_WR1 active), for transferring a byte of receive data, byte address is selected by FBS in response to RFM_FIFOR_BPP and controls activated for write. Next state is state 15.

When the request is a transmit data read to TFM (TFM_FIFOR_RD1 active), the required TDCR2 address is selected by FBS (as a function of RSM TSI and internally generated word position indications) and the controls are activated for a read. Next state is state 5.

When the request is a 2-word read for TFM (TFM_FIFOR_RD2), TFM is seeking access to both the TDCR1 and TDCR2 spaces of the respective channel. These spaces are addressed sequentially (as a function of RSM_TSI and internally generated word position selection signals) and the controls are activated for reads. Next state is state 6.

When the request is a one word read for SIO (SIO_FIFOR_RD active), the address furnished by SIO (SIO_ADDRESS) is selected, array controls are activated for read, and next state is state 7.

When the request is a word write to FIFOR from SIO (SIO_FIFOR_WR active), SIO address is selected, controls are activated for write and next state is state 17.

State 1 (Read RDCA to DMAC):

Array controls activated to access the array for reading RDCR1 location of DMAC address (DMAC_CH_NBR). Next state is state 8.

State 2 (Read TDBC to DMAC):

Array controls activated to access array for reading TDCR1 location of DMAC address. Next state is state 20.

State 3 Write Transmit Data and Start Write For Updated TDBC):

Assert FIFOR_DMAC_ACK to inform DMAC transmit data has been written and updated TDBC and TDFSW must be presented to be written next. Array enable is deactivated after this, but select and write access controls held active. Next state is state 13.

State 4 (Read Boundary Check and PE Status to RFM):

Array controls activated for read relative to associated channel's RDCR1, then deactivated. Next state is state 21.

State 5 (Read Transmit Date to TFM):

Array controls activated to read associated channel's TDCR2, then deactivated. Next state is state 23.

State 6 (Read TDFSW to TFM):

Array controls activated to read associated channel's TDCR1, then deactivated. Next state is state 10.

State 7 (Read Word to SIO):

Array controls activated to read word at SIO_ADDRESS, then deactivated. Next state is state 22.

State 8 (First ACK to DMAC on 2 Word Receive Side Read):

FIFOR_DMAC_ACK asserted to DMAC. DMAC address adjusted to second word (RDCR2) location of same channel. Clock enable activated for second read access. Next state is state 9.

State 9 (Read Receive Data After DMAC):

Array controls activated for second read then deactivated. Next state is state 20.

State 10 (First ACK to TFM; 2 Word Read, TDFSC & Transmit Data):

FIFOR_TFM_RD_ACK asserted to have TFM accept TDFSW info on bus 203, and prepare to accept transmit data next. Clock enable activated for next read and TFM address adjusted for next word (TDCR2) location. Next state is state 16.

State 11 (Update TDFSW for TFM):

Array clock activated for writing to appropriate TDFSW/TDCR1 space. Clock enable deactivated. Next state is state 19.

State 12 (Write Transmit Data Followed by TDBC):

Array clock activated for writing transmit data from DMAC to TDCR2 space of associated channel. Address adjusted to next word space (that of associated TDCR1). Clock deactivated. Next state is state 3.

State 13 Write TDFSW and TDBC After Transmit Data):

Clock activated to access array for writing to TDCR1 space, then deactivate. Next state 20.

State 14 (Write DMAC Parity Error):

Clock activated to access array to write to TDCR1 PE space. Clock deactivated. Next state 20.

State 15 (Write Receive Data Byte for RFM):

Array accessed to write data byte from RFM to RDCR2 space of associated channel/slot. Clock deactivated. Next state 21.

State 16 (Read Transmit Data to TFM after Having Read TDFSW):

Array accessed to read transmit data from associated channel's TDCR2 space to TFM (TFM selects appropriate byte). Clock deactivated. Next state 23.

State 17 (Write Data Word for SIO)

If a flag is not detected examine check register for idle or abort pattern (7 or more consecutive 1's). If such is detected, set appropriate idle or abort indicator relative to INT, clear data register and reset bit count. If RDATA_VALID is inactive, next state is state 1; else, next state is state 3.

Array accessed and SIO_DATA word written to location of SIO_ADDRESS. Clock disabled. Next state 22.

State 18 (Write RDCA for DMAC):

Array accessed to write to RDCR1 space of channel number indicated by DMAC. Clock enable deactivated. Next state 20.

State 19 (Acknowledge TDFSW Write of TFM):

FIFOR_TFM_ACK asserted. Array controls deactivated. Next state 0.

State 20 (Acknowledge to DMAC):

FIFOR_DMAC_ACK asserted. Array controls deactivated. Next state 0

State 21 (Acknowledge to RFM):

FIFOR_ACK_RFM asserted. Array controls deactivated. Next state 0.

State 22 (Acknowledge to SIO):

FIFOR_SIO_ACK asserted. Array controls deactivated. Next state 0.

State 23 (Acknowledge to TFM of Transmit Data Read):

FIFOR_TFM_RD_ACK asserted. Array controls deactivated. Next state 0.

11.4 RFM Functions

RFM (Receive FIFO Manager) transfers receive data byte between RV and specifically addressed byte locations in RDCR2 word spaces of FIFOR, and by requests to DMARQ initiates transfers of receive data to host IOP memory from FIFOR (under the direction of DMAC). RFM also can access status information in RDCR1 spaces of FIFOR (e.g. for ascertaining if parity error occurred during related DMAC transfers from FIFOR to host IOP memory).

RFM operates synchronously with RV and RL1, as a time division multiplex engine, to service active channels in synchronism with appearances of respective channel time slots at BTDM. As is the case for the other synchronous elements, RFM is started and halted by RSM at regular time intervals related to said slot appearances. When signalled to halt (RSM_RCV_EOS), RSM transfers to an idle state and asserts RFM_DONE as indication to RSM that it is in a stable state suitable for time swap exchange of status words (RFM_TS01 and RFM_TS02) associated with ending and beginning channel slots. The new status words are loaded in response to load control signals from RSM (RSM_RFM_LOAD1 and RSM_RFM_LOAD2). After loading of new channel status RFM is signalled to start by RSM_RCV_START.

In operation relative to any active channel, RFM accepts receive data bytes presented by RV, and stores them in specific byte locations of associated channel word spaces RDCR2 in FIFOR. As each such space becomes filled, RFM posts a request in DMARQ to cause DMAC to transfer the contents of that space (asynchronously) to external IOP memory. RFM also processes status information received from RV, keeps track of the number of bytes received in each frame, and indicates end of frame status to the INT partition. It also processes status conditions posted by DMAC in the RDCR1 spaces of FIFOR and reports posted boundary check and parity error conditions to the INT partition.

11.5 RFM Time Swapped Words 1 and 2

Figure 18:
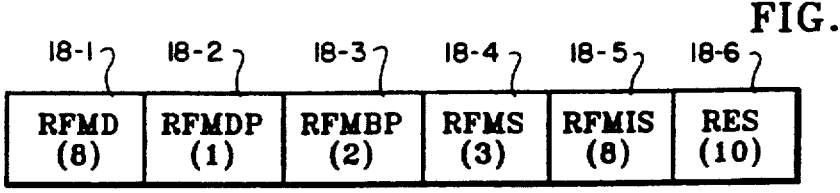
FIGS. 18 and 19 illustrate the formats of two time swap status words exchanged between RFM and TS RSM. via RSM.
Figure 19:
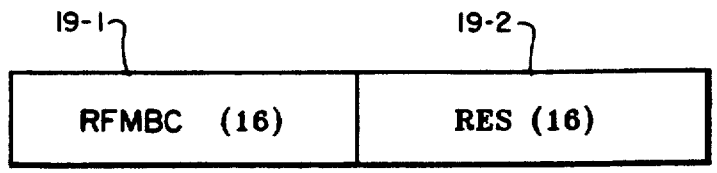

The time swapped words transferred between RFM and TSR (RFM_TS01 and RFM_TS02) under control of RSM are indicated in FIGS. 18 and 19 (see also 6-8 and 6-9 in FIG. 6).

RFM_TS01 (FIG. 18) comprises: an 8-bit field 18-1, designated RFMD, containing any data received from RV and not yet transferred to FIFOR; a 1-bit field 18-2, designated RFMDP indicating the parity of data stored in RFMD; a 2-bit field 18-3, designated RFMBP, a byte pointer to the next byte position in FIFOR/RDCR2 into which receive data for the current channel is to be transferred; a 3-bit field 18-4, designated RFMS, indicating the current state of RFM relative to the respective channel as one of: idle (no valid data received), active (valid data received for placement in FIFOR), or "between frames" (an idle, abort or end of frame indication has been received from RV, requiring associated status posting by RFM to INT once the associated FIFOR contents have been DMA'd to IOP); an 8-bit field 18-5, designated RFMIS, indicating interrupt status of RFM as one of: idle pattern received, end of frame detected, abort pattern detected, octet alignment error detected, CRC error detected, buffer overflow condition detected relative to FIFOR/RDCR2; and 8 reserved bit positions 18-6 (unused presently but available for other indications).

RFM_TS02 (FIG. 19) comprises a 16-bit field 19-1, designated RFMBC, indicating the number of bytes received by RFM relative to the respective channel during the current frame, and 16 reserved/unused bits 19-2. Upon detection of end of frame, idle or abort condition, RFM adjusts the value in RFMFBC (to ensure that CRC bytes are not included in the count), and the adjusted value together with the value of RFMIS in RFM_TS01 are passed to (picked up by) INT during the latter's interrupt request handling process.

11.6 RFM Logic

The logical organization of RFM is indicated in FIG. 17. RFM comprises state machine logic 220, bus selector 221 for transferring receive data and status information presented by RV (in response to select functions provided by state logic 220), data registers 222 for receiving the information selected by selector 221 (in response to control signals provided by state logic 220), and time swap status registers 223 for holding the currently effective time swap status words of RFM (this partition has two such words and two registers 223 for holding them).

In normal operations of RFM, state logic 220 would make the following transitions: start in idle state (state 0), transfer to state 4 upon reception of RSM_RCV_START to wait/check for indication that the FIFOR buffer is not full (if buffer is full wait in state 4 until it is not full before proceeding), transfer to state 10 to check for FIFOR parity error and also to check for boundary check condition by reading RDCR1 status posted by DMAC. In the absence of parity error or boundary check conditions, transfer to state 1, to wait for data transfer request from RV, then to state 5 to store data in FIFOR, and return to idle state 0 upon receipt of end of slot indication RSM_RCV_EOS. Details of state logic 220 follow.

State 0 (Idle State)

This is the state in which RFM can safely swap its time swap status words. In this state, the RFM_DONE indication can be asserted (following receipt of RSM_RCV_EOS), allowing RSM to operate TSR to store the current status of RFM presented from registers 223 to outputs RFM_TS01 and RFM_TS02. Also, in this state new status can be loaded into registers 223 from RFM TS BUS in response to load control signals from RSM (RSM_RFM_LOAD1, RSM_RFM_LOAD2). After loading status RSM starts RFM processing by assertion of RSM_RCV_START.

In this state, RFM waits for RSM_RCV_START. When this signal is active, the state of the receive DMA enable bit (RDE) in RSM_CCR is checked. If that bit is off (current channel not enabled for reception) next state is state 8. If that bit is on, and RFM state status (RFMS and RFMIS fields in RFM_TS01) indicate previous error in this channel, go to state 8. Else, go to state 4.

State 1 (Examine newly loaded status in RFM_TS01, 02)

State status is checked to initiate the tasks required relative to the current state. If halted by RSM while in this state, go to state 0. If status indicates previous detection of idle pattern, go to state 2. If status indicates data was received previously but has not yet been written to FIFOR, raise write request to FIFOR, RFM_FIFOR_WR_REQ, and go to state is state 5. If status indicates previous receipt of end of frame indication from RV, go to state 9 to report same to INT. If status indicates previous detection of parity error or boundary check condition, go to state 8. If status indicates severe logic error encountered, return to state 0.

State 2 (Process Data And Frame Status Received From RV)

In this state, data and status (end of frame, abort or idle) presented by RV are processed. RV_RFM_REQ active indicates data is valid at RV_RFM_DATA input to selector 221. RV_RFM_REQ_STATUS active indicates status is valid at RV_RFM_STATUS input of selector 221. Depending upon which input is active, data or status, respective acknowledgement, RFM_RV_D_ACK or RFM_RV_S_ACK is activated.

If end of frame status and data are received from RV simultaneously, state status is set to indicate end of frame reception, and data receipt acknowledgement is given to RV by RFM_RV_D_ACK. Status of FIFOR data buffers in RDCR2 is checked to determine if they hold 2 or more bytes of valid data. If they do, RFM_DMARQ_SET is activated to request DMAC service and next state is state 11. If number of bytes held in FIFOR at this time is less than 2, RFM_DMARQ_SET is not activated and next state is state 6.

If only data is received from RV, state status is set to indicate receipt of a data byte, acknowledgement to RV is given via RFM_RV_ACK, the receive data byte count (RFMBC in RFM_TS02) is increased by 1, and next state is state 5.

If only end of frame status is received, state status is modified to indicate that, the frame byte count is decreased by one if it is greater than 0 (to adjust for transfer of CRC), acknowledgement is returned to RV via RFM_RV_S_ACK, and the number of valid bytes contained in the FIFOR data buffer is checked. If there are at least 3 valid bytes in the buffer, the request bit to DMARQ (RFM_DMARQ_SET) is activated and next state is state 11. If there are less than 3 bytes in the buffer next state is state 6 without activation of request to DMARQ. The number of valid bytes in FIFOR at end of frame reception is important because this condition occurs only in channels operating under HDLC protocols, in which the last 2 bytes transferred from RV are CRC remainder bytes that are not part of the frame data count; hence, the count must be adjusted on the fly to reflect the true received data count.

If an abort or idle frame status is received from RV, the number of valid data bytes in FIFOR is checked. If there are no valid data bytes in FIFOR, next state is state 9. If there is one byte, next state is state 6. If there are two bytes, frame byte count is decreased by one and next state is state 6. If there 3 bytes, frame byte count is decreased by one and next state is state 3.

State 3 (Decrease Frame Byte Count By One)

Frame byte count is decreased by one and next state is state 6.

State 4 (Wait For DMAC to empty FIFOR data buffer)

If halted by RSM while in this state transfer to state 0. In this state the request signal from DMARQ (DMARQ_RFM_REQ), which when active indicates that DMAC service has been requested relative to the FIFOR data buffer (when such service is completed DMAC turns this signal off), is checked repeatedly for indication of completion of DMAC service relative to the FIFOR data buffer. Upon receipt of such indication, transition to state 10.

State 5 (Write Received Data To FIFOR Data Buffer) In this state, assert write request to FIFOR, RFM_FIFOR_WR_REQ. When FIFOR acknowledges (with FIFOR_RFM_ACK), apply byte position pointer RFM_FIFOR_BPP to address a byte location in the FIFOR data buffer to which the received data byte is written. Update pointer, to point to next position, and state status to indicate data has been written to FIFOR. Check status of the FIFOR data buffer. If full, activate RFM_DMARQ_SET to request DMAC service and go to state 4. If the buffer is not full, go to state 2 without action relative to DMARQ. If halted by RSM before completing the foregoing actions, return to state 0.

State 6 (Decrease Frame Byte Count By One)

Frame byte count value is decreased by one and next state is state 9.

State 7 (Clean Up State)

Clear frame byte count, set state status to indicate beginning of a new frame, and transition to state 4.

State 8 (Pass Frame Status From RV to INT)

This state is entered as a result of the RDE (receive DMA enable) bit in RSM_CCR being off. In this state all frame status received from RV is passed to INT by activation of RFM_INT_REQ and processing by INT of RFM status presented at RFM_TS01,02. All received data is discarded. Return to state 0 when RSM_RCV_EOS is activated. It is the responsibility of the host/IOP complex to ensure that the RDE bit in a channel's CCR is set active if data is to be received with normal DMA action in that channel.

State 9 (Report Error Or Frame Status To INT)

An interrupt request to INT, RFM_INT_REQ, is raised to report error or frame status. Possible interrupts are: FIFOR parity error (see state 10), boundary check condition encountered, or end of frame indication received. Go to state 8 if parity error or boundary check condition is presented, or to state 7 if normal frame ending status is reported.

State 10 (Read Boundary Check Bit From FIFOR)

Assert RFM_FIFOR_RD_REQ relative to current channel's RDCR1 space. When FIFOR acknowledges this request, check for FIFOR parity error (FIFOR_PARITY_ERROR active). If such error is indicated, go to state 9 and set status indicator denoting this occurrence. If RDCR1 indicates that a boundary check occurred during the associated DMAC transfer, set state status to indicate this condition and go to state 9. If neither FIFOR parity error nor boundary check condition has occurred, go to state 1. If halted by RSM, go to state 0.

State 11 (Decrease Frame Byte Count)

Decrease frame byte count by one and go to state 4.

11.7 TFM Functions

Figure 25:
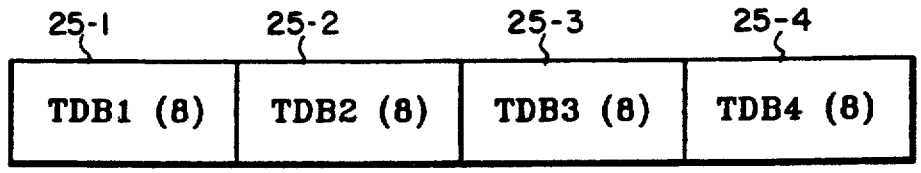

The transmit FIFO manager TFM is a time division multiplex synchronous element. It is started and stopped by RSM in synchronism with appearances of channel time slots at the BTDM. TFM manages transfers of communication transmit data (relative to active channels) from FIFOR to TV. Such data is queued (in sets of 4 or less bytes) in TDCR (transmit DMA configuration register) spaces in FIFOR, in particular in TDCR2 spaces (FIGS. 7, 25). The data is transferred from external IOP memory to FIFOR by DMAC (in sets of 4 or less bytes), and extracted from FIFOR by TFM one byte at a time. Control information relative to each channel queue is stored in the associated TDCR1 space in FIFOR.

Figure 24:
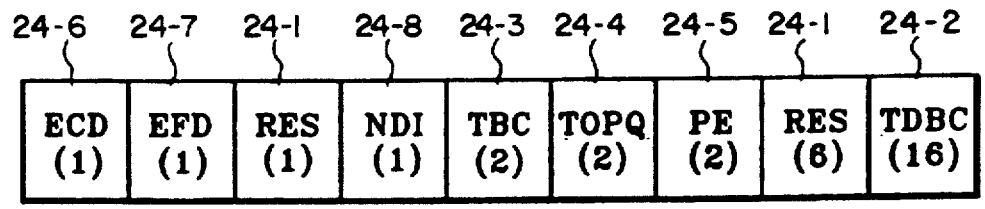
FIGS. 24 and 25 illustrate storage spaces allocated in FIFO RAM for storing up to two words of "transmit data" (data signals being processed for transmission to external channels) per channel.

The form and content of the information stored in the TDCR1 and TDCR2 spaces in FIFOR is indicated in FIGS. 24 and 25, and described briefly both here and in the description of DMAC below.

TDCR1 (FIG. 24) contains: three 1-bit indications, three 2-bit indications, one 16-bit indication and 7 reserved/unused bit spaces. The 1-bit indications are: ECD (end of chain detected), EFD (for end of frame detected), and NDI (no data indication, meaning that a DMAC service has encountered an end of buffer condition leaving no further data to be transmitted). The 2-bit indications are: TBC (transmit buffer count, pointing to the next byte in FIFOR/TDCR2 to be transferred to TV), TOPQ (top of queue; in any instance of queue service, DMAC may transfer 4 or less data bytes and this indicator points to the location of the first "valid" byte), and PE (indicating one of the following 4 DMA parity error conditions: no error, FIFOR parity error, DMAC control RAM parity error, parity errors encountered both in FIFOR and DMAC control RAM). The 16-bit indication, TDBC (transmit DMA byte count), represents the byte length of the current external data buffer from which DMAC is retrieving data and indirectly indicates command chaining points for the DMAC (see DMAC description below for more details).

TDCR2 (FIG. 25) comprises a queue of four transmit data byte spaces, TDB1-TDB4, into which transmit data retrieved by DMAC is placed. As noted above, in any instance of DMAC service 4 or less bytes are retrieved and placed in the queue, and the location of the first valid byte so placed is defined by the TOPQ indicator in TDCR1.

TFM is also responsible for initiating timely replenishment of transmit data queues in FIFOR, in coordination with real-time requirements of channel communication processes. TFM monitors the status of the transmit data queue in FIFOR for each active channel, and as the queue becomes empty TFM asserts a request to DMARQ to initiate (asynchronous) replenishment action by DMAC relative to external IOP memory.

Control information indicating the status of DMAC service relative to each active channel is stored in that channel's TDCR1 word space in FIFOR (FIG. 7), and TFM monitors control information TDFSW (transmit data FIFO status word) in the first byte of TDCR1 for detecting end of frame points in the transmit data stream and for passing related signals via TV to TL1 enabling the latter to carry out CRC and flag insertion functions relative to channels configured for bit oriented protocols (e.g. HDLC). At such times, TFM increments a frame count in its time swap word by one, and presents an interrupt request to INT for passing the frame transition information along to the host system (see description of INT below for details of how the information is actually passed).

The DMAC process for retrieving transmit data allows for chaining of retrieval commands relative to (e.g. scattered) data blocks in IOP memory (see DMAC description below for details) with a certain degree of autonomy relative to the IOP/host systems. TFM also monitors the TDCR1/TDFSW information for end of chain detected (ECD) indications. Upon detecting such, TFM relays related indications to TL1 via TV, for enabling TL1 to insert fill patterns 1s if required until DMAC service relative to the chained block is effective. The chain transition condition is also reported to INT (see description of INT below). At such times, TFM becomes inactive relative to the associated channel and explicit action by SIO/IOP is required (see description of SIO below) to reinitalize the channel and reactivate TFM; ensuring that any required coordination, between IOP/host systems and DMAC, for effectuating chaining, is carried out before resumption of channel communications.

When TFM is halted by an end of slot indication from RSM, RSM_XMIT_EOS, while performing operations relative to an active channel, a time swapped word TFM_TS01, defining TFM's state relative to that channel, is saved by RSM in TSR. If the next appearing channel is active, another word TFM_TS01, defining TFM's status relative to that channel, is loaded into TFM (from TSR by RSM), and TFM is restarted, by signal RSM_XMIT_START from RSM, to resume processing relative to the new channel.

The TFM status word saved by RSM during swapping does not include the transmit data byte, if any, which may have been fetched by TFM from FIFOR and not yet transferred to TV when RSM halts the current channel slot operation. This is because each transmit data fetch by TFM is initiated by a request from TV and concludes normally (no intervening halt) with a byte transfer to TV together with a TFM acknowledgement. The loqic of TV is arranged so that if it has an outstanding (unacknowledged) data fetch request to TFM when halted it will withdraw that request and save status requiring it to present the same request to TFM when next restarted relative to the same channel. The logic of TFM is arranged, when halted before completing a transmit data fetch from FIFOR, to withdraw the request so that on the next service of the same channel TV will reissue its request to TFM. Since the pointer TBC, which defines the next byte position for TFM to fetch data from the FIFOR transmit buffer queue is not changed by TFM until the fetched byte has been passed to TV, if TFM is halted during an incomplete fetch no special action is required to ensure that the correct byte will be fetched by TFM from FIFOR when TV repeats its request.

11.8 TFM Time Swapped Word

Figure 21:
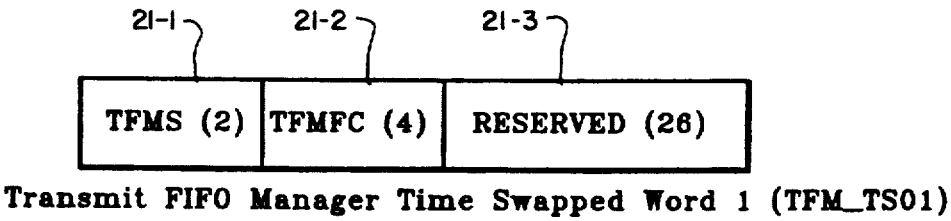
FIG. 21 illustrates the format of the time swap status word, TFM_TS01, exchanged between TFM and TS RAM
Figure 22:
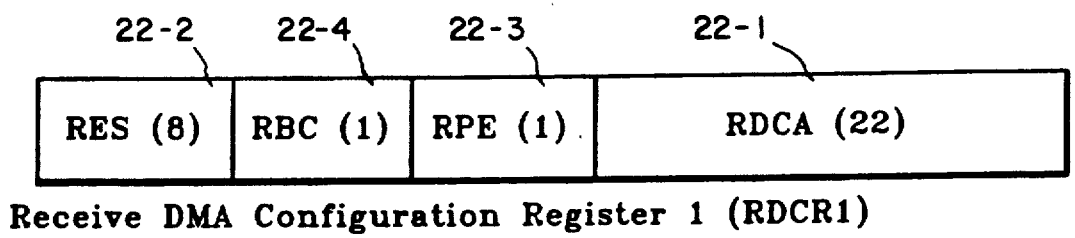
FIGS. 22 and 23 illustrate storage spaces allocated in FIFO RAM for storing up to two words of "receive date" (data signals received form external channels) per channel.

The form and content of TFM's time swapped word TFM_TS01 is shown in FIG. 21 (see also 6-10, FIG. 6). The word consists of 6 actually used bits, 21-1 and 21-2, and 26 reserved/unused bits 21-3. For reasons explained above, and discussed again in descriptions of states 0 and 6 below, this word does not include any transmit data associated with an incomplete fetch (a fetch not completed when TFM is halted by RSM). The 6 used bits include a 4-bit field 21-1 designated TFMFC (TFM Frame Count), indicating the number of frames of transmit data which have been transmitted relative to the associated channel, and a 2-bit field 21-2 designated TFMS (TFM State) defining the state of TFM relative to the associated channel as one of: initialized (by external action of SIO/IOP; see description of SIO below), normal processing, halted due to parity or logic error, or halted due to end of chain condition.

11.9 TFM Logic

Figure 20:
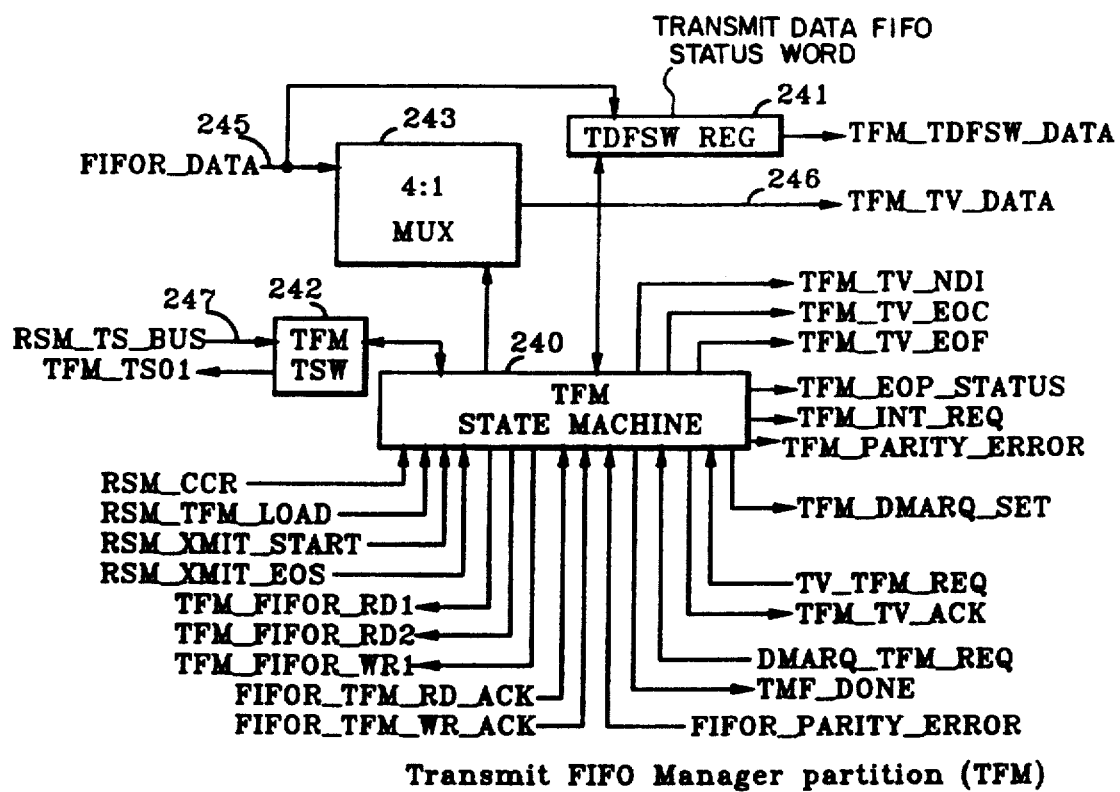
FIG. 20 is a block diagram of the transmit FIFO manager (TFM) element in IDLC.

The logical organization of TFM is shown in FIG. 20. TFM comprises state machine logic 240, register 241 for storing TDFSW information fetched from FIFOR/TDCR1, register 242 for storing the TFM time swapped word TFM_TS01 associated with the channel currently being processed in TFM, and multiplexor/selector circuit 243 for selecting data byte portions of transmit data words appearing at 245 and transferring the selected bytes to output 246.

Register 241 receives TDCR1 status information from FIFOR, via FIFOR_DATA bus 245, and presents output status data at its output, TFM_TDFSW_DATA; e.g. for write transfer back to FIFOR when control output TFM_FIFOR_WR1 is given by logic 240. Time swap word register 242 is loaded from RSM_TS_BUS, during time swap action by RSM, and presents its current contents at TFM_TSO1 output, to be saved to TSR by RSM when TFM is halted and logic 240 is presenting TFM_DONE (indicating that it is in stable state 0 appropriate for time swap word saving).

Multiplexor/selector 243 is operated by logic 240 to perform transmit data byte selection relative to its input 245 from FIFOR. In response to fetch requests TV_TFM_REQ from TV, transmit data is read from FIFOR to selector input 245 in word parallel form. Logic 240, using the buffer count pointer information TBC in TDFSW register 241, selects the appropriate byte to be presented to TV at output 246, TFM_TV_DATA. When the data at output 246 is valid for transfer to TV, logic 240 asserts TFM_TV_ACK to TV and the data is accepted instantly (within 50 nanoseconds) by TV.

Logic 240 asserts TFM_TV_EOC when passing the ECD (end of chain detected) indicator portion of TDFSW from register 241 to TV, and TFM_TV_ EOF when passing the EFD (end of frame detected) indicator portion of TDFSW to TV. The logic asserts TFM_EOP_STATUS in association with TFM_INT_REQ when passing end of process status to INT (see description of INT below for details of end of process interrupt status handling). Other outputs and inputs of the logic are explained below in the description of its states. States of state logic 240 are:

State 0 (Idle State)

The state in which it is "safe" for RSM to conduct time swapping of TFM_TS01 information (without possibility of loss or ambiguity due to transient interaction between TFM and either TV or FIFOR or DMARQ). In this state TFM can assert its Done indication to RSM (TFM_DONE), indicating that TFM is in a stable state suitable for safe execution by RSM of state time swapping. When this state is entered after end of slot/halt indication from RSM (RSM_XMIT_EOS), RSM stores the contents of register 242 in the associated channel space of TSR. If the next channel slot is associated with an active channel, RSM presents an associated previously saved status word at RSM_TS_BUS and asserts RSM_TFM_LOAD to cause logic 240 to load that word into register 242. Upon activation of RSM_TFM_LOAD logic 240 also resets an internal status bit (not shown) NEW_TDFSW which when set indicates that the state of TDFSW/TDCR1 has changed and may require specific action by TFM to update the associated information in FIFOR (see discussions of state 2 and 6 below). After completing the state time swap, RSM restarts TFM by asserting RSM_XMIT_START. At that time, the state logic transitions to state 1 if the transmit DMA enable bit (TDE) in RSM_CCR is on, and otherwise transitions to state 9.

State 1 (Examine Newly Loaded Status)

In this state, status newly loaded into register 242 during state 0 operation (TFM_TS01 for channel currently being served) is examined. If the status indicates need for DMAC action to fill the transmit data queue in FIFOR (field TFMS indicating newly initialized status), a request to DMARQ, TFM_DMARQ_SET, is asserted and the logic transitions to state 2. The request to DMARQ instantly (within 50 nanoseconds) causes setting of a request latch in DMARQ (see description of that element below) and return of acknowledging indication DMARQ_TFM_REQ to logic 240. The request to DMARQ causes asynchronous action by DMAC to fetch transmit data from external IOP memory to FIFOR, and the signal DMARQ_TFM_REQ is not turned off until DMAC completes its action (which could involve more than one cycle of TFM service relative to the associated channel). However, the DMARQ operates in synchronism with TFM relative to its DMARQ_TFM_REQ signalling functions so that the signal will remain on each time the associated channel is serviced by TFM unless and until it is turned off by action of DMAC.

If state status in register 242 indicates normal processing status, logic 240 transitions to state 2 or 3 depending respectively upon whether DMARQ_TFM_REQ is active or inactive. As noted above, although DMAC operates asynchronously in servicing a TFM request for FIFOR refilling, DMARQ operates in synchronism with RSM and TFM with respect to this DMARQ_TFM_REQ acknowledgement signalling function (also see DMARQ description below), and the function is deactivated relative to any channel only when DMAC completes the required action. Therefore active state of this signal is invariably associated with the channel currently being serviced by TFM, and indicates that the requested DMAC function (filling of FIFOR queue) is incomplete.

If state status indicates detection of error or end of chain condition from the previous processing interval of the same channel, the logic transitions to state 9.

State 2 (Wait For Data Buffer In FIFOR To Be Filled)

In this state (entered from state 1 or 6), the state logic waits for the transmit data buffer in FIFOR to be filled via DMAC action requested by earlier assertion of TFM_DMARQ_SET relative to the channel currently being served.

Indication that this action is completed is given when DMARQ_TFM_REQ is turned off relative to the channel currently being serviced (see state 1 discussion above). If the action is completed during the current slot, the logic transitions to state 3.

If end of slot is received before completion (RSM_XMIT_EOS), logic transitions to state 12 or state 0 depending respectively on whether or not internal latch, NEW_TDFSW, has been set indicating that TDFSW has been changed. If the latch has been set the logic asserts TFM_FIFOR_WR1 before tranferring to state 12 (to initiate writing of the altered TDFSW, from output TFM_TDFSW_DATA to FIFOR/TDCR1). As noted earlier this latch is set only when TDFSW has been changed due to completion of a requested action, and the latch is invariably reset at the beginning of each new slot; therefor its appearance in set condition during any slot invariably denotes completion of a requested action relative to the channel currently being serviced, and need for storage of associated new TDFSW information in FIFOR.

State 3 (Wait For Data Request From TV)

If TV_TFM_REQ is active (TV requesting data to be fetched), the logic asserts TFM_FIFOR_RD2, to initiate back-to-back fetching of status (TDCR1) and transmit data (TDCR2) words from FIFOR, and transitions to state 4. The data fetch will yield all 4 bytes of the TDCR2 queue but the logic operates multiplexor/selector 243 to select only a single byte to appear at TFM_TV_DATA using the buffer count pointer TBC in the fetched TDFSW. Upon arrival, the status word is placed in register 241, and the selected byte of data is passed immediately to TV via selector 243 and TFM_TV_DATA. If these actions are completed, the value of TBC is adjusted to point to the next data byte to be fetched, and NEW_TDFSW latch is set. If end of slot (halt) indication RSM_XMIT_EOS is received during this state, the logic transitions either to state 12 or state 0 depending on the state of NEW_TDFSW. If that latch is set, the logic asserts TFM_FIFOR_WR1 (to write the new TDFSW information back to FIFOR) and transitions to state 12. If the latch is not set the logic transitions to state 0.

State 4 (Receive TDFSW And Transmit Data From FIFOR)

If FIFOR acknowledges the first read request (state 3) by activating FIFOR_TFM_RD_ACK, the TDFSW information is latched into register 241 and FIFOR parity indication (FIFOR_PARITY_ERROR) is checked. If parity error is indicated, set status to indicate parity error and go to state 11. Otherwise go to state 13 to prepare for arrival of the transmit data from the second read request (issued in state 3).

If halted by RSM_XMIT_EOS, logic asserts TFM_FIFOR_WRI and transitions to state 12 if NEW_TDFSW latch is set. If latch is not set it goes to state 0.

State 5 (Select Byte Of Transmit Data Sent From FIFOR)

In this state the data part of the dual read request issued in state 3 arrives at FIFOR_DATA and is received without explicit acknowledgement from FIFOR. The data received is a full word (TDCR2) and selection of a byte of that word is made by the logic as a function of the TDFSW buffer count value (TBC) stored in register 241 during state 4. The selected byte is presented at TFM_TV_DATA and when valid at that position TFM_TV_ACK is asserted, and the NDI bit in TDFSW is also passed to TV as TFM_TV_NDI. If the TBC indicates that the byte being selected is the last byte in the TDCR2 queue, the end of chain (ECD) and end of frame (EFD) indicators in TDFSW (at the output of register 241) are also presented to TV via TFM_TV EOC and TFM_TV EOF respectively. If these actions are completed the logic transitions to state 10.

If halted by RSM and NEW_TDFSW is set, the logic asserts TFM_FIFOR_WR1 and transitions to state 12. If halted and the latch is not set logic goes to state 0.

State 6 (Check Status Of ECD and EFD Indicators In TDFSW)

This state entered from state 5 via state 10.

If both end of chain and end of frame are indicated in the TDFSW currently held in register 241, the transmitted frame count (TFMFC in TFM_TS01 register 242) is incremented by one, state status (TFMS in register 241) is adjusted to indicate end of chain condition reached, and logic transitions to state 11. If only end of chain is indicated, only state status TFMS is changed to indicate end of chain condition reached and logic goes to state 11. If only end of frame is indicated the frame count is incremented by one, TFM_DMARQ_SET is asserted, and the logic goes to state 2. If neither end of chain nor end of frame is indicated, TFM_DMARQ_SET is asserted, and the logic transitions to state 2.

State 7 (Wait For Additional Data Request From TV)

This state differs from state 3 in that the TDFSW is currently available in register 241; accordingly, if TV is requesting data during this state, the logic asserts only a single read, TFM_FIFOR_RDI, relative to FIFOR/TDCR2 and transitions to state 8.

If halted by RSM and NEW_TDFSW is set, the logic asserts TFM_FIFOR_WRI (to write changed TDFSW in FIFOR) and goes to state 12. If halted and TDFSW is unchanged, it goes to state 0.

State 8 (Wait For Data To Arrive From FIFOR)

When data arrives from FIFOR, the TBC bits in TDFSW are used to select the appropriate byte and the TBC value is also checked to see if the byte being selected is in the last queue position (i.e. if the queue is emptied by transfer of this byte). If the byte selected is the last, ECD and EFD indicators in TDFSW are passed to TV with the selected data byte, and the logic transitions to state 6. If the selected data byte is not the last one in the queue, the TBC value is updated to point to the next byte in the queue, NEW_TDFSW is set, and the logic goes to state 7.

If halted by RSM and NEW_TDFSW is set, logic asserts TFM_FIFOR_WR1 (to write the changed TDFSW to FIFOR) and goes to state 12. If halted and TDFSW is unchanged, logic goes to state 0.

State 9 (Check Need To Update TDFSW)

In this state (reached from state 1 or 11), the logic checks to determine if TDFSW needs to be updated. If it does the logic transitions to state 12. If it does not the logic goes to state 0.

State 10 (Checking Validity Of TDFSW Received From FIFOR)

The TDFSW received from FIFOR during state 4 is checked for validity by evaluation of its top of queue (TOPQ) and buffer count (TBC) pointers.

If TOPQ points to the first byte location in the TDCR2 queue, and TBC points to the last byte position in the queue, logic goes to state 6. If TOPQ points to first position and TBC to other than the last position logic goes to state 7.

If TOPQ points to second byte position and TBC points to first byte position, TDFSW is invalid. In this circumstance, state status TFMS is set to indicate error and logic goes to state 11. If TOPQ points to second byte position and TBC points to last position, logic goes to state 6. If TOPQ points to second position and TBC to other than first or last position, logic goes to state 7.

If TOPQ points to third byte position and TBC to either the first or second position, TDFSW is invalid. State status is set to indicate error and logic goes to state 11. If TOPQ points to third position and TBC to last position logic goes to state 6. If TOPQ and TBC both point to third position logic goes to state 7.

If TOPQ points to last byte position and TBC to the same position, logic goes to state 6. If TOPQ points to last position and TBC to any other position, error state status is set and logic goes to state 11.

Before exiting this state, the TBC transmit data byte pointer is adjusted to point to the next byte to be fetched from FIFOR when the next request from TV is received (if not pointing to the last byte position). Note that this state is entered from state 5 provided that the transmit data fetching action of the latter state is completed relative to TV. Note also that if the pointer TBC is pointing to the last position at this time, a request for DMAC action will have been posted resulting in activation of DMARQ_TFM_REQ (indicating to TFM that the queue is being serviced), and upon deactivation of that signal (by DMAC after completing the service) TFM state logic is required to fetch the new TDFSW information supplied by DMAC which will include new TBC and TOPQ values.

State 11 (Generate Interrupt Request To INT)

Assert interrupt request to INT, via TFM PARITY_ERROR if state status indicates parity error or via TFM_INT_REQ otherwise, and go to state 9. Assertion of latter request indicates to INT that TFM_EOP_STATUS currently asserted by the logic is valid (see description of INT below for details of how this information is processed).

State 12 (Write Updated TDFSW to FIFOR)

Wait for FIFOR to acknowledge write request, TFM_FIFOR_WR1, issued in any other state (for updating TDFSW). When FIFOR_TFM_WR_ACK goes active, deassert write request and go to state 0.

State 13 (Align For Second Read of RD2 Operation)

This state is used to align with the timing of FIFOR relative to the second read of a pair of consecutive read requests initiated by TFM_FIFOR_RD2. Next state is state 5.

12.1 Interrupt Handling Elements—INT, SIO 12.1 Overview

Interruption reporting relative to the IOP/Host is handled by Interrupt Handler (INT) and Slave I/O (SIO) partitions. INT monitors requests throughout the IDLC and from the L1 circuits, those related to communication channel events as well as those related to hardware failures, posts related interrupt requests to SIO along with associated vector information pointing to the interruption source, and manages the storage of related status information in TSR and one of the INT common registers discussed below (IHEISR).

SIO passes the interrupt requests and vectors to the IOP/Host System, and provides access paths from IOP to TSR and registers in both the IDLC and L1 circuits for enabling IOP to asynchronously retrieve stored status associated with interrupt requests (see e.g. path 89, FIG. 5; also description of SIO below). SIO is also involved in processes other than interrupt handling (initialization/reset functions, dynamic programming of time swap status, etc.).

12.2 INT Functions

INT monitors requests relating to reportable events, throughout the IDLC and from the L1 circuits, assembles a vector (1 byte) identifying the source of the associated condition or event, oversees storage of status information related to the event/condition and passes the vector along with a request to SIO. SIO presents corresponding requests to the IOP via SIO_ONT (FIG. 32), a line continuously monitored by the IOP. When that line is active, and the IOP is available for dealing with it, the IOP acknowledges the request and retrieves the associated vector from SIO. When ready to perform the required interrupt handling process, the IOP uses the vector to perform a table lookup operation establishing the IDLC or L1 interrupt source, and acts through SIO to retrieve the associated status information.

Events reportable to INT from the IDLC fall into three major categories: End Of Process (EOP) Channel Interrupts, Channelized Error Interrupts and Hardware Error Interrupts. EOP and channelized error interrupts each have 32 sub-categories corresponding to individual source channels. EOP interrupts indicate expected events in individual channels (e.g. frame end detection). Channelized Error interrupts indicate hardware error conditions affecting particular channels (e.g. parity errors in retrieval of a particular channel's data or state information from one of the IDLC RAM's). Hardware Error Interrupts indicate catastrophic hardware error conditions potentially affecting all channels.

Two vector categories are allotted for requests made by the L1 circuits. These distinguish L1 requests as relating to hardware error events and channel condition/error events. L1 requests/vectors are prioritized to be attended to before channelized IDLC requests, but not before IDLC non-channelized hardware errors. Relative to each category of interrupts a corresponding vector is formed by INT and passed to SIO/IOP with an associated request. Status information related to requests originating from L1 and the IDLC is stored respectively in the L1 circuits and the IDLC, and retrieved by asynchronous action of IOP/SIO. Status information relative to IDLC hardware errors is stored in an INT register (IHEISR) and status related to IDLC channelized events and error conditions is stored in TSR (refer to discussion of EOPISR queues and CEISR register spaces below).

The vector generated by INT and passed to SIO/IOP indicates the interruption category/source. Vector formation and usage is described below in section 12.2.6. Formats and functional handling of IDLC status parameters is described next.

12.2.1 End of Process (EOP) Channel Interrupts

These indicate particular expected events in communication channels (e.g. detection of receive frame end and transmit chain end events, relative to receive and transmit processes in HDLC channels, etc.). Related End Of Process Interrupt Status (EOPIS) words (32-bits each) are latched by individual receive and transmit elements, and stored by RSM under direction of INT in End of Process Interrupt Channel Register (EOPISR) spaces in TSR (FIG. 6).

Figures 30, 31:
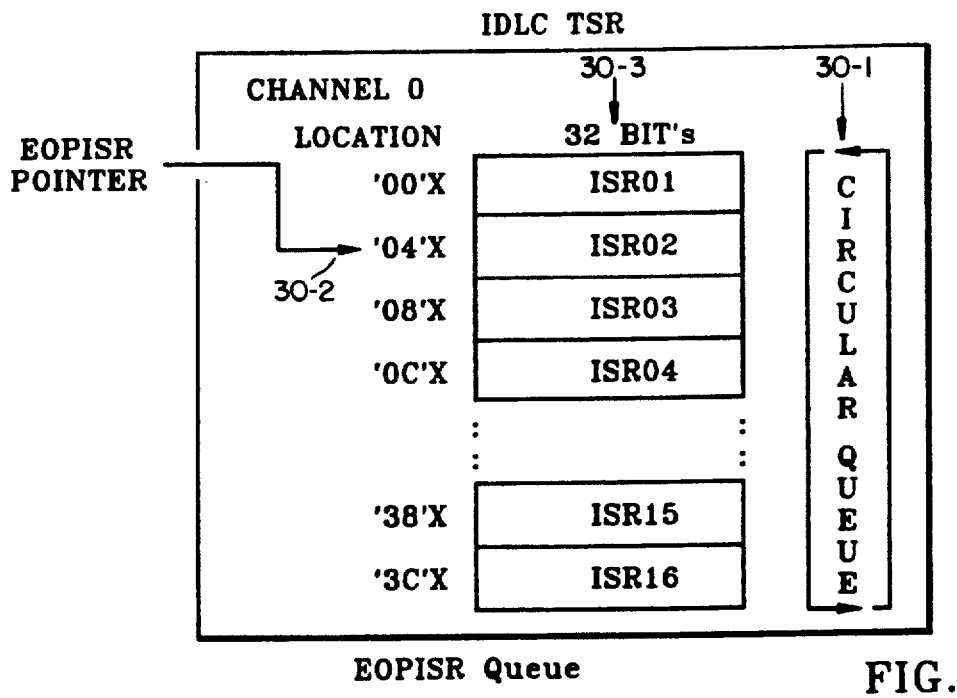
FIG. 30 illustrates the queue in TS RAM relative to each communication channel of (up to 16) status terms EOPISR.
FIG. 31 is a chart of IDLC interrupt vector levels and priorities relative to IOP.

Each channel is allocated a queue of 16 such spaces in TSR (EOPISR01-EOPISR16, FIGS. 6, 30), which is managed by INT and IOP as a circular buffer, as indicated symbolically at 30-1 in FIG. 30. Each channel also has a single register space (CEISR) in TSR for storage of a Channelized Error Interrupt Status (CEIS) word described below. Information stored in each channel's CEISR indicates the status of that channel's EOPISR queue, and includes a Next, Status Location (NSL) pointer (28-8, FIG. 28). As suggested at 30-2 (FIG. 30), values of this pointer are used to indicate the next location in the EOPISR queue (30-3, FIG. 30) available for storing new EOPIS information (see paragraph 12.2.2 below). The NSL pointer is modified by INT as an entry is written to the queue position designated by the current value of the pointer.

For each IDLC vector indicating an EOP condition, the IOP is required to read a single EOPIS word from the queue (via SIO). An indication (NOV) of the number of vectors currently pending on each channel's queue (28-9, FIG. 28) is stored in the respective CEISR/TSR space. This indication is incremented by INT in association with the writing of status entries into the queue, and decremented by INT when it receives indication that one or more status words have been removed from the queue by IOP (see discussion of single-status and multi-status modes below). Therefore it indicates the "fullness" of the queue. INT detects imminent overflow of a queue when a certain number of vectors are pending on that queue (the number is different for single and multi-status operating modes described below).

There is no explicit indication of when a word has been removed from the queue, nor is there a requirement for ordering such removal in alignment with the order of entry into the queue. Furthermore, relative to queue entries made in multi-status mode, as discussed below, the IOP is not required to read such entries while in the interrupt handling routine by which it processes associated vectors (allowing for simplification of such routines); nor is it required to acknowledge its processing of such entries in line with its status retrieval processing, although it gives indication of its handling via updates of HPCR toggle and SWRC parameters as discussed below. This eases real time constraints which otherwise would be imposed on the IOP status retrieval process.

The HPCR toggle and SWRC (Status Word Read Count) functions mentioned above are monitored by INT to determine when to update the CEISR functions NOV and NSL, the latter determining when and where new EOPIS entries are made. The HPCR register in which the toggle and SWRC are stored is located in RSM (see description of RSM above).

There is also no restriction as to the number of queue entries which can be retrieved by the IOP at one time (in "multi-status" mode). Thus, if a queue contains 10 EOPIS words at a given time it is possible for IOP/SIO to retrieve all 10 (or fewer) in one execution of its retrieval process. Since IOP updating of toggle and SWRC parameters in the HPCR need not be tightly tied to its queue retrieval processing, it is possible for more entries to be placed on a queue by INT/RSM after the IOP has accessed earlier entries, and for such later entries to be retrieved before HPCR parameters are updated. Thus, it is permissible for the IOP in its updating of the HPCR to account for entries retrieved in separately performed queue accessing processes.

It should be understood by those skilled in the art that remotely originated transmissions provide indications of the numbers of frames received at remote nodes. Thus, the IOP has the ability to compare the number of frames actually transmitted by the IDLC with the number of such frames supposedly received at remote nodes. Since the IOP also knows at any instant of time how many transmit frames have been made available to the IDLC/DMAC for chained handling, the IOP can if desired regulate the number of frames made available, relative to its handling of receive frame end interrupt status retrieval (EOPISR queue entries), so as to ensure that barring abnormal operation of the IDLC queue overflow can not occur.

The point to note here is that balancing of transmission loads and interrupt status retrieval activities, to avoid inefficient channel link usage in the network while averting overloading of the IOP, is a function of IOP design. But it also should be clear that this balancing is facilitated presently, since retrieval processing by the IOP of IDLC EOPISR multi-status mode queue entries (representing receive frame end events) can be handled separate from the processing of associated interrupt vectors and also separate from the updating of toggle and SWRC parameters (i.e. that these functions can be handled efficiently within the IOP on a multitasking basis). It also should be clear that in the IDLC vector presentation, status queueing and queue management are separately manageable on an efficient multi-task basis.

Another point to note is that EOPIS entries are made only relative to channels configured for protocol communications (e.g. HDLC) as distinct from clear channels carrying e.g. voice telephone signals (the latter handle data in continuous streams without special frame delimiting flags, etc., and associated links are established via exchanges of control signals carried in separate channels).

The form of the EOPIS word is shown in FIG. 29. The number of bits in each field is indicated in parenthesis below the field mnemonic. The "A" below IQ0 at 29-1 (Interrupt Status Overflow Indicator) indicates that this parameter is considered always valid, and therefore should be checked by the IOP routine whenever the associated entry is removed from the queue. When IQO is set to indicate that the queue has overflowed, no further entries to the queue are allowed until the respective channel's CEISR parameter has been reinitialized (by IOP/SIO).

Fields labelled T and R are respectively associated with transmission and reception process conditions.

The T fields consist of the three 1-bit indication, at 29-2 through 29-4: XMIT EOC (transmit end of chain reached or not reached), XMIT ABT/IDL (transmit abort/idle sent or not sent; sent as consequence of underrun detection in the channel), XMIT UNDR (transmit underrun encountered or not encountered).

The R fields include four 1-bit "source" indications and six status indications; of the latter four are 1-bit parameters, one is a 4-bit parameter, and the remaining one is a 16-bit term. The source indications include: SRC EOF at 29-5 (source is or is not an end of frame encountered), SRC ABC at 29-6 (source is or is not address boundary check encountered), SRC ABT at 29-7 (source is or is not abort indication received), and SRC IDL at 29-8 (source is or is not idle indication received). The status indications include: RDD at 29-9 (receive DMA Disabled, indicating if DMA reception in respective channel's CCR is disabled or enabled), TX CNT at 29-10 (count, of the number of frames transmitted in the current chain up to the time at which the respective interrupt request was posted), RCV OAS at 29-11 (receive octet alignment status effective when request posted), RCV CRC at 29-12 (CRC error detected or not detected at the time of posting), RCV OVF at 29-13 (the receive side of FIFOR did or did not overflow), and RCV DBC at 29-14 (receive DMA byte count, indicating the number of data bytes DMA'd to IOP memory during the currently received frame; this indication relative to HDLC protocols includes the total of data and CRC bytes, and is valid only when RCV OVF is not indicating overflow and one of the source indicators SRC ABT, SRC IDL or SRC EOF is active). The following should be noted relative to the foregoing R fields.

When EOF is active, the transmit count TX CNT is valid and IOP should check the status parameters to determine the length of the data DMA'd into its memory (RCV DBC) and to see if OAS, CRC or OVF error conditions were encountered during reception of the frame.

When SRC ABC is active, RCV DBC status is valid. Transmit interrupts will continue to be processed, but receive interrupts will be suppressed. IOP recovers from this condition by disabling reception in the respective channel, programming a new boundary address and re-enabling reception.

When SRC ABT is active, the channel was impliedly receiving a frame when the remotely originated abort signal was detected. When this occurs, only RCV DBC status is valid in the status fields. The RCV CRC status indication will be set active and should be ignored.

If SRC IDL is active and the respective channel is being operated in half-duplex mode, the IOP is effectively informed that the channel line should be turned around to permit transmission in that channel. In this circumstance, only RCV DBC status is valid. RCV CRC will be set active by the IDLC but should be ignored.

If RDD indicates receive DMA is disabled, and SRC ABC is inactive, RCV DBC should be ignored (this circumstance implies the DMAC was previously disabled, and therefore no valid data could have been DMA'd to IOP memory).

TX CNT is a cumulative count of the number of frames transmitted by the IDLC. It is inserted by the IDLC relative to each EOPIS word associated with reception of a frame (i.e. into R fields) for several reasons. Due to the transmit DMA chaining capability of the IDLC (see DMAC description below), it was decided to conserve IOP bus bandwidth and processing time by eliminating IDLC interrupts of the IOP to report transmittals of individual frames. Nevertheless, in order to provides integrity on the receive side of each full duplex channel link, it is necessary to furnish this transmitted frame count information to the IOP on a timely basis, inasmuch as received frames include a receive count sent by respective sources of such frames which represent the number of frames received by the source. Thus, the count of transmitted frames is needed by the IOP to distinguish erroneous receive count indications and maintain transmission integrity (e.g. by re-transmitting frames not actually received).

Another advantage or potential application for providing timely indications of transmitted frame counts to the IOP, relative to a device such as the IDLC having transmit DMA chaining capability, is that it enables the IOP to free up buffer space on a timely basis for dynamically sustaining chained transmittal activities. Using TX CNT to verify that at least certain frames have been transmitted by the IDLC and remotely received, the IOP can insert new transmission data into at least those portions of its buffer memory space which contain the already transmitted data of those certain frames. Thus, the amount of IOP buffer space required for sustaining chained IDLC transmittal can be reduced relative to what would be required if the IOP had to wait for an end of (transmittal) chain indication from the IDLC before freeing up buffer space.

When RCV OAS indicates octet misalignment, or RCV CRC indicates CRC error, the respective frame apparently contains error and should be discarded by IOP.

When RCV OVF indicates FIFOR overflow, the value of RCV DBC if other than 0 indirectly indicates the location of the last byte which was DMA'd into IOP memory, and may be useful to determine the location in IOP memory at which DMA transfer of the next receive frame should begin. If the DBC value is 0 no further calculation is required to determine that next location.

12.2.2 Channelized Error Interrupts

These interrupts are associated with hardware errors affecting a particular channel and not other channels; either FIFOR parity error or TSR parity error relative to a channel space. As noted above, the status associated with these interrupts includes parameters for managing the EOPIS queue of the associated channel. A unique vector is generatable for each channel's channelized error interrupts. After this type of interrupt, the channel must be disabled and re-enabled before re-use.

The form of the CEISR information is shown in FIG. 28. There are 15 reserved/presently unused spaces at 28-1, and 17 actively used fields. The latter include four single-bit indications WVA, at 28-2, PTV, at 28-3 IQO, at 28-4 and SWA at 28-5, two 2-bit indications PE at 28-6 and IM at 28-7, one 4-bit parameter NSL at 28-8 and one 5-bit parameter NOV at 28-9. The active fields are individually described in section 12.2.9 below.

12.2.3 Hardware Error Interrupts

These concern catastrophic hardware related errors which can affect all channels. Associated status consists of an IDLC Hardware Interrupt Status (IHEIS) word which is held in a dedicated register in INT (the IHEISR register). The word consists of 14 actively used 1-bit parameters having mnemonic labels and form indicated in FIG. 27. The remaining 18 spaces in IHEISR register (at 27-1, 27-2 and 27-3 in FIG. 27) are unused/reserved. The 14 actively used indicators consist of 10 "status" indicators at 27-4 and 4 "source" indicators at 27-5.

Status indicators are set active by the IOP without a formal interruption from the IDLC. The related status conditions occur when the IDLC detects error while attempting communication with the IOP; either as a result of IOP/SIO direct access or DMAC operation. When such errors are detected, the IDLC withholds acknowledgements to the IOP which cause a timeout lapse/error to be generated in the IOP (leading to the setting of the IHEISR status indicators without formal interruption processing). Source indicators are set active as a result of a catastrophic error condition occurrence. Such error conditions typically are not recoverable and usually indicate that the IDLC is not operational. The source bits are useful for diagnostic fault isolation purposes.

12.2.4 Transmit and Receive Interrupt Processing

The IDLC transmit processing and receive processing functions which give rise to indications causing INT to generate interrupts are fully described in the copending applications referring to "Autonomous Elements" and "Synchronous Link Interface" in their titles. Since these functions are identical for basic channels and HyperChannels, they are considered not relevant to the present application and their discussions are omitted. To the extent if any that understanding of these functions may have ancillary relevance, their discussion in the corresponding section of either application is incorporated herein by reference.

12.2.5 Interrupt Vector Form, Generation and IOP Usage

Interrupt vectors generated by INT are each single byte encoded numerical values corresponding to the source of the interrupt. The Source (FIG. 31) is one of: IDLC chip level hardware error, L1 chip level hardware error, L1 channelized event or error, IDLC channelized error or IDLC channel process event. Relative to IDLC channelized error and process events the source 31-1 (FIG. 31) is further resolved to indicate the specific one of 32 channels which was being serviced when the respective (parity) error or process event was detected. Thus, the vector number in effect ranges over 67 values (2 associated with IDLC and L1 chip level hardware errors, 1 with L1 channelized events or errors, 32 with IDLC channelized errors and 32 with IDLC channel process events).

IOP uses the vector to access a respective one of 67 entries in a lookup table in IOP memory. The table entries specifically indicate respective interrupt source identities, as noted above, together with any additional information required by IOP to conduct its interrupt handling process. Due to the manner by which the vector is constructed by INT, the table and portions thereof are relocatable by IOP within different portions of 256 word segment of its memory; i.e. the range addressable by 8 bits and (the INT vector) and a base value fixed by IOP.

When the interrupt source is other than IDLC channelized event or error (i.e. IDLC hardware error related, L1 hardware error related, or L1 channel event related), INT forms the vector using the 6-bit IIVO (IDLC Interrupt Vector Offset) number in the ICR (IDLC Configuration) register which is located in SIO (FIGS. 4 and 32) and a 2-bit value associated with the source. The 2 bit value is generated by the INT_CHP state machine component of INT (see paragraph 12.2.7 below) and concatenated in that state machine to the IIVO offset value transferred from SIO/ICR to form the full vector (INT_CHP VECTOR). The offset value, which is programmably selected by IOP and set into ICR by IOP/SIO when the IDLC is initialized, is used by IOP to select one of 64 offset positions (relative to a base location fixed by IOP). Each offset position represents a boundary of a 4-word group of positions. The 2 bit value concatenated by the INT state machine is used by IOP to select 1 of 4 locations within the group of positions designated by the offset value.

When the interrupt source is IDLC channelized, the vector is formed using a 2-bit offset value taken from the CIVO (Channel Interrupt Vector Offset) field in the ICR register and a 6-bit value internally determined by the INT_CHN state machine in INT. The offset and internally determined values are concatenated in the state machine to form the full vector (INT_CHN_VECTOR) which is presented to SIO/IOP. The offset value is programmably determined by IOP and set into ICR during IDLC initialization. IOP uses the 2 bit offset to locate one of 4 offset positions, at boundaries of 4 separate respective 64-word groups of locations in IOP memory, relative to a base position/value fixed by IOP. IOP uses the 6-bit value to address one of 64 locations within the space designated by the offset value. The addressed location contains the information needed by IOP to interpret the vector and link to the required interrupt handling process.

12.2.6 INT Partition Logic

Figure 26:
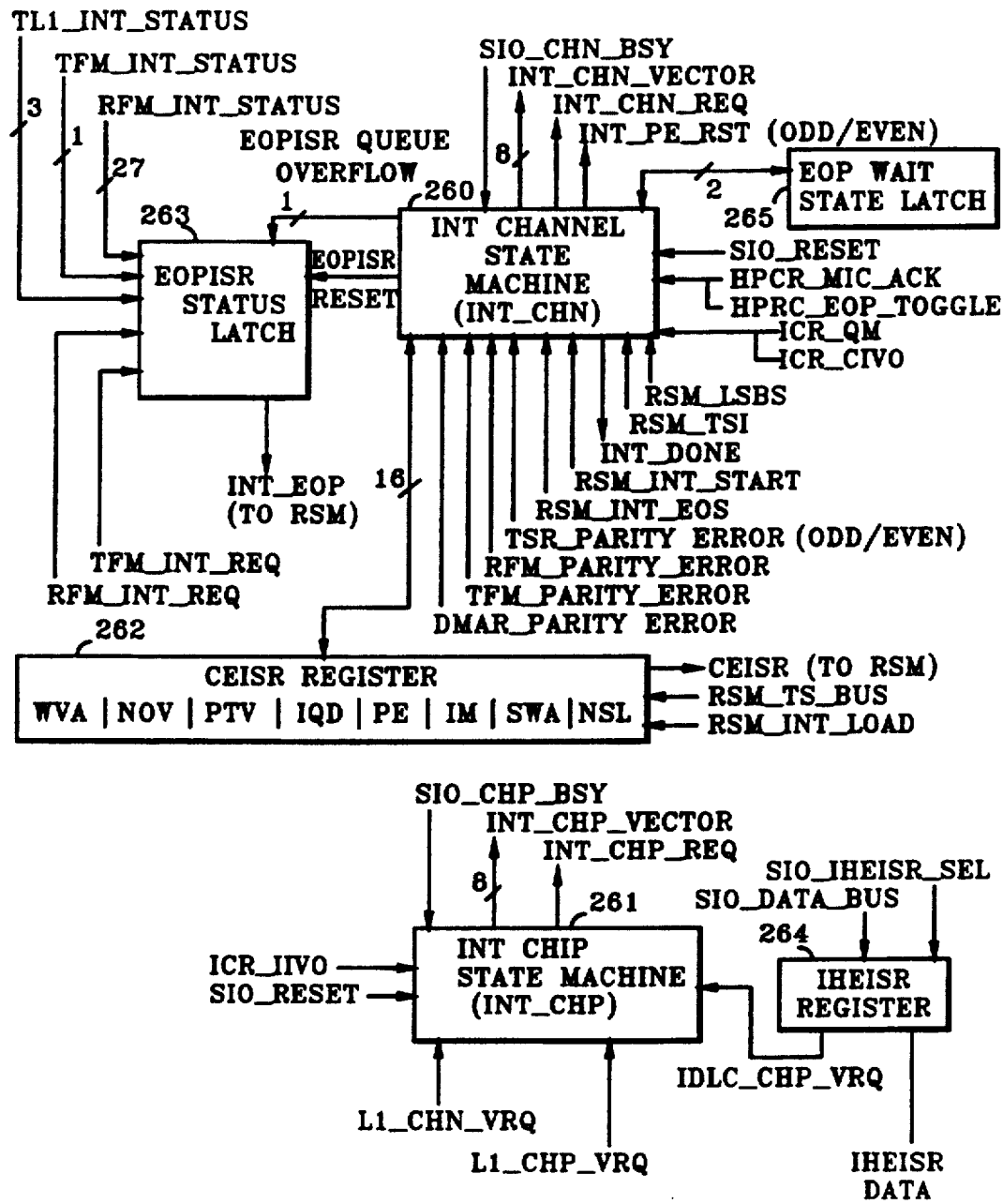
FIG. 26 is a block diagram of the interrupt partition INT in the IDLC.

FIG. 26 shows major logical components (state machines, etc.) of the Interrupt (INT) partition along with its registers, external interfaces and control signals. The partition includes state machines 260 (INT_CHN) and 261 (INT_CHP), CEIS register 262 EOPIS latches 263 and IHEISR register 264.

State machines 260 and 261 operate as discretely separate logical units; unit 260 operating in channelized mode relative to process events and channelized parity error occurrences, and unit 261 operating asynchronously relative to hardware error events in both IDLC and the L1 circuits as well as channel events occurring in the L1 circuits.

Register 262 is used to latch CEIS information relative to the channel currently being served. latches 263 are used to latch EOPIS information relative to that channel. Register 264 is used to hold status information relative to hardware errors.

The main functions of INT partition are to respond to interrupt indications, including internal IDLC requests and external requests from the L1 circuits, to collect and store interrupt status relative to such indications, to manage the (channelized) EOPISR queues (in TSR; see e.g. 6-11, FIG. 6), to construct vectors relative to indications from the other partitions and to present such vectors along with associated interrupt requests to the SIO partition for transfer to the IOP. IOP uses the vectors in table lookup operations to locate information identifying respective interrupt sources (L1 channel, L1 chip hardware, IDLC chip hardware, process event in a specific 1 of 32 IDLC channels, or parity error occurrence in a specific 1 of 32 IDLC channels), uses the table information to link to an appropriate interrupt handling routine, and uses that routine to retrieve the associated interrupt status from the IDLC via SIO.

INT_CHN state machine 260 operates relative to channelized IDLC process events, while INT_CHP state machine 261 operates relative to IDLC hardware related error conditions and L1 conditions (chip level errors and/or channelized events).

INT_CHN operates in the time swapped environment. In time slots associated with active channels, RSM loads channelized time swap status from TSR into register 262, via RSM_TSR_BUS, and starts operation of INT_CHN state machine with RSM_INT_START pulse. Bit assignment in CEISR are shown in FIG. 29, and discussed below in paragraph 12.2.8. During its operation, INT_CHN receives channel event inputs from TLI, TFM and RFM in EOPISR status latches 263, in response to respective request indications (TLI INT_REQ, TFM_INT_REQ, RFM_INT_REQ). These latches are cleared before any of the receive or transmit processes start. Their values during INT operation are not specifically interpreted by INT_CHN.

INT_CHN uses a 2 bit internal register to hold a temporary EOP WAIT STATE LATCH value, which is not saved across time slots, for determining action to be taken by INT_CHN in its state 7 as one of: store EOPISR status, ignore EOPISR status, or clear EOPISR status. If EOPIS or CEIS status is to be stored, INT_CHN asserts INT_EOP to RSM at end of slot, and transfers the contents of CEISR register 262 to RSM. RSM examines the SWA (status word available) bit in the transferred CEIS information to determine if EOPIS status was latched (at TL1, TFM or RFM) during the slot. If status was latched, it is RSM's responsibility to store the status from the respective latching partition into the EOPISR queue in TSR, using the Next Status Location (NSL) bits in the transferred CEIS information to locate the queue space to be written. RSM generates the actual TSR address location to which the EOPISR is written by concatenating the NSL to a base address (in TSR) which is a predetermined function of the channel number.

Although RSM performs the EOPISR transfers into and out of TSR, management of the EOPISR queue is the responsibility of the INT_CHN state machine. INT_CHN state machine is also responsible for 'shutting down' EOPISR status queue when the queue is about to overflow beyond 16 events deep, or a parity error has been detected relative to TSR, FIFOR or DMAR. Parity errors relative to TSR and DMAR are respectively indicated via TSR_PARITY_ERROR and DMAR_PARITY_ERROR. Parity errors relative to FIFOR are respectively indicated via RFM_PARITY_ERROR and TFM_PARITY_ERROR.

Relative to TSR parity errors, indicated by RSM via TSR_PARITY_ERROR, note should be taken in FIG. 26 that the actual indication occurs on one of two lines (an odd or even line) as suggested by the notation "TSR_PARITY_ERROR (ODD/EVEN)". When RSM encounters a parity error during access to TSR it determines if the address used is that of an odd or even numbered basic channel and presents error indication to INT on the respective odd or even TSR_PARITY_ERROR line. This is done to prevent INT and RSM from logging the error status to the wrong basic channel space in TSR.

Referring to FIG. 3, synchronous interrupt processing (by INT of CEISR and EOPISR status parameters) is the last IDLC function to be concluded relative to slot transitions. Thus, for instance, if INT is presented instantly with a time slot indication (RSM_TSI) pointing to an even numbered basic channel while RSM is fetching the pre-CCR parameter of a next odd numbered basic channel an indication of TSR parity error at that instant would produce ambiguous effects. If INT reacted instantly to the indication, and logged error status to its internal CEISR register (discussed below) that status would be written by RSM to the space of the even numbered channel. So instead, the indication is given with odd/even significance and INT determines if it should delay generation of associated status until the time slot indication changes.

Of course, RSM logic could be constrained to delay its TSR parity error indication to INT to a point in time where it would not be ambiguous. But for convenience it was decided presently that such occurrences could be handled by presenting an odd/even association to INT and having it determine from the time slot indication whether its generation of CEISR error status relative to the parity error event should be delayed. When TSR Parity Error is handled this way, by odd/even association, INT must acknowledge its handling of the respective indication by returning an odd/even reset indication to RSM—shown at INT_PE_RST (ODD/EVEN) in the figure—so that RSM can deassert its indication.

The above TSR parity error handling is further complicated when HyperChannels are active, since then the RSM time slot indication may point to an odd numbered reference slot while an even numbered constituent slot is concluding. Thus, if RSM encounters a TSR parity error relative to the odd numbered slot following the constituent slot and presents odd error indication to INT the resulting action would be ambiguous (INT would see odd parity error indication and odd time slot indication, and instantly generate error status which then would be written by RSM to the TSR space associated with the odd reference slot, rather than the space associated with the slot following the constituent slot). This possibility is eliminated presently by providing INT with an indication RSM_LSBS (denoting the least significant bit of the slot actually occurring at the BTDM) which in this situation would indicate the even numbered association of the constituent slot. INT would then recognize a mismatch between the least significant bit of the time slot indication and the LSBS and delay its generation of TSR error status accordingly.

In respect to each parity error source indicated in FIG. 26 (TSR, RFM, TFM, DMAR), a unique hardware error interrupt is generated for the channel in which the error occurred. In respect to error associated with imminent overflow of an EOPISR queue, an IQO bit is set in the final (last entered) EOPISR status word in the queue (so that when that word is retrieved by the IOP the overflow error is manifested to the IOP).

INT_CHN state machine receives inputs from 2 registers, the ICR (IDLC Configuration Register) in SIO, and the HPCR (HDLC Protocol Configuration Register) in RSM. ICR contents are programmed by IOP at IDLC initialization and are not channelized (apply unchanged to all channel processes). HPCR is channelized (different for each channel) and is loaded from each channel's TSR space (see FIG. 6) during time swapping. Contents of each channel's HPCR word are programmably set by IOP/SIO. Presently relevant fields in these registers are specifically described below.

INT_CHN state machine manages the EOPISR queue in one of two programmable modes based on the QM bit setting in the ICR register; single status mode or multi-status mode. The ICR/QM bit value is programmed by IOP at IDLC initialization. INT receives that bit at ICR_QM (FIG. 26), and supports Single Status Word or Multiple Status Word formation based on the QM bit value. In single status mode, a single interrupt vector is generated and passed to the IOP for each event entry on the EOPISR queue. In multi-status mode a single vector can be generated for multiple status event entries on the EOPISR queue.

There are performance advantages to multi-status mode in terms of reduced interrupt path length in the IOP interrupt handling routines, but a disadvantage of added routine complexity in respect to management of IOP access to the queue. When using multi-status mode, IOP acknowledges the number of status words it has removed from the queue, by writing a related value in the (channelized) HPCR register and flipping the polarity of a toggle bit in that register; refer to descriptions below of SWRC (status word read count) and TOGGLE fields in HPCR. These fields are input to INT at HPCR_EOP_TOGGLE and HPCR_MIC_ACK (FIG. 26).

The Previous Toggle bit Value (PTV) in CEISR register 262 is compared against HPCR_EOP_TOGGLE for a mismatch indicating that IOP has accessed the respective channel's queue and removed one or more entries therefrom. This mechanism is used by INT to protect against overwriting unremoved/pending queue entries. The Number of Outstanding Vectors (NOV) really means the number of status words on the EOPISR queue when INT is in multi-status mode. NOV will be decremented by INT with the value in HPCR_MIC_ACK after IOP acknowledges the number of status words removed from the queue. This frees associated locations in TSR to be used again, thus maintaining circularity of the queue.

EOPISR queue access by the IOP involves the following sequence of operations: (1) read CEISR (from TSR via SIO) to get pending status word count NOV (number of outstanding vectors) and queue offset address NSL (next status location) for beginning of pending entries; (2) read EOPISR status word or words from the queue (one word in single status mode, one or more words, up to 16, in multi-status mode); (3) read HPCR (from TSR); and (4) write updated (inverted) toggle polarity, SWRC and LSA (link station address) values if necessary to HPCR/TSR (as noted previously, INT monitors the HPCR toggle and SWRC functions and updates associated CEISR parameters PTV and NOV when appropriate.

Reading of queue entries in single status mode does not require explicit IOP acknowledgement (since each vector pertains to one and only one status word) and the TOGGLE and SWRC bits are not used/changed in this mode. Disadvantages of Single Status mode are indicated below relative to the number of status words which can be stored in the EOPISR queue (14) and the additional path length of the IOP interrupt handling routine. In this mode, an interrupt request and vector are passed to IOP for each queue entry, and INT detects queue overflow (causing setting of IQO bit in last queue entry) when the number of pending entries in the queue/vectors reaches 14 (although the queue capacity is 16, this precaution is needed because of vector queueing in SIO, and absence of specific IOP acknowledgement of queue entry removals). Although the IOP does not specifically acknowledge queue entry removals in this mode, it is required to perform the entry removal while in the interrupt handling routine (i.e. it can not interrupt the routine and return to its task level until this is done, if overwriting of status on the queue is to be avoided).

In multi-status mode, IOP must explicitly acknowledge the number of status words which it has read relative to each vector by writing a corresponding value in the SWRC field of HPCR. INT detects Interrupt Queue Overflow (IQO) when 16 vectors are pending on the queue (and sets the IQO bit in the last entry to 1). In this mode, IOP execution of queue access can be delayed by returns to task level since multiple entries can be removed in one series of TSR accesses.

When a vector associated with an IDLC channel condition is ready for presentation to SIO, INT_CHN state machine interfaces to the SIO partition via the SIO_CHN_BSY, INT_CHN_VECTOR and INT_CHN_REQ signals. INT_CHN monitors SIO_CHN_BSY signal to determine if SIO's channel vector latch is busy or available. If available the vector (INT_CHN_VECTOR) is latched into the SIO partition where SIO manages presentation of vectors on the IOP processor bus.

The 8 bit vector value generated by INT_CHN to SIO, relative to IDLC channel conditions (process end events and parity errors), uses the 2 bit Channel Interrupt Vector Offset (CIVO) in the ICR register to indicate the offset in IOP memory of a space containing the associated table entries for all channels, the 5 bit channel time slot indicator from RSM_TSI to further distinguish locations of entries associated with the source IDLC channel, and a single bit generated by INT_CHN to distinguish the location of the particular entry associated with the interrupt (that bit being one value if the associated interrupt relates to an end process event and an opposite value if the associated interrupt relates to a channelized parity error.

If SIO_CHN_BSY is active when INT has a vector to transfer, INT_CHN examines the same indication during subsequent time slots in which the respective channel is served. Thus, INT_CHN competes on a channelized basis in its service of all IDLC channels for access to SIO and its single channel vector latch. Access to SIO's channel vector latch follows no algorithm and is random, based upon many variables (e.g. IOP interrupt routine path lengths, IDLC channel frame sizes, etc.). The EOPISR queue depth of 16 entries per channel offers a very low probability of queue overflow on any channel.

INT_CHN indicates completion of execution by setting the INT_DONE signal, which indicates to RSM that the CEISR is stable and available for swapping. This should occur prior to the end of time slot indication (RSM_INT_EOS) from RSM. If INT_DONE is not active at this time, RSM determines that a logic/hardware error has occurred and sets the LTO (logic time-out) bit in IHEISR (see description of IHEISR bits below). INT_CHP state machine monitors IHEISR and generates the associated interrupt request/vector.

INT_CHP state machine operates continuously across time slots, and manages chip level interrupt vectors relative to any of three possible sources: L1 hardware, L1 channel, IDLC hardware. L1 hardware errors and channel conditions are respectively indicated to INT_CHP by L1_CHP_VRQ and L1_CHN_VRQ (FIG. 26). The source relative to IDLC hardware errors is indicated by settings of bits in the source field section of the IHEISR register (FIG. 27); bit ITE (Interface Timing Error) denoting a failure of synchronization between IDLC and L1 circuits, bit LTO (Logic Timeout) denoting a failure of IDLC logic to complete an operation within a critical time period (e.g. activation of INT_DONE prior to RSM EOS as discussed above), bit ESD (error state detected) denoting that a state machine in an IDLC partition has transitioned to an unused/forbidden state, and bit DTO (DMA Timeout) denoting failure of bus access between DMA and the IOP bus. If any of these bits are set the signal line IDLC_CHP_VRQ, from IHEISR register to INT_CHP, is active (i.e. IDLC_CHP_VRQ represents the logical OR of IHEISR bits ITE, LTO, ESD and DTO).

INT_CHP interfaces to SIO via SIO_CHP_BSY, INT_CHP_VECTOR, and INT_CHP_REQ signals as shown in FIG. 26. SIO_CHP_BSY is fed back to INT from a chip vector latch in SIO which is settable by INT_CHP_REQ, which is presented from INT to SIO in association with INT_CHP_VECTOR. The latter vector output is latched in SIO when SIO_CHP_BSY is inactive, and distinguishes the interrupt source as one of the above-mentioned three. SIO_CHP_BSY when active indicates that a vector/request has been received from INT but not yet transferred from SIO to IOP.

The INT_CHP_VECTOR value contains the 6 bit IDLC Interrupt Vector Offset value (IIVO) and a 2-bit value generated by INT_CHP, The offset value is extracted by INT from the ICR register in SIO and represents an offset, relative to a base location in the IOP memory space, of a group of table lookup entries associated with hardware related interrupt conditions reportable by INT. The INT generated 2 bit value represents the location within the group of a particular entry associated with the particular condition being reported. Together the 8 bits are used by IOP to access the particular table entry and link via the latter to an IOP interrupt handling routine appropriate for retrieving the related status information from either IHEISR register in INT or from registers in the L1 circuits.

12.2.7 INT State Machines 12.2.7.1 INT CHN State Machine

If SIO_RESET, then state=0

State 0 (WAIT FOR RSM START PULSE)

If RSM start pulse (RSM_INT START) is inactive, remain in state 0.

If RSM start pulse is active and Interrupt Mode (IM in CEISR) is '00' (indicating INT is being activated for the first time on this channel), reset FIFOR parity error indication (PE in CEISR), reset status word available indication (SWA in CEISR), set IM to '11 - normal mode'; go to state 1.

If RSM_INT_START is active and IM is '10 - disabled' (indicating FIFOR parity error) or '01- disabled' (indicating TSR parity error), then EOPISR queue for this channel has been 'shut down'; set EOP WAIT STATE LATCH to 'CLEAR EOPISR STATUS'; go to state 7.

Ignore TSR parity error if LSBS and least significant bit of RSM_TSI are different (see above discussion of race condition possibilities relative to such errors). if RSM_INT_START is active and IM is '11 - normal' then proceed with normal EOPISR queue processing state movements; If SWA/CEISR active (status available from previous slot process of this channel), increment the Next Status Word Location (NSL in CEISR), reset SWA and go to state 1.

State 1 (Check for Channelized TSR, RFM or TFM Parity Error; if none, check for IOP Acknowledgement Of EOPISR Queue Status Readout; if none, check for EOPISR Queue Overflow Condition)

Check for channelized parity error. If PE bits in CEISR indicate parity error (implying occurrence of not yet reported parity error relative to TSR or FIFOR in prior service of this channel), or if TSR_PARITY_ERROR or RFM_PARITY_ERROR or TFM_PARITY_ERROR is currently active, examine SIO_CHN_BSY to determine availability of channel vector latch in SIO to receive another channelized vector (reference SIO description below, and item 297 in FIG. 43).

If SIO_CHN_BSY is active then set EOP WAIT STATE to 'CLEAR EOPISR STATUS'; go to state 7.

If SIO_CHN_BSY not active, generate a Channelized Hardware Error Interrupt vector for this channel, latch it in SIO channel vector latch, and proceed with next action to identify cause of error.

If the cause was RFM_PARITY_ERROR or TFM_PARITY_ERROR, set IM mode to '10 - disabled FIFO parity error'; go to state 2

If the cause was TSR_PARITY_ERROR, set IM to 'disabled TSR parity error'; go to state 2.

If no parity errors are indicated and status is "waiting for vector acknowledgement" (WVA bit active in CEISR register 262), then compare Previous Toggle bit Value (PTV) in CEISR register with toggle bit in HPCR register settable by the IOP (HPCR_TOGGLE input).

If PTV and HPCR_TOGGLE bits are NOT the same then IOP has acknowledged retrieval of status from the EOPISR queue. The number of words read indication SWRC in HPCR (as indicated by HPCR_MIC_ACK input to this state machine) is valid. Go to state 4.

If PTV and HPCR_TOGGLE bits are the same then IOP has not acknowledged EOPISR transfer for this channel and EOPISR is still pending on the queue relative to the last vector generated for the queue; no further vectors are to be generated for this channel. Proceed with next operation to check for queue overflow.

If the EOPISR queue has overflowed for this channel (IQO set in CEISR), then set the EOP WAIT STATE to 'CLEAR EOPISR STATUS'; go to state 7.

If EOPISR queue is not about to overflow for this channel, set EOP WAIT STATE to 'STORE EOPISR STATUS'; go to state 7.

If no TSR or FIFO parity errors and not waiting for IOP vector acknowledgement (WVA inactive), go to state 6.

State 2: (Wait for SIO_CHN_BSY)

If SIO_CHN_BSY is available, activate INT_CHN_REQ, and remain in same state

If SIO_CHN_BSY is busy and vector was for Channelized Hardware Error Interrupt, set EOP WAIT STATE to 'CLEAR EOPISR STATUS'; go to state 7.

If SIO_CHN_BSY is busy and vector was for EOPISR status, check EOPIS queue overflow.

If EOPISR queue has overflowed (IQO in CEISR active), set EOP WAIT STATE to 'CLEAR EOPISR STATUS'; go to state 7.

If EOPISR queue has NOT overflowed (IQO in CEISR Inactive) then set EOP WAIT STATE to 'STORE EOPISR STATUS'; go to state 7.

State 3 (Check EOPISR queue overflow condition)

Check EOPISR queue overflow on this channel, by comparing NOV to the maximum number of EOPISR STATUS words based on the ICR_QM mode bit. If QM bit is 1 (indicating multi-status mode) then maximum number of EOPISR STATUS words is 16. If QM bit is 0 (indicating single_status mode) then the maximum number of EOPISR STATUS words is 14.

If QM bit is active and NOV count is 16 then set queue overflow bit (IQO in EOPISR) to indicate the queue has overflowed.

If QM bit is inactive and NOV is 14 then set queue overflow bit (IQO in EOPISR) to indicate the queue has overflowed.

Set EOP WAIT STATE to 'STORE EOPISR STATUS'; go to state 7.

State 4 (Adjust vector count based on IOP acknowledgement)

If the number of status words acknowledged HPCR_MIC_ACK by IOP is greater than the number of status words currently stored (NOV), assume that either an IOP programming error or an undetected TSR parity error has occurred. In either event generate a Channelized Hardware Error, set PE to '11 parity error detected while reading TSR'; go to state 1.

If IOP acknowledges (HPCR_MIC_ACK) a number greater than zero, then decrement both the IOP acknowledge (HPCR_MIC_ACK) and vector count (NOV) values, remain in state 4. Note it takes one state transition for each decrement and compare.

If HPCR_MIC_ACK equal zero then reset waiting for acknowledgement (WVA); go to state 7.

State 5 (Not used)

State 6 (Generate EOPISR vector)

If current vector count NOV is greater than zero then a vector needs to be generated for this channel.

If the SIO_CHN_BSY signal is busy (active) then skip vector generation during this time slot, try again next time slot, but continue with normal EOPISR status processing below.

If the EOPISR queue has overflowed (IQO set in CEISR)

set the EOP WAIT STATE to 'CLEAR EOPISR STATUS'. If the queue has not overflowed set the EOP WAIT STATE to 'STORE EOPISR STATUS' Go to state 7.

If the SIO_CHN_BSY signal is available, generate an

EOPISR vector for this channel. If queue mode (ICR_QM) is multi-status then capture current toggle bit (HPCR_TOGGLE) in HPCR register (for future comparison) and set wait for vector acknowledgement (WVA) active. If queue mode (ICR_QM) is single status decrement the vector count (NOV) register; go to state 2.

If current vector count NOV equals zero then no vector needs to be generated; go to state 7.

State 7 (Wait EOPISR status)

Wait for status available indication from transmit or receive element (SWA active)

If end of slot indication received from RSM (RSM_INT_EOS), go to state 0

If TSR_PARITY_ERROR active, set PE to '11 - parity error detected while reading TSR'. Set EOP WAIT STATE to 'CLEAR EOPISR STATUS', remain in state 7.

If SWA bit is active (indicating either receiver or transmitter partition has latched status into EOPISR STATUS LATCH) and EOP WAIT STATE is 'STORE EOPISR STATUS' then increment NOV, and set EOP WAIT STATE to 'IGNORE EOPISR STATUS'; go to state 3.

If SWA is active and EOP WAIT STATE is 'IGNORE EOPISR STATUS' then remain in state 7.

If SWA is active and EOP WAIT STATE is 'CLEAR EOPISR STATUS' then reset the SWA bit, remain in state 7.

If SWA is active and EOP WAIT STATE is set equal to the current EOP WAIT STATE, remain in state 7.

12.2.7.2 INT CHP State Machine

If SIO_RESET then state=0

State 0: Wait L1_CHP_VRQ, L1_CHN_VRQ, or IDLC_CHP_VRQ active

If L1_CHP_VRQ active, give associated vector to SIO; go to state 4.

If L1_CHN_VRQ active, give vector to SIO and go to state 2.

If IDLC_CHP_VRQ active, give vector to SIO and go to state 1.

State 1: Wait For L1_CHP_VRQ or L1_CHN_VRQ active, or IDLC_CHP_VRQ inactive

If L1_CHP_VRQ active give vector to SIO; go to state 5.

If L1_CHN_VRQ active give vector to SIO; go to state 3.

If IDLC_CHP_VRQ inactive go to state 0.

State 2: Wait L1_CHP_VRQ active, L1_CHN_VRQ inactive, or IDLC_CHP_VRQ active

If L1_CHP_VRQ active give vector to SIO; go to state 6.

If L1_CHN_VRQ inactive go to state 3.

If IDLC_CHP_VRQ active give vector to SIO; go to state 0.

State 3: Wait L1_CHP_VRQ active, L1_CHN_VRQ inactive, or IDLC_CHP_VRQ inactive

If L1_CHP_VRQ active give vector to SIO; go to state 7.

If L1_CHN_VRQ inactive go to state 1.

If IDLC_CHP_VRQ inactive go to state 2.

State 4: Wait L1_CHP_VRQ inactive, L1_CHN_VRQ active or IDLC_CHP_VRQ active

If L1_CHP_VRQ inactive go to state 0.

If L1_CHN_VRQ active give vector to SIO; go to state 6.

If IDLC_CHP_VRQ active give vector to SIO; go to state 5.

State 5: Wait L1_CHP_VRQ inactive, L1_CHN_VRQ active, or IDLC_CHP_VRQ inactive

If L1_CHP_VRQ inactive go to state 1.

If L1_CHN_VRQ active give vector to SIO; go to state 7.

If IDLC_CHP_VRQ inactive go to state 4.

State 6: Wait L1_CHP_VRQ inactive, L1_CHN_VRQ inactive, or IDLC_CHP_VRQ active

If L1_CHP_VRQ inactive go to state 2.

If L1_CHN_VRQ inactive go to state 4.

If IDLC_CHP_VRQ active give vector to SIO; go to state 7.

State 7: Wait L1_CHP_VRQ inactive, L1_CHN_VRQ inactive, or IDLC_CHP_VRQ inactive If L1_CHP_VRQ inactive go to state 3.

If L1_CHN_VRQ inactive go to state 5.

If IDLC_CHP_VRQ inactive go to state 6.

12.2.8 INT Registers

Details of state parameters CEIS and EOPIS have been given above. Notes relating to CEISR usage, details of state function IHEISR and details of configuration designating functions ICR and HPCR are given next.

12.2.8.1 CEISR (FIG. 28)

Individual field titles and functions are generally indicated above. Specific function restrictions and notes are given below.

WVA (Waiting For Vector Acknowledgement) at 28-1 indicates pendency of vector acknowledgement from IOP. when acknowledgement is pending, INT is disabled from generating new interrupt vectors.

NOV (5 bits; Number Of Outstanding Vectors) at 28-2 indicates number of valid outstanding vectors on the queue. When IOP acknowledges interrupt it can access this value to determine the number of valid EOPISR entries waiting to be read from the queue. INT uses this value to determine when a queue overflow condition is occurring.

PTV (Previous Toggle Bit Value) at 28-3 indicates previous value of the HPCR toggle bit; by comparing this bit to the HPCR toggle bit, while operating in multi-status mode, INT determines when IOP has accessed the EOPISR queue.

IQO (Interrupt Queue Overflow)

indicates if EOPISR queue has overflowed.

PE (Parity Error; 2 bits)

indicates one of the following states relative to IDLC RAM's: no parity error detected; parity error detected while reading TSR; parity error detected while reading FIFOR.

this field should be read by IOP each time a channelized hardware error interrupt is generated by INT for a specific channel.

IM (Interrupt Mode)

these bits indicate one of the following operating modes of IDLC relative to the associated channel: initialized (pending activation by RSM), disabled due to TSR parity error, disabled due to FIFOR parity error, enabled (for normal operation).

SWA (Status Word Available)

indicates when status is available for storage on the EOPISR queue (by RSM).

NSL (Next Status Word Location; 4 bits)

points to offset location within current channel's EOPISR queue segment in TSR at which next EOPIS status is to be stored; when status is available to be stored (SWA active), RSM uses this field as the lower 4 bits of the TSR address to access the queue (the other bits are determined by the channel number)

NOTES new CEIS values from INT are written by RSM to TSR a maximum of 3.8 microseconds after an associated vector has been generated; thus any attempt to access CEISR/TSR prior to a 3.8 microsecond delay after vector generation may result in reading old CEIS information. Thus, access to this parameter by IOP/ISO should be delayed for at least 3.8 microseconds after IOP receipt of the vector (normally, the time required in IOP for leaving task mode and linking to the interrupt handling routine would exceed 3.8 microseconds, so no special delay action by IOP should be needed to meet this requirement).

12.2.8.2 IHEISR

Referring to FIG. 27, this register has 10 actively used "status indicating" bits (WPE, APE, LID, PWE, PIA, DPE, NDS, WSE, PPE, DBE) and 4 actively used "source" indicating bits (ITE, LTO, ESD, DTO) having the following uses:

WPE (Write Protect Error) at 27-4 denotes attempt by IDLC to perform unauthorized write to a protected portion of its allotted address space (the writing action is inhibited)

APE (Address Parity Error) at 27-5

IDLC/SIO has detected parity error in the address used during a programmed operation by IOP via SIO (if the operation was a write it is suppressed)

LID (Lost Interrupt Detected) at 27-6

IDLC (SIO) has detected an interrupt acknowledge cycle (IACK) but has no pending vector to give to IOP PWE (Programmed I/0 Write Error) at 27-7 indicates invalid attempt by IOP/SIO to perform back to back write operations relative to a 32 bit register location in the IDLC using non-sequential PIA (Programmed I/0 Invalid Address) at 27-8 indicates invalid attempt by IOP/SIO to access a reserved portion of the system address space allotted to the IDLC DPE (Data Parity Error) at 27-9 indicates detection of data parity error during programmed I/0 write operation by IOP/SIO to an IDLC RAM. Addressed location not updated when this error is detected.

NDS (No Data Strobes) at 27-10

Neither of two data strobes expected during a read or write relative to an IDLC address (upper or lower strobe) was active during the operation.

WSE (Write Data Strobe Error) at 27-11

Both upper and lower data strobes were inactive on a write sequence to internal IDLC registers defined to be 32 bits wide.

PPE (Programmed I/0 Parity Error) at 27-12

Data parity error detected during programmed read (by IOP/SIO) of IDLC address.

DBE (DMA Bus Error) at 27-13

BUS_ERROR active during a DMAC/MIO operation relative to IOP bus. IOP must read its status registers for more details, but this usually indicates either an address parity error or double bit ECC error detected (by IOP) during the operation.

ITE (Interface Timing Error) at 27-14 when IDLC was not prepared to react (i.e. a lack of synchronization between IDLC and L1; most likely due to a hardware failure).

LTO (Logic Time-Out) at 27-15

Indicates failure of IDLC logic to complete required operation within a predetermined allotted time (usually indicates internal hardware failure).

ESD (Error State Detected) at 27-16

Invalid state detected in an IDLC partition state machine unit. Usually, due to hardware failure.

DTO (DMA Time-Out) at 27-17

IOP did not respond to an IDLC DMA/MIO request within 50 microseconds. This time is normally sufficient for MIO to gain control of IOP bus, and failure to do so generally indicates hardware error.

12.2.8.3 ICR

The fields in this register are detailed in the SIO description below (refer to section 12.3.2).

12.2.8.4 HPCR

Details of the fields contained in this register and their usage are given in the RSM description (refer to section 7.3)

12.2.9 Interrupt Handling in HyperChannels

As noted earlier, HyperChannels are formed by combining basic channels and associating the corresponding constituent slots (relative to each frame of BTDM slot recurrence) with a reference (first appearing) constituent slot.

Interrupt indications received during constituent slots of HyperChannels are handled as for other channels, but channelized error and event status are posted relative to the reference slot. This occurs in essence transparent to the logical operation of INT (ignoring the race condition possibilities discussed above relative to TSR parity errors occurring while even or odd numbered constituent slots were in process relative to a HyperChannel having an opposite odd or even numbered slot position), since the storage of the related status is controlled by RSM and its time slot indication (RSM_TSI). The time slot indication during service of a non-reference constituent slot will point to the reference slot and cause related interrupt status to be stored relative to the TSR space allocated to the reference slot.

The exception noted earlier, relative to TSR parity error occurrences, is dealt with by having RSM present INT with indications enabling INT to determine the appropriate time for generating status so that it is properly directed to a reference slot space or another space as appropriate.

12.3 SIO Partition

12.3.1 SIO Operations

SIO interfaces between INT and the IOP, for conveying interrupt requests and associated vectors to the IOP and for providing IOP access to individual register and RAM address space locations throughout the IDLC; both for supporting IOP retrieval of interrupt status and/or diagnostic information and for enabling the IOP to programmably establish initial states of IDLC elements and channels. When communicating with the IOP bus, SIO is a "slave" of the IOP; i.e. all of its operations for transferring information over the IOP bus are dependent upon IOP initiative for execution. Also, its operations relative to the IOP and other IDLC elements are conducted in asynchronous time relation to processing operations in IDLC channels.

12.3.2 SIO Logical Organization

Figure 32:
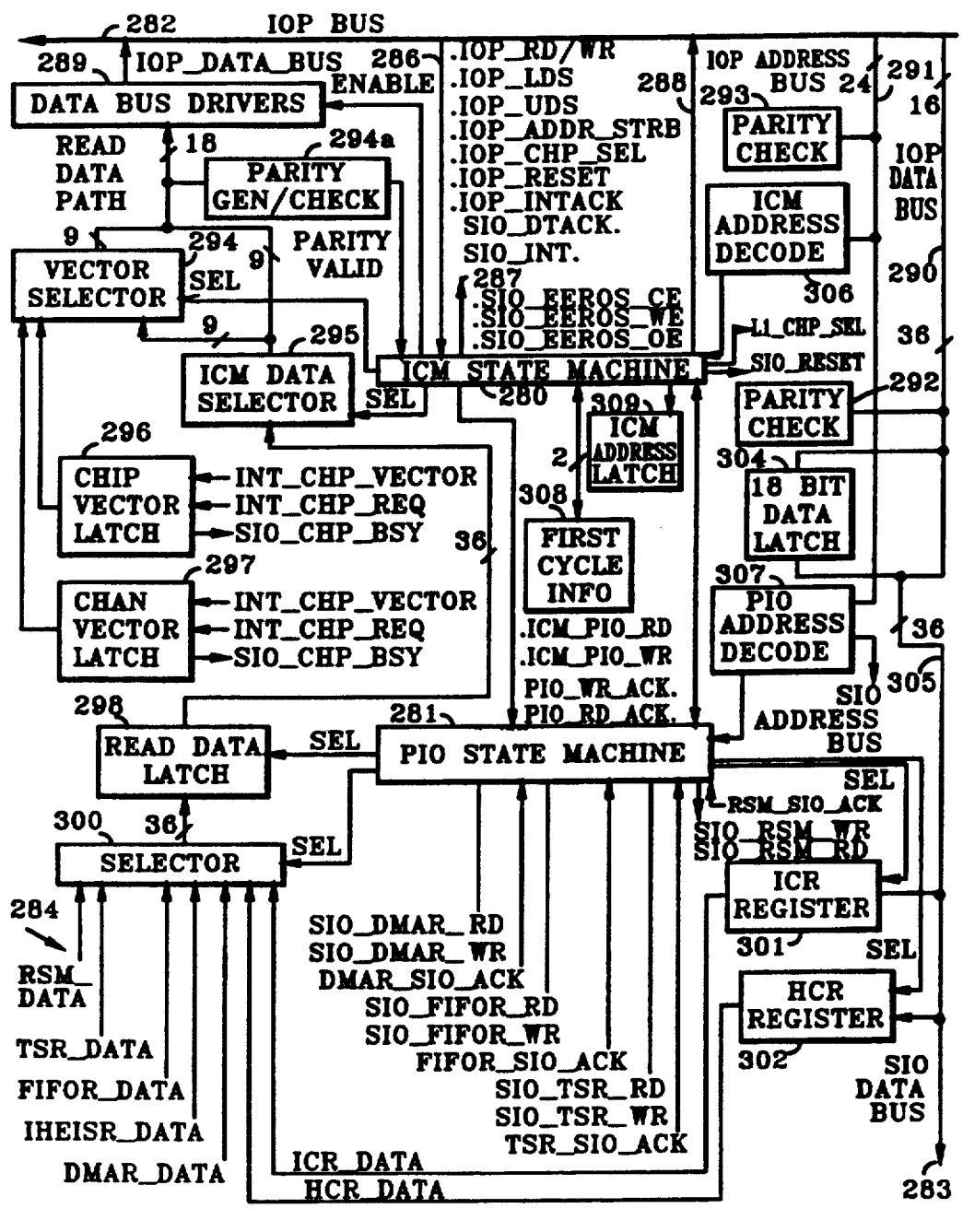
FIG. 32 is a block diagram of the slave I/O partition SIO in the IDLC.

FIG. 32 shows the logical organization and external interfaces of the SIO partition. This partition interfaces within the IDLC to the INT partition, to all IDLC RAM's and to major registers in all other partitions. Externally, it interfaces to the IOP bus and L1 circuits.

Logical functions of the partition are performed primarily by two independently operating state machine units 280 (ICM or IOP Control Manager state machine) and 281 (PIO or Program I/O Mapper state machine). As suggested by their names, the ICM state machine is responsible for interfacing to the IOP bus 282, and the PIO state machine is responsible for the movement of data over the programmable I/O interface 283-284 between SIO and the IDLC RAM's and other partitions. The ICM state machine is solely responsible for interfacing to the INT partition with respect to transferral of interrupt requests and vectors from the latter to the IOP bus, and also operates to control transfers of IDLC status information from latches 285 into which such data is written under control of PIO state machine.

The ICM state machine interfaces directly to the IOP bus at 286-288, for exchanging control signals with the IOP which control transfers of data between SIO and the IOP. These control signals are designated in a notation "X_Y" where X is the driving source and Y is the signal function. A period (".") is placed either to the left or right of the signal name to associate that name with the line respectively to the left or right. For example, ".IOP_INT_ACK" associates with line 286 to its left (driven by the IOP) and represents the latter's acknowledgement of receipt of an interrupt request/vector set; and "SIO_INT." associates with line 288 to its right and represents an interrupt request indication driven by ICM/SIO.

Data outbound to the IOP is transferred from SIO bus driver circuits 289 to the IOP bus under enabling control of ICM state machine. Data inbound from the IOP bus is received at 290 along with IOP-driven address signals at 291. Inbound data and addresses are respectively checked by parity check circuits 292 and 293 having not-shown output connection to ICM for indicating errors to the latter.

Outbound data is presented to bus drivers 289 via selector circuits 294 and 295 both controlled by ICM state machine 280. Selector circuits 294 receive inputs from interrupt vector latch sources 296 and 297. Latches 296 receive hardware error vectors sent to it from INT under the control of INT_CHP state machine described above. Latches 297 receive channelized event/condition vectors under control of INT_CHN state machine described previously.

Selector circuits 295 receive data from read data latches 298. Latches 298 are loaded from outputs of selector circuits 300. Operations of circuits 300 and loading of latches 298 are controlled by PIO state machine 280. Circuits 300 selectively transfer data from RSM, TSR, FIFOR, DMAR, and several registers. The data path from RSM allows for transfer of the contents of the HPCR (HDLC Protocol Configuration Register) located in RSM. The other registers feeding selector 300 include the IHEISR register located in INT, and two SIO registers, ICR (IDLC Configuration Register) 301 and HCR (HyperChannel Configuration Register) 302. Details of ICR field assignments are given below, and details of the HCR fields are given in the HyperChannel description (section 15).

Figure 33:
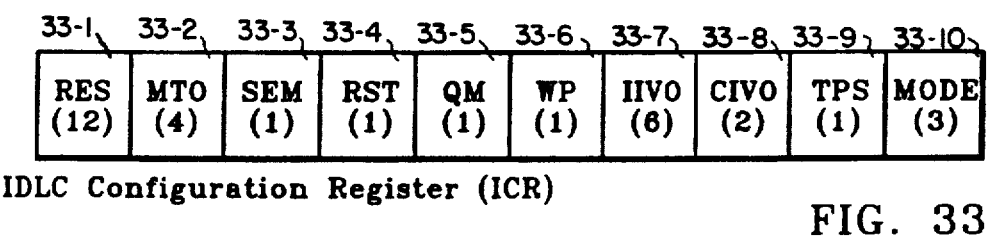
FIGS. 33 and 34 respectively illustrate the forms of configuration defining function ICR (IDLC configuration register) and HCR (HyperChannel configuration register) registered in SIO.
Figure 34:
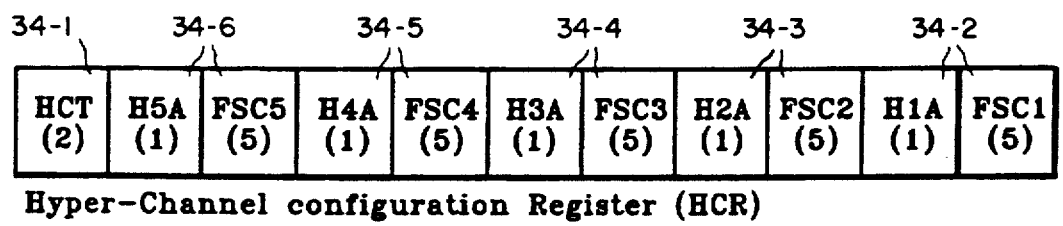
Figure 35:
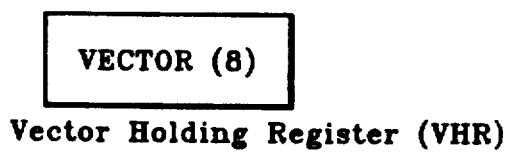
FIG. 35 illustrates the form of the VHR (vector holding register) status function registered in SIO.

Referring to ICR FIG. 33, the fields are:

RES (Reserved 12 bits) at 33-1

MTO (Master Time Out, 4 bits) at 33-2

Programmable timer values which determine the length of time the IDLC will wait for a slave acknowledgement when performaing a master operation SEM (Slave Error Mode, 1 bit) at 33-3

The IDLC will not acknowledge a slave access which is in error if the SEM bit is inactive. It will acknowledge and assert a bus error indication in an erroneous slave access if the SEM bit is active RST (Reset, 1 bit) at 33-4

This bit provides the software a means to do a system reset via the SIO QM (Queue Mode, 1bit) at 33-5

This bit determines whether single or multiple status words are to be taken when a vector is present (See INT logic element for detail)

WP (Write Protect, 1 bit) at 33-6

This bit is used to protect the contents of an Electrical Eraseable Read Only Storage (EEROS) element external to the IDLC IIVO (IDLC Interrupt Vector Offset, 6 bits) at 33-7

This field is used to generate the upper six bits of the eight bit manual vector for all IDLC chip level interrupts CIVO (Channel Interrupt Vector Offset, 2 bits) at 33-8

This field is used to generate the upper two bits of the eight bit manual vector for all channel level interrupts TPS (TSR Page Select, 1 bit) at 33-9

This bit is used to select either the upper or lower page of the TSR (Notice that a page in TSR is 1K×36)

MODE (3 bits) at 33-10

This field places the IDLC to operate in various modes: Normal operation, reset, forced error normal, forced error reset, and quiet. The various modes provide features for diagnostic purposes. When normal operation mode is set, the IDLC will start operating. When reset mode is set, the IDLC is in idle mode. When forced error normal mode is set, the IDLC operates in normal mode and forces parity error on all SIO write operations. When forced error reset mode is set, the IDLC operates in reset mode and forces error on all SIO write operations. When quiet mode is set, the IDLC operates in normal operation mode but no interrupts will be asserted by the IDLC.

The IOP bus provides an 18-bit interface to SIO (16 data bits, 2 parity bits), and SIO interfaces to the 32-bit wide internal data busing of the IDLC. Inbound and outbound data is transferred over the IOP bus in 18-bit parallel units (two 8-bit bytes with two associated parity bits) accompanied by upper and lower data strobe functions (.IOP_UDS and .IOP_LDS) at 286 indicating which bytes are valid. Outbound data is loadable into latches 298 in 36-bit parallel units (4 bytes plus parity) and can be transferred over L. the IOP bus in a two-cycle transfer operation, in which 18-bit parts of the data are multiplexed to the bus through ICM data selector 295.

Data inbound to SIO from the IOP bus is transferrable in 18 bit parallel data units (two 8-bit bytes and associated parity bits), accompanied by 24 bit address units designating the ultimate destination within the IDLC. The IOP can direct data to 32 bit wide registers in the IDLC by sequentially transferring a pair of 18 bit inbound data units over the bus in a two-cycle transfer operation. The first 18 bit unit of such a pair is latched into data latches 304, allowing for parallel presentation of the pair on 36-bit wide extension bus 305 (one 18 bit unit from latches 304 and the other directly from the IOP bus). Bus 305 (SIO_DATA_BUS) extends to the other IDLC partitions and RAM's.

Inbound address units are applied through ICM decoder 306 to ICM state machine 280, and through PIO decoder 307 to PIO state machine 281. Two bit latch 308 ("First Cycle Information" latch) is used by ICM to remember control parameters of the first cycle of a two-cycle back-to-back transfer operation; i.e. if the first cycle transfer is a read from the IOP or a write to the IOP, and if the least significant address bit of the first cycle is odd or even (the latter information is used to verify that the back to back transfers occurred on a word boundary).

In inbound data transfers to other IDLC elements, the address decoded by ICM decoder 306 is applied to ICM state machine and from the latter to ICM address latches 309 feeding into the PIO state machine. Using that information, PIO state machine determines when it should activate the output of its decoder 307 to provide the address SIO_ADDRESS_BUS which is distributed internally to other IDLC partitions and RAM's. The data path to RSM (interface 283 and RSM_DATA at 284) allows the IOP to perform diagnostic read and write functions relative to the internal latches of RSM which are used for time time swapping.

The ICM and PIO state machines intercommunicate through a request/acknowledge interface. ICM presents read and write requests (ICM_PIO_RD, ICM_PIO_WR) which PIO acknowledges (with PIO_RD_ACK, PIO_WR_ACK).

The ICM state machine has 32 possible states described below, by which it manages the asynchronous IOP bus protocol for slave transfers and the internal protocol for interfacing the 16 bit architecture of the bus to the 32 bit internal architecture of the IDLC. All control signals from the IOP (.IOP_RD/WR, .IOP_LDS, IOP_UDS, .IOP_ADDR_STRB, .IOP_CHP_SEL, .IOP_RESET, and .IOP_INTACK) are latched prior to synchronous input to the ICM state machine which runs on a 50 ns clock. Parity checking on both the address and data buses of the IOP (IOP_ADDRESS, and IOP_DATA_BUS) is done on a byte basis.

The start of an IOP bus cycle is indicated when both the chip select (.IOP_CHP_SEL) and address strobe (.IOP_ADDR_STRB) are active at the same time. The polarity of the .IOP_RD/WR signal indicates if the cycle is a write to the IDLC or a read to the IOP (logic 1 indicates read, logic 0 indicates write). The lower data strobe (IOP_LDS) and upper data strobe (IOP_UDS) indicate if the upper or lower 8 bits of the data bus (IOP_DATA_BUS) are valid on a write cycle or if either/both bytes are valid on a read cycle. Write cycles to 32 bit data registers in the IDLC require two 16 bit IOP bus cycles to occur and the ICM temporarily captures both data and parity in latches 304 on the first cycle. On the second cycle the ICM provides a full 36 bits (32 plus 4 bits parity) to the PIO State Machine.

Read cycles from 32 bit data registers also require two 16 bit IOP bus cycles, and the ICM selects the first 18 bits (16 data plus 2 bits parity) using selector 295 which multiplexes the 36 bits (32 data plus 4 parity bits) from the PIO's READ DATA LATCH 298. The ICM ADDRESS LATCH 309 is used at the end of the first cycle to latch the current IOP address for comparison on the second cycle to verify back to back addresses with only a change in address by comparing the second least significant bit A1 in the addresses of the two cycles (IOP addresses are numbered A0 thru A24). ICM First Cycle Information latch 308 remembers if the first cycle is a read or write, and the value of A1 bit. This information is used on the second 16 bit cycle of a 32 bit read or write. After two successful back to cycles or an ICM detected error cycle the First Cycle Information is cleared to a 'no history' value. ICM does data parity checking on read cycles to further isolate internal data parity errors from IOP bus parity errors.

ICM indicates completion of either a read or write cycle by driving its data acknowledge line (SIO_DTACK.) active. Any slave error detected during either a read or write bus cycle will cause the ICM to withhold activation of SIO_DTACK., and set the appropriate slave error status indication bit in the IHEISR register (refer to description of that register in the previous INT description). IOP times out the SIO_DTACK acknowledge from ICM on all read and write operations, and takes appropriate diagnostic or other action when error is indicated.

The mechanism for ICM to indicate there is an interrupt vector available for the IOP processor, is to asynchronously drive the "SIO_INT." signal active. This eventually causes IOP execution of task programs to be suspended and generation of an interrupt acknowledge cycle on the IOP bus. At this time the IOP drives ".IOP_INTACK" active causing either a chip vector (CHIP_VECTOR_LATCH) or channel vector (CHAN_VECTOR_LATCH) to be driven on the lower 8 bits of the IOP_DATA_BUS by ICM.

Vector latches 296 and 297 are referred to as Vector Holding Registers (VHR) and can also be accessed by the IOP in program I/O cycles (e.g. for diagnostic purposes).

ICM provides a layer of address decode (ICM_ADDRESS_DECODE) which determines selection of L1 circuits, PIO (other IDLC parts), or VHR on read and write data transfers (Note the VHR register are read only in normal SIO operation). The L1 decode causes the L1 chip select (L1_CHP_SEL) signal to become active and routes data between the IOP bus and the L1 circuits. The VHR decode allows read of the VHR registers. A decode into PIO space is defined to be an access to memory mapped I/O space in the IDLC which is distinct from addresses of the L1 circuits and VHR registers. Such decodes cause ICM to request service from PIO, by activation of .ICM_PIO_RD or .ICM_PIO_WR, depending on the direction of the IOP bus cycle. The PIO State Machine acknowledges ICM requests using the PIO_ICM_ACK signal.

PIO provides a further layer of address decode 307 (PIO ADDRESS DECODE) beyond that done in ICM. PIO manages multiplexing and latching of data between internal 36 bit IDLC busses (32 bit data, 4 bit odd parity, except DMAR which has a 32 bit data, 1 bit odd parity). PIO accesses TSR, FIFOR, and DMAR RAMs using request and acknowledge signals designating respective RAM's; e.g. SIO_TSR_RD (or WR) and TSR_SIO_ACK.

Via selector 300, PIO multiplexes 36 bit data buses from TSR, RSM, FIFO, DMACR, IHEISR register, ICR register, and HCR register to the READ DATA LATCH 298, during PIO read cycles. The RSM_DATA input to selector 300 is the read path to time swap registers in RSM for diagnostic purposes. The IHEISR_DATA, ICR_DATA, and HCR_DATA inputs to the selector are read paths from the IHEISR register (in INT), the ICR register, and HCR register respectively.

On write operations, PIO distributes 36 bit data via bus 283 (SIO_DATA_BUS) to the same IDLC elements. The ICR and HCR registers are used within the IDLC to distribute configuration and hyperchannel information to RSM partition (refer to RSM description and HCR and ICR bit descriptions previously given). SIO_IHEISR_SEL extends from PIO to INT and is used for selection of IHEISR register on transfers of IHEISR data to the IOP.

12.3.3 State Machine States 12.3.3.1 ICM State Machine

If SIO_RESET, then state=0.

State 0: Wait for IOP processor bus cycle start.

If IOP chip select (IOP_CHP_SEL) and IOP address strobe (IOP_ADDR_STRB) on IOP bus are both active then wait 50 ns to allow address parity to become stable; go to state 31.

If interrupt acknowledge (IOP_INTACK) and address strobe (IOP_ADDR_STRB) are active, then set VECTOR_SELECTOR path to transfer vector from CHIP_VECTOR_LATCH or CHAN_VECTOR_LATCH (CHIP_VECTOR_LATCH has higher priority than CHAN_VECTOR_LATCH). Note, even though the original cause for activating the IOP INT signal, which causes the IOP to respond with IOP_INTACK, may have been the loading of CHN_VECTOR_LATCH with a vector, the selection of either channel or chip vector by ICM is done during the IOP_INTACK cycle.

If no vectors are pending (i.e. CHP_VECTOR_LATCH and CHN_VECTOR_LATCH are empty), then set lost interrupt bit (LID) in IHEISR; go to state 1.

State 1: Vector Parity Generation Delay

Delay 1 clock cycle (50 ns) to allow valid parity to be generated at the output of VECTOR_SELECTOR 294. Go to state 2.

State 2: Vector parity check

Check parity of VECTOR SELECTOR at 294a.

If parity is good, assert data acknowledge (PIO_DTACK) on IOP bus; go to state 3.

If parity is bad, withhold data acknowledge PIO_DTACK to cause DTACK time out condition in IOP. Set Program I/O read Parity Error bit (PPE) status indication in IHEISR; go to state 14.

State 3: Reset SIO_CHN_BSY or SIO_CHP_BSY indication relative to INT (these signals are monitored by INT as indications of full or empty states of CHIP_VECTOR_LATCH and CHAN_VECTOR_LATCH.

Reset either SIO_CHP_BSY or SIO_CHN_BSY based on current multiplexed position of VECTOR_SELECTOR (i.e. If CHIP_VECTOR_LATCH is selected reset SIO_CHP_BSY, and if CHAN_VECTOR_LATCH is selected reset SIO_CHN_BSY).

If IOP_INTACK is inactive go to state 15.

If IOP_INTACK is active go to state 7.

State 4: Wait for PIO read acknowledge (PIO_RD_ACK) active or address strobe (IOP_ADDR_STRB) inactive.

If PIO acknowledges read (PIO_RD_ACK), save current IOP bus address bits in ICM address latch 309, and save First Cycle Information at 308 (to allow fast access of data from latches 298 on next consecutive read cycle, as then there is no need to request data from PIO State Machine) ; go to state 5.

If IOP address strobe (IOP_ADDR_STRB) is inactive then clear First Cycle Information to 'no history', as current cycle is prematurely ending.

If chip select (IOP_CHP_SEL) is active go to state 15.

If chip select (IOP_CHP_SEL) is inactive go to state 0.

State 5: Read Data Parity Generation Delay State

Wait for read data parity to be generated on ICM DATA SELECTOR bus by waiting for 1 clock cycle to elapse (i.e. delay 50 ns); go to state 6.

State 6: Check PIO Read Data Parity

Check parity on upper or lower data bus based on processor bus control signals IOP_UDS and IOP_LDS.

If parity is good then put out PIO_DTACK; go to state 14.

If parity is bad clear First Cycle Information to 'no history', set Program I/O read Parity Error (PPE) status indication in IHEISR register, DO NOT generate PIO_DTACK; go to state 14.

State 7: Wait for Interrupt Acknowledge To Go Inactive

If interrupt acknowledge (IOP_INTACK) signal goes inactive, go to state 0.

If interrupt acknowledge (IOP_INTACK) remains active remain in state 7.

State 8: Not Used

State 9: PIO Write, Wait for Data Strobes (IOP_UDS and/or IOP_LDS) to go Active or Address Strobe (IOP_ADDR_STRB) to go Inactive If either latched data strobe (IOP_UDS or IOP_LDS) has gone active then use unlatched data strobe signals to determine valid 16 bit bus cycles being requested. Check data parity from IOP DATA BUS. Verify valid back to back 16 bit cycles when First Cycle Information indicates previous cycle was a write.

If data strobes (UDS,LDS) or address strobes IOP_ADDR_STRB are active remain in state 9.

If parity is good and first half of 32 bit cycle then latch data, save First Cycle Information ('write with A1=0'), latch address in ICM ADDRESS LATCH and drive PIO_DTACK active to IOP; go to state 14.

If parity is good and second half of 32 bit cycle then issue write request to PIO (ICM_PIO_WR); go to state 10.

If parity is bad, set data parity error bit (DPE) in IHEISR, DO NOT generate PIO_DTACK; go to state 14.

If either unlatched IOP_UDS or IOP_LDS are inactive then IOP has failed to drive both data strobes active or programming restriction has been violated. In either case this is not a 16 bit cycle so set no data strobes (NDS) status indication in IHEISR, DO NOT generate PIO_DTACK; go to state 14.

If address strobe (IOP_ADDR_STRB) is inactive, assume IOP has had a PIO_DTACK time out and current cycle is prematurely ending; go to state 0.

State 10: Wait for PIO Write Acknowledge or Address Strobe Inactive

If PIO write acknowledge (PIO_WR_ACK) is inactive or address strobe (IOP_ADDR_STRB) is active then remain in state 10.

If PIO write acknowledge (PIO_WR_ACK) is active then save First Cycle Information ('write with A1=1'), generate PIO_DTACK; go to state 14.

If address strobe (IOP_ADDR_STRB) is inactive then assume PIO_DTACK time out, clear First Cycle Information to 'no history'; go to state 0.

State 11: Not used

State 12: Not used

State 13: Layer 1 Write, Wait Data Strobes Active or Address Strobes Inactive

If data strobes (IOP_UDS or IOP_LDS) remain inactive or address strobe (IOP_ADDR_STRB) remains active, remain in state 13.

If either latched data strobe (IOP_UDS or IOP_LDS) has gone active then put out L1 chip select (L1_CHP_SEL); go to state 14. Note that L1 chip itself is responsible for returning processor PIO_DTACK and not the IDLC although SIO partition must continue to monitor processor bus IOP_ADDR_STRB to determine when the current bus cycle ends (i.e. when processor address strobe goes inactive).

If address strobe (IOP_ADDR_STRB) goes inactive assume PIO_DTACK time out; go to state 0.

State 14: Wait for Address Strobe (IOP_ADDR_STRB) Inactive

If address strobe (IOP_ADDR_STRB) is active, remain in state 14.

If address strobe (IOP_ADDR_STRB) is inactive and chip select (IOP_CHP_SEL) is inactive go to state 0.

If address strobe (IOP_ADDR_STRB) is inactive and chip select (IOP_CHP_SEL) is active go to state 15.

State 15: Wait for Chip Select to go Inactive

If chip select (IOP_CHP_SEL) is active I/O, remain in state 15.

If chip select (IOP_CHP_SEL) is inactive go to state 0.

State 16: EEROS Read State 0

Hold SIO_EEROS_CE and SIO_EEROS_OE active to meet EEROS read access time (EEROS is optional diagnostic read only memory not pertinent to present description); go to state 17.

State 17: EEROS Read State 1

Continue to Hold SIO_EEROS_CE and SIO_EEROS_OE active to meet EEROS read access time; go to state 18.

State 18: EEROS Read State 2

Continue to Hold SIO_EEROS_CE and SIO_EEROS_OE active to meet EEROS read access time; go to state 19.

State 19: EEROS Read State 3

Continue to Hold SIO_EEROS_CE and SIO_EEROS_OE active to meet EEROS read access time; go to state 20.

State 20: EEROS Read State 4

Continue to Hold SIO_EEROS_CE and SIO_EEROS_OE active to meet EEROS read access time; go to state 21.

State 21: EEROS Read State 5

Continue to Hold SIO_EEROS_CE and SIO_EEROS_OE active to meet EEROS read access time. Data from EEROS should be valid on IOP DATA BUS, but allow another clock cycle for valid parity to be generated; go to state 22.

State 22: EEROS Read State 6

Continue to Hold SIO_EEROS_CE and SIO_EEROS_OE active to allow EEROS read data to be gated onto IOP DATA BUS from EEROS, generate IOP_DTACK signal; go to state 14.

State 23: Read Vector Holding Register (VHR)

Select either chip vector (CHIP_VECTOR_LATCH) or (CHAN_VECTOR_LATCH) channel vector based on active vector busy signals (SIO_CHP_BSY or SIO_CHN_BSY), giving higher priority to chip level vector generation.

If no vectors are latched (i.e. neither SIO_CHP_BSY or SIO_CHN_BSY is active), present hard coded empty vector value on data bus. Reset selected vector busy indication; go to state 1.

State 24: EEROS Write State 0

If EEROS Write Protect bit (WP) in the ICR register is not active, an EEROS write protect error is detected, set the WPE bit in the IHEISR, DO NOT generate PIO_DTACK; go to state 14.

If EEROS Write Protect bit (WP) in the ICR register is active, this is a valid EEROS write cycle, provide EEROS chip select (SIO_EEROS_CE) and EEROS write signal (SIO_EEROS_WE), generate PIO_DTACK; go to state 25.

State 25: EEROS Write State 1

Continue to hold SIO_EEROS_CE and SIO_EEROS_WE active to meet EEROS write setup and hold times; go to state 26.

State 26: EEROS Write State 2

Continue to hold SIO_EEROS_CE and SIO_EEROS_WE active to meet EEROS write setup and hold times; go to state 27.

State 27: EEROS Write State 3

Continue to hold SIO_EEROS_CE and SIO_EEROS_WE active to meet EEROS write setup and hold times; go to state 28.

State 28: EEROS Write State 4

Continue to hold SIO_EEROS_CE and SIO_EEROS_WE active to meet EEROS write setup and hold times; go to state 29.

State 29: EEROS Write State 5

Deactivate SIO_EEROS_CE and SIO_EEROS_WE signals to EEROS; go to state 30.

State 30: EEROS Write State 6

Generate IOP_DTACK signals to IOP; go to state 14.

State 31: Address Parity Check, Determine Slave Read or Write, Determine PIO memory mapped access, L1 memory mapped access, or Vector Holding Register (VHR) access.

If IOP address parity is bad, set address parity error (APE) bit in IHEISR, DO NOT generate PIO_DTACK; go to state 14.

If processor bus rd/wr signal (IOP_RD/WR) indicates read cycle and Vector Holding Register memory map is decoded, go to state 23.

If IOP_RD/WR signal indicates read cycle and PIO memory map is decoded indicating an access to TSR, DMAR, or FIFOR, ICR register, IHEISR register, or HCR register then turn on data bus driver enable, select upper or lower PIO data bus multiplexer.

If the last read cycle access address in ICM ADDRESS LATCH matches the current IOP address and A1=1 then the data in PIO data latch is valid and can be directly gated on to IOP bus; go to state 5.

If current IOP address has A1=0 then the PIO partition must be accessed; output ICM_PIO_RD signal to PIO state machine; go to state 4.

If A1=1 and the last access was a write then this is a program I/O 32 bit write sequence error, set WSE status bit in IHEISR register, set First Cycle Information to 'no history', Do Not generate PIO_DTACK; go to state 14.

If IOP_RD/WR signal indicates read cycle and L1 addresses are decoded then set L1_CHP_SEL select active; go to state 14.

If the IOP_RD/WR signal indicates read cycle and EEROS memory map is decoded, go to state 16.

If IOP_RD/WR signal indicates write cycle and PIO memory mapped addresses are decoded then access to TSR, DMAC, FIFO's, ICR, IHEISR, or HCR is being attempted.

If A1=0 and the last access was a PIO write with address bit 1 (A1)=0 then current cycle is a program I/O write sequence error, set WSE bit in IHEISR, do not put out PIO_DTACK; go to state 14.

If A1=0 and last access was not a write cycle with A1=0 then this is a valid PIO write cycle for first 16 bits; go to state 9.

If A1=1 and last access was a write with A1=0 and previous address and current address match then this is a valid PIO read cycle for second 16 bits; go to state 9.

If A1=1 but either the previous cycle was not a write with A1=0 or the current and previous addresses do not match then this is a Program I/O write error, set PWE bit in IHEISR, DO NOT generate PIO_DTACK; go to state 14.

If IOP_RD/WR indicates a write and the L1 chip addresses are decoded, activate L1_CHP_SEL and go to state 13.

If IOP_RD/WR indicates write cycle and EEROS memory map is decoded go to state 24.

If PIO, EEROS, L1 Chip, or VHR register address was not decoded then a Program I/O invalid address in IDLC memory map was accessed, set the PIA bit in IHEISR register, DO NOT generate IOP_DTACK; go to state 14.

12.3.3.2 PIO State Machine

If SIO_RESET, de-activate all selects, acknowledgments and enables; go to state 1.

State 1: Wait ICM_PIO_RD or ICM_PIO_WR

Wait for a read ICM_PIO_RD or write ICM_PIO_WR request from the ICM.

If no requests are active remain in state 1.

If either ICM_PIO_RD or ICM_PIO_WR becomes active, begin decoding IOP ADDRESS using PIO ADDRESS DECODE logic and move to state 2.

State 2: Select partition based on address

If none of the partitions (TSR, DMACR, FIFO, or RSM) or none of the register (IHEISR, ICR or HCR) addresses were decoded by PIO ADDRESS DECODER then an invalid address was decoded, go to state 5.

If a valid address for a partition was decoded, enable select line (SIO_DMACR_RD, SIO_DMACR_WR, SIO_FIFO_RD, SIO_FIFO_WR, SIO_TSR_RD, SIO_TSR_WR, SIO_RSM_RD, or SIO_RSM_WR) to appropriate partition, based on the address decoded and the state of IOP_RD/WR signal; go to state 3.

If a valid address for a register was decoded and the IOP_RD/WR signal indicates a write cycle, enable the select line to the appropriate register to strobe the data from the SIO_DATA_BUS into the register, generate PIO_WR_ACK; go to state 4.

If a valid address for a register was decoded and the IOP_RD/WR signal indicates a read cycle, enable the PIO SELECTOR and READ DATA LATCH to the appropriate register, generate PIO_RD_ACK; go to state 4.

State 3: Wait Partition Acknowledgment for Read

Wait for the appropriate partition acknowledgement (DMACR_SIO_ACK, FIFO_SIO_ACK, TSR_SIO_ACK or RSM_SIO_ACK), or the ICM_PIO_RD signal to become inactive.

If no acknowledgement or ICM_PIO_RD remains active then remain in state 3.

If ICM_PIO_RD signal becomes inactive this indicates the IOP bus cycle is pre-maturely ending, set Program I/O read Parity Error bit (PPE) in IHEISR go to state 1.

If appropriate partition acknowledgement occurs, generate PIO_RD_ACK signal, go to state 4.

State 4 : Wait ICM request de-assertion

Wait for the ICM_PIO_RD or ICM_PIO_WR request to be deasserted.

If ICM_PIO_RD or ICM_PIO_WR are active remain in this state. If ICM_PIO_RD and ICM_PIO_WR are inactive go to state 1.

State 5: Invalid Address State

If an invalid address in PIO address space was decoded set Program I/O Invalid Address bit (PIA) in IHEISR register and do not respond to ICM request. This will cause the IOP to eventually timeout the data acknowledge IOP_DTACK. Wait for either ICM_PIO_RD or ICM_PIO_WR to go inactive; go to state 1.

All remaining states are invalid/unused; if any of these are entered, assert Error State Detected bit (ESD) in IHEISR. Go to state 1.

13 DMARQ, DMA RAM and DMAC Element

13.1 DMARQ

DMARQ (DMA Request Queue) is a set of "request" registers and selection logic for conveying requests for data transfer action from the FIFO managers (RFM, TFM) to the DMAC (DMA Control) partition, and for returning completion (reset) indications from DMAC to the requesting partitions. Requests from RFM and TFM are received in DMARQ register latches synchronously (i.e. during respective time slots of presentation by RFM, TFM), presented statically to DMAC, and reset when DMAC has performed the requested transfer. DMAC services DMARQ requests one at a time in a predetermined order of priority, with HyperChannel requests given precedence over basic channel requests (because of the higher speeds of operation of HyperChannels).

Figure 36:
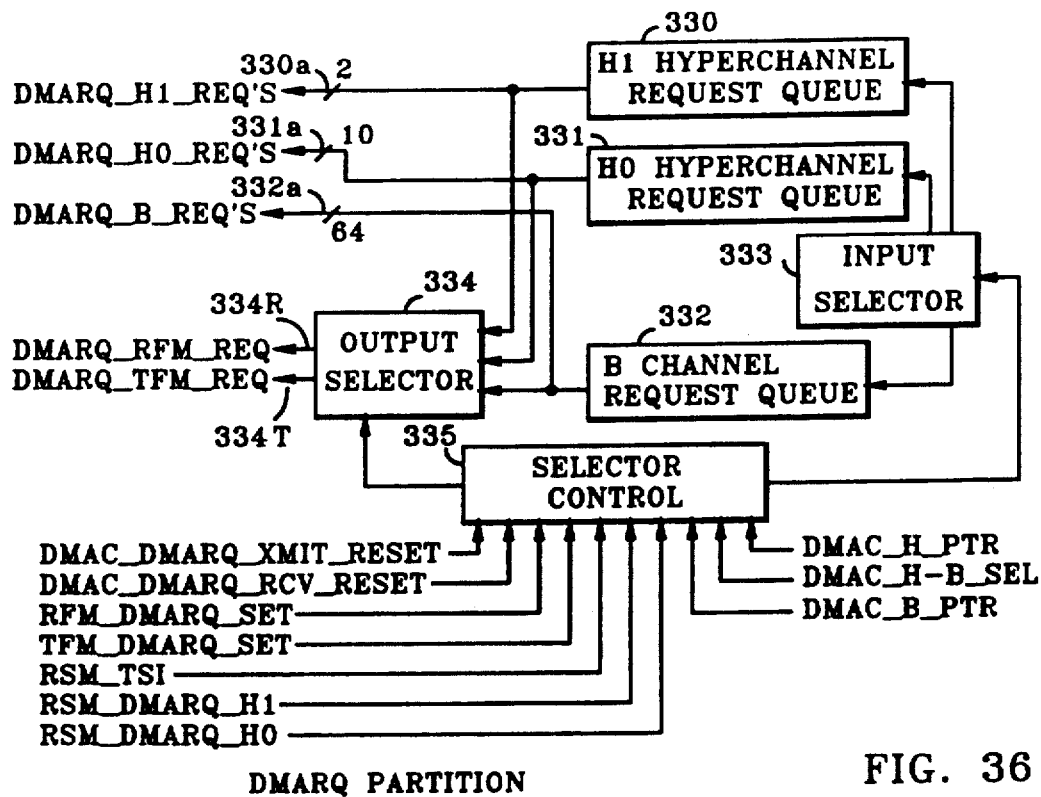
FIG. 36 is a block diagram of the DMARQ (DMA request queue) partition in the IDLC.

Logical organization of DMARQ is shown in FIG. 36. The request registers are organized into 3 distinct register queues indicated at 330, 331 and 332. Input selector circuit 333 routes setting and resetting inputs to individual queues and to selected request bit positions in the queues. Setting inputs originate from TFM and RFM, and resetting inputs from DMAC.

Output selector 334 presents indications of request bit states in the queues to RFM and TFM in time multiplex; i.e. in synchronism with basic channel time slots associated with queued requests. Indications DMARQ_RFM_REQ, when active in any time slot, indicate to RFM pendency of a request for DMA data transfer action relative to the receive side of the channel associated with that slot. Indications DMARQ_TFM_REQ, similarly indicate to TFM pendency of requests for data transfer relative to transmit sides of channels associated with respective slots.

Outputs of all request bit registers in queues 330-332 are presented in parallel to DMAC at 330a-332a respectively. Outputs associated with pending requests are active, and other outputs are inactive. Selection controller 335 transfers controlling inputs to input and output selectors 333 and 334. The controlling inputs to selector 333 steer setting and resetting inputs to inputs of appropriate queue elements, and the controlling inputs to selector 334 steer outputs of appropriate queue elements to the time slotted ports 334R and 334T for synchronous presentation to RFM and TFM (as signals DMARQ_RFM_REQ and DMARQ_TFM_REQ).

DMAC prioritizes its handling of requests at 330a-332a, according higher priority to H1 HyperChannel requests at 330a than H0 HyperChannel and B/D channel requests at 331a and 332a, and higher priority to H0 requests at 331a than to B/D requests at 332a. This is necessary because of the higher operating speeds of HyperChannels relative to basic channels, and the highest operating speeds of H1 type HyperChannels. For each channel and HyperChannel position in DMARQ there are separate positions for indicating requests for receive data and transmit data transfers (requests set by signals respectively originated from RFM and TFM), and in respect to these requests priority is accorded (arbitrarily) to receive requests over transmit requests.

Each queue contains a number of request indicating (bit) positions corresponding to the maximum number of channels associatable to the queue. Since only one H1 type HyperChannel is supportable in the 32 available slot times per BTDM time frame (see HyperChannel description in section 15, hereafter), the associated queue 330 contains only 2 bit positions (one for receive data requests and the other for transmit data requests). Since 5 H0 type HyperChannels are sustainable concurrently when no H1 HyperChannel is active (HyperChannels numbered H01 through H05), queue 331 contains 10 bit positions (5 for receive data requests from each H0 HyperChannels, and 5 for transmit data requests from the same HyperChannels). Finally, since basic slot time positions at BTDM are assignable to individual B/D type channels, queue 332 contains 64 bit positions (32 for receive data requests relative to such channels, and 32 for transmit data requests in the same channels).

The parallel ouputs at 330a, 331a and 332a have lines from each of the respective queue bit positions to indicate associated request states. Thus, 330a contains 2 lines (1 for receive, other for transmit), 331a contains 10 lines (5 receive, 5 transmit) and 332a contains 64 lines (32 receive, 32 transmit). Active bit level on any line indicates that a request is actively pending in the respective queue position.

Since HyperChannels receive IDLC service during plural time slots in each BTDM frame, while B type channels receive service only in a single slot per frame, it should be apparent that HyperChannel requests for DMA data transfer require faster DMAC service than B channel requests if the allotted bandwidth is to be used efficiently. Furthermore, since H1 HyperChannels have greater allotted bandwidth than H0 type HyperChannels, H1 requests must receive faster DMA service than either H0 or B/D channel requests.

Selection controller 335 receives inputs from RFM and TFM to set requests for receive and transmit service in the DMARQ registers (RFM_DMARQ_SET and TFM_DMARQ_SET respectively), and separate inputs from DMAC to reset such requests as they are serviced (DMAC_DMARQ_RCV_RESET and DMAC_DMARQ_XMIT_RESET respectively). These inputs are accompanied by other signals designating the required routing relative to the queue bit positions.

The setting inputs from RFM and TFM are accompanied by additional steering control inputs from RSM which effectively designate one of the DMARQ queues and a specific position in the queue. Resetting inputs from DMAC have similar accompanying functions designating a queue and a position therein.

The additional signals accompanying request setting inputs from RFM and TFM, and effectively designating one of the queues 330-332, are manifested via RSM_DMARQ_H1 and RSM_DMARQ_H0. If the H1 indication is active queue 330 is designated. If the H0 indication is active queue 331 is active. If neither the H1 nor H0 indication is active, queue 332 is designated.

The additional signals pointing to a position within the designated queue are in the time slot indication RSM_TSI supplied to selector control 335. RSM_TSI actually points to a pair of request positions, for indicating receive data and transmit data requests. The position in that pair which is to be set is indicated by the request setting source, RFM_DMARQ$_{13}$ SET or TFM_DMARQ_SET.

Relative to resetting requests from DMAC, additional input from DMAC, DMAC_H—1 B_SEL, designates selection of a pointer input from DMAC (DMAC_H_PTR or DMAC_B_PTR) which in turn points to one of the queues 330-332, and a pair of register positions in that queue (for receive data and transmit data requests). The reset request source, DMAC_DMARQ_RCV_RESET or DMAC_DMARQ_XMIT_RESET, indicates which position in the designated pair is to be reset.

Relative to HyperChannels, each of which encompasses a plurality of BTDM basic slot positions (see description of HyperChannels below), the time slot indication RSM_TSI is translated by RSM from a value associated with the current time slot count to a value associated with the time position of a reference (first appearing) one of the constituent time slots incorporated into that HyperChannel. Thus, all actions taken relative to the respective HyperChannel (in DMARQ, in time swapping relative to TSR, and in transfers relative to FIFOR) are directed to positions associated with respective reference time slots. The translation of the RSM time slot indicator is based on information in the HCR register (programmed by IOP/SIO when the HyperChannel mapping is established; see HyperChannel description below).

When ready to do so, DMAC services requests posted in queues 330-332, one at a time and in (descending) priority order: H1 receive, H1 transmit, H0 receive, H0 transmit, B/Normal Channel receive, B/Normal channel transmit. DMAC state logic remembers the origin of each request selected to be serviced, and when ready to reset the request in DMARQ that information is used to determine states of appropriate reset selection signals; selector DMAC_H-B_SEL, active one of the 2 pointers DMAC_H_PTR or DMAC_B_PTR, and active one of 2 receive/transmit reset indicators DMAC_DMARQ_RCV/XMIT_RESET. Thus, DMAC resets the respective request by activating inputs to selection controller 335: (1) DMAC_H—B_SEL selecting one of the 3 queues 330-332; (2) one of DMAC_B_PTR or DMAC_H_PTR, distinguishing a pair of positions in the selected queue; and (3) one of DMAC_DMARQ_RCV_RESET or DMAC_DMARQ_XMIT_RESET indicating which position of the pair to reset.

During the processing interval of each slot assigned to a HyperChannel, RSM translates time slot indication RSM_TSI into a value associated with the respective HyperChannel and activates a respective one of RSM_DMARQ_H1 or RSM_DMARQ_H0. In time multiplex, and based on instantaneous values of RSM_TSI, RSM_DMARQ_H1, and RSM_DMARQ_H0, selection controller 335 directs output selector 334 to place at its outputs 334R and 334T signals corresponding to states of associated bit positions in associated queues; such outputs corresponding to the status of receive DMA and transmit DMA request handling in the channel currently being synchronously served (the one corresponding to TSI).

Outputs 334R and 334T are directed respectively to RFM and TFM. Thus, when 334R indicates set status, while RFM has an associated request setting output, RFM will deactivate its output while maintaining internal status remembering that it has a request pending relative to the respective channel. When 334R indicates reset status, while the internal RFM indication is that of a pending request (thereby indicating to RFM that its request has been serviced by DMAC), RFM will reset its internal indication and resume processing of receive data relative to FIFOR. Similar actions are taken by TFM relative to indications at 334T.

At system reset, all registers in queues 330-332 are reset. During subsequent receive data processing, as RFM loads a fourth byte of receive data into FIFOR, in the buffer space allotted to the channel currently being served (the RDCR2 space of that channel), RFM activates a request setting indication RFM_DMARQ_SET to DMARQ. This causes DMARQ to set a respective bit position in one of its queues, thereby presenting a set indication on a corresponding line at 330a, 331a or 332a, which signals pendency of a corresponding request to DMAC (for receive data transfer service). As DMAC completes its handling of the request (by completing the data transfer from the respective FIFOR buffer to IOP memory), it provides inputs to DMARQ as described which serve to reset the associated queue position, effectively indicating to RFM during the associated time slot at 334R that the DMA transfer has been completed.

Similarly, as TFM empties a buffer space in FIFOR allotted to the channel currently being served (the associated TDCR2 space), it activates a setting request TFM_DMARQ_SET causing a request to be transferred to DMAC relative to that channel. And as the DMA service is completed, loading the respective FIFOR buffer with data from IOP memory, indication of that event is given to TFM at 334T.

13.2 DMA RAM AND ACCESS CONTROLS

Figure 37:
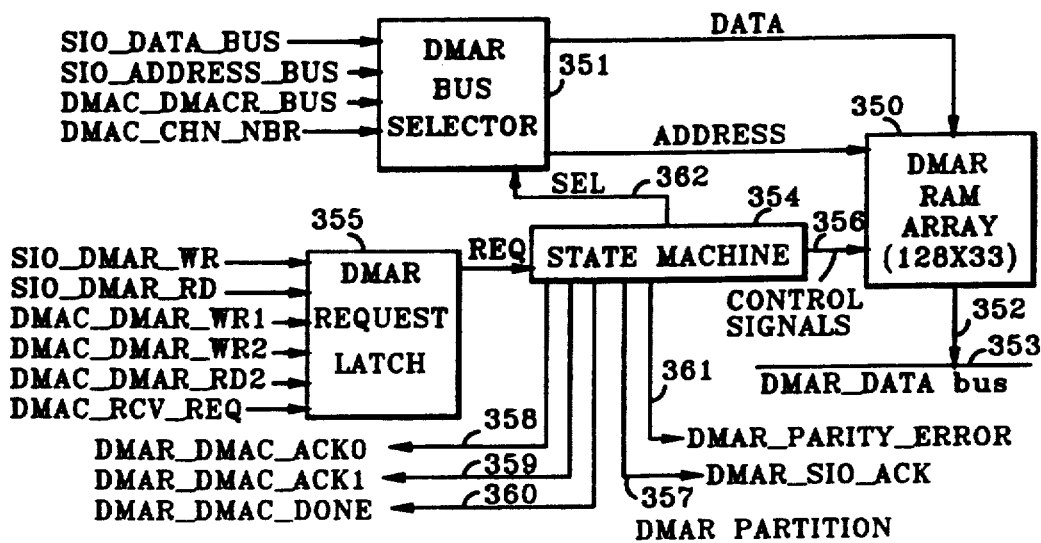
FIG. 37 is a block diagram of the DMAR (DMA RAM) partition in the IDLC.

The DMA RAM (DMAR) unit, with access controls, shown in FIG. 37, is accessible to SIO and DMAC, and stores control information for DMAC. Per channel storage space allocations in this unit are shown generally in FIG. 8. For each basic channel/slot, 2 word spaces are allocated for storing parameters RDCR3, RDCR4 defining handling of receive data, and 2 word spaces are allocated for storing parameters TDCR3, and TDCR4 defining handling of transmit data. The abbreviations RDCR and TDCR respectively represent Receive DMA Configuration Register and Transmit DMA Configuration Register. These control parameters are shown in FIGS. 39-42 discussed below.

Referring to FIG. 37, the DMAR unit comprises 128×33 RAM array 350, receiving data and address inputs from selector circuits 351 and furnishing data outputs at 352 to bus 353. Input selector 351 receives (address and data) inputs from SIO ((SIO_ADDRESS_BUS and SIO_DATA_BUS) and DMAC (DMAC_CHN_NBR, and DMAC_DMAR_BUS). Data outputs from the array (DMAR_DATA) are furnished to DMAC and SIO via bus 353 along with acknowledging outputs discussed below which effectively designate which partition is to receive the data.

Input DMAC_CHN_NBR to selector 351 represents a partial address of an associated channel space in array 350. It is adjusted by the state logic of DMAC to correspond either to the slot number of a B/D channel (equal to the value of DMAC_B_PTR) or to the reference slot number of a HyperChannel (the DMAC_H_PTR value), depending upon the type of DMAC request currently being served (refer to description of request latches 355 below). Since each channel is allotted 4 word spaces in array 350 (those containing the associated RDCR3, RDCR4, TDCR3 and TDCR4 parameters), the channel number function by itself is insufficient to address the individual word spaces.

Operations of array 350 are controlled by state machine logic 354 in response to read and write request signals received in DMA request latches (DRL) 355. Inputs to latches 355 originate from SIO (SIO_DMAR_RD, SIO_DMAR_WR) and DMAC (DMAC_DMAR_WR1, DMAC_DMAR_RD2 and DMAC_DMAR_WR2). The state machine monitors the latched requests, resolves any contentions between coexistent requests to select one request at a time, and provides control signal outputs to array 350 at 356, acknowledging outputs to SIO at 357, and acknowledging outputs to DMAC at 358 and 359. The control signals at 356 include additional address bits required to complete the partial address designated by DMAC_CHN_NBR.

DMAC provides a qualifying input to latches 355, DMAC_RCV_REQ, for enabling state logic 354 to distinguish RD2 requests (DMAC_DMAR_RD2) associated with receive channel functions from WR2 requests (DMAC_DMAR_WR2) associated with transmit channel functions (the former requiring fetching of RDCR3, RDCR4, and the latter TDCR3, TDCR4). The qualifying input is used by the state logic to generate the appropriate partial address.

The state machine logic also provides acknowledgement and final completion indications to DMAC (DMAR_DMAC_ACK0,_ACK1,_DONE) at 360 for enabling the latter to determine when to begin the second of a pair of consecutive operations on a 2 word write (WR2) or read (RD2) relative to consecutive locations in the array (all DMAC reads are 2 word reads). The state machine also conducts an output parity check operation and provides indications of parity error (DMAR_PARITY_ERROR) to INT at output 361.

The state machine sequences through 3 states to perform each array access operation. A first state provides selection control signals at 362 to selector 351 directing the latter to select either DMAC or SIO address/data inputs (to simplify the discussion, the "channel number" input to selector 351 from DMAC, DMAC_CHN_NBR, is termed the latter's address input; although each such input requires an offset—provided by selector 351 in response to specific selection inputs received at 362—to locate the specific 1 of 4 word spaces to be read or written relative to the channel designated by that number).

13.2.1 (DMAR) STATE MACHINE STATES

If reset, go to state 0.

STATE 0 (Arbitration State)

This state prioritizes DMAC and SIO requests presented simultaneously to selector 351, giving priority to DMAC requests over SIO requests.

All read requests from DMAC are 2 word reads (DMAC_DMAR_RD2), as distinct from write requests which can be for either 1 or words. On such read requests, array control signals from the state machine to the array (at 356) are activated; these designating array selection, read and clock enable functions. Selector 351 is operated to pass the address (DMAC_CHN_NBR with offset) to be read to the array address lines. Go to state 6.

On a 1 word write from DMAC (DMAC_DMAR_WR1), array control signals are activated for array selection, write and clock enablement. The DMAC address and data are passed from selector 351 to the array. Go to state 7.

On a 2 word write from DMAC (DMAC_DMAR_WR2), array selection controls are activated, and DMAC address and data are input to the array, as for 1 word write. However, go next to state 8.

On read request from SIO (all are 1 word only), array controls activated for read and selector 351 is operated to pass SIO address (SIO_ADDRESS_BUS) to the array address input. Go to state 3.

On write request from SIO (all 1 word only), array controls activated for write selection and selector 351 is operated to pass SIO address and data inputs to respective array inputs. Go to state 9.

STATE 1 (First ACK to DMAC and Array Preparation For Second Read Access)

On a DMAC read (all are 2 word only), this state is used to acknowledge the first part of the request and to prepare the array for the second word fetch. DMAR_DMAC_ACK0 is asserted as the first acknowledgement (indicating that bus 353 contains valid data for DMAC), and parity of the output data is checked. If parity error is detected, the error indication to DMAC (DMAR_PARITY_ERROR) is set. The address offset to be selected by selector 351 is adjusted to point to the next location to be read. The read and array select control inputs remain active from the previous state (state 6) and the array clock enable signal is re-activated. Go to state 5.

STATE 2 (First ACK of 2 Word DMAC Write)

DMAR_DMAC_ACK0 is asserted to DMAC. DMAC address offset adjusted to point to next location to be written. Write select and array select functions remain active from previous state (state 8), and clock enable is re-activated. Go to state 10.

STATE 3 (Accessing Array For SIO Read)

Array controls activated for read (array clock is pulsed active and then deactivated). Go to state 13.

STATE 4 (Checking Parity On Second DMAC Read Access)

DMAR_DMAC_DONE and DMAR_DMAC_ACKI are asserted to DMAC. Array output data is parity checked. If there is parity error, the parity error indication to DMAC is activated. Array control signals are all deactivated. Go to state 0.

STATE 5 (Reading Second Word of DMAC Read)

Array clock (re-activated in State 1) is de-activated. Go to state 4.

STATE 6 (Reading First Data Word On DMAC Read Request)

Array clock pulsed active then inactive. Go to state 1.

STATE 7 (Write Word For DMAC 1 Word Write Request)

Array clock pulsed active then inactive. Go to state 11.

STATE 8 (Write First Word Of 2 Word DMAC Write Request)

Array clock pulsed active then inactive. Go to state 2.

STATE 9 (Accessing Array For SIO Write)

Array clock pulsed active then inactive. Go to state 13.

STATE 10 (Write Second Word On DMAC 2 Word Write)

(Array clock pulsed active then inactive. Go to state 12.

STATE 11 (Acknowledging DMAC 1 Word Write)

DMAR_DMAC_ACK0 asserted, indicating that DMAC's data has been written into the array. Array control signals are deactivated. Go to state 0.

STATE 12 (Second ACK To DMAC On 2 Word Write)

DMAR_DMAC_ACK1 asserted to DMAC. Array controls de-activated. Go to state 0.

STATE 13 (Acknowledging SIO Write)

DMAR_SIO_ACK is asserted. Array controls are deactivated. Go to state 0.

13.2.2 CONTROL WORDS STORED IN DMAR

Channelized control information used by the FIFO manager and DMAC is stored in FIFOR in RDCR1 and TDCR1 (Receive and Transmit DMA Control Register) spaces allocated to each of the basic channels (see FIG. 7). Channelized control information used only by DMAC is stored in DMAR in RDCR3, RDCR4, TDCR3 and TDCR4 word spaces allocated to each basic channel (see FIG. 8). Receive and transmit data is stored in RDCR2 and TDCR2 spaces in FIFOR. The channelized control information has the following form and usage.

RDCR1 (see FIG. 22) consists of 8 reserved/unused bits 22-2 (RES), a receive boundary check (RBC) bit 22-4, a receive parity error (RPE) bit 22-3, and a 22-bit receive DMA current address (RDCA) field 22-1. The RBC bit is set active when the DMAC encounters a boundary check condition (RDCA matches a preset boundary address RDBA in RDCR4 discussed below) while servicing an RFM request relative to a FIFOR receive data queue. RFM monitors the RBC bit, and when the latter is active passes an indication to INT which eventually results in IOP being informed of the check condition via interrupt.

RDCR3 (FIG. 39) comprises 2 reserved/unused bits 39-1, an 8-bit field 39-2 labelled RDLAH (Receive DMA Last Address High), and a 22-bit field 39-3 designated RDFA (Receive DMA First Address) field. The RDLAH field represents the upper 8 bits of a 20 bit address denoting the end of the respective channel's IOP receive buffer. Together with the RLAL field in RDCR4, the RDLAH field is used to determine the full end address of the respective channel's IOP receive buffer. RDFA represents the beginning address of the respective channel's IOP receive buffer (although IOP memory addresses are 24 bits, the receive buffer, by convention, begins and ends on 4-byte boundaries; hence, the 2 low order bits are always 0 and the 22 bits of this field fully determine the beginning address).

RDCR4 (FIG. 40) comprises a 12-bit field 40-1, designated RDLAL (Receive DMA Last Address Low) and a 20-bit field 40-2 RDBA (Receive DMA Boundary Address). RDLAL represents the lower 12 bits of the address of, the end of the respective channel's IOP memory receive buffer. It is concatenated to the RDLAH field above to form a full end address representing the last valid address in the receive buffer. When DMAC reaches this address without encountering a boundary check, it begins transferring data next at the beginning address RDFA. RDBA represents the 20 high order bits of a boundary address (usually RDLA+1) beyond the last address. As the receive buffer fills with data, the IOP can prevent overwriting of data at the beginning of the buffer by setting this address to a value associated with a protected portion of IOP memory. If DMAC attempts to write to this address a boundary check condition is set and all further received data is ignored.

In practice, the buffer size is larger than a frame, and RDBA is set programmably (by IOP/SIO) at a value between RDFA and RDLA. Initially, the position designated by the RDBA is beyond the position which would be used to hold the last byte of a frame. Consequently, after DMAC finishes loading the first frame into the buffer, IOP receives frame end interruption, empties the buffer and moves the RDBA pointer to another position pointing to a vacated space in the buffer.

Meanwhile, DMAC continues filling the buffer and when it arrives at the last address wraps to the first address and continues filling from there. In normal operation, the size of the buffer, the timing of action by IOP in response to the frame end interruption, and the location of the boundary address relative to the first valid buffer entry which has not been removed, should be adequate to ensure that valid receive data in the buffer is not overwritten.

However, if the current address used by DMAC matches the boundary address, the IOP is apparently not vacating the buffer at a suitable pace and valid data may be overwritten. Accordingly, in that circumstance, receive processing is halted in the affected channel, and a boundary check indication is passed to RFM via RDCRI causing an INT interrupt to be generated notifying IOP of the abnormal condition.

TDCR1 (FIG. 24) contains 7 reserved bits 24-1 (RES), an ECD (End Of Chain Detected) bit 24-6, an EFD (End Of Frame Detected) bit 24-7, a NDI (No Data Indicator) bit 24-8, a 2-bit TBC (Transmit Buffer Count) field 24-3, a 2-bit TOPQ (Top Of Queue) field 24-4, a 2-bit TPE (Transmit Parity Error) field 24-5, and a 16-bit TDBC (Transmit DMA Byte Count) field 24-2. The 1 bit indicators are set by DMAC when respective end of chain, end of frame or no data indicated conditions are encountered (end of chain and end of frame are indicated by DCB bits, no data indicator is activated when DMAC encounters an end of buffer condition while servicing a request to fetch transmit data)

TDCR3 (FIG. 41) contains 8 reserved bits 41-1 and a 24-bit TDBA (Transmit DMA Buffer Address) field 41-2. The TDBA field indicates the next source of transmit data (although 24 bits long, best practice would be to require the 2 low order bits to be zero and locate transmit data only on word (4/byte boundaries). The reason for this is that if data could be fetched at arbitrary byte boundaries, the result could be fetching of e.g. a single byte to FIFOR which in turn would pass through the IDLC transmit path (FIFOR, TFM, TV, TL1) much faster than 4 bytes and therefore increase the possibility of underrun.

Finally, TDCR4 (FIG. 42) comprises 10 reserved-/unused bits 41-1, an ECI (End Of Chain Indicator) bit 42-2, an EFI (End Of Frame Indicator) bit, and a 20-bit DCBA (DMA Control Block (DCB) address) field 42-4. ECI and/or EFI are respectively activated when DMAC encounters end of chain and/or end of frame indications in the current DCB. An active ECI indicates to DMAC that no further DCB's are to be fetched after the IOP transmit data buffer currently in use is exhausted. Active EFI means that after the current buffer is exhausted, the TFM must provide end of frame indication causing TL1 to insert a frame end sequence after the last data byte is sent. The DCBA is the address at which the next DCB of an unexhausted DCB chain is to be fetched.

13.3 DMAC

The DMA Controller DMAC interfaces to DMAR and FIFOR for transferring receive data from FIFOR to the IOP and transmit data from the IOP to FIFOR under direction of control information stored in DMAR. Such transfers are initiated in response to requests posted to the DMARQ partition by RFM and TFM, and latched in individual register positions of DMARQ as described earlier. DMAC interfaces to DMARQ for receiving latched requests, acting upon them in a predetermined priority order, and clearing them (through resetting inputs to DMARQ as described earlier). Upon accepting a request from DMARQ, DMAC cooperates with MIO partition, DMAR and FIFOR to conduct a DMA data transfer between IOP memory and FIFOR. In this process, MIO arbitrates for access to the IOP bus, and upon obtaining such conducts the data transfer between DMAC and IOP memory. DMAC handles transfers relative to FIFOR and DMAR separately. In its data transfer operations, MIO passes signals from DMAC to the IOP bus (read/write and address control signals and write data signals). In the presently described embodiment, operations of DMAC relative to receive data differ from operations relative to transmit data in several respects. Receive data is processed relative to a single block of IOP memory with all operations of the DMAC tightly controlled by the IOP through programmed loading of control information into DMAR and FIFOR via SIO.

Transmit data is processed by the DMAC in response to data control block (DCB) command arrays stored in DMAR which are "chainable". The first DCB in a chain is loaded into DMAR by IOP (via SIO), but after the IDLC completes the data transmittal function defined by that DCB, and recognizes a chaining indication in the DCB, DMAC fetches another DCB from IOP memory to DMAR and the process is repeated. Each DCB can point to a different block of IOP memory as the source of transmit data (so that data in scattered blocks can be gathered by the DMAC through the actions of chained DCB's) and operations relative to chained DCB's can be carried out without interruption of the IOP (to indicate end of frame points in the transmittal process).

Receive data is written from FIFOR (via DMAC and MIO) to a single block of IOP memory space managed by the IOP as a circular buffer. In normal circumstances, such data is loaded into successive buffer locations, from a highest address position to a lowest address, and then DMAC automatically wraps/returns to the lowest position and repeats the progression. In such circumstances, IOP receives end of frame interruptions (from INT), and manages timely removal of data from the buffer, so as to permit repeated use of the buffer.

The buffer size is selected (by the IOP memory management software) to hold more than a frame of receive data relative to each active channel. After each frame end interruption, buffered data is removed (to another location in IOP or host memory) and the IOP reinitializes the associated channel and the control information in DMAR (via SIO). At each such reinitialization, IOP sets a new boundary address value in DMAR which imposes limits on DMAC access to IOP memory space. This boundary address is progressively moved to lie ahead of the space needed for entry of the next received frame.

In normal operation, the removal of data and repositioning of the boundary address by IOP will be conducted fast enough, relative to the data loading operations of DMAC/MIO, that the boundary address position should not be overrun. An important function of the DMAC is to detect when its current IOP memory address for receive data coincides with the above boundary address, and to provide a boundary check indication at such times (for informing the IOP, via an associated interruption handled by INT and SIO, that valid data has been overwritten).

Transmit data is transferred from blocks of IOP memory designated by initial address functions in DCB's which are chainable; i.e. they contain chaining indications (placed therein either initially when the DCB was loaded into IOP memory, or through programmed operation via SIO while the DCB resides (whereby IOP can optionally extend the length of a DCB chain on a dynamic basis when its processing capabilities permit such). Chained blocks of transmit data (i.e. blocks whose initial locations are specified by chained DCB's) may thereby be scattered, overlapping or coincide positionally in IOP memory depending upon processing capabilities of the IOP.

An important function of the DMAC in respect to transmit data is to delimit frame boundaries in data being forwarded to link channels operating under framing protocols, and to indicate such to the IOP without corresponding INT interruptions. As explained earlier, this is done by including such delimiting information as part of the status associated with frame end receive data interrupts.

13.3.1 DMAC LOGICAL ORGANIZATION

Figure 38:
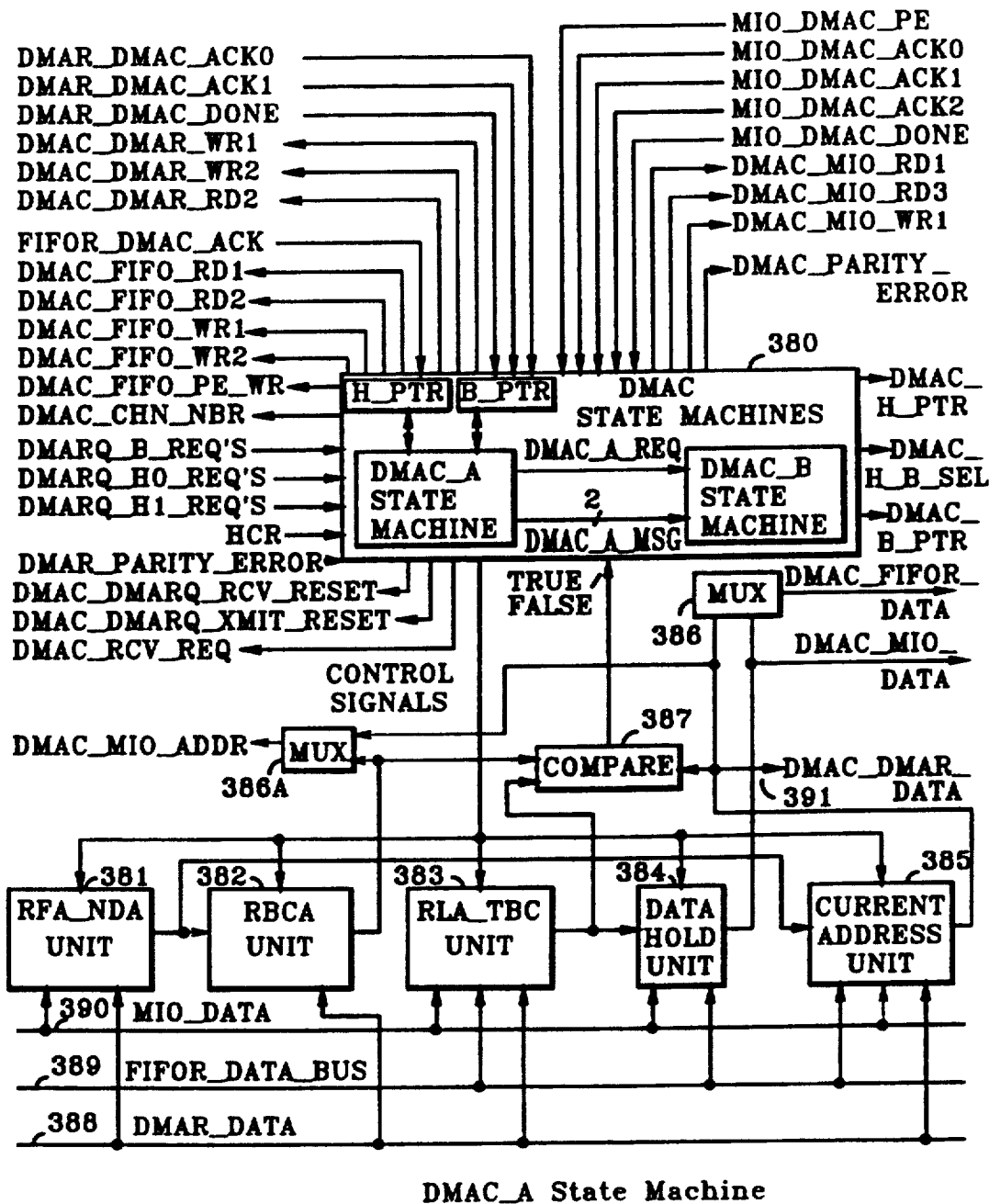
FIG. 38 is a block diagram of the DMAC (DMA control) partition in the IDLC.
Figure 39:
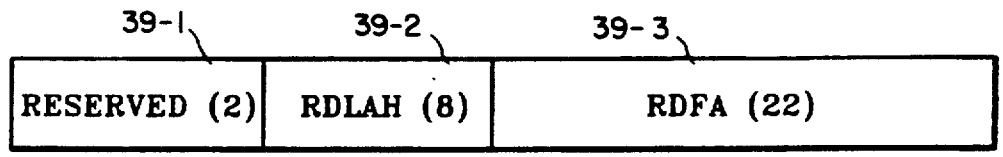
FIGS. 39 and 40 respectively illustrate the forms of terms RDCR3 and RDCR4 stored in DMAR relative to each active channel, and used by DMAC to control its transfer operations relative to data being received in respective external communication channels.
Figure 40:
Figure 41:
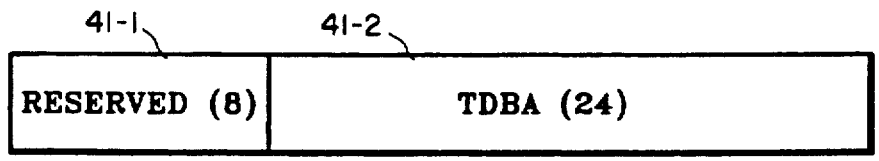
FIGS. 41 and 42 respectively illustrate the forms of terms TDCR3 and TDCR4 stored in DMAR relative to each active channel, and used by DMAC to control its transfer operations relative to data being transmitted to respective external communication channels.
Figure 42:
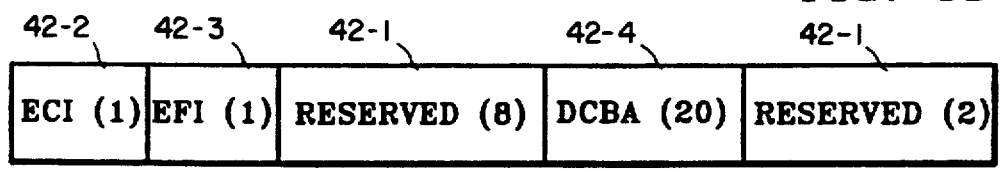

Logical organization of the DMAC is shown in FIG. 38. It includes state machine logic indicated generally at 380, five registers shown at 381-385, a multiplexing circuit shown at 386 and a compare circuit shown at 387.

State logic 380 comprises two state machine units 380A and 380 B respectively designated DMAC_A and DMAC_B state machines. Operations respectively controlled by these units, and specific state details, are discussed later.

Register 381, termed the RFA_NDA (receive first address and next DCB address) has different usage during DMAC operations associated with transmit and receive data processing. When DMAC is processing/writing receive data to IOP memory, register 381 is used to latch and hold the RDFA (receive data first address) word which is stored in the respective channel's RDCR3 location in DMAR.

When DMAC is processing/fetching transmit related DCB's, register 381 is used to hold a next DCB address fetched from either DMAR or IOP (DMAR via DMAR_DATA_BUS, IOP via MIO_DATA_BUS). The next DCB address is taken from DMAR when the DCBA field of TDCR4 is used, and from IOP directly when current transmit data runs out and a next DCB address is unavailable in TDCR 4 (e.g. when a DCB arrives pointing to an empty data buffer but containing a next chained DCB address). When DMAC is ready to fetch a next DCB, the contents of register 381 are transferred to register 382 discussed below for use as the address to be placed on the IOP bus via DMAC_MIO_ADDR; that signal produced via multiplexor 386A from the unit 382 or 385. After a new DCB is fetched from IOP, the transmit data buffer address and next DCB address in TDRC3 and TDRC4 will be replaced by the respective contents of the new DCB. When DMAC is ready to update the TDCR3 and TDCR4, the contents of register 381 is transferred to register 385 to be stored into TDCR4 via DMAC_DMAR_DATA after the contents of register 385 is stored into TDCR3.

Register 382, termed the RBCA (Receive Boundary Check Address) register, is used to hold the RDBA function extracted from RDCR4 via DMAR_DATA bus 388. This function is compared, via compare circuit 387, with a current IOP address held in register 385. If the comparands match, this indicates the receive buffer is full, and causes DMAC to terminate receive data processing in the respective channel and set boundary check indication to be forwarded to IOP by RFM via an INT interrupt.

The use of register 382 for holding the next DCB address has been described in register 381 above.

Register 383, the RLA_TBC (Receive Last Address and Transmit Byte Count) register, has dual usage in receive and transmit processing. In receive processing, this register latches and holds the receive data last address components RDLAL and RDLAH, retrieved from RDCR3/4 spaces in DMAR via bus 388. During transmit data processing, register 383 holds transmit byte count information received either from FIFOR (TDCR1), via FIFOR_DATA bus 389, or from IOP memory via MIO_DATA bus 390. The FIFOR data is used to get the current byte count and the IOP route is used to get a new byte count during fetching of a new DCB.

When the receive last address is latched in register 383, it is compared via comparator 387 with a current address in register 385. A match on such comparison indicates that the physical end of the receive buffer has been reached, and DMAC must replace the current address with the Receive First Address from RDFA/RDCR3 via bus 388. When the transmit byte count is held, it is decremented and passed through the "data hold" register 384 for return transfer to FIFOR.

The data hold register 384 also has multiple usage. When transmit data is being fetched via bus 390, it is held temporarily in register 384 en route to FIFOR via multiplexor 386 output DMAC_FIFO_DATA. Handling of transmit byte count information in this register has been discussed above. When receive data is being processed, it is taken from FIFOR via bus 389 and held temporarily in register 384 en route to IOP memory via output path from that register to DMAC_MIO_DATA at 391.

Current address register 385 also has multiple usage. At different phases of DMAC processing, it receives addresses for application to IOP memory (via DMAC_MIO_ADDR), incremented transmit address values to be written back to DMAR via DMAC_DMAR_DATA, and incremented receive address values to be written back to FIFOR via DMAC_FIFOR_DATA output of multiplexor 386. The receive address and transmit address values are respectively input to the register from FIFOR (via bus 389) and DMAR (via bus 388). Input of next DCB addresses to this register has already been described.

13.3.2 DMAC STATE MACHINES

The state machine units DMAC_A and DMAC_B are logically tightly coupled. DMAC_A is mainly responsible for interfacing to MIO, DMAR, and DMARQ (including arbitrating requests for data transfer presented by DMARQ, and furnishing resetting control indications to DMARQ upon completion of service). DMA_B is mainly responsible for interfacing to FIFOR.

When requests accepted by DMAC_A from DMARQ require access to FIFOR, output DMAC_A REQ from DMAC_A to DMAC_B is activated. In response, DMAC_B carries out the necessary task as designated by message codes asserted by DMAC_A at DMAC_A_MSG. The 2-bit message code designates one of the four tasks: (1) read transmit byte count from FIFOR; (2) write updated transmit byte count and data to FIFOR; (3) read current receive buffer address and data from FIFOR; (4) write updated current receive buffer address to FIFOR.

The following inputs and outputs are provided between state logic 380 and DMAR:

DMAR_DMAC_ACK0—Acknowledgement by DMAR of first transfer of a two word transfer

DMAR_DMAC_ACK1—DMAR acknowledgement of second transfer

DMAR_DMAC_DONE—DMAR indication of completion

DMAC_DMAR_WR1—DMAC request for 1 word write

DMAC_DMAR_WR2—DMAC request for 2 word write

DMAC_DMAR_RD2—DMAC request for 2 word read

DMAC_RCV_REQ—Full designation DMAC_DMAR_RCV_REQ; auxiliary addressing function to DMAR for distinguishing a DMAC_DMAR_RD2 request associated with a receive channel operation from a like request associated with a transmit channel operation; the first requiring location of RDCR3,4 parameters and the latter location of TDCR3,4.

Inputs and outputs between state logic 380 and MIO are: MIO_DMAC_ACK0—MIO acknowledge of first word transfer between DMAC and IOP MIO_DMAC_ACK1—MIO acknowledge of second word transfer MIO_DMAC_ACK2—MIO acknowledge of third word transfer MIO_DMAC_DONE—MIO completion indication MIO_DMAC_PE—MIO indication of parity error at IOP interface DMAC_MIO_RD1—DMAC request for IOP mem 1 word read DMAC_MIO_RD3—DMAC request for 3 word read (2 transmit data plus 1 DCB)

DMAC_MIO_WR1—DMAC request for 1 word write

Inputs and outputs between logic 380 and FIFOR are:

FIFOR_DMAC_ACK—FIFOR acknowledge of transfer

DMAC_FIFOR_RD1—DMAC request for 1 word read

DMAC_FIFOR_RD2—DMAC request for 2 word read

DMAC_FIFOR_WR1—DMAC request for 1 word write

DMAC_FIFOR_WR2—DMAC request for 2 word write

DMAC_FIFOR_PE_WR—DMAC indication of write parity error

DMAC_CHN_NBR—DMAC channel slot indicator/address. Includes bit indication of receive or transmit and with respective rd or wr request makes up the complete address information needed by FIFOR Input/outputs relative to DMARQ are:

HCR—input from HCR register in SIO indicating active HyperChannel assignments and providing pointers relative to respective HyperChannels for use in addressing FIFOR and DMAR (see also description of DMARQ above, and later description of HyperChannels)

RCV_RESET—(full designation DMAC_DMAR-Q_RCV_RESET) signal to DMARQ to reset receive DMA request just serviced.

XMIT_RESET (full designation DMAC_DMAR-Q_XMIT_RESET) signal to DMARQ to reset transmit DMA request just serviced.

DMARQ_B_REQ'S—DMARQ request inputs to DMAC associated with B channel requests

DMARQ_H0_REQ'S—DMARQ request inputs for H0 HyperChannels

DMARQ_H1_REQ'S—DMARQ request inputs for H1 HyperChannels

DMAC_H_PTR—Output provided to DMARQ with DMAC_DMARQ_RESET, when service to a HyperChannel has been completed, pointing to specific DMARq request bit position which is to be reset (resolves to specific HyperChannel and receive or transmit position of same).

DMAC_H-B_SEL—Output to DMARQ with DMAC_DMARQ_RESET distinguishing selection of HyperChannel request or B channel request for reset.

DMAC_B_PTR—Output to DMARQ when B channel is selected for reset, pointing to specific request position to be reset (resolves to specific channel number and receive or transmit position of same).

Other output:

DMAC_PARITY_ERROR—DMAC indication to INT of parity errors detected relative to FIFOR, DMAR or IOP memory via MIO CONTROL SIGNALS—Outputs of state logic 380 to registers 381-385

TRUE/FALSE—Input from compare circuits 387 to state logic 380

Specific states of state machine units DMAC_A and DMAC_B are:

DMAC_A

In the following description, field parameter portions of RDCR1-4 and TDCR1-4 are designated by their respective abbreviated names (e.g. RDFA, RDLAH, etc.). Also, to simplify the description, the first byte of TDCR1 containing 3 single bit and 2 two bit indications is referred to as TDFSW (transmit data FIFO status word).

STATE 0 (FIRST LEVEL PRIORITIZATION OF DMARQ SERVICE REQUESTS) active service requests from DMARQ are prioritized, with H1 getting top priority, H0 next and B channel requests last if an H1 request is active, assert DMAC_H-B_SEL to DMARQ (in effect designating selection of an H request), activate DMAC_H_PTR to DMARQ with a code value corresponding to the H1 request position, and go to state 1.

if an H0 request is active, and no H1 request, activate DMAC_H-B_SEL and DMAC_H_PTR (pointing to H0 request to be reset) and go to state 2.

if a B request is active and no H requests, set DMAC H_H-B_SEL to indicate B channel being serviced, raise DMAC_B_OTR with value designating specific B channel request being serviced, and go to state 3.

STATE 1 (READ SELECTED HYPERCHANNEL'S STATUS AND CONTROL INFORMATION)

2 word read request (DMAC_DMAR_RD2) asserted to DMAR for fetching two words containing status and control information for the selected H1 HyperChannel. Depending on whether a receive or transmit process is being served, the requested information is in the RDCR3-4 or TDCR3-4 spaces in DMAR allocated to the base channel slot representing the reference channel of the HyperChannel (see DMARQ description above and HyperChannel description below). Simultaneously, a DMAC_A_REQ and DMAC_A_MSG are presented to DMAC_B state machine to request the needed FIFOR read accesses (1 word if a transmit is being processed, 2 words if a receive). Go to state 4.

STATE 2 (PRIORITIZATION OF H0 REQUESTS)

Resolve contention, if any, among H0 requests in a predetermined selection order. The selected H0 channel is assigned last priority among H0 channels for next service in order to equalize the servicing over time of all H0 requests. Set internal H count to value of current H0 selection (giving that value lowest H0 priority for next H0 contention). Go to state 1.

STATE 3 (RESOLVING B CHANNEL CONTENTION)

Resolve contention, if any, among B channel requests in prearranged order. Selected channel then assigned last priority for next selection to equalize servicing over time of all B channel requests. Set internal B count to value of current selection. Go to state 1.

STATE 4 (WAIT FOR DMAR TO COMPLETE WORD FETCH REQUEST)

Wait for DONE indication (DMAR_DMAC_DONE) and go to state 5.

In servicing receive process, first word from DMAR (availability indicated by DMAR_DMAC_ACK0 active) includes the first address information RDFA and the RDLAH part of the last address. The RDFA is loaded into register 381 and the RDLAH into register 383. Second word (availability indicated by DMA-R_DMAC_ACK1 active) includes boundary address RDBA and low portion of last address RDLAL. RDBA is loaded into register 382 and RDLAL into register 381 (replacing the already processed RDFA).

In transmit process, first arriving word includes transmit data buffer address TDBA loaded into register 385. Second word includes chain end indicator ECI, frame end indicator EFI and next DCB address (DCBA). All are loaded into register 383.

STATE 5 (WAIT FOR DMAC_B TO COMPLETE REQUEST SERVICE)

In this state the DMAC-A request bit set in state 1 is constantly checked. The bit is reset by DMA_B when the latter finishes the requested read service relative to FIFOR. Go to state 6 if servicing receive, or to state 9 if servicing transmit.

STATE 6 (CHECK FOR PARITY ERROR OR BOUNDARY CHECK CONDITION)

After all information has been fetched from DMAR and FIFOR, check for associated indications of parity error (examine PE bit in RDCR1, which is set during state 3 of DMAC_B if parity error condition exists) and boundary check condition (active RBC bit in RDCR1) set during state 8. If parity error, all processing for this channel is suspended. Go to state 15 if error or boundary check condition found. If neither found, assert DMAC_MIO_WR1 to write receive data (see state 5) in IOP memory receive buffer. Address for this write is derived from current address in register 385 and presented on DMAC_MIO_ADDR. Go to state 7.

STATE 7 (WAIT FOR MIO TO COMPLETE RECEIVE DATA WRITE)

Increment address in current address register when MIO acknowledges state 6 write request with MIO_DMAC_ACK0. Go to state 8.

STATE 8 (UPDATE CONTROL INFORMATION OF CHANNEL IN SERVICE)

If current contents of address register match RDFA, transfer RDFA to address register. If address register matches RDBA function in register 382, a boundary check condition has occurred; therefore an indicator bit RBC is set in and concatenated with the address in register 385 to be written back to FIFOR. If the current address is neither at the bottom of the receive buffer nor associated with a boundary check condition, DMAC_A_REQ and DMAC_A_MSG are activated to request DMAC_B 1 word write service relative to respective receive channel space in FIFOR. Go to state 15.

STATE 9 (CHECK PARITY ERRORS AND DEPLETION OF CURRENT BYTE COUNT RELATIVE TO TRANSMIT CHANNEL)

After all words for transmit request (TDCR1,3,4) have been fetched (state 5) check for parity error indication (set in state 3 of DMAC_B if relative to FIFOR, and raised at DMAR_PARITY_ERROR if relative to DMAR). Go to state 15 if parity error found. If no errors, check if transmit byte count (fetched by DMAC_B to register 383) is 0. If it is, new DCB is needed. Raise 3 word read to MIO (DMAC_MIO_RD3) and transfer DCBA (DCB address) from register 381 to register 382 to prepare for its use by MIO, and go to state 11 to await new DCB. If transmit byte count is not depleted, transmit data word read from MIO at address located by DMAC_MIO_ADDR provided at output of register 383, and go to state 12.

STATE 10 (CHECK FOR EMPTY NEW DCB)

Check new DCB received in state 11 for "empty" condition (0 valued transmit byte count). If empty, and neither ECI nor EFI in new DCB is set, another DCB is needed; so issue request for new DCB fetch and return to state 11. If empty, but either ECI or EFI is set, frame and/or chain has ended without more data to send; so update TDFSW and concatenate it with transmit byte count, issue associated 1 word write request to DMAC_B for returning the updated TDCR1 word to FIFOR, and go to state 15. IF new DCB not empty, activate DMAC_MIO_RD1 to request transmit data word read (using address loaded into register 385 during state 11) and go to state 12.

STATE 11 (WAIT FOR MIO TO COMPLETE NEW DCB FETCH)

Wait for new DCB words. First word from MIO is transmit data buffer address which is loaded into register 385 when MIO_DMAC_ACK0 is active. Second word from MIO contains ECI, EFI bits and next DCB address; loaded together into register 381 when MIO_DMAC_ACK1 is active. Third word from MIO (available when MIO_DMAC_ACK2 active) is transmit byte count loaded into register 383. On activation of MIO_DMAC_DONE go to state 10.

STATE 12 (WAIT FOR MIO TO COMPLETE FETCH OF TRANSMIT DATA WORD)

When transmit data word arrives (MIO_DMAC_ACK0 active), load it into register 384, increment transmit address, decrement transmit byte count, activate DMAC_B to update TDFSW/TDCR1 status byte in FIFOR and go to state 13.

STATE 13 (CHECK FOR TRANSMIT BYTE COUNT STATUS)

Check updated transmit byte count for zero/empty status. If empty, the TDCR1/FIFOR ECI and EFI bits are updated to values of corresponding bits in TDCR3/DMAR. DMAC_A_REQ and appropriate message DMAC_A_MSG are transferred to DMAC_B to update FIFOR with 1 or 2 word write (1 word if new DCB empty, 2 words if not). Simultaneously, a 1 or 2 word write request is issued to DMAR (1 word if only updating transmit buffer address of old DCB; 2 words if updating both transmit buffer address and next DCB address). Go to state 14.

STATE 14 (WAIT FOR DMAR TO COMPLETE UPDATING DCB)

Upon arrival of acknowledgement from DMAR, transfer ECI, EFI and next DCB address from register 381 to register 385 for second word write to DMAR. Go to state 15.

STATE 15 (CLEAN UP REGISTERS AND RECYCLE)

Remain in this state until DMAC_A_REQ is reset by DMAC_B action, then reset all registers 381-385, then return to state 0 to start new cycle of operations.

DMAC_B

IF RESET, GO TO STATE 0

STATE 0 (POLLING DMAC_A_REQ BIT)

In this state, the request bit from DMAC_A is continuously polled to see if service relative to FIFOR is needed. When the bit goes active, raise DMAC_FIFOR_REQ and decode the message on DMAC_A_MSG. Then output DMA_CHN_NBR to FIFOR for the latter's use as partial address. Depending on the message from DMAC_A, present FIFOR with one of DMAC_FIFOR_RD1 or _RD2 or _WR1 or WR2 to complete addressing information. Go to: state 1 if DMAC_A message designates "read transmit byte count from FIFOR"; state 2 if message designates "write updated transmit byte count and data to FIFOR"; state 3 if the message is "read receive current buffer address and data from FIFOR"; or state 4 if the message is "write updated receive current buffer address to FIFOR.

STATE 1 (READ TRANSMIT BYTE COUNT FROM FIFOR)

Upon receipt of FIFOR acknowledgement (FIFOR_DMAC_ACK) transfer transmit byte count from FIFOR_DATA_BUS 389 to register 383. Check parity condition. If there is parity error, notify DMAC_A, set parity error status bit in PE field of TDCR1 in FIFOR (to notify IOP via TFM and INT), and go to state 8. If no error, reset DMAC_A_REQ bit and return to state 0.

STATE 2 (WRITE TRANSMIT BYTE COUNT AND DATA TO FIFOR)

On acknowledgement from FIFOR, transfer TDFSW and transmit byte count to register 384 to be written to FIFOR as the second word of the WR2 instruction given in state 0. The first word written is the transmit data which is in register 384 when the state 0 instruction to FIFOR is issued. Go to state 5.

STATE 3 (READ RECEIVE CURRENT DATA BUFFER ADDRESS AND RECEIVE DATA FROM FIFOR)

On acknowledge from FIFOR, the receive current data buffer address is latched from FIFOR_DATA_BUS to register 385, and its parity is checked. If in error, go to state 6 to write parity error indication into the PE bit in RDCR1/FIFOR (eventually resulting in parity error condition recognition in RFM and notification of IOP via INT interrupt). If no error, go to state 9 to receive second word from FIFOR.

STATE 4 (WRITE UPDATED RECEIVE CURRENT DATA BUFFER ADDRESS TO FIFOR)

On acknowledge from FIFOR (acknowledging write operation relative to receive current data buffer address presented in state 0), reset DMAC_A_REQ and return to state 0.

STATE 5 (ADJUST FOR 2 WORD WRITE)

This state serves to realign timing with the FIFOR during a 2 word write (see state 2).

STATE 6 (WRITE PARITY ERROR INDICATOR FOR RECEIVE CHANNEL)

When FIFOR has written RDCR1 to revise the parity error indicator bit, activate DMAC_PARITY_ERROR indication to INT (appears at DMAR_PARITY_ERROR input of INT, FIG. 37). Reset DMAC_A_REQ bit and return to state 0.

STATE 7 (SECOND STATE OF 2 WORD READ)

On acknowledge from FIFOR, check for parity error in receive data word (second word read from FIFOR). If error occurred, go to state 6 to write parity error indicator into RDCR1/FIFOR. If no error, reset DMAC_A_REQ bit and return to state 0.

STATE 8 (WAIT FOR FIFOR TO FINISH WRITING STATUS WORD CONTAINING ERROR INDICATOR IN TDCR1)

On acknowledge from FIFOR (of TDCR1 write set up in state 1), reset DMAC_A_REQ bit and return to state 0.

STATE 9 (BUFFER STATE FOR 2 WORD READ)

This state used to allow for timing realignment during reading of second word in a 2 word read (see state 3).

14 MIO

The Master I/0 (MIO) partition arbitrates for control of the IOP bus in behalf of DMAC. Upon gaining control, MIO performs a direct memory access transfer to or from IOP memory using address and control parameters transferred by DMAC (also data, usually receive data, when the transfer is a write to IOP memory).

In a typical environment, the IOP processing engine could be a Motorola 68000 processor and the bus that of the 68000 allowing for external assumption of master control. In another typical environment, the IOP processor could be one of the family of International Business Machines Corporation processors using the Micro Channel bus architecture (Micro Channel is a trademark of the International Business Machines Corporation) which also allows for multiple bus masters via arbitration. In such environments, MIO operates as a bus master upon gaining control of the bus (a 16-bit bus master in the 68000 environment; a 32-bit master in the Micro Channel bus environment).

Details of the logical organization and states of the MIO are provided in the co-pending applications referring to "Autonomous Elements" and "Controller With Synchronous Link Interface" in their titles. Since the structure and operations of MIO have no relevance to HyperChannel formation or usage, these details are omitted here. To the extent that such details might have ancillary relevance the corresponding sections describing MIO in the disclosures in said co-pending applications are incorporated herein by reference.

15. HyperChannels

HyperChannels, are formed presently by combining basic channels associated with time slots at the BTDM interface to obtain increased bandwidths. CCITT recommendations for HyperChannels in ISDN environments contemplate H0 type HyperChannels running at 384 Kbps, H11 HyperChannels running at 1.536 Mbps, and H12 HyperChannels running at 1.920 Mbps.

Subject IDLC device, configured as described, supports 32 full duplex 'basic' channels ('B' or 'D' channels), each capable of running at 64 Kbps. Each basic channel is associated with a corresponding positionally ordered "basic" processing time slots relative to the BTDM. At any time, a basic channel/slot may be either active or inactive.

In this configuration, logic distributed presently in RSM, DMARQ, DMAC, and SIO supports formation and usage of up to five H0 HyperChannels, by combining six basic channel slots per HyperChannel, or one H11 HyperChannel spanning 24 basic slots, or one H12 HyperChannel spanning all 32 basic slots. When either an H11 or H12 HyperChannel is configured, H0 HyperChannels can not be formed.

The IDLC goes beyond CCITT recommendations and allows any number of basic slots to be assigned to larger channels ("extended channels"), for greatest flexibility in bandwidth, as well as permitting assignments of non-contiguous slots (allowing formation of HyperChannels or extended channels even when a sufficient number of contiguous basic slots are unavailable due to current B/D channel usage). The configuration of basic time slots within any HyperChannel is programmable dynamically (by IOP) and logically transparent to processing elements of the IDLC (with the exception of a potential race condition in INT relative to storage of TSR parity error status as described above in the description of INT).

15.1 HyperChannel Formation and Usage

In the IDLC, HyperChannel formation and usage is implemented via logic distributed in the SIO, RSM, DMARQ and DMAC partitions. With exceptions noted, creation and operation of HyperChannels is logically transparent to all other partitions. HyperChannels or extended channels are formed by combining basic time slots into a single channel unit. The basic slots so combined are termed "constituent" slots of the HyperChannel.

A fundamental technique used presently in HyperChannel formation/usage is to assign one of the constituent slots as a "reference" slot relative to which all process status and configuration parameters of the entire HyperChannel are stored (in TSR, FIFOR, DMAR and certain registers discussed below).

Relative to each HyperChannel, logic in RSM and DMAC acting on information in the HCR register in SIO (see FIG. 4) and the CCR of each constituent channel (see FIG. 6) forms a logical "plural-to-one" association between the non-reference constituent slots and the reference slot. Consequently, during processing relative to a non-reference constituent slot, position defining parameters relative to TSR, FIFOR, DMAR and DMARQ, which ordinarily would point to storage/request positions associated with the basic slot currently being serviced, are translated to refer to positions associated with the reference slot.

Thus, for instance, during processing relative to any constituent slots, exchanges of time swap state functions between TSR and the synchronous data handling partitions would be conducted only relative to the TSR space dedicated to the associated reference slot.

The translational association relative to DMARQ is such that request setting and resetting inputs to DMARQ associated with HyperChannels are steered to different register queues than inputs associated with other channels.

These special HyperChannel associations are defined by the CT (Channel Type) field in the CCR register and contents of the HCR (HyperChannel Configuration Register). Recall that CCR's of basic channels are stored in TSR spaces assigned to respective channels, and fetched to a hardware CCR register in RSM during time slot service to the respective channel (refer to the earlier description of RSM). Recall also that HCR is a common register not replicated across time slots. Although physically located in SIO (as a topological choice), HCR could as well be located in another partition. HCR has outputs coupled to other partitions (refer to FIGS. 4 and 32, and the description of HCR field assignments below).

When a HyperChannel is created, HCR register is programmably set by IOP to provide an associated pointer to a constituent reference slot, which appears earliest in the frame of slots at BTDM (that slot is also termed the FSC or first slot of the respective HyperChannel). Relative to each constituent slot of a HyperChannel, the CT (channel type) field in the associated CCR is set (by IOP/SIO) to indicate the respective channel type and number as one of: B/D, H01, H02, H03, H04, H05, or H1 (either H11 or H12 depending on applicational environment).

The HCR contains five 6-bit fields which associate with up to five HyperChannels (see details below). Each such field contains an activity bit serving to indicate if the associated channel is active, and five bits constituting the FSC pointer to the associated reference slot. For economy and simplicity, all configuration and status parameters for a HyperChannel are stored relative to the reference slot, and the FSC pointer is used to address the reference slot during processing activities relative to associated constituent slots. Before the start of processing relative to each slot, RSM pre-fetches a CCR associated with that slot (see item "P" in FIG. 3), and uses information therein to set up associated processing parameters for partitions acting relative to that slot. One such parameter is a time slot indicator, RSM_TSI, which relative to B/D type channels corresponds to the physical time position of the respective slot.

The CT (channel type) field in the pre-fetched CCR associated with each channel is a 3-bit code identifying the respective channel type as either ordinary B/D type or one of 6 HyperChannel types (H1 or one of 5 specifically numbered H0 types; H01-H05). RSM examines the CT field in each pre-fetched CCR to determine the channel association of the respective next processing slot. RSM maintains a slot count which relative to B/D channels is used as its external time slot indicator RSM_TSI to the other partitions.

Upon determining that a next slot is a constituent slot of a HyperChannel, RSM determines the activity state of the HyperChannel via the associated activity bit in HCR. If the HyperChannel is active, RSM replaces its present slot count with the value in the associated FSC field in HCR so that its external time slot indicator RSM_TSI assumes a value corresponding to the time position of the reference slot.

Thus, during loading of new state information relative to a constituent next slot (into the synchronous processing partitions), the space in TSR associated with the reference slot is addressed, and during processing relative to that slot access to FIFOR (for receive or transmit data) is directed to the space associated with the reference slot.

Furthermore, relative to data transfer processes in the asynchronous domain (DMAC), indications of staticized requests pending in DMARQ are presented on a time multiplex synchronous basis to RFM and TFM so that they may determine status of respective data queues in FIFOR. For this purpose, RSM furnishes DMARQ with its time slot indication RSM_TSI and, during time slots associated with HyperChannels, control indications of respective HyperChannel types (RSM_DMARQ_H1 or RSM_DMARQ_H0 distinguishing respective HyperChannel types H1, H01, H02, ..., H05). Such type indications are used by DMARQ to select associated request register outputs for presentation to RFM/TFM. During time slots associated with B/D channels, DMARQ uses RSM_TSI to select associated request status for presentation. Refer to earlier description of DMARQ for additional details.

Requests queued by DMARQ are serviced by DMAC one at a time and in a predetermined priority sequence (see DMARQ description). When a HyperChannel request is selected for service by DMAC, state logic in that partition associates the request position (in the DMARQ H0 or H1 queue) to select the respective FSC function in HCR as associated address pointer DMAC_CHN_NBR relative to FIFOR and DMAR. DMAC state logic also develops an associated address pointer (DMAC H PTR) and reset operator function (DMAC_DMARQ_RCV_RESET or DMAC_DMARQ_XMIT_RESET), which together point to the specific queue location of the selected request, and applies them to DMARQ for resetting that request (see DMARQ description).

15.2 HCR Field Assignments

HCR (FIG. 34) contains a 2-bit field 34-1 designated HCT (HyperChannel Type) and five 6-bit fields, 34-2 thru 34-6, which associate with up to five H0 type HyperChannels H0n (n=1-5). Each 6-bit field includes an activity indicator bit HnA (n=1-5), and a 5-bit field used when the respective HyperChannel is active as a pointer FSCn (n=1-5) designating the time position of the reference slot (n=1-5).

The value stored in the HCT field (by IOP/SIO) indicates one of two restrictions on HyperChannel formation (although the 2 bits allow for 4 states only 2 of those are used presently) as follows: (1) H1 HyperChannel formation disabled (H0 and B/D allowed), or (2) H1 HyperChannel in use (H0 formation disallowed, but B/D still allowed).

The HnA bits when active indicate that an associated HyperChannel is active. H2A-H5A can only be active if HCT is in a state allowing for H0 HyperChannel formation (HI HyperChannel formation disabled). Active states of H2A-H5A respectively indicate active states of correspondingly numbered HyperChannels H02-H05. Active state of H1A indicates either an active H1 type HyperChannel or an active H01 type HyperChannel depending on the state of HCT (type H1 if HCT indicates H1 in use, type H01 otherwise).

Although information given by the HCT and HnA fields of HCR is seemingly redundant, it has a specific synchronizing purpose. In a general sense, the same information is available in CCR's of associated slots, particularly in respective channel type fields CT and respective bits indicating enablement for communicative data transfers. However, the HCR information is needed for synchronizing HyperChannel startup.

When a HyperChannel is formed, IOP programs control parameters for all constituent slots (in TSR, FIFOR and DMAR), sets an appropriate reference slot pointer in HCR, and activates the associated HnA bit in HCR. This last action instantaneously establishes active status relative to all constituent slots. Were it not for this, it would be necessary to synchronize the loading of CCR information relative to all constituent slots so that the start of communication in any one constituent would not conflict with actions in another next appearing constituents slot which then might not yet be active. This would lead to error since such communication would of necessity require the full bandwidth of all constituent slots to avoid overrun or underrun.

Relative to active HyperChannel indications HnA, respective FSCn fields contain reference slot pointers used by RSM and DMAC. RSM uses such pointers relative to each constituent slot to translate an internal slot count, which effectively designates the physical time position of the respective slot, into an external logical time slot indication RSM_TSI designating the time position of the associated reference slot. The external indication is thus used for addressing locations in TSR and FIFOR assigned to the reference slot, whenever a constituent slot is serviced.

Relative to each active HyperChannel, RSM also develops control signals to DMARQ (RSM_DMARQ_H1, RSM_DMARQ_H0) for steering requests from RFM and TFM to particular queue positions in DMARQ (see earlier description of DMARQ).

DMAC uses the FSC pointers for determining its channel number (DMAC_CHN_NBR) and H pointer (DMAC_H_PTR) control functions relative to HyperChannel requests (see earlier descriptions of FIFOR, DMAR, DMARQ and DMAC). Recall that the channel number functions are used as (partial) addresses relative to FIFOR and DMAR, while the H pointer values are used as reset steering functions relative to DMARQ (in conjunction with either DMAC_DMARQ_RCV_RESET or DMAC_DMARQ_XMIT_RESET).

15.3 HyperChannel Logic Schematic

Figure 43:
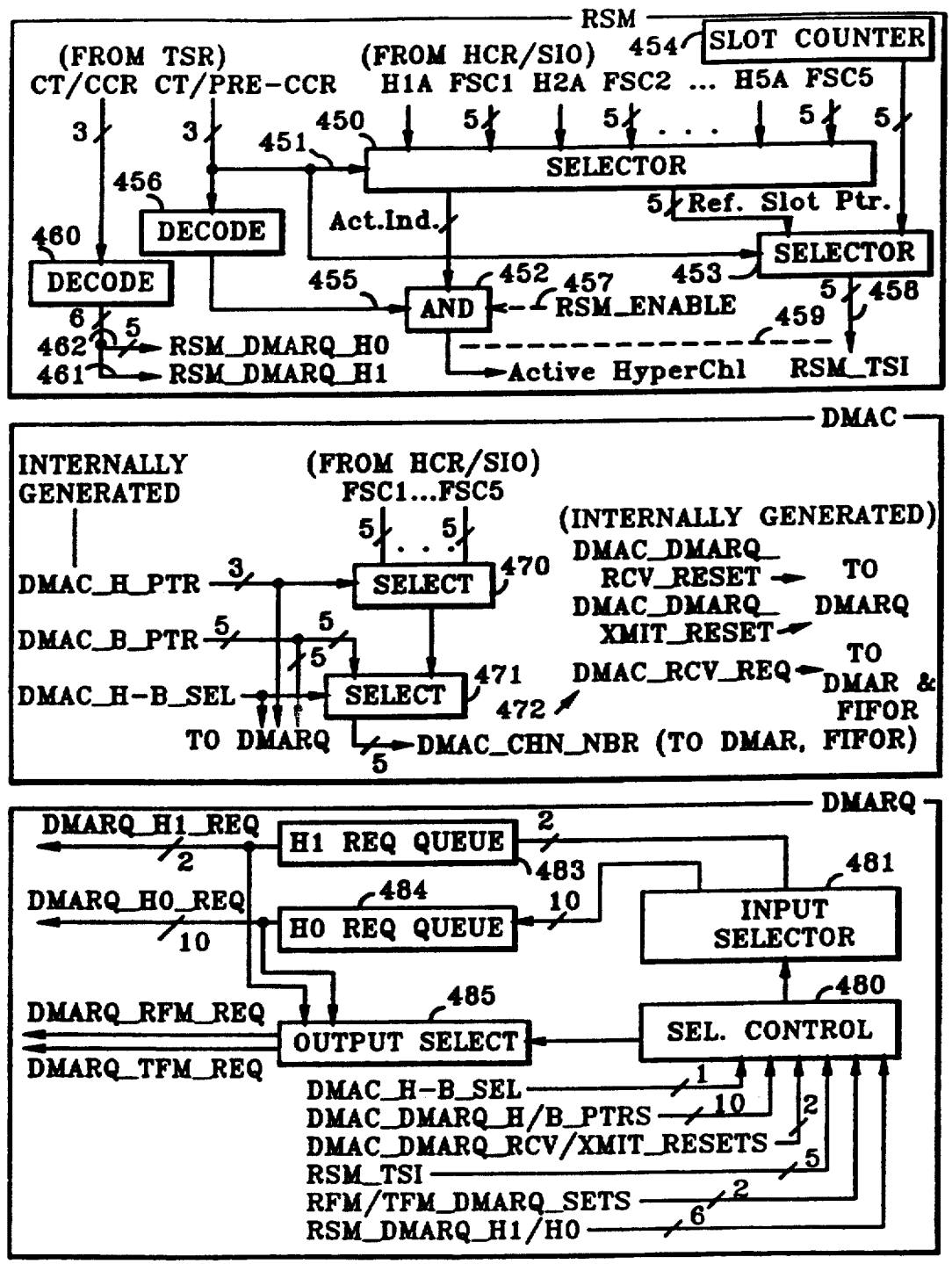
FIG. 43 illustrates circuits within the subject IDLC device which are responsible for defining configuration and usage of HyperChannels.

FIG. 43 schematically illustrates the logic of the IDLC applicable to HyperChannel formation and usage. Such logic is distributed as shown within the RSM, DMAC, and DMARQ partitions. The distributed portions are described separately below. For logical clarity, FIG. 43 illustrates certain functions as performed by "discrete" logical elements (e.g. selector circuits, decoders, etc.), although in the present embodiment many of these functions are integrated within state logic of respective partitions.

15.3.1 RSM Part of HyperChannel Logic

RSM logic associated with HyperChannel usage includes selector circuitry 450. At the beginning of each constituent slot of a HyperChannel, circuitry 450 operates to transfer the information in one of the five numbered field groups in the HCR register (the groups HnA, FSCn; n=1-5) to its outputs. The selected activity indicating bit HnA is transferred to the activity indication output "Act. Ind.", and the associated reference slot pointer FSCn is transferred to the "Ref. Slot Ptr." output.

The HCR register is shown here and in FIG. 4 as residing in SIO, but it should be understood that this was done for topological and signalling convenience and not necessity; topological convenience in respect to distribution of circuit count in the partitions, and signalling convenience in respect to providing the shortest path from IOP to this register. This register could be placed with possibly more logical consistency in RSM, or with perhaps less overall convenience in any other partition.

The HCR group selection made by logic 450 is determined by the CT field of the pre-CCR applied at 451, the latter fetched by RSM from TSR early in each slot period, prior to the start of IDLC synchronous processing relative to the associated slot (see FIG. 3). The activity indication bit HnA in the selected field group is applied to AND gate 452, and the FSCn part of the selected group is applied to a further selector 453.

Selector 453 is responsive to the CT in the pre-fetched CCR to select either a reference slot pointer FSCn supplied by selector 450 or a slot count presented by slot counter 454. Counter 454 counts slot transitions, modulo 32, defined by beginning of slot indications from BTDM. The FSCn function is selected if the CT in the pre-fetched CCR designates a HyperChannel type, and the value of slot count 454 is selected otherwise.

Input 455 of AND gate 452 is activated if the CT function decoded by decoder 456 is designating a HyperChannel type. Input 457 of AND gate 452 is activated when RSM_ENABLE is pulsed active by RSM at a transition phase associated with the start of process activity relative to the current slot; in general terms, at a point in the state swapping process such that the prior latched value of RSM_TSI is useful for addressing TSR spaces at which status of synchronous processing relative to the preceding slot is to be saved and the new latched value of the same parameter is useful to address TSR spaces from which status relative to the slot associated with the pre-fetched CCR is to be loaded.

Output 458 of selector 453 is latched in not-shown latches, and as intended to be indicated by dotted line connection 459 from the output of AND gate 452 to selector output 458, such latching is effected in time synchronism with the activation of the AND gate (in particular, when RSM_ENABLE rises). Thus, when the now current slot is one associated with an active HyperChannel, the value of RSM_TSI latched at the output of selector 453 will be a reference slot pointer FSCn function chosen by selector 450, whereas if the now current slot is associated with an active B/D type channel the latched value of RSM_TSI will be the current slot count.

The function latched at RSM_TSI is presented to other partitions (TSR, FIFOR, INT and DMARQ) as the now current time slot indication. Thus, addressing functions in these partitions are referred to the time position of a reference slot when the current slot is a constituent slot of a HyperChannel, and to the actual time position represented by the slot count otherwise. Note that as the RSM_TSI value is latched, the previous value is saved in a not-shown latch to preserve the address parameters needed to complete the saving of state information relative to the previous slot.

During the now current slot, the CCR is refetched (see RSM description earlier) and its CT field is applied to decoder 460. When the applied CT designates an H1 HyperChannel type, a respective output 461 of decoder 460 is activated. When the applied CT designates an H0n type HyperChannel (n=1 to 5) a respective one of the 5 lines at decoder output 462 is activated. When the applied CT designates B/D channel type not-shown other output of decoder 60 is activated. Decoder outputs 461 and 462 are supplied to DMARQ as respective HyperChannel type indications RSM_DMARQ_H1 and RSM_DMARQ_H0n, and used by the latter to steer input request setting signals (from RFM and TFM) and request resetting signals (from DMAC) to positions within DMARQ queues associated with type H1 and H0 HyperChannels (see description of DMARQ portion of HyperChannel logic below, and earlier description of DMARQ partition, for additional details).

15.3.2 DMAC Part of HyperChannel Logic

DMAC logic for HyperChannel use includes "cascaded" selectors 470 and 471. In the earlier description of the DMAC partition, functions of these selectors are performed by the state logic of the partition, but for logical clarity these functions are shown here in association with discrete decoding entities.

Selector 470 receives as inputs the FSC fields of HCR, and is operated by DMAC_H_PTR when DMAC is servicing a HyperChannel request, to select the FSCn field specifically designated by the H pointer value. The H pointer is generated by the DMAC_A state machine (see FIG. 38 and related earlier description of DMAC).

Selector 471 receives as inputs the output of selector 470 and DMAC_B_PTR, the latter also generated by the DMAC_A state machine (FIG. 38), and selects one of those as a function of its control input DMAC_H_B_SEL (also generated by the state machine). The latter control input distinguishes which type of channel request is currently being serviced by DMAC, HyperChannel or B/D type channel.

DMAC selects pending requests from DMARQ for DMA transfer service (relative to IOP memory as described earlier), one at a time and in predetermined priority sequence (refer to earlier descriptions of DMARQ and DMAC). As a request is selected for service, DMAC state logic remembers its DMARQ output position, and uses that to determine values of DMAC_H_PTR, DMAC B PTR and DMAC_H_B_SEL to be generated when respective requests are to be reset.

The state logic of DMAC also generates functions indicated at 472; DMAC_DMARQ_RCV_RESET, DMAC_DMARQ_XMIT_RESET and DMAC_RCV_REQ. The first two of these are supplied to DMARQ along with the above H and B pointers for steering reset signals to queue positions respectively associated with receive and transmit operations (refer to DMARQ description) relative to the HyperChannel designated by the H pointer. DMAC_RCV_REQ is supplied to DMAR for conditioning the latter for addressing operations associated with receive requests (see earlier DMAR description).

15.3.3 DMARQ Part of HyperChannel Logic

This part of the HyperChannel logic includes portions of the selection controls and request queues associated with handling of HyperChannel requests for DMAC service.

Selection control 480 represents that part of the selector controls 335 shown in FIG. 36 which is relevant to handling of HyperChannel requests. Input selection control 481 represents that part of input selection controls 333 in FIG. 36 (the controls responsible for steering setting and resetting requests to appropriate positions in the DMARQ request registration queues) which is relevant to handling of HyperChannel requests. Queues for H1 HyperChannel requests shown at 483 and 484 correspond respectively to queues 330 and 331 shown in FIG. 36. Finally, output selection controls shown at 485 represent that part of output selection controls 334 in FIG. 36 which is relevant to presentation of HyperChannel request status to RFM and TFM. Output controls 485 present request queue status in time multiplex in synchronism with the servicing of channel slots (in respect to HyperChannels, in synchronism with servicing of constituent slots). Status of requests for DMA receive data service are presented to RFM at DMARQ_RFM_REQ (corresponding to output port 334R in FIG. 36), and status of requests for DMA transmit data service are presented to TFM at DMARQ_TFM_REQ (corresponding to output 334T, FIG. 36).

15.4 Example of Dynamic HyperChannel Formation

An example of HyperChannel formation follows with the following scenario. Initial state: IDLC disabled for H1 type HyperChannel formation (i.e. H0 allowed), and currently using BTDM slots 3-7, 12-19 and 25-30 to sustain active B type channels and/or one or more (but less than 5) H0 type HyperChannels.

The foregoing status and slot usage leaves 13 BTDM slots available for other usage (slots 0-2, 8-11, 20-24 and 31). In general, groups of 6 basic slots can be used for H0 type HyperChannel formation. Thus, the available slots as above are candidates for potential assignment to either two H0 HyperChannels (if 3 or less of such are currently active) and 1 B type channel, or to one H0 HyperChannel and seven separate B type channels, or to thirteen separate B type channels. The following is a description of how 6 of the available slots could be assigned on a dynamic basis to a newly configured H0 full duplex type HyperChannel (dynamic in the sense that processing in the currently active slots continues uninterrupted during formation of the new H0 HyperChannel).

To establish the H0 HyperChannel, the local IOP/Host would have to first communicate with the remote IOP/Host to which it intends to link (presumably, through an existing active D channel signalling link between the local and remote systems. Such communication would request setting up an H0 HyperChannel linkage. The response from the remote system would indicate its availability for such linkage (it would be available only if it were in a state permitting H0 formation and had six idle slots).

Assume that both local and remote nodes are configurable for H0 formation and have capacity for such (and have so indicated in their communications). The next step would be for the local IOP/Host to instruct the remote node (via existing signalling link) to form an H0

HyperChannel. Upon acknowledgement of this communication, the local IOP/Host would begin forming the new H0 HyperChannel.

The first step in the formation would be for the local IOP/Host to program the CCR's associated with local slots 1, 2 and 8–11 with type field (CT) assignments designating each as a constituent slot of a specifically numbered H0 type HyperChannel; doing so by accessing the spaces in the local TSR assigned to those CCR's (via the local SIO) and loading appropriate information therein.

Next, the local IOP/Host must load control parameters in TSR, FIFOR and DMAR, into spaces associated with the reference slot position, for sustaining the required HyperChannel operation in all involved partitions. These loading operations are conducted of course via SIO, and include: (1) loading TSR with time-swap state parameters required for initiating synchronous transmit and receive processing in the designated HyperChannel; (2) loading FIFOR with initial RDCR1 and TDCR1 control parameters required for FIFOR management in that HyperChannel; and (3) loading DMAR with RDCR3,4 and TDCR3,4 control parameters required for controlling DMAC access to IOP memory and FIFOR for that HyperChannel.

Then the local IOP/Host would prepare spaces in its memory for sustaining the H0 channel communications, and send a further communication to the remote IOP/Host (over the existing signalling link) indicating completion of its H0 formation and readiness to activate the new HyperChannel. When the remote IOP/Host acknowledges with same status, the local IOP/Host would set the FSCn and HnA field associated with the new HyperChannel's H0 number (in the HCR register of the local IDLC); the FSC field being set to point to slot 1 as the reference slot for the respective HyperChannel, and the HA bit being set to its active state. Presumably, the remote system would be doing the same. This completes the process, and the new HyperChannel is now available for active data communication.

SUMMARY

It should be appreciated now that we have described a communications controller device in which basic time division slots in an ordered time division frame are assignable either individually to basic channels, or in plural slot groups to extended channels and HyperChannels. In assignments of the basic slots to extended channels and HyperChannels, the grouped slots function effectively as a single slot unit associated with a reference (earliest appearing) slot in the group. A logical plural-to-one association is formed between the constituent slots of each group and the reference slot so that addressing functions ordinarily related to the basic slots are transformed into addressing functions related only to the reference slot.

One advantage of this transformation/association is that it simplifies operations between external host processing systems and the device relative to programming of HyperChannel or extended channel control parameters and retrieval of interruption status information. Thus, the external system need only load control parameters for HyperChannels and extended channels into device storage spaces assigned to the reference slot, and when retrieving channel event status from the device, the external system need only refer to device storage space assigned to the reference channel for storing such status.

Accordingly, these and other advantages and aspects of the subject device relative to HyperChannel usage are now defined by the following claims.

We claim:

1. In a communication controller for interfacing between a data processing system and a signal communication network, said controller having a plurality of internal channels selectively allocatable for interfacing to discrete external communication channels in said network, each of said internal channels having reserved exclusively thereto internal buffer memory for temporary storage of data signals being transferred between it and said network, an arrangement for operating a selected group of plural internal channels, in time coordination, as an extended bandwidth logical internal channel, in order to interface with an external channel on said network which operates at data signal transmission rates exceeding the capacity of a single said internal channel, said arrangement comprising:

random access memory (RAM) means having storage spaces therein reserved to individual said internal channels;

first means coupled to said RAM means for assigning a group of selected ones of said internal channels as constituents of a said extended bandwidth logical internal channel; said first means including means for designating a selected one of said assigned internal channels as a reference channel for the respective group;

second means coupled to said first means for defining operations to be conducted between all of said assigned internal channels and a single associated external channel; and third means, coupled to said first and second means, for conducting data transfer operations, in time coordination, between said associated external channel and each of said assigned internal channels; said third means including means for effectively transferring data signals in transit relative to said associated external channel between each said assigned internal channel and only storage space in said RAM reserved to said reference channel; whereby all data in transit between the associated external channel served by each said group and said data processing system is effectively funneled through only the internal buffer storage space reserved to said reference channel; and wherein:

said internal channels are served in cyclically recurrent time slots of cyclically recurrent time frames; each internal channel having a time slot position in each said frame uniquely assigned thereto;

said controller includes means for generating numerical slot indications in synchronism with occurrences of said time slots, said indications representing time positions of respectively occurring slots in said frame; and said third means includes for selectively translating each said slot position assigned to an internal channel in said group other than said reference channel into the slot position indication assigned to said reference channel; whereby data transfer operations relative to said RAM during each time slot allocated to the internal channels in said groups are steered to a space in said RAM dedicated to the respective reference channel of the group.

2. The arrangement in accordance with claim 1 further comprising:
   fourth means, cooperative with said third means but operating in asynchronous relation to said internal channels, for transferring data signals sequentially between said internal buffer memory space reserved to the reference channel of each said group and said data processing system in the sequence corresponding to the order in which said signals are communicated over the external channel to which the respective group interfaces.

3. The arrangement in accordance with said system comprises a shared memory accessible to said controller, and said fourth means comprises:
   direct memory access (DMA) control means, for controlling direct access to said shared memory and direct transfers of data signals between the internal buffer memory reserved to said internal channels and said shared memory; said DMA control means being adapted when operating relative to each said internal channel group to transfer data signals only between the internal buffer memory reserved to the respective reference channel and said shared memory.

4. The arrangement in accordance with claim 1 wherein:
   said first means comprises a dedicated register in said controller.

5. The arrangement in accordance with claim 4 wherein:
   said register is accessible to said data processing system for enabling said system to programmably select a said reference internal channel for each said group.

6. The arrangement in accordance with claim 4 adaptable to sustain operations concurrently relative to a plurality of separate groups of internal channels allocated by said first means, wherein;
   said register comprises a plurality of sections associated with respective said groups, each section designating a reference channel for the respective group.

7. The arrangement in accordance with claim 1 wherein:
   said first means is capable of allocating varied numbers of said internal channels to different said groups, and the time slots associated with the internal channels of each group may be slots having non-adjacent time positions in said frame; and
   each said internal channel has exclusively reserved thereto an interrupt status queue, for presenting information concerning its operational status to said data processing system, and interrupt status of each said group of internal channels is mapped to the interrupt status queue reserved to the respective reference channel.

8. The arrangement in accordance with claim 7 wherein said data processing system comprises an addressable memory and a parallel data transfer bus connecting said system with said memory and peripheral devices, and wherein said controller further comprises:
   means for connecting said controller to said bus;
   DMA (direct memory access) control means coupled between said means for connecting to said bus and said task performing means for directing transfers of data between said internal buffer memory and said addressable memory via said bus connecting means, said DMA control means operating in asynchronous relation to time slots allocated to any said group, and in a DMA mode relative to said addressable memory for transferring data between a space in said internal buffer associated with the reference time slot of the respective group and said addressable memory; and
   request queueing means coupled between said task performing means and said DMA control means for receiving and storing requests for data transfer action from said task performing means during occurrences of said time slots associated with said internal channels and for presenting said stored requests to said DMA control means in asynchronous time relation to said internal channel time slots; said request queueing means storing requests associated with said groups in request queues associated with said groups and separate from requests associated with active internal channels that are not allocated to a group; said DMA control means giving priority service to requests associated with said groups ahead of requests associated with internal channels that are not allocated to groups.

9. The arrangement in accordance with claim 8 wherein said request queueing means comprises:
   means responsive to completion indications presented by said DMA control means upon completion of handling of said queued requests for resetting respective requests; and
   means operating in synchronism with said time slot indication translating means for presenting indications of the resetting of requests associated with said internal channels to said task performing means in time slots associated with respective internal channels; said resetting indications of requests associated with said groups being presented in the time slot associated with the respective reference channel.

10. The arrangement in accordance with claim 1 including:
    means coupled to said slot indication translating means, and operating in synchronism with occurrences of time slots allocated to any said group, for performing time coordinated processing tasks on data signals being communicated between said any group and a respective external channel in said network; said task performing means including means responsive to control information stored in said RAM relative to the reference channel of each said group for coordinating the performance of said tasks relative to data in transit relative to all time slots of the respective group, said control information to which said coordinating means is responsive being accessed via addressing functions generated by said slot position indication translating means.

11. The arrangement in accordance with claim 10 wherein said groups formed by operations of said time slot allocating means are configurable to operate as HyperChannel units.

12. In a data communication controller for interfacing between a communication network and a data processing system, said controller having a plurality of internal channels selectively assignable for interfacing to discrete external channels in said network, said controller having internal buffer memory reserved to each said internal channel for storing data signals being transferred between said network and the respective internal channel, an arrangement for operating a selected group of said internal channels as a single HyperChannel unit having greater bandwidth than individual said internal channels, said arrangement comprising:
- first means for designating a group of plural selected ones of said internal channels as constituents parts of a said HyperChannel unit;
- second means for designating a selected one of said constituent channels as a reference channel for the group;
- means for storing control information in association with said reference channel for controlling operations relative to the respective group;
- means coupled to said first and second designating means for accessing said control information while operating relative to constituent channels other than a said reference channel, and responsive to said control information for transferring data exclusively between the buffer memory reserved to the respective reference channel and said network, whereby data in transit between said other constituent channels and said network is effectively funneled through said respective reference channel while being internally processed in said controller and whereby such data is always handled internally by said controller in the same sequence in which the associated data signals are transferred over said network; and wherein:
- said data transferred between said controller and said processing system, relative to each said HyperChannel unit, is transferred effectively relative to the respective reference channel and consists exclusively of data transferred relative to the internal buffer memory reserved to said respective to said respective reference channel.

13. An arrangement in accordance with claim 12 wherein:
- said second designating means comprises a register in said controller dedicated for use relative to one or more HyperChannel units.

14. An arrangement in accordance with claim 13 wherein data is transferred between said controller and network bit serially relative to individual said internal channels, including said constituent channels, and between said controller and processing system in bit-parallel form.

* * * * *